United States Patent [19]
Carley

[11] Patent Number: 6,038,348
[45] Date of Patent: Mar. 14, 2000

[54] PIXEL IMAGE ENHANCEMENT SYSTEM AND METHOD

[75] Inventor: Adam Carley, Windham, N.H.

[73] Assignee: Oak Technology, Inc., Sunnyvale, Calif.

[21] Appl. No.: 08/685,804

[22] Filed: Jul. 24, 1996

[51] Int. Cl.[7] ..................................................... G06K 9/40
[52] U.S. Cl. .......................... 382/268; 382/254; 358/448
[58] Field of Search .................................... 382/254, 268, 382/162, 266; 358/447, 448, 455, 462, 534

[56] References Cited

U.S. PATENT DOCUMENTS

| | | | |
|---|---|---|---|
| 4,437,122 | 3/1984 | Walsh et al. | 358/447 |
| 4,847,641 | 7/1989 | Tung | 347/131 |
| 5,481,627 | 1/1996 | Kim | 382/254 |

*Primary Examiner*—Thomas D. Lee
*Attorney, Agent, or Firm*—Testa, Hurwitz & Thibeault, LLP

[57] ABSTRACT

A pixel image enhancement system which operates on color or monochrome source images to produce output cells the same size as the source pixels but not spatially coincident or one-to-one correspondent with them. By operating upon a set of input pixels surrounding each output cell with a set of logic operations implementing unique Boolean equations, the system generates "case numbers" characterizing inferred-edge pieces within each output cell. A rendering subsystem, responsive to the case numbers and source-pixel colors, then produces signals for driving an output device (printer or display) to display the output cells, including the inferred-edge pieces, to the best of the output device's ability and at its resolution.

58 Claims, 8 Drawing Sheets

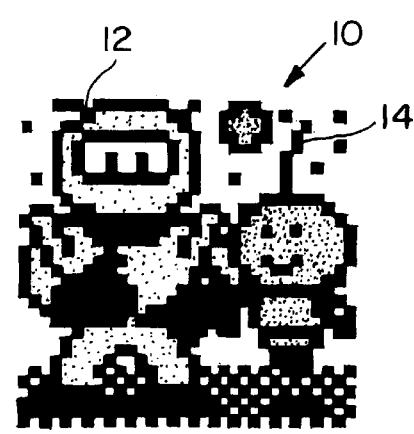
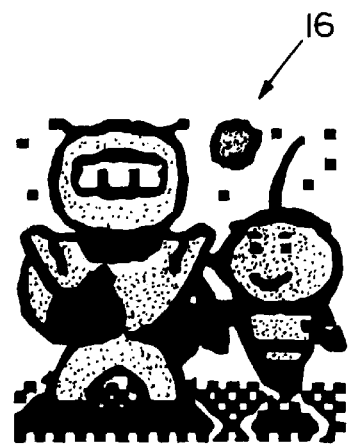
FIG. 1        FIG. 2
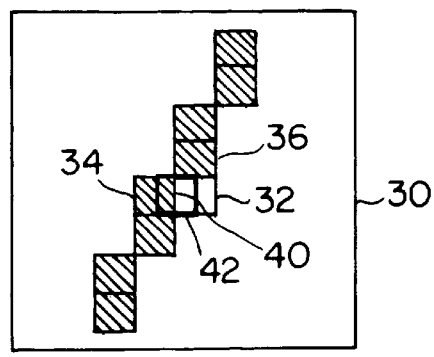
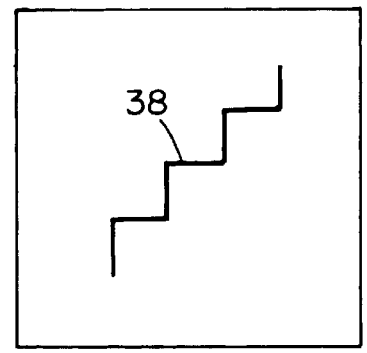
FIG. 3A       FIG. 4
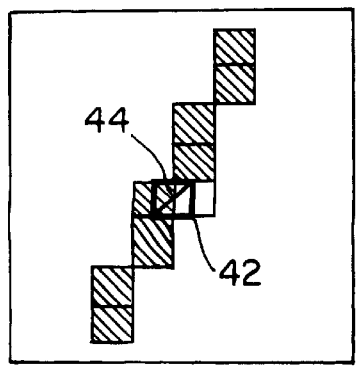
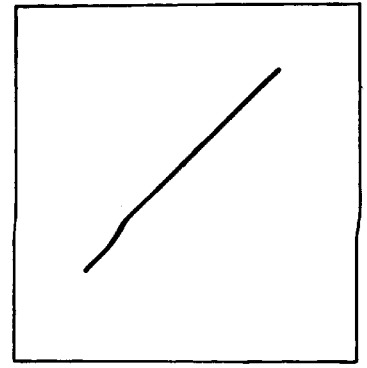
FIG. 3B       FIG. 5

Case #06
Darkness x 256: 64
c.of g.x 256: 0

Near-45-Degree cases: A
Vertical-45 set

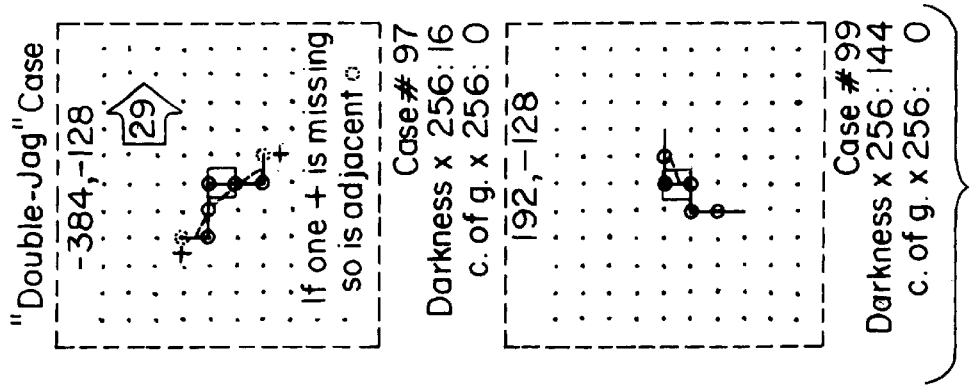
FIG. 8C Near-45-Degree Cases: A Special Cases
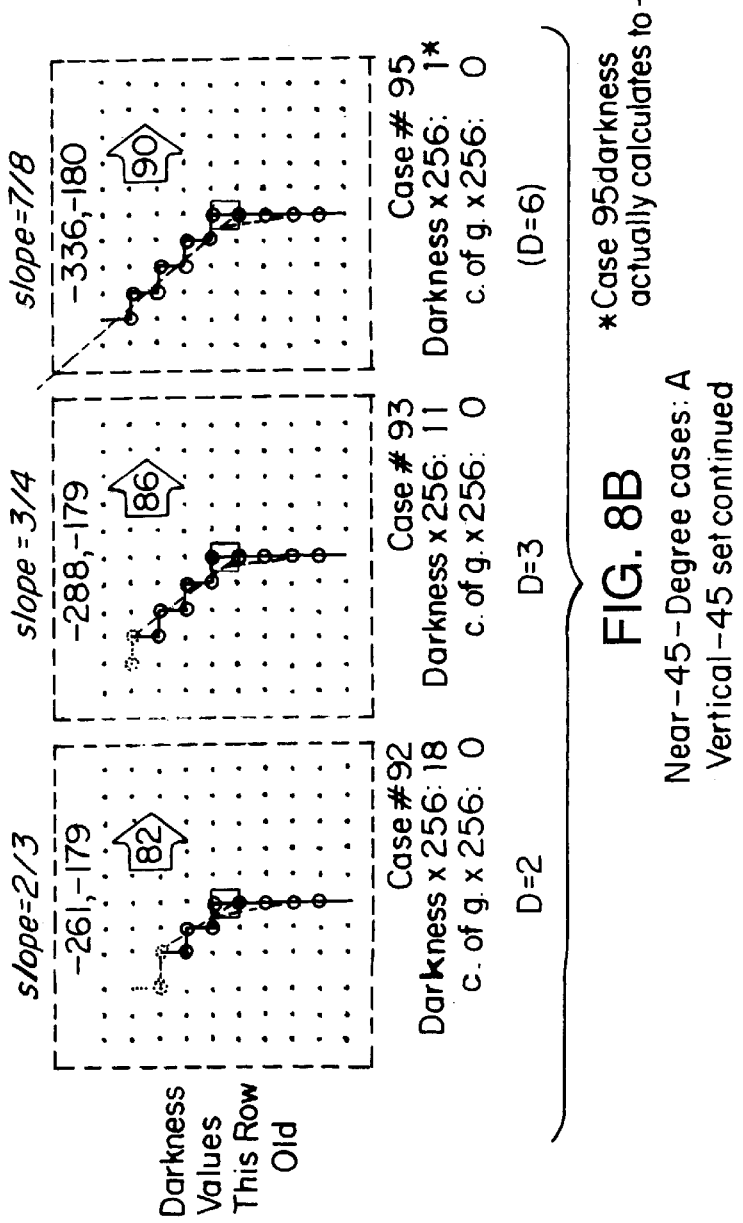
FIG. 8B Near-45-Degree cases: A Vertical-45 set continued

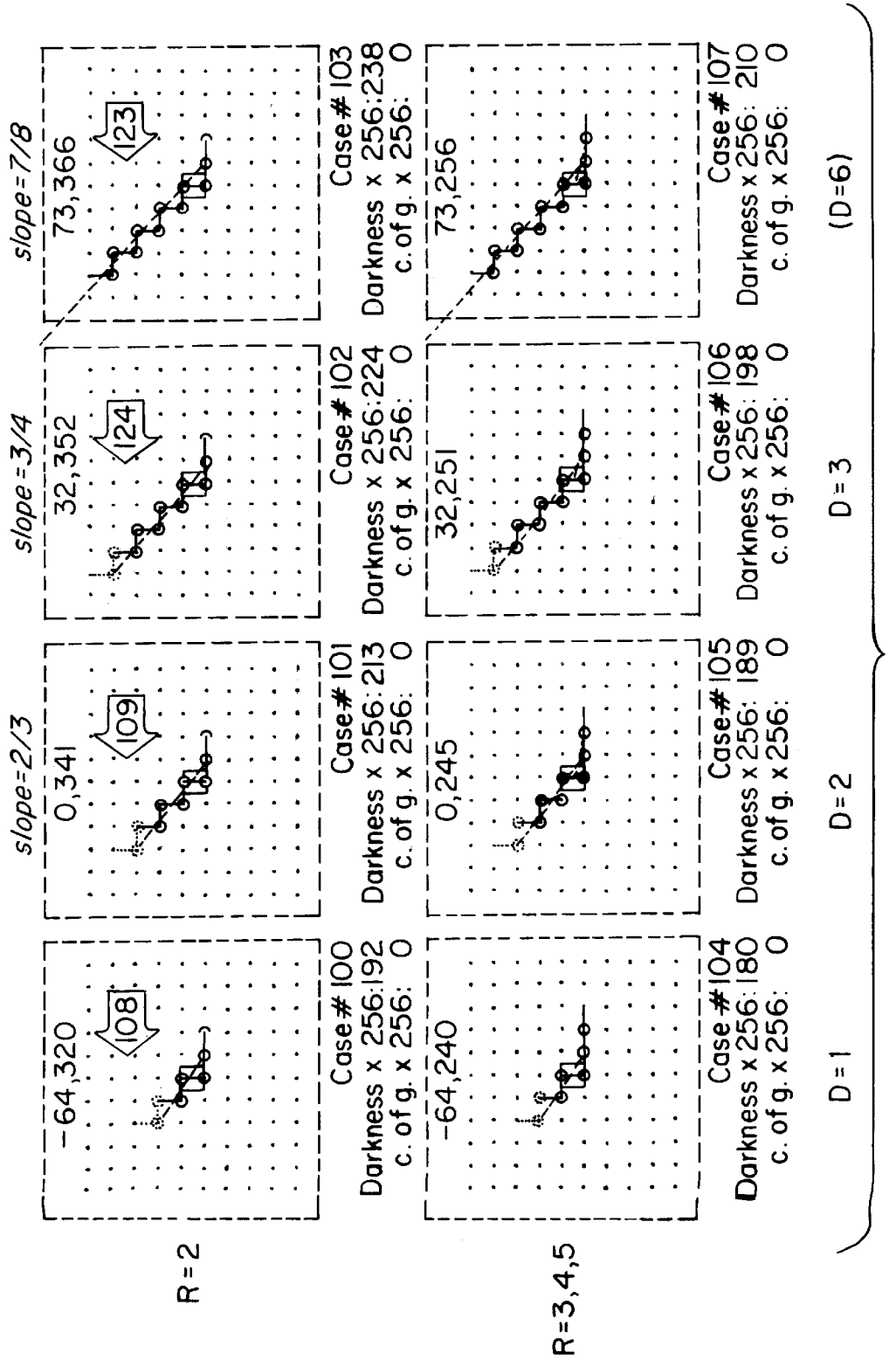
FIG. 8D Near-45-Degree Cases: A
Split_45 END set

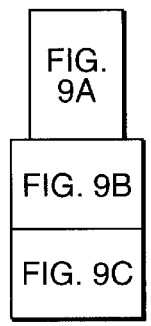
FIG. 9
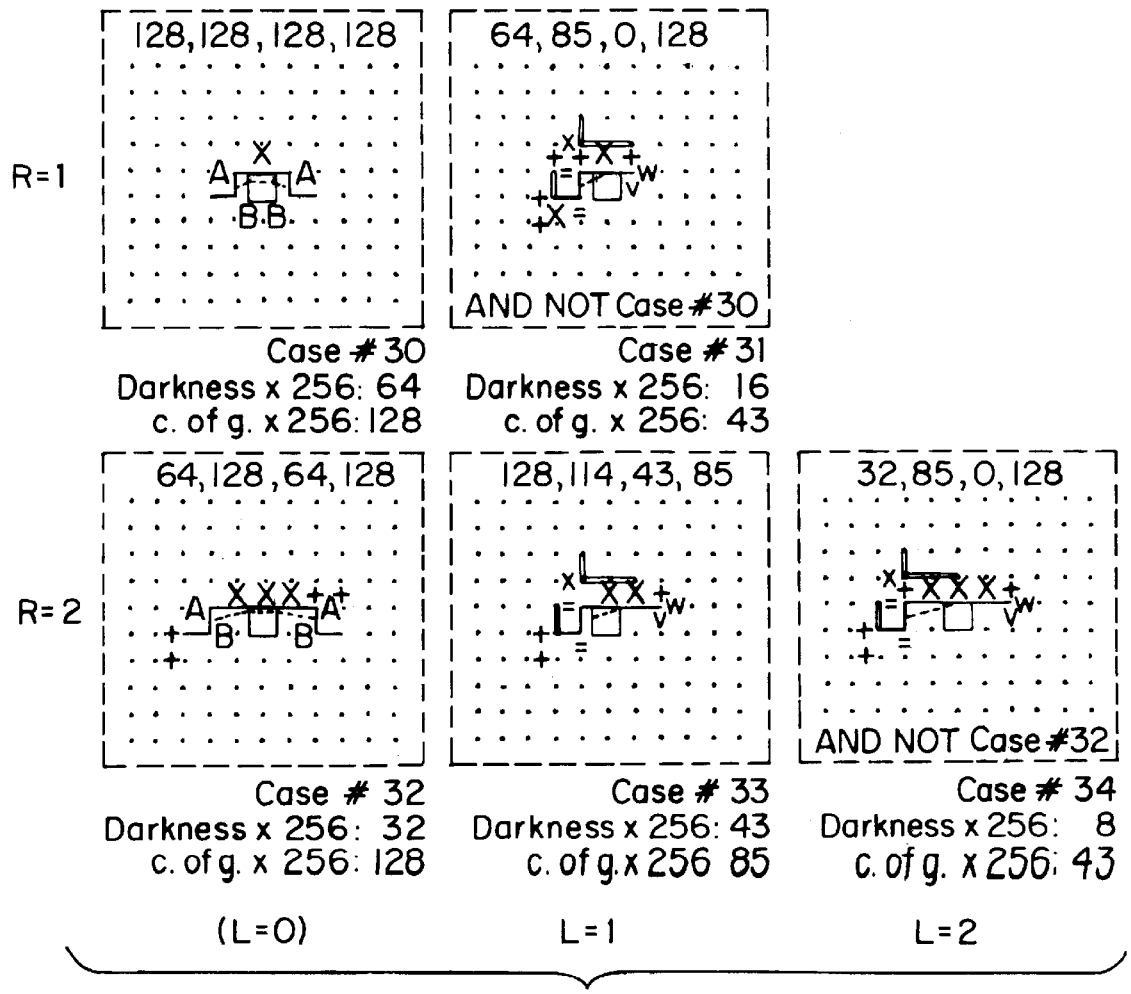
FIG. 9A Color Near-Horizontal Cases

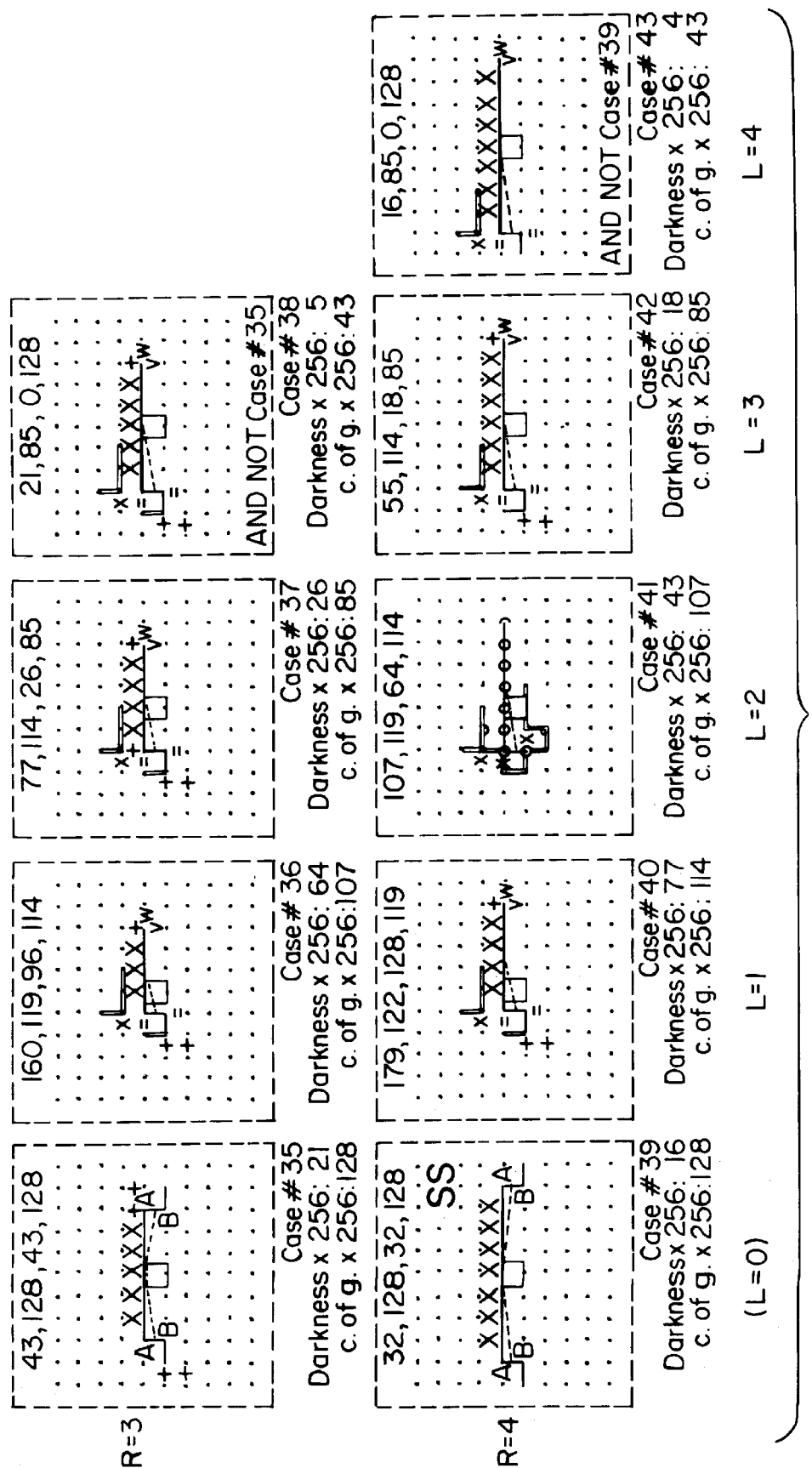
FIG. 9B Color Near-Horizontal Cases continued

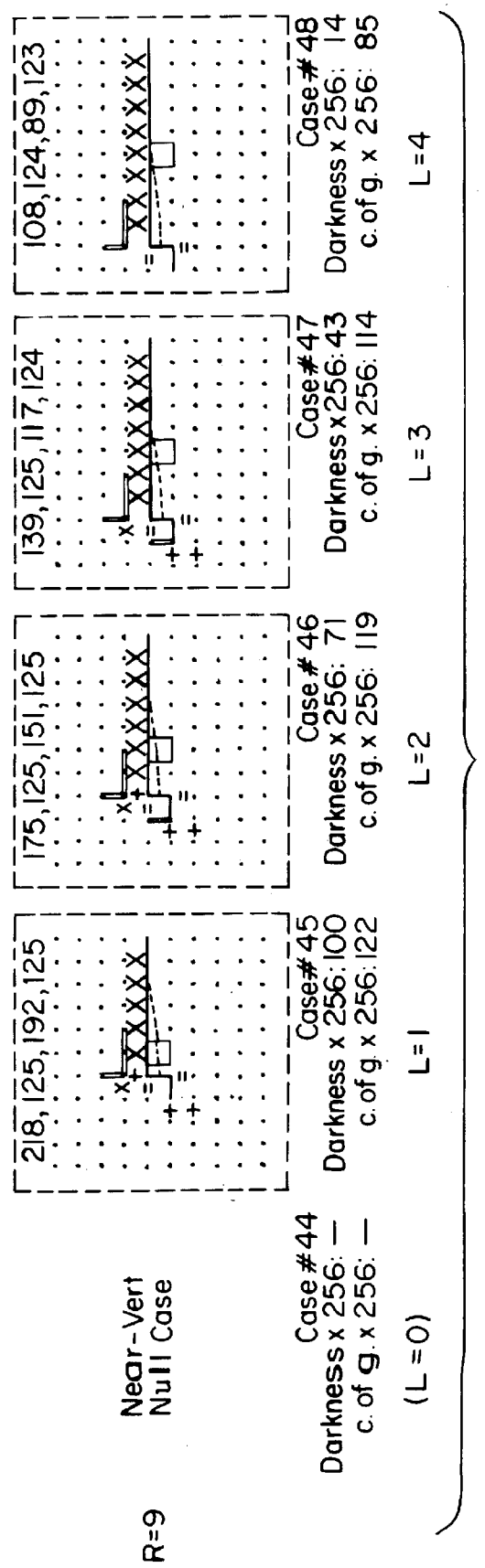
FIG. 9C Color Near-Horizontal Cases continued

6,038,348

PIXEL IMAGE ENHANCEMENT SYSTEM AND METHOD

FIELD OF INVENTION

A pixel image enhancement system for higher resolution black and white and color images including alphanumeric characters and graphic video game designs displayed on such devices such as computer monitors, printers, facsimile machines, television screens, video game displays, and the like.

BACKGROUND OF INVENTION

A need for higher resolution image production is well documented in the art. A close inspection of letters and graphic images on a computer screen or a hard copy print out reveal jagged lines causing an unsightly rough appearance of displayed and printed images.

One method of ameliorating this problem, disclosed in U.S. Pat. No. 4,437,122 to the Xerox Corporation involves isolating a center pixel, matching the 3 by 3 pixel pattern surrounding and including the center pixel with a table of "standard pixel formats", and then subdividing the center pixel area into enhanced "subpixels".

Another method utilizes pattern matching templates operating on a window with a central bit. See U.S. Pat. No. 4,847,641 assigned to the Hewlett Packard Corporation.

One disadvantage in the prior art is the use of "standard pixel formats" and templates. When the selected pixel and the surrounding pixels to be analyzed are few in number, for example a 3 by 3 pixel matrix, and when the pixels are only bi-valued (black or white), the total number of possible input patterns is small. A 3 by 3 matrix of input pixels, each either black or white, has a total of only 512 possible patterns which, in contemporary hardware or software can easily be handled by placing 512 hand selected "answers" ("templates" or "standard pixel formats") into a look-up table. The analysis of only a 3 by 3 pixel matrix is very error prone, however, since the pattern analyzed can be indicative of a line angled at 45° or the beginning of a curve. Analyzing a larger subset of the input pixel matrix requires the formation of a very large unwieldy number of standard pixel formats or templates.

The templates disclosed in the Hewlett Packard patent are similar to input windows except for having a third pixel state in addition to black or white. The third state is called a "don't care" condition. This allows each template to represent many possible inputs, specifically two to the power of the number of "don't care" conditions in a given template, thus greatly reducing the number of templates required. Such tri-valued templates, however, are still very limited. For example, if one tiny feature is to be allowed two different ways, two completely separate templates are required.

Although it may be fairly straight forward to straighten out a jagged 45° line according to this prior methodology, it is nearly impossible to use standard pixel formats or templates to account for the numerous possible permutations of angled lines, curves, and other features inherent in the display of alpha numeric characters and graphical displays. In addition, the prior art methodologies are generally constrained to bi-valued input bitmaps.

Another type of system involves the use of "anti-aliasing" filters which are linear. Anti-aliasing filters do not make inferences based on real world properties of edges such as slope continuity. Anti-aliasing filters remove spurious a high frequency information which is an artifact of the quantization process but they do not replace the spurious high frequency information with inferred hypothetical high frequency information.

SUMMARY OF INVENTION I

It is therefore an object of this invention to provide an improved pixel image enhancement system and methodology.

It is a further object of this invention to provide such a pixel image enhancement system and methodology which is not constrained to templates or standard pixel formats.

It is a further object of this invention to provide such a pixel image enhancement system and methodology which is not constrained by use of a center pixel, a center bit, or a small 3 by 3 input pixel pattern.

It is a further object of this invention to provide such a pixel image enhancement system and methodology which eliminates the requirement that the input pixels be bi-valued.

It is a further object of this invention to provide such a pixel image enhancement system and methodology which is able to handle any input pixel pattern and which enhances color images.

It is a further object of this invention to provide such a pixel image enhancement system and methodology which is implemented in hardware instead of software thereby decreasing the processing time.

It is a further object of this invention to provide such a pixel image enhancement system and methodology which can be used in conjunction with any type of output display device: CRT's, LCD displays, printers, facsimile machines, television, and which is easily housed within a chip which can be located in the output device.

It is a further object of this invention to provide such a pixel image enhancement system and methodology which employs an inferential algorithm for image outline detection.

It is a further object of this invention to provide such a pixel image enhancement system and methodology which utilizes a digital modulator, in some applications, for precise pixel positioning.

It is a further object of this invention to provide such a pixel image enhancement system and methodology which lowers the video subsystem cost.

It is a further object of this invention to provide such a pixel image enhancement system and methodology which lowers memory and processing requirements.

This invention results from the realization that a high resolution pixel image enhancement system can be accomplished, not by analyzing a central pixel of a small matrix of input pixels using templates or tables of standard pixel formats, but by detecting elemental edges between adjacent input pixels, generating an edge map, and using Boolean equations implemented in hardware to produce a segment of an inferred edge, within an output cell area, from the edge map resulting in higher resolution and accuracy than the inputted pixel map would otherwise allow. The result is a system which enhances color as well as black and white alphanumeric and graphic images and which can be used in conjunction with any type of display device: printers, CRTs, LCD displays, projection displays, television, facsimile machines and the like at a much lower cost. An unwieldy number of patterns or templates need not be designed and the system can be implemented on a chip which is placed in the output device or elsewhere for very high resolution.

This invention features a pixel image enhancement system and method. The system includes means, responsive to an input pixel map, for detecting edges between adjacent input pixels of the map. The edge may be defined by two adjacent pixels of different color. There are means for analyzing a set of pixels surrounding an output cell area partially overlapping a plurality of pixels including means for generating a case number characterizing the inferred edge based on the set of pixels surrounding the output cell. There are also means, responsive in the case number, for producing a display signal which drives an output device to display, to the best of its ability, the inferred edge.

In the preferred embodiment, the input pixel bit map is 640×480 pixels and the output device has a resolution of 800×600 pixels. The display signal is output for each pixel of the output device in the typical implementation. The system also features means for detecting an edge between adjacent pixels by identifying a difference of color between the adjacent input pixels. The means for generating a case number preferably includes a set of logic operations implementing Boolean equations defining the case number as a function of the set of pixels surrounding the detected edge. In a preferred embodiment, an edge map is generated which contains the detected edge.

This invention also features a pixel image enhancement system comprising means for creating an output cell which partially overlaps a plurality of adjacent input pixels, means for defining a window of input pixels surrounding the output cell, means for generating a case number characterizing the window and an inferred edge piece within the output cell, and means for displaying the output cell.

The means for detecting an edge between adjacent pixels includes means for identifying a difference of color between the adjacent input pixels. The input pixels are typically in the form of a pixel map and the means for creating an output cell includes means for sequentially creating output cells at each set of adjacent input pixels across scanned rows. The window typically includes an odd number of pixels in one direction and an even number of pixels in the other direction and in the current embodiment the window is 9×10 pixels. The means for generating the case number typically includes a set of logic operations implementing Boolean equations defining the case number as a function of the detected edges between adjacent pixels within the window. As an intermediate step, an edge map containing the detected edges is also generated.

This invention also features a pixel image enhancement method comprising the steps of detecting, in response to an input pixel map, an edge between adjacent input pixels in the map, analyzing a set of pixels surrounding the detecting edge including generating a case number of characterizing an inferred edge based on the set of pixels surrounding the detected edge, and producing a display signal, in response to the case number, which drives an output device to display the inferred edge.

The method of this invention typically includes the steps of detecting edges between adjacent input pixels, creating an output cell which partially overlaps a plurality of adjacent input pixels, defining a window of input pixels including the plurality of adjacent input pixels, generating a case number characterizing the window and an inferred edge within the output cell, and then displaying the output cell. The step of detecting an edge between the adjacent pixels typically includes identifying a difference of color between adjacent input pixels. The input pixels may be in the form of a bit map and if so the step of creating the output cells includes sequentially creating output cells at each set of adjacent input pixels in the bit map. The window typically includes an odd number of pixels in one direction and even number of pixels in the other direction such as a 9×10 window or an even number in both dimensions such as 8 by 8. The step of generating a case number includes implementing Boolean equations defining the case number as a function of the detected edges between adjacent pixels within the window. The method further includes a step of generating an edge map containing the detected edges.

The above system and method apply to both bivalued (e.g. black and white) and color images. For color images, this invention also features a computation device for converting a digitized source color image containing at least three different colors continuously disposed, into a second electronic color image of different effective spatial resolution. There are means for forming a scanned sequence of examination windows into the digitized color image. The examination windows are at least three pixels high and at least three pixels wide. There are also means for defining a corresponding scanned sequence of elemental inferral areas smaller than, and substantially centered within, the examination windows. There are means, responsive to the colors of pixels within the examination windows, for computing at least one inferred edge piece within at least some of said elemental inferral areas. There are also means for combining the inferred edge pieces within the elemental inferral areas, with the source image color to produce one elemental unit of the second electronic color image.

The second electronic color image typically comprises a standard array of binary coded pixels. The second color image may be formatted for display (printing) on a color printer, or for display on a color display device including a cathode ray tube or a fixed-pixel flat-panel display. In some cases, the spatial resolution is a decreased resolution, and other cases, the spatial resolution is an increased resolution. The color display may be a multiresolution display operated in higher resolution mode than the resolution of the digitized color image. The computation device may comprise a microprocessor with software. The computation device may be a part of an integrated circuit including pipelined logic operable in real time. The digitized color image may be a still image or a moving color image.

The Examination window is typically rectangular and has an even number of pixels in one dimension and an odd number of pixels in the other dimension. It may also have an even number of pixels in both dimensions. The Examination window may be of variable size and may be elliptical, i.e. have its corners missing.

The elemental inferral area, in the preferred embodiment, is equal in area and aspect ratio to the input pixels in the digitized color image. It at least partially overlaps at least two adjacent input pixels in the digitized color image. The elemental inferral area may partially overlap four touching input pixels in the digitized color image.

The means for computing the inferred edge pieces typically computes either zero, one, or two inferred-edge pieces within a given elemental inferral-area. The computation selects from among a predefined set of no more than 1000 predefined inferred-edge pieces. The selection is usually represented as a binary case number. Alternatively, the selection may be represented as an active signal on one of a set of conductors, the set of conductors corresponding to the set of predefined inferred-edge pieces. The means for computing the inferred-edge pieces comprises means for separately computing unoriented inferred edge pieces and separately computing an orientation to be applied to the unoriented inferred-edge pieces. There may be four possible orientations constituting all possible combinations of vertical and horizontal mirror images of unoriented edge-pieces, or eight by further including 90° rotation.

Further included are means for computing an intermediary map of existing edges in the digitized color image and within the examination window. The intermediary map of existing edges may designate an edge as present between two contiguous source pixels when the contiguous source pixels differ at all in color. The intermediary map of existing edges may designate an edge as present between two contiguous source pixels when the contiguous source pixels differ in color by more than a given threshold amount in units approximately representative of the psychological color difference between the pixels. The threshold may be dynamically optimized.

The two contiguous source pixels may be diagonally disposed with respect to each other and touching only at a shared corner. At least one scan line of the intermediary map of existing edges may be buffered in lieu of buffering at least one scan line of the digitized color image. The means for computing inferred edge pieces includes means for detecting near −45° edges in the digitized color image and means for detecting single-pixel width features in the digitized color image. The means for detecting single-pixel width features includes means for approximately preserving the feature width in the inferred image. The means for selecting the inferred-edge pieces includes means for detecting the major subfeatures in the examination window shared by a plurality of candidate inferred-edge pieces.

There may be exactly two such subfeature detections combined to select the desired inferred-edge piece. The detection of a major subfeature may serve to inhibit selection of a particular inferred-edge piece. This inhibitory subfeature is typically a local checker board pattern of pixels in the examination window. The subfeature may also be a single pixel-sized typographic serif. It may also be a single pixel-sized typographic cross-stroke. The means for selecting the inferred-edge piece may include means for prioritizing among multiple inferred-edge piece candidates of a given orientation which would otherwise be selected. The computation of an inferred-edge piece requires that the source pixels along at least one side of the complete edge all have substantially the same color. There are means for estimating which of two diagonally-disposed features is continuous through a given node where the continuity is otherwise ambiguous. The computation further includes means for knowing that the detection criteria for a given unoriented inferred-edge piece are internally symmetric and means for suppressing the generation of any orientation which is rendered redundant by that symmetry. The computation of the inferred-edge pieces includes means for detecting curved edges which are tangent to one of the orientation axes. The computation computes inferred-edge pieces which approximately join end-to-end with the inferred edge-pieces in adjacent elemental inferral-areas. The computation of inferred-edge pieces also includes means for detecting double-size jags characteristic of sharply-curved edges tangent to a 45° line. The computation of the inferred-edge pieces favors the longer complete inferred-edge in otherwise ambiguous situations. The inferred-edge piece may comprise at least one straight-line segment represented as a vector and/or may be represented as a uncolored bi-valued bit-map of much greater resolution than the digitized source color image. This bit-map may be generated in a run-length-encoded form. The vector or bit-map representation of the inferred-edge pieces is computed by using the case numbers to access a look-up table in one preferred embodiment.

The elemental unit of the second electronic color image may be a pulse of modulated width and position. This pulse may also be modulated in amplitude. The elemental unit of the second electronic color image may be a standard red-green-blue binary-encoded pixel.

The device of this invention further may include means for utilizing the predefined separate locations of the color sub-pixels in a fixed-pixel color display to increase effective luminance resolution. The elemental unit of the second electronic color image may be a standard cyan-magenta-yellow-black binary-encoded pixel. The means for combining inferred-edge pieces may include storage means for storing one previous scan line of computed elemental inferral areas. In some cases, the resolution of the digitized color image is the same as the nominal resolution of the final output device and elemental units of the second electronic color image are positioned on scan lines half-way between the scan lines of the computated elemental-inferral areas.

Finally, this invention features a computation method for converting a digitized source color image containing at least three different colors contiguously disposed. This digitized source color image is converted into a second electronic color image of different effective spatial resolution using a scanned sequence of examination windows into the digitized color image. The examination windows are at least three pixels high and at least three pixels wide. The method of this invention utilizes a scanned sequence of elemental inferral-areas smaller than, and substantially centered within, the examination windows. At least one inferred-edge piece is computed within at least some of the elemental inferral-areas in response to the detected edges within the examination windows. Then, the inferred edge piece(s) within the elemental inferred-areas is combined with color data from the source color image to produce one elemental unit of the second electronic color image.

DISCLOSURE OF PREFERRED EMBODIMENT

Other objects, features and advantages will occur to those skilled in the art from the following description of a preferred embodiment and the accompanying drawings, in which:

FIG. 1 is a graphical depiction of a low resolution pixel image;

FIG. 2 is a graphical depiction of the low resolution pixel image shown in FIG. 1 after it is enhanced in accordance with the system and methodology of this invention;

FIG. 3A is a view of a window containing a set of input pixels in accordance with this invention;

FIG. 3B is a view of a partial inferred edge created within an output cell overlapping two adjacent input pixels within the window shown in FIG. 3A in accordance with this invention;

FIG. 4 is a view of a jagged line resulting from the low resolution input pixels shown in FIG. 3A;

FIG. 5 is a view of the same line created from the inferred edges produced in accordance with this invention as shown in FIG. 3B;

FIGS. 8 and 9 are a graphical representations of other logic operations implementing boolean equations for generating case numbers in accordance with this invention.

Figure 6:
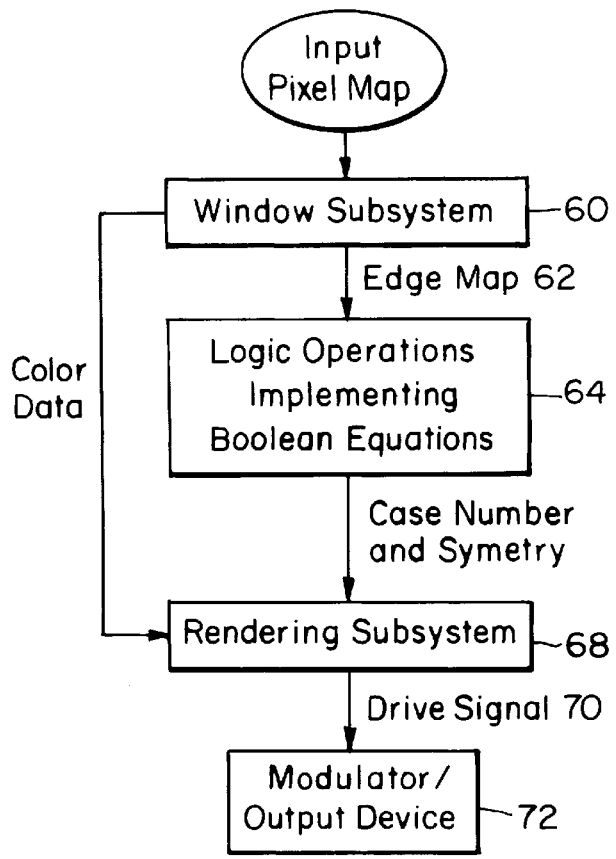
FIG. 6 is a block diagram of the major subcomponents of the pixel image enhancement system of this invention.

FIG. 1 depicts a low resolution color pixel image 10 as might be seen on a computer monitor such as a CRT. Elimination of jagged edges 12 and jagged lines 14 are the object of this invention. The system of this invention produces higher resolution virtual image 16, FIG. 2 with greatly reduced jagged edges and jagged lines as shown resulting in a more aesthetically pleasing image.

According to the methodology of this invention, window 30, FIG. 3A includes a set of 9 by 10 input pixels 32, 34, 36, from an input pixel map as shown. Input pixel 32 is white and input pixels 34 and 36 are black but they may be any of shade of grey or any other color as is known in the art. When these input pixels are displayed as is, the result would be jagged line 38 as shown in FIG. 4.

In this invention, however, elemental source edge 40 between adjacent input pixels 32 and 34 of a different color is detected. A map of these edges is constructed and output cell 42 is generated which represents an image area including detected edge 40 and a portion of horizontally adjacent input pixels 32 and 34 as shown. All the edges between adjacent input pixels within the window 30 are then analyzed using a set of logic operations implementing Boolean equations in hardware. Since a much larger 9 by 10 matrix of input pixels is analyzed, a much higher accuracy is possible than in the 3 by 3 pixel matrix shown in the Xerox patent. Because the logic operations implementing the particular Boolean equations in this invention, however, there is no need for an unwieldy number of templates or "standard pixel formats".

The Boolean equations generate a case number characterizing window 30 based on the elemental edge 40 between two adjacent input pixels of different color and the other edges between other adjacent input pixels within window 30. This case number is then used to produce an "inferred" edge segment 44, FIG. 3B within output cell (also called an inferral area) 42. This process is repeated for each output cell in the entire image. An eight bit "case number" representing the inferred edge segments and symmetry information are then presented as input data to the rendering system for a particular output device which outputs and colors the inferred edge segment 44 to the best of its ability depending on the resolution limit and other capabilities of the output device and the original colors in the input pixel map. See FIG. 5.

Accordingly, window subsystem 60, FIG. 6 forms a moving window within the source pixel-map. The window is typically an even number of pixels in the horizontal direction of the output scan and an odd number of pixels in the vertical direction. In the preferred embodiment, the window is 9 by 10 pixels with a total of 90 input pixels. The process of forming the moving window requires line stores if the source data is presented in raster-scan fashion, as is typical. In the case of a 9-line window, eight prior lines are stored. The ninth line is the currently inputting line and need not be stored. These line stores, known in the art, are a major portion of the gate count and system cost and can be lowered if multiple scan lines (not necessarily all 9) are accessed simultaneously from a source RAM store or partially calculated edgemaps are stored instead of raw pixels. The exact size and shape of the window (square or rectangular) can be modified since the extreme edges and corners of the window are not as important as the central area which can even lead to an elliptical window.

The next step, step 62, is to convert the pixel-map to edgemaps, step 60. An edge bit represents the boundary between two touching pixels which have different color. If they have the same color, the edge is absent or "0". If they are different, an elemental edge is present or "1". Thus two vertically adjacent pixels have an elemental horizontal edge between them, denoted as h0 to h79. Two horizontally adjacent pixels have an elemental vertical edge between them, denoted as v0 to v80. In a 9 by 10 window, there are a total of 161 elemental vertical and horizonal edges. The conversions of the source data into an edgemap, not shown in the prior art, looses all data about the absolute color of pixels. Once the processing has made its best guess as to the intended edge, if any, in the output cell based on the edge map, then color data, bypassed around the edgemap, is added to form the final output cell.

In addition to the horizontal and vertical edge map, a corner map is used in color versions. Two pixels meeting only at their corners like red squares on a checkerboard are assigned the corner value "1" if they are different and "0" if they are the same. A checkerboard would thus have all zeros in its corner map and all ones in its horizontal and vertical edgemaps. Corner touching pixels connecting in the direction of a backslash (\) form a b-type corner, b0 to b79, and pixels connecting in the direction of a forward slash (/), form an f-type corner, f0 to f79. There are thus another 160 bits in the corner maps. Not all the bits are used and unused bits need not be calculated.

Figure 7:
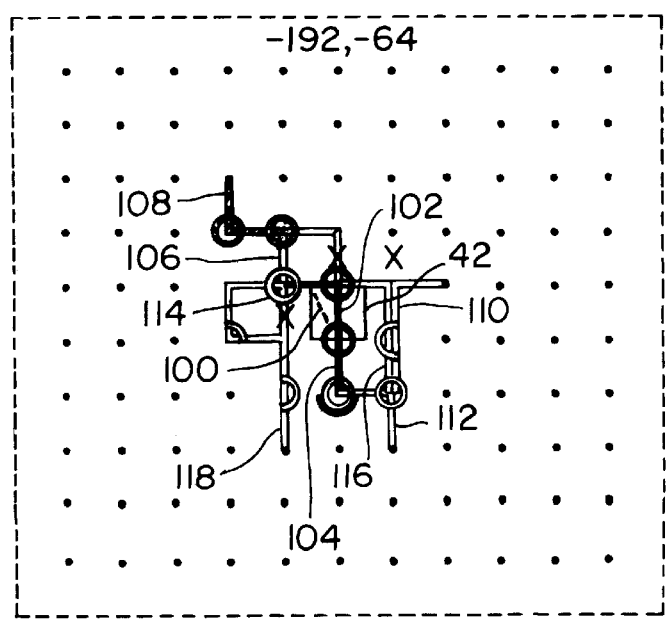
FIG. 7 is a partial graphical representation of one set of Boolean equations for generating case numbers in accordance with this invention.
Figure 8:
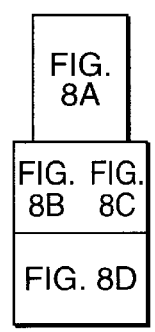
Figure 8A:
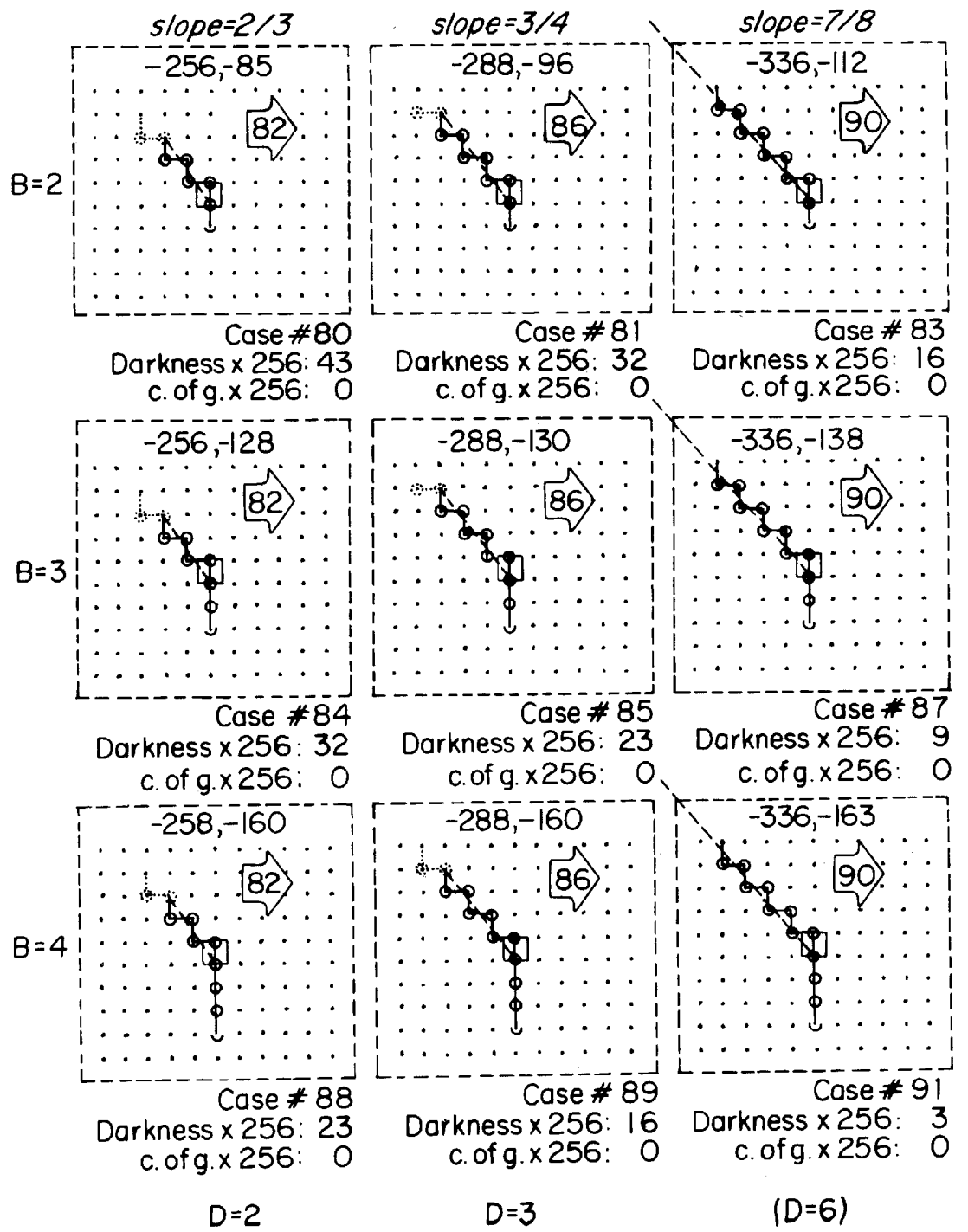

The edge and corner maps thus defined then pass to a series of Boolean equations, step 64 which categorize the input window as one of a number of "cases" (or "no case", called case 0). A representative sample of these cases is graphically shown in FIGS. 7–9. Each case represents a particular inferred edge segment (shown as a dashed line) within the area of the output cell 42. Generally, the output edges for the different cases are unique, although some are very similar and there may be incidental identities. The output cell, with its inferred edge, is then colored based on actual source colors of adjacent input pixels. The result is the delineation of a virtual output cell of infinite resolution but usually less than perfect inferral accuracy. The inferred edge associated with each case number is determined as part of the inventive process of defining the equations for each case. By infinite resolution is meant that a particular case, for instance, may call for an edge 0.1234 of the way across the cell; a few even have curved edges. A given output device, e.g. a display or a printer, typically cannot reproduce this edge exactly, and it may be constrained to a specific pattern of sub-pixels because of its own inherent resolution capability. The actual infinite resolution output cell shown arbitrarily in FIGS. 7–9 is imaginary (virtual) because, while implied by the case number, it is never actually created for any given output device. Instead the case number is usually converted directly, by a lookup table, into signals to drive the output device. The conversion used is peculiar to a given rendering device. The case numbers, on the other hand, are universal to all rendering devices, a reduced set may be used for cruder devices. For chips intended to work with a variety of output devices, there may exist an intermediary higher-level representation of the output cell, e.g. vectors or super resolution bit map (which may be run length compressed). Conversely, in special-purpose chips for particularly crude rendering devices, the case-recognition Boolean logic may be simplified and approximated. Thus, fewer cases may be used. The conversion from the case-number and symmetry to the final output drive signals is accomplished in rendering subsystem 68, FIG. 6. This subsystem assembles the output cells into a complete image and possibly using a separate modulator provides a drive signal 70 that the output device can accept. In printers and CRT's, the rendering subsystem drives one or more modulators 72 or D/A converters. In LCD displays and other fixed pixel applications (scaling, resolution conversion, etc) the rendering subsystem simply provides a new but enhanced pixel map of different resolution. The output electronic image may be in a form specific to a given output device or in a form selected to minimize hardware costs, e.g. utilizing a time-modulated signal to produce both grayscale and precision edge location by separately modulating a pulse's width and position for each elemental unit in the output image. The latter can be implemented all-digitally in the same chip as other circuitry. For displays with an inherent grayscale (e.g. a CRT), but in systems with limited bandwidth, the preferred embodiment may be a hybrid where such a time-modulated signal essentially defines feature edges but is combined with D/A converter(s) to modulate the amplitude of the pulses. The Boolean equations which characterize each case act in parallel in hardware to permit operation in real time (dedicated hardware required for "moving" on "animated" images). All the above operations are pipelined and take roughly fifteen pipeline stages. They may also be implemented entirely or partially in software operating on a microprocessor.

FIGS. 7–9 are sample drawings of a few representative cases. These drawings are meant to be guides to the Boolean equations which actually define the cases. They are not represented in the hardware or software implementation as templates, or any other way, and may not exactly or unambiguously equivalent to the Boolean equations. The Boolean equations also involve very substantial sharing of terms among cases (i.e. factoring), which is not shown in the drawings.

The drawings cover the area of the examination window into the source bitmap. The center square 42, FIG. 7 represents the area represented in the output cell for that case. Dashed line 100 represents the edge that is inferred when the equations for the case are satisfied. Although the inferred edge is drawn beyond the center square for clarity, only that segment of the inferred edge within the center square is used in forming the actual output cell.

In this notation, a line (e.g. 102, 104, 106, 110, 112) between two input pixels indicates that those two input pixels must be different. i.e. must have an elemental edge between them. A letter "X" between two input pixels indicates that those two input pixels must be the same color. i.e. have no elemental edge between them. A circle around a node indicates that there must be color continuity along the "clear" side of the two elemental edged meeting at the node. As discussed before, at least one side of the source edge, the so-called "clear side", must be of one continuous color while the other side may be any number of colors. If the two elemental edges meeting at the node meet at 90 degrees, a very complicated logical relationship among a subwindow of pixels surrounding the node is required to evaluate the circle function. That function, called the "JOIN" function, is heuristic and specified by the Boolean equations implemented by the MACRO labeled "super—join" in Appendix A. The subwindow for the JOIN function is six by six input pixels if those 36 pixels are available within the current main window, lesser if not. The purpose of the JOIN function is to guess which of two possible interpretations are to be used when all four elemental edges are present at a node. These two possible interpretations are called "backslash" and "forward slash" and indicate which diagonally-touching input pixels are to be interpreted as color-continuous. JOIN may return either, neither, but not both backslash or forward-slash for a given node. A half- or quarter-circle along a continuous edge indicates that only one side of that particular edge in that particular case is allowed as the "clear" edge. A half-circle ending an edge, i.e. where a single elemental edge is shown coming into the node, indicates a requirement for color discontinuity at that node on the "clear side". That indicates the edge must end there on the clear side. The edge need not end there on the non-clear side. Color discontinuity detection is implemented by the eschatological "v,w" function in the Boolean equations.

The guide drawings, in general, show sets of features. The lines stand for logical relationships among those set of features. In general, the Boolean equations for a pictured case are satisfied if;

(a) The features shown as line 104 and the features shown as line 106 are all present and the features shown by line 108 are not all present and the features shown by line 110 are not all present and the features shown by line 112 are not all present or (b) the 104 features are all present and the features shown by line 114 are all present or (c) the 102 features and the features shown by line 116 are all present or (d) the 102 features and the features shown by line 118 are all present.

The guide drawings, of course, represent only one of four possible symmetries (for an odd by even window) or one of eight possible symmetries (for an even by even window). The symmetry pictured is defined as the canonical, or s=O, symmetry and is arbitrarily chosen.

A near-horizontal or near vertical straight line is quantized as a jagged line with single-pixel wide jags evenly spaced. The correct inferred edge, shown as the dashed line within the output cells shown in FIGS. 7–9, is then a slanted straight line passing though the exact center of each jag. This simple inferred edge is an "equal darkness" rendering. That means an area is added to the figure on one side of the jagged line which is exactly equal to the area subtracted from it. Enhanced text, for example will then be no darker or lighter than unenhanced text.

In a simple color system, there is an edge "present" between two source pixels if they have different colors. That is, the system makes no distinction between large and small color differences. Text and video games meet this condition. It uses the same cases as the black and white version but there is a more involved algorithm for detecting and rendering the edges. The inferred edges, however, are exactly the same. The color algorithm generalizes the black and white algorithm by this approximate rule: "A case hit occurs if the corresponding source edge has a single color, any one color, on one side of it, even if there are multiple colors on the other side. If this criterion results in multiple hits, the longer inferred edge is to be favored.

The particular Boolean equations in the preferred embodiment, though involving some experimentation to derive, none-the-less exhibit certain general principles as follows.

Each possible input pixel-map window has a left-right mirror-image and an up-down mirror image, a total of four "symmetries". Rather than have four possible cases, for a total over 800, the logic shown in Appendix A generates, in addition to case numbers, two symmetry bits. For example if case number 06, FIG. 7, occurs in vertical symmetry, it means the conditions shown in the diagram and equations for case 06 occur upside-down in the source pixel-map. In order for the logic to operate in pipelined real time, all 800 sets of Boolean equations are actually implemented, but three quarters of them can be generated automatically during chip design from the other one-quarter, thus saving engineering time and eliminating errors. Certain common Boolean terms can also be factored out of various groupings of two or more different equations resulting in reduced gate count. Alternatively, if the logic is fast enough, only the equations for one symmetry need be implemented and they can then be time-shared among the symmetries by generating mirror-image edgemaps and using a 4×clock. The current implementation uses all equations to operate at maximum speed and does not require a multiple-frequency reference clock.

Isolated cases, marked "SS" (self-symmetric) in FIGS. 7–9 have Boolean equations which themselves exhibit two-fold symmetry. In those cases two, rather than four, sets of Boolean equations need be generated. One case, number 44, has four-fold symmetry.

If the window is even-by-even e.g. 10 by 10, the output cell sits at the corner of four input pixels and overlaps one-quarter of each. There is then a symmetry of 90° rotation in addition to the symmetries of the present design, for a total of eight-fold symmetry. This has the advantage of reducing the number of cases, for example combining near-vertical cases with near-horizontal cases, and making some near −45 cases self-symmetric. The net effect is a large increase in the amount of logic that is computer-generated table at the time of chip design, a large reduction in the conceptual complexity, a moderate decrease in gate count (due to new "SS" cases) in the high-speed version, and a large (roughly 50%) decrease in gate count in the time-multiplexed version using an 8×clock. On the down side, this will create a plethora of horizontal edges halfway between scan lines in 1:1 renderings on scanned output devices, which is very undesirable. This "split-line" problem is correctable by adding some complexity, namely a half-line vertical shift, to the rendering algorithm. The split-line problem does not exit in 2:1 or 4:1 renderings which would likely be used in video games and many other applications.

A special accommodation is made of edges along single-pixel-wide lines. This involves detecting the other side of the line and using that information to infer the intended edge on the side being examined. These are the so-called 'green' and 'red' case-variations in the near-vertical and near-horizontal in FIGS. 7–14.

The present algorithm recognizes and devotes a considerable number of cases, for near 45 degree jagged lines. By that is meant intended edges between 45 degrees (slope=1) and a slope of $3/2$ in one direction of $2/3$ in the other. It is also possible to better handle slopes between $3/2$ and 2, and $1/2$ and $2/3$ respectively with addition, analogous, cases not currently implemented.

Small-font lower-case t's crosses, for example, often have a very small (e.g. one pixel) bump on one side of a stroke which the eye connects to a co-linear feature on the other side of the stroke. In the absence of the connecting feature, the correct inference would be a smoothed or rounded bump. But in the presence of the connecting feature, the bump should be left sharp. This feature occurs in the near-vertical, near-horizontal, and splitcell cases. It works by detecting the connecting extension on the other side of one-pixel wide strokes.

The serif exclusion also applies for certain cases. This feature recognizes that a single-pixel bump at the end of a long vertical or horizontal stroke is more likely to be an intended sharp feature (e.g. a serif) than a gentle curve to be smoothed out. Another exclusion affects rendering some distance away from the actual feature and hence many cases.

Both near-horizontal and near-vertical cases have special tangent cases, referring to curved intended edges at the point they are exactly tangent to the vertical or the horizontal. There are also corresponding tangent cases among the near −45 cases. In every near-horizontal tangent case, the length of the straight (horizontal) unenhanced edge between jags is even, and in every near-vertical tangent case, the length of the straight (vertical) unenhanced edge between jags is odd. It is the rendering of the center, exactly tangent, output cell only that forms a "tangent" case. Non-central output cells, including all cells in odd (vertical) or even (horizontal) respectively, tangents without a center cell are by choice not specially rendered but instead rendered the same as the corresponding non-curved (i.e. straight) intended edge. This choice is made to lower the number of cases, although a full detection of tangent cases would be more accurate.

When two edges in the source appear to cross, a major refinement in the rendering algorithm is required. In the edgemap, this is the situation when all four possible vertical and horizontal edges are present at a given inter-pixel node. In the black/white only application or in the color application where only two colors touch the node, there are two possible interpretations: either a feature of one color passes through the node over a background of the other color, or vice-versa. Choosing wrong will put very visible breaks in small features in both text and cartoon art. Not choosing at all, i.e. leaving a four-corners pattern, is better than choosing wrong but leaves a significant piece of the image looking unenhanced. The choice affects rendering some distance (up to half a window) away from the node in question.

In the simplest version of this invention, black is always called foreground and white is always background. For normal text, this is produces the best possible result. Another solution, is only applicable to black and white text (or two-color text). This solution detects reverse text and then treats black (or the dominant color) as background. A full color foreground/background detector is the most general solution. Virtually all foreground/background algorithms involve counting something, e.g. edges or pixels, and comparing numbers. Counting and comparing are simple in software and sequential hardware, but very gate-intensive in the pipelined hardware of this invention. Many things have to be counted simultaneously in a given window.

In one implementation, for black and white, the Boolean equations are designed to be mutually exclusive, that is if one case "hits" no other case would hit. This has two advantages. First, there is a savings of gates because the binary case-numbers can be formed by a few OR gates. Second, it serves as a very sensitive check for errors in human reasoning and bugs in the computer implementations. Virtually all errors result in occasional mutual exclusivity violations, which can be checked for in the software simulation. While mutual exclusivity of cases can be maintained, mutually exclusivity of symmetries is impossible because perfectly symmetric input windows are possible. The four symmetries are thus ORed together into three signal lines (vertical sym, horizontal sym, and 180 rotation), not two, and a two-gate priority encoder is used to obtain the final two-bit symmetry.

For color, maintaining mutual exclusivity was a problem because color images may have three edges coming into a node, violating the even-edges rule that was invaluable in maintaining mutual exclusivity in black/white. Also, the choice of precedence among multiple hits is a very useful tool. Without mutual exclusivity, the hardware implementation requires at least a partial priority encoder to handle precedence. Many single-pixel-width image features create two inferred edges passing through some output cells, one on each side of the cell. Often both edges have the same case number in 180 degrees symmetries. The second edge often just nicks the cells and is marginally visible in a 1:1 or 2:1 rendering, such as rendering 300 or 600 DPI source on 600 DPI printer. However, larger rendering ratios are feasible. By going one step beyond simple priority encoding, and superimposing both hits in certain double-hit situations, these thin lines can be correctly rendered. For many plain-typeface text images, the current rendering is essentially perfect and this is the only artifact left.

Solid areas, e.g. in the center of wide strokes, normally generate no case hits, that is case 0, because there are no edges to be inferred there. By adding a simple additional case, a subset of case 0, the existing Boolean structure will detect areas that need to be grayed when toner-saving is selected while rendering the edges fully enhanced and sharp. Further, with a precise modulator, the grayed areas can be precisely halftoned. Multiple levels of toner-saving would be readily available with few additional gates.

The same lookup tables that convert from case numbers to rendering waveforms can include engine curve correction, where appropriate, with no additional gates.

Near horizontal cases, FIG. 9, and splitcell (except case 56) cases are compensated cases. Doing so with the others actually creates an undesirable artifact. The reason for this is that typefonts for laser printers are, in effect, already designed with the darkening effect of the engine in mind. Further, a perfectly vertical source edge would need to be moved whereas a more sensible and simple approach is to leave it alone. Moving such a 90 degree edge would require, for consistency, moving all other edges and some cases then would be moved into different cells.

A significant minority of cases produce an inferred edge that extends left or right to a second output cell. None extend further. Special concomitant cases are used for that adjacent output cell, called shifted cases and having different case numbers. Separate case diagrams are not shown from the shifted cases because their diagram is the same as the parent case except shifted one pixel right or left, hence the name. A left shifted case is one whose parent's diagram is shifted left and is rendered to the right of the parent case. Of course, the horizontal symmetry bit reverses the direction of shift. The algorithm is arranged so that shifted cases cannot occur vertically.

Shifted cases could be implemented the same as regular cases, using Boolean equations with all the edges incremented or decremented by one count from the parent case. An easier way is to pipeline the final case number one additional stage and, when a parent case is detected, insert the corresponding shifted case number of the left or the right of it using either an explicit positive delay or the pipeline stage as a negative delay, respectively.

The diagrams shown in FIGS. 7–9 are carefully organized into rows and columns on each page, even through the case numbers themselves are essentially arbitrary. Generally, with some exceptions, one half of each figure—with corresponding conditions, is the same for all cases in a given column, and the other half of each figure, with corresponding conditions, is the same for all cases in a given row. Some figure halves are the same on two different pages. This has been carefully set up this way to permit sharing of Boolean equation terms and hence a massive savings in gate count. Without this factoring, the gate count would be prohibitive.

One case, case 97, with its shifted case, case 29, FIG. 8, is the so-called double-jag case. A smooth source edge produces jags, one pixel in size, at periodic intervals in the pixel map and the spacing between jags depends on the local slope of the edge. In general, a jag two pixels in size is an intended feature not to be smoothed out. However, it can be shown that even an ideal, computerized, pixelization of a smooth but tightly curved edge, if it is near 45 degrees and phased exactly wrongly against the pixel boundaries, will produce a double-jag. The double-jag case, along with its shifted case, correctly detects and smooths out this situation. Without it, many sharply curved edges, e.g. the inside of a small "s" are rendered improperly.

In the current facsimile software implementation, the Boolean equations are carefully factored to increase speed when run on a "Pentium" (and higher) processors. The Pentium processor has two instruction-executing pipelines which operate simultaneously until one pipeline needs data from the other and then the first pipeline stalls until the data is available. The software computes 64 versions of each Boolean equation simultaneously, each operating on a different window across the scan line. Different equations and/or different pieces of one equation are then interleaved in the code in such a way as to minimize Pentium pipeline stall. Special macroinstructions are defined to make the assembler do most of the work in this interleaving. The entire code is then repeated in three versions, called "tracks", again making the assembler do the work, so that as soon as 32 of the 64 windows are resolved (i.e. all 32 hit on a case or are definite no-hits), the code switches to a faster track that only computes the remaining 32, still fully interleaved for Pentium pipelining, the Pentium being a 32 bit processor. The result is an entire facsimile page processed in typically less than 10 seconds.

Because the algorithm is looking for general edge forms and the output cells are infinite resolution, source DPI and destination DPI can be anything. Also, nothing in the algorithm assumes either input or output pixels are square. Hence the same hardware or software can instantly switch from 200 by 200 DPI facsimile input to 200 by 100 DPI facsimile, both current facsimile standards.

One case, case 3, detects and slightly rounds sharp corners. The rounding radius is one-half pixel. This effect, turns out to be very pleasing at high magnification while invisible at low.

Another case, case 99, case FIG. 8, detects 90° corners that are intended to be rounded, i.e. with the corner pixel itself missing, and renders them accordingly. The rounding radius is 1.5 pixel width. This situation frequently occurs on italics. Near-horizontal and near-vertical hits that would otherwise occur in this situation are suppressed.

In order to simplify the computation, an intermediate "edgemap" is formed. Its purpose is to carry only edge information through the main computation, putting aside the actual colors that butt to form the edges. After the inferred edge is computed, the colors are restored in the "renderer" prior to final output. For color images, the edge information (the "edgemap") also requires substantially less data than the full color pixelmap, reducing the memory requirements in the line stores.

There exists an "edge" or "source edge" or "elemental edge" (terms used synonymously herein) between two adjacent input pixels if the two pixels are of different color. Then, the edge is called present or "1". There exists no edge (i.e. edge absent or edge=O), if the two pixels are the same color. This determination is computed as a compare/equal in the normal manner using the inclusive OR of the exclusive OR's (XOR's) of corresponding bits of the two pixels and requires relatively few gates.

There are thus two basic kinds of elemental edges in the edgemap; horizontal edges (between vertically adjacent pixels) and vertical edges (between horizontally adjacent edges). If only two colors are possible, e.g. a black/white bitmap as source, these two types of edges are all that is needed. For operation on more than two colors, e.g. full color, the edgemap must carry two additional types of edges, really pseudo-edges, representing a comparison between pixels which touch only at a corner point, i.e. are diagonally adjacent like the black squares on a chess board. The four types of edges are designated "h", "v," "b", and "f" for "horizontal", "vertical", "backslash", and "forwardslash" respectively.

The entire examination window into the source color pixelmap generates an edgemap of four bits per source pixel except at the edges and corners of the window. Thus a ten by ten pixel window (100 total pixels) is converted to an edgemap of 351 bits. These edgemap bits are all available simultaneously for Boolean operations and are constantly changing as the window scans across the source image.

The compare/equal scheme for determining elemental edges works excellently on computer-generated images, such as text and video games. However, continuous-tone images from photographic sources rarely have two adjacent pixels of exactly identical color due to noise and other factors. In that case there are elemental edges "everywhere", the edge inferrer cannot identify true edges, and there are few "hits". For photographic source images a more sophisticated elemental edge-detection algorithm must be used. In a photographic image, an elemental edge is called "present" if two adjacent pixels differ in color by more than some threshold amount. That threshold is preferably measured in human perceptual difference rather than binary difference. The optimum edge-recognition threshold varies from one source to another and can either be a manual adjustment, or automatically adjusted to maximize the extent of inferred edge recognition. Too large a threshold will result in too few elemental edges in the edgemap, "broken" edges seen by the inferrer, and just as few "hits" as the other extreme.

How the output cell data is turned into drive signals depends on the particular display or printer device. One important example is displaying a lower source-resolution, e.g. 640 by 480 pixels, on a higher resolution fixed-pixel display device, e.g. a 800 by 600 pixel color LCD computer monitor. This type of display has tri-colored subpixels, red, green, and blue, which are arranged in triplets to make up full-color pixels.

The display pixels can be treated as single full-color pixels. For more apparent resolution, however, the preferred embodiment is to separately compute and drive each primary-color subpixel as follows, and then deliver composite full-color pixels.

The area of each display primary-color subpixel may partially overlap the area of 1, 2, or 4 output cells computed by the methods disclosed herein. If the source and output resolutions were exact multiples of each other (including equal), the overlap might be constrained to just one or two output cells. For the example resolutions given (and typically) one or two lines of output cells, but never more, are required to generated one horizontal line of display. Those two lines would consist of the currently computed output cell line plus one previous line stored in an OUTPUT-CELL LINE STORE. For the two resolution figures given, the output device consumes less than one source line per output line, and therefore some lines of output cells, at regular intervals, need to be repeated to create a seamless displayed image. Thereby, the 1, 2 or 4 output cells partially overlapped by a given display primary-color-subpixel, will be available as needed in real time without storing more than the one line of inferred-edge (output cell) information. No intermediary frame buffer is required.

The value of a given display subpixel, say a green subpixel, is then determined as the average green intensity within the area of that green subpixel as seen in the inferred, or output-cell, image. The corresponding blue subpixel, will then get its value from a different, but adjacent, area in the inferred image even though the green and blue subpixels are part of the same RGB full-color pixel as conventionally driven. The computation of the average green intensity within the area of a particular green subpixel is determined by the appropriately weighted averages of the green intensities in the various polygons within the 1, 2, 4 output cells. If the input and output resolution are ratios of small integers to each other, or nearly so, this computation of average color values is simplified. For example, 800 and 640 (pixel-width images) are in the ratio 5:4. In this case, the primary-color subpixels overlap the 1, 2 or 4 output cells in a small number of possible patterns and lookup tables or other computational simplifications may be used.

The Appendix A depicts, in assembly language, the actual logic operations implementing the Boolean equations which generate the case numbers as graphically depicted in FIGS. 7–9. The rendering subsystem logic used for demonstrating the invention is shown in Appendix B.

Although specific features of the invention are shown in some drawings and not others, this is for convenience only as some features may be combined with any or all of the other features in accordance with the invention.

XLI CORPORATION

APPENDIX "A"

CONTENTS:

INF_45A.ASM
        INF_45B.ASM
        INF_45C.ASM
        INF_ASM.MAK
        INF_DATA.INC
        INF_HORZ.ASM
        INF_MAC.INC
        INF_MAIN.ASM
        INF_SET.ASM
        INF_SPLT.ASM
        INF_VERT.ASM

XLI CORPORATION - CONFIDENTIAL
INF_45A.ASM                                                                                                      PAGE 1

---

```
        .486            ; switched to 486 to allow BWSAP instruction: 12/3/95

_TEXT    SEGMENT DWORD use32 PUBLIC 'CODE'
_TEXT    ENDS
_ADAM    SEGMENT DWORD use32 PUBLIC 'CODE'
_ADAM    ENDS
_DATA    SEGMENT DWORD use32 PUBLIC 'DATA'
_DATA    ENDS
CONST    SEGMENT DWORD use32 PUBLIC 'CONST'
CONST    ENDS
_BSS     SEGMENT DWORD use32 PUBLIC 'BSS'
_BSS     ENDS
DGROUP   GROUP   CONST, _BSS, _DATA
         ASSUME DS: DGROUP, SS: DGROUP _DATA SEGMENT
INCLUDE INF_DATA.inc              ;EXTERNDEF's and EQU's
_DATA ENDS

_ADAM SEGMENT
ASSUME CS:_ADAM,DS:_DATA

INCLUDE INF_MAC.inc       ;code MACRO's track = 3                 ;used in MACRO's

PUBLIC DO_NEAR_45A

DO_NEAR_45A:                      ;main entry

; ******** START OF MATERIAL COPIED FROM NEAR_45A.VHD  11/6/95 *************
;  note: 45A moved ahead of nearhorz to allow defering to cases 30,31 by 29,108,109,124,123
;  5/17/96  case 99 moved to very end of 45A so that 100,104 can be "over"s ;rowB2_bot_verts(n) <= v(81*n+40) AND v(81*n+49);
;rowB3_bot_verts(n) <= v(81*n+40) AND v(81*n+49) AND v(81*n+58);
;rowB4_bot_verts(n) <= v(81*n+40) AND v(81*n+49) AND v(81*n+58) AND v(81*n+67);
;rowB5_bot_verts(n) <= v(81*n+40) AND v(81*n+49) AND v(81*n+58) AND v(81*n+67) AND v(81*n+76);

;rowB2_bot_Xs(n) <= NOT h(80*n+45);
;rowB3_bot_Xs(n) <= NOT h(80*n+45) AND NOT h(80*n+55);
;rowB4_bot_Xs(n) <= NOT h(80*n+45) AND NOT h(80*n+55) AND NOT h(80*n+65);
;rowB5_bot_Xs(n) <= NOT h(80*n+45) AND NOT h(80*n+55) AND NOT h(80*n+65) AND NOT h(80*n+75);

;rowB2_bots(n) <= (h(80*n+54) OR h(80*n+55)) AND rowB2_bot_verts(n) AND rowB2_bot_Xs(n);
;rowB3_bots(n) <= (h(80*n+64) OR h(80*n+65)) AND rowB3_bot_verts(n) AND rowB3_bot_Xs(n);
;rowB4_bots(n) <= (h(80*n+74) OR h(80*n+75)) AND rowB4_bot_verts(n) AND rowB4_bot_Xs(n);
;rowB5_bots(n) <=                             rowB5_bot_verts(n) AND rowB5_bot_Xs(n);

;All three of the above variables can be chained to save time:

;*Color*: Instead, use the corresponding variables from NEARVERT: Vrow?_bots[A|B]
; same row #s (2-5) as before.

rc      = 0
        rr      = 0 s       = 0
        REPEAT  4                 ; on s = 0-3
;rowR2_right(n) <= v(81*n+40) AND h(80*n+45) AND h(80*n+46) AND NOT v(81*n+50) AND (v(81*n+51)   OR v(81*n+42));
;rowR3_right(n) <= v(81*n+40) AND h(80*n+45) AND h(80*n+46) AND NOT v(81*n+50) AND  h(80*n+47) AND NOT v(81*n+51);

;;*Color* terms common to all four rowR rights:    [bugs fixed 5/17/96]

movQ    ,v,40                     ; terms common to both sides
                andQ    ,h,45
                andQ    ,h,46 movQ    b,join_44_forwd
                notQ    b
                andQ    b                         ;bring in common terms andQ    ,join_44_back
                andQ    ,not_v,50
                andQ    b,not_v,41 stoQ    ,temporary_hold
                stoQ    b,temporary_hold2 andQ    ,h,47                     ;row R3 first
                andQ    b,h,47                    ;both A and B sides
```

XLI CORPORATION - CONFIDENTIAL
INF_45A.ASM                                                                                                          PAGE 2

```
        andQ       ,NOT_v,51
        andQ      b,NOT_v,42
        stoQ       ,ArowR3_rightsA
        stoQ      b,ArowR3_rightsB movQ        ,not_h,47              ; 'w'  Row R2 end condition
            movQ       b
            orQ         ,v,51                  ; 'v'
            orQ        b,v,42 andQ       ,temporary_hold
        andQ      b,temporary_hold2
        stoQ       ,ArowR2_rightsA
        stoQ      b,ArowR2_rightsB ;As1(n)   <= NOT h(80*n+44) AND NOT h(80*n+33);
;As2(n)   <= NOT h(80*n+44) AND NOT h(80*n+33) AND NOT h(80*n+22);
;As3(n)   <= NOT h(80*n+44) AND NOT h(80*n+33) AND NOT h(80*n+22) AND NOT h(80*n+11);
;As4(n)   <= NOT h(80*n+44) AND NOT h(80*n+33) AND NOT h(80*n+22) AND NOT h(80*n+11) AND NOT h(80*n+00);

;Bs1(n)   <= NOT h(80*n+35);
;Bs2(n)   <= NOT h(80*n+35) AND NOT h(80*n+24);
;Bs3(n)   <= NOT h(80*n+35) AND NOT h(80*n+24) AND NOT h(80*n+13);
;Bs4(n)   <= NOT h(80*n+35) AND NOT h(80*n+24) AND NOT h(80*n+13) AND NOT h(80*n+02);

;col1_clear_edge(n) <= (As1(n) AND color(n)) OR (Bs1(n) AND NOT color(n));
;col2_clear_edge(n) <= (As2(n) AND color(n)) OR (Bs2(n) AND NOT color(n));
;col3_clear_edge(n) <= (As3(n) AND color(n)) OR (Bs3(n) AND NOT color(n));
;col4_clear_edge(n) <= (As4(n) AND color(n)) OR (Bs4(n) AND NOT color(n));
;    NOTE: the OR in the above equations is equivalent to XOR ; one_zag(n)    <= h(80*n+34) AND v(81*n+30);
; two_zag(n)    <= h(80*n+34) AND v(81*n+30) AND h(80*n+23) AND v(81*n+20);
;three_zag(n)   <= h(80*n+34) AND v(81*n+30) AND h(80*n+23) AND v(81*n+20) AND h(80*n+12) AND v(81*n+10);
; four_zag(n)   <= h(80*n+34) AND v(81*n+30) AND h(80*n+23) AND v(81*n+20)
;                  AND h(80*n+12) AND v(81*n+10) AND h(80*n+01) AND v(81*n+00);

; Example of Jag numbering:  this is jag2.    A,B are join back's ;*Color*
;                        |
;                       A-B
;                        |
;                       A-B
;                        |   <v40
;
;

;; break-through suppression added to both sides  3/5/96
        rc      = 0
        rr      = 0
        REPEAT   4                           ; rr = 0-3, jag 1-4

IF rr eq 0
                movQ         ,join_34_back
                movQ        b,join_34_forwd
            ENDIF
            IF rr eq 1
                movQ         ,join_23_back
                movQ        b,join_23_forwd
            ENDIF
            IF rr eq 2
                movQ         ,join_12_back
                movQ        b,join_12_forwd
            ENDIF
            IF rr eq 3
                super_join          01         ; cross-thru suppression
            ENDIF notQ       b
                stoQ       b,temporary_hold   ; NOT 34-rr*11,forwd
                stoQ        ,temporary_hold2  ;     34-rr*11,back IF rr eq 0
                movQ         ,join_33_back
                movQ        b,join_33_forwd
            ENDIF
            IF rr eq 1
                movQ         ,join_22_back
                movQ        b,join_22_forwd
            ENDIF
            IF rr ge 2
                super_join         (33-rr*11)  ; cross-thru suppression
            ENDIF
```

XLI CORPORATION - CONFIDENTIAL
INF_45A.ASM                                                                                      PAGE 3
------------------------------------------------------------------------------------------------

```
          andQ      ,temporary_hold
          stoQ      b,temporary_hold      ; 33-rr*11,forwd IF rr eq 0
          andQ      ,v,40                            ; we put v40 in all jags
       ELSE
          andQ      ,jag%rr!_topleftA
       ENDIF andQ      ,h,34-rr*11                      ;THE jag itself
          andQ      ,v,30-rr*10 stoQ      ,jag%rr+1!_topleftA  ; JAG1 also used in SPLITCELL movQ      ,temporary_hold      ; 33-rr*11,forwd
          notQ
          andQ      ,temporary_hold2     ; 34-rr*11,back IF rr eq 0
          andQ      ,v,40                            ; we put v40 in all jags
       ELSE
          andQ      ,jag%rr!_topleftB
       ENDIF andQ      ,h,34-rr*11                      ; the jag itself
          andQ      ,v,30-rr*10 stoQ      ,jag%rr+1!_topleftB  ; JAG1 also used in SPLITCELL rr      = rr + 1               ; holding data around loop.
       ENDM                              ; rr 0-3

;col1_tops(n) <=  one_zag(n) AND col1_clear_edge(n) AND col1_eqs(n);
;col2_tops(n) <=  two_zag(n) AND col2_clear_edge(n) AND col2_eqs(n);
;col3_tops(n) <=  three_zag(n) AND col3_clear_edge(n) AND col3_eqs(n);
;col4_tops(n) <=  four_zag(n) AND col4_clear_edge(n);

;col1_eqs(n) <=     (h(80*n+23) OR    h(80*n+44) OR NOT v(81*n+21)) AND        col1 has this term to exclude case #99
;
;                   (NOT h(80*n+23) OR NOT v(81*n+20) OR (NOT Bs2(n) AND NOT As2(n)));
;col2_eqs(n) <=  NOT h(80*n+12) OR NOT v(81*n+10) OR (NOT Bs3(n) AND NOT As3(n));
;col3_eqs(n) <=  NOT h(80*n+01) OR NOT v(81*n+00) OR (NOT Bs4(n) AND NOT As4(n));
; Believe it or not, the following should be equivalent to these col1_eqs;
;*Color* don't believe it!

; restart loop:
          rr      = 3                    ; BACKWARDS LOOP
          REPEAT  4                      ; rr = 3-0, col 4 1

IF rr eq 3
                movQ      ,jag%rr+1!_topleftA
                movQ      b,jag%rr+1!_topleftB
             ELSE
                notQ
                notQ      b                          ;these nots implement w,z,y,v conditions
                andQ      ,jag%rr+1!_topleftA
                andQ      b,jag%rr+1!_topleftB
             ENDIF
                stoQ      ,Acol%rr+1!_topsA  ; *** later: use EQU for col 4.
                stoQ      b,Acol%rr+1!_topsB rr      = rr - 1               ; holding data around loop.
          ENDM                           ; rr = 3-0 BACKWARDS LOOP
          s       = s + 1
          ENDM                           ; s = 0-3

; Note: case 97 is implemented in SPLITCELL

;c100sym(n)   <=  col1_tops(n) AND rowR2_right(n);
;c101sym(n)   <=  col2_tops(n) AND rowR2_right(n);
;c102sym(n)   <=  col3_tops(n) AND rowR2_right(n);
;c103sym(n)   <=  col4_tops(n) AND rowR2_right(n);

rc      = 0                    ;redundant
          s       = 0
          REPEAT 4                                   ; s = 0-3 movQ      ,Acol1_topsA
             movQ      b,Acol1_topsB
             andQ      ,ArowR2_rightsA
             andQ      b,ArowR2_rightsB
             orQ                                                                                  ;combine
A,B sides
          CASE_IS 100,over,L,108,defer  ; invoking shifted also. Defer to 30,31
                                        ;*Color*: may be overridden by #99.

movQ      ,Acol2_topsA
```

XLI CORPORATION - CONFIDENTIAL
INF_45A.ASM                                                                                                    PAGE 4

```
        movQ      b,Acol2_topsB
        andQ       ,ArowR2_rightsA
        andQ      b,ArowR2_rightsB
        orQ                                                                        ;combine
A,B sides
        CASE_IS 101,over,L,109,defer    ; invoking shifted also. Defer to 30,31 movQ       ,Acol3_topsA
        movQ      b,Acol3_topsB
        andQ       ,ArowR2_rightsA
        andQ      b,ArowR2_rightsB
        orQ                                                                        ;combine
A,B sides
        CASE_IS 102,over,L,124,defer    ; invoking shifted also. Defer to 30,31 movQ       ,Acol4_topsA
        movQ      b,Acol4_topsB
        andQ       ,ArowR2_rightsA
        andQ      b,ArowR2_rightsB
        orQ                                                                        ;combine
A,B sides
        CASE_IS 103,over,L,123,defer    ; invoking shifted also. Defer to 30,31

;c104sym(n)    <=  col1_tops(n) AND rowR3_right(n);
;c105sym(n)    <=  col2_tops(n) AND rowR3_right(n);
;c106sym(n)    <=  col3_tops(n) AND rowR3_right(n);
;c107sym(n)    <=  col4_tops(n) AND rowR3_right(n);

movQ       ,Acol1_topsA
        movQ      b,Acol1_topsB
        andQ       ,ArowR3_rightsA
        andQ      b,ArowR3_rightsB
        orQ                                                                        ;combine
A,B sides
        CASE_IS 104,over             ;*Color*: may be overridden by #99.

movQ       ,Acol2_topsA
        movQ      b,Acol2_topsB
        andQ       ,ArowR3_rightsA
        andQ      b,ArowR3_rightsB
        orQ                                                                        ;combine
A,B sides
        CASE_IS 105,over movQ       ,Acol3_topsA
        movQ      b,Acol3_topsB
        andQ       ,ArowR3_rightsA
        andQ      b,ArowR3_rightsB
        orQ                                                                        ;combine
A,B sides
        CASE_IS 106,over movQ       ,Acol4_topsA
        movQ      b,Acol4_topsB
        andQ       ,ArowR3_rightsA
        andQ      b,ArowR3_rightsB
        orQ                                                                        ;combine
A,B sides
        CASE_IS 107,over ;c80sym(n)    <=  col2_tops(n) AND rowB2_bots(n);
;c81sym(n)    <=  col3_tops(n) AND rowB2_bots(n);
;c83sym(n)    <=  col4_tops(n) AND rowB2_bots(n);

;;*Color* using bottoms from NEARVERT:

movQ       ,Acol2_topsA
        movQ      b,Acol2_topsB
        andQ       ,Vrow2_botsA
        andQ      b,Vrow2_botsB
        orQ                                                                        ;combine
A,B sides
        CASE_IS 80,over,R,82,over          ;*Color* 'over' added movQ       ,Acol3_topsA
        movQ      b,Acol3_topsB
        andQ       ,Vrow2_botsA
        andQ      b,Vrow2_botsB
        orQ                                                                        ;combine
A,B sides
        CASE_IS 81,over,R,86,over movQ       ,Acol4_topsA
        movQ      b,Acol4_topsB
        andQ       ,Vrow2_botsA
        andQ      b,Vrow2_botsB
```

XLI CORPORATION - CONFIDENTIAL
INF_45A.ASM                                                                                              PAGE 5
---

```
            orQ                                                             ;combine
A,B sides
        CASE_IS 83,over,R,90,over ;c84sym(n)      <= col2_tops(n) AND rowB3_bots(n);
;c85sym(n)      <= col3_tops(n) AND rowB3_bots(n);
;c87sym(n)      <= col4_tops(n) AND rowB3_bots(n);

movQ     ,Acol2_topsA
            movQ    b,Acol2_topsB
            andQ     ,Vrow3_botsA
            andQ    b,Vrow3_botsB
            orQ                                                             ;combine
A,B sides
        CASE_IS 84,over,R,82,over       ;changed to 'over' 5/8/96           ;defer:
*test* was over movQ     ,Acol3_topsA
            movQ    b,Acol3_topsB
            andQ     ,Vrow3_botsA
            andQ    b,Vrow3_botsB
            orQ                                                             ;combine
A,B sides
        CASE_IS 85,over,R,86,over movQ     ,Acol4_topsA
            movQ    b,Acol4_topsB
            andQ     ,Vrow3_botsA
            andQ    b,Vrow3_botsB
            orQ                                                             ;combine
A,B sides
        CASE_IS 87,over,R,90,over ;c88sym(n)      <= col2_tops(n) AND rowB4_bots(n);
;c89sym(n)      <= col3_tops(n) AND rowB4_bots(n);
;c91sym(n)      <= col4_tops(n) AND rowB4_bots(n);

movQ     ,Acol2_topsA
            movQ    b,Acol2_topsB
            andQ     ,Vrow4_botsA
            andQ    b,Vrow4_botsB
            orQ                                                             ;combine
A,B sides
        CASE_IS 88,over,R,82,over       ;*Color*: 'over' added movQ     ,Acol3_topsA
            movQ    b,Acol3_topsB
            andQ     ,Vrow4_botsA
            andQ    b,Vrow4_botsB
            orQ                                                             ;combine
A,B sides
        CASE_IS 89,over,R,86,over movQ     ,Acol4_topsA
            movQ    b,Acol4_topsB
            andQ     ,Vrow4_botsA
            andQ    b,Vrow4_botsB
            orQ                                                             ;combine
A,B sides
        CASE_IS 91,over,R,90,over ;c92sym(n)      <= col2_tops(n) AND rowB5_bots(n);
;c93sym(n)      <= col3_tops(n) AND rowB5_bots(n);
;c95sym(n)      <= col4_tops(n) AND rowB5_bots(n);

movQ     ,Acol2_topsA
            movQ    b,Acol2_topsB
            andQ     ,Vrow5_botsA
            andQ    b,Vrow5_botsB
            orQ                                                             ;combine
A,B sides
        CASE_IS 92,over,R,82,over movQ     ,Acol3_topsA
            movQ    b,Acol3_topsB
            andQ     ,Vrow5_botsA
            andQ    b,Vrow5_botsB
            orQ                                                             ;combine
A,B sides
        CASE_IS 93,over,R,86,over movQ     ,Acol4_topsA
            movQ    b,Acol4_topsB
            andQ     ,Vrow5_botsA
            andQ    b,Vrow5_botsB
            orQ                                                             ;combine
A,B sides
```

XLI CORPORATION - CONFIDENTIAL
INF_45A.ASM                                                                                           PAGE 6

---

```
          CASE_IS   95,over,R,90,over s        = s + 1
          ENDM                              ; on s = 0-3

; old special exclusion of case 99 from coll_tops: [needed for VHDL exclusivity]
;*Color* : now we just use case 99 precedence to solve this instead.
;         movQ     ,Acoll_tops
;         movQ     ,h,23
;         orQ      ,h,44
;         orQ      ,NOT_v,21
;         andQ
;         stoQ     ,Acoll_tops ;c99sym(n) <= v(81*n+40) AND v(81*n+48) AND v(81*n+57) AND NOT v(81*n+31) AND NOT v(81*n+32) AND
;             h(80*n+35) AND h(80*n+36) AND h(80*n+44) AND NOT h(80*n+53) AND
;             ((NOT v(81*n+49) AND NOT color(n)) OR (NOT v(81*n+39) AND color(n)));

rc       = 0             ;redundant
          s        = 0
          REPEAT 4                         ; s = 0-3 movQ     ,join_34_forwd  ; A-side condition
          movQ     b,join_34_back  ; both-sides condition: suppress upper cross-thru
          notQ     b andQ     b,v,57          ; this para: fixed edges
          andQ     b,h,35          ; v40,h44,v48 are in jag1
          andQ     b,h,36
          andQ                     ;bring fixed into A-side andQ     b,not_v,41      ; this para.: X's
          andQ     ,not_v,32
          andQ     b,not_h,54
          andQ     ,not_h,53 s = s XOR 2              ;up-down reverse
          andQ     ,jag1_topleftA
          andQ     b,jag1_topleftB
          s = s XOR 2              ;up-down reverse orQ                                                                                      ;combine
A,B sides
          CASE_IS  99,over         ;*Color* 'over' added s        = s + 1
          ENDM                              ; on s = 0-3

; ******** END   OF MATERIAL COPIED FROM NEAR_45A.VHD  11/6/95 *************

RET                      ;end of do_near_45A

%OUT
%OUT      End of INF_45A.asm (NEAR_45A)

_ADAM ENDS
      END
```

XLI CORPORATION - CONFIDENTIAL
INF_45B.ASM PAGE 1

```
        .486            ; switched to 486 to allow BWSAP instruction: 12/3/95

_TEXT   SEGMENT DWORD use32 PUBLIC 'CODE'
_TEXT   ENDS
_ADAM   SEGMENT DWORD use32 PUBLIC 'CODE'
_ADAM   ENDS
_DATA   SEGMENT DWORD use32 PUBLIC 'DATA'
_DATA   ENDS
CONST   SEGMENT DWORD use32 PUBLIC 'CONST'
CONST   ENDS
_BSS    SEGMENT DWORD use32 PUBLIC 'BSS'
_BSS    ENDS
 DGROUP GROUP   CONST, _BSS, _DATA
        ASSUME DS: DGROUP, SS: DGROUP _DATA SEGMENT
INCLUDE INF_DATA.inc            ;EXTERNDEF's and EQU's
_DATA ENDS

_ADAM  SEGMENT
ASSUME CS:_ADAM,DS:_DATA

INCLUDE INF_MAC.inc     ;code MACRO's track = 3               ;used in MACRO's

PUBLIC DO_NEAR_45B

DO_NEAR_45B:                    ;main entry

; ******* START OF MATERIAL COPIED FROM NEAR_45B.VHD  11/9/95 *************
                        ;includes 45C
; What follows is radically refactored vis-a-vis the VHDL, but is intended
;to be exactly equivalent logically.  The VHDL can be substantially simplified
;by using the factoring here, which I hadn'd discovered at the time.

; First, we do an early-out fork and compute the center region which is
; common to all 45B,C figures:

; *this messed up putting case 56 at the end, since it doesn't meet this criterion ** rc      = 0
        s       = 0
;       movQ            ,jag1_topleftA
;       movQ    b,jag1_topleftB
;       s       = 3                     ;180 degree for bottom
;       andQ            ,jag1_topleftB
;       andQ    b,jag1_topleftA
;       orQ                             ; 1st two ways to hit
;       s       = 1
;       movQ    b,jag1_topleftA
;       s       = 2
;       andQ    b,jag1_topleftB
;       orQ                             ; 3rd option
;       s       = 1
;       movQ    b,jag1_topleftB
;       s       = 2
;       andQ    b,jag1_topleftA
;       orQ                             ;4th option
;
;       notQ                    ; assumes this 45B is the last section
;                               ;anything without a center-figure is a NO HIT
;       IFe track eq 2
;          or           hits_log,EAX   ; eliminate said no-hits.
;       ENDIF
;       IFe track eq 1
;          or           Ehits_log,EDX
;       ENDIF ; one_zag(n)   <= v(81*n+40) AND h(80*n+35) AND v(81*n+32);
; two_zag(n)   <= v(81*n+40) AND h(80*n+35) AND v(81*n+32) AND h(80*n+26) AND v(81*n+24);
;three_zag(n)  <= v(81*n+40) AND h(80*n+35) AND v(81*n+32) AND h(80*n+26) AND v(81*n+24) AND h(80*n+17) AND v(81*n+16);
; four_zag(n)  <= v(81*n+40) AND h(80*n+35) AND v(81*n+32) AND h(80*n+26) AND v(81*n+24) AND h(80*n+17)
;                 AND v(81*n+16) AND h(80*n+08) AND v(81*n+08);

;As1(n)  <= NOT h(80*n+34);
;As2(n)  <= NOT h(80*n+34) AND NOT h(80*n+25);
;As3(n)  <= NOT h(80*n+34) AND NOT h(80*n+25) AND NOT h(80*n+16);
;As4(n)  <= NOT h(80*n+34) AND NOT h(80*n+25) AND NOT h(80*n+16) AND NOT h(80*n+07);

;Bs1(n)  <= NOT h(80*n+36)
;Bs2(n)  <= NOT h(80*n+36) AND NOT h(80*n+27);
;Bs3(n)  <= NOT h(80*n+36) AND NOT h(80*n+27) AND NOT h(80*n+18);
```

XLI CORPORATION - CONFIDENTIAL
INF_45B.ASM                                                                                                    PAGE 2
------------------------------------------------------------------------------------------------

```
;Bs4(n)       <= NOT h(80*n+36) AND NOT h(80*n+27) AND NOT h(80*n+18) AND NOT h(80*n+09);

;col1_tops(n) <=    one_zag(n) AND v(81*n+23) AND NOT h(80*n+26);
;col2_tops(n) <=    two_zag(n) AND v(81*n+15) AND NOT h(80*n+17);
;col3_tops(n) <=  three_zag(n) AND v(81*n+07) AND NOT h(80*n+08);

s       = 0
            REPEAT  4                       ; s = 0-3
            rr      = 0
            REPEAT  3                       ; rr = 0-2    for column 1,2,3 and 4,5,6
;*Color* tops 1,2,3:
            movQ    ,v,23-rr*8
            movQ    b s       = s XOR 1               ; L/R switch
            andQ    ,jag%rr+1!_topleftB     ; becomes A-side
            andQ    b,jag%rr+1!_topleftA    ; becomes B-side
            s       = s XOR 1               ; L/R switch andQ    ,not_h,25-rr*9
            andQ    b,not_h,26-rr*9          ; the X stoQ    ,Bcol%rr+1!_topsA       ; tops 1,2,3
            stoQ    B,Bcol%rr+1!_topsB      ; tops 1,2,3

;col4_tops(n) <=   one_zag(n) AND h(80*n+26) AND h(80*n+27) AND NOT v(81*n+24);
;col5_tops(n) <=   two_zag(n) AND h(80*n+17) AND h(80*n+18) AND NOT v(81*n+16);
;col6_tops(n) <= three_zag(n) AND h(80*n+08) AND h(80*n+09) AND NOT v(81*n+08);

;-- The equations for center-right-pix black:  w + y!vz = 1    (side A clear)
;
;col7_A_side_eq(n)   <=  color(n) AND (h(80*n+25) OR  (h(80*n+26) AND NOT v(81*n+24) AND v(81*n+33)));
;col8_A_side_eq(n)   <=  color(n) AND (h(80*n+16) OR  (h(80*n+17) AND NOT v(81*n+16) AND v(81*n+25)));
;col9_A_side_eq(n)   <=  color(n) AND (h(80*n+07) OR  (h(80*n+08) AND NOT v(81*n+08) AND v(81*n+17)));

;*Color* tops 4,5,6:   rr = 0-2 s = s XOR 1                     ; to convert 25 to 23, 16 to 12
            IF rr eq 0
            movQ    ,join_23_forwd          ; really _25_back
            movQ    b,join_23_back          ; really _25_forwd
            ENDIF
            IF rr eq 1
            movQ    ,join_12_forwd          ; really _16_back
            movQ    b,join_12_back          ; really _16_forwd
            ENDIF
            s = s XOR 1                     ; restore IF rr eq 2
            super_join      (25-rr*9) ; really super_join 07
            ENDIF
            notQ
            stoQ    b,temporary_hold        ; forming A side in <b>, B side in <a>
                                            ; 4/3/96 bug fix movQ    b,h,26-rr*9             ; fixed edge
            andQ    b,h,27-rr*9             ; fixed edge
            andQ                            ; into both A,B sides
            andQ    b,temporary_hold andQ    b,not_v,24-rr*8         ; the X
            andQ    ,not_v,33-rr*8 s       = s XOR 1               ; L/R switch
            andQ    b,jag%rr+1!_topleftB    ; becomes A-side
            andQ    ,jag%rr+1!_topleftA     ; becomes B-side
            s       = s XOR 1               ; L/R switch stoQ    b,Bcol%rr+4!_topsA      ; rr = 0,1,2    tops 4,5,6
            stoQ    ,Bcol%rr+4!_topsB       ; rr = 0,1,2    tops 4,5,6 rr      = rr + 1
            ENDM                            ; on rr = 0,1,2

;-- The equations for center-right-pix white:  w!y + yz = 1    (side B clear)
;
;col7_B_side_eq(n)   <= NOT color(n) AND ((h(80*n+25) AND NOT h(80*n+26)) OR (h(80*n+26) AND v(81*n+33)));
;col8_B_side_eq(n)   <= NOT color(n) AND ((h(80*n+16) AND NOT h(80*n+17)) OR (h(80*n+17) AND v(81*n+25)));
;col9_B_side_eq(n)   <= NOT color(n) AND ((h(80*n+07) AND NOT h(80*n+08)) OR (h(80*n+08) AND v(81*n+17)));

rr      = 0
            REPEAT  3                       ; rr = 0-2    for column 7,8,9 movQ    ,Bcol%rr+1!_topsA
            movQ    b,Bcol%rr+1!_topsB
```

XLI CORPORATION - CONFIDENTIAL
INF_45B.ASM  PAGE 3

```
        orQ     ,Bcol&rr+4!_topsA
        orQ     b,Bcol&rr+4!_topsB s       = s XOR 1               ; L/R switch
        orQ     ,jag&rr+2!_topleftB     ; becomes A-side       Next top.
        orQ     b,jag&rr+2!_topleftA    ; becomes B-side notQ                            ; exclude any of above three top types
        notQ    b andQ    ,jag&rr+1!_topleftB     ; becomes A-side
        andQ    b,jag&rr+1!_topleftA    ; becomes B-side
        s       = s XOR 1               ; L/R switch ; restore stoQ    ,Bcol&rr+7!_topsA       ; top 7,8,9  col10 done by EQU
        stoQ    b,Bcol&rr+7!_topsB      ; top 7,8,9  col10 done by EQU rr      = rr +1
        ENDM                            ; on rr = 0-2 s       = s + 1
        ENDM                    ; on s = 0-3

; Final assembly of cases:

rc      = 0
        s       = 0
        REPEAT  4               ; on s = 0-3

; NOTE: the A,B and color conditions are already included in tops,bots in
; the factoring herein.

;c110sym(n) <= row1_bots(n) AND col2_tops(n) AND ((As2s1(n) AND color(n)) OR (Bs2s1(n) AND NOT color(n)));
;c112sym(n) <= row1_bots(n) AND col3_tops(n) AND ((As3s1(n) AND color(n)) OR (Bs3s1(n) AND NOT color(n)));
;c125sym(n) <= row1_bots(n) AND col4_tops(n) AND ((As2s1(n) AND color(n)) OR (Bs1s1(n) AND NOT color(n)));
;c126sym(n) <= row1_bots(n) AND col5_tops(n) AND ((As3s1(n) AND color(n)) OR (Bs2s1(n) AND NOT color(n)));
;c127sym(n) <= row1_bots(n) AND col6_tops(n) AND ((As4s1(n) AND color(n)) OR (Bs3s1(n) AND NOT color(n)));

movQ    ,Brow1_botsA
        movQ    b,Brow1_botsB
        andQ    ,Bcol2_topsA
        andQ    b,Bcol2_topsB
        orQ
        CASE_IS 110,over movQ    ,Brow1_botsA
        movQ    b,Brow1_botsB
        andQ    ,Bcol3_topsA
        andQ    b,Bcol3_topsB
        orQ
        CASE_IS 112,over,L,200,defer    ; 6/3/96 defer, no particular reason
                                        ; except these tend to be smaller
        movQ    ,Brow1_botsA
        movQ    b,Brow1_botsB
        andQ    ,Bcol4_topsA
        andQ    b,Bcol4_topsB
        orQ
        CASE_IS 125,over,L,206,defer movQ    ,Brow1_botsA
        movQ    b,Brow1_botsB
        andQ    ,Bcol5_topsA
        andQ    b,Bcol5_topsB
        orQ
        CASE_IS 126,over movQ    ,Brow1_botsA
        movQ    b,Brow1_botsB
        andQ    ,Bcol6_topsA
        andQ    b,Bcol6_topsB
        orQ
        CASE_IS 127,over,L,200,defer ;c116sym(n) <= row2_bots(n) AND col3_tops(n) AND ((As3s2(n) AND color(n)) OR (Bs3s2(n) AND NOT color(n)));
;c129sym(n) <= row2_bots(n) AND col5_tops(n) AND ((As3s2(n) AND color(n)) OR (Bs2s2(n) AND NOT color(n)));
;c130sym(n) <= row2_bots(n) AND col6_tops(n) AND ((As4s2(n) AND color(n)) OR (Bs3s2(n) AND NOT color(n)));

;c133sym(n) <= row3_bots(n) AND col6_tops(n) AND ((As4s3(n) AND color(n)) OR (Bs3s3(n) AND NOT color(n)));

movQ    ,Brow2_botsA
        movQ    b,Brow2_botsB
        andQ    ,Bcol3_topsA
        andQ    b,Bcol3_topsB
        orQ
```

XLI CORPORATION - CONFIDENTIAL
INF_45B.ASM PAGE 4
---

```
        CASE_IS 116,over movQ     ,Brow2_botsA
            movQ    b,Brow2_botsB
            andQ     ,Bcol5_topsA
            andQ    b,Bcol5_topsB
             orQ
        CASE_IS 129,over,L,204,defer movQ     ,Brow2_botsA
            movQ    b,Brow2_botsB
            andQ     ,Bcol6_topsA
            andQ    b,Bcol6_topsB
             orQ
        CASE_IS 130,over movQ     ,Brow3_botsA
            movQ    b,Brow3_botsB
            andQ     ,Bcol6_topsA
            andQ    b,Bcol6_topsB
             orQ
        CASE_IS 133,over,L,205,defer ;c128sym(n) <= row4_bots(n) AND col2_tops(n) AND ((As2s1(n) AND color(n)) OR (Bs2s2(n) AND NOT color(n)));
;c131sym(n) <= row4_bots(n) AND col3_tops(n) AND ((As3s1(n) AND color(n)) OR (Bs3s2(n) AND NOT color(n)));
;c111sym(n) <= row4_bots(n) AND col5_tops(n) AND ((As3s1(n) AND color(n)) OR (Bs2s2(n) AND NOT color(n)));
;c113sym(n) <= row4_bots(n) AND col6_tops(n) AND ((As4s1(n) AND color(n)) OR (Bs3s2(n) AND NOT color(n)));

movQ     ,Brow4_botsA
            movQ    b,Brow4_botsB
            andQ     ,Bcol2_topsA
            andQ    b,Bcol2_topsB
             orQ
        CASE_IS 128,over,R,201,defer movQ     ,Brow4_botsA
            movQ    b,Brow4_botsB
            andQ     ,Bcol3_topsA
            andQ    b,Bcol3_topsB
             orQ
        CASE_IS 131,over,R,202,defer movQ     ,Brow4_botsA
            movQ    b,Brow4_botsB
            andQ     ,Bcol5_topsA
            andQ    b,Bcol5_topsB
             orQ
        CASE_IS 111,over,R,201,defer movQ     ,Brow4_botsA
            movQ    b,Brow4_botsB
            andQ     ,Bcol6_topsA
            andQ    b,Bcol6_topsB
             orQ
        CASE_IS 113,over,R,202,defer ;c132sym(n) <= row5_bots(n) AND col3_tops(n) AND ((As3s2(n) AND color(n)) OR (Bs3s3(n) AND NOT color(n)));
;c117sym(n) <= row5_bots(n) AND col6_tops(n) AND ((As4s2(n) AND color(n)) OR (Bs3s3(n) AND NOT color(n)));

movQ     ,Brow5_botsA
            movQ    b,Brow5_botsB
            andQ     ,Bcol3_topsA
            andQ    b,Bcol3_topsB
             orQ
        CASE_IS 132,over,R,203,defer movQ     ,Brow5_botsA
            movQ    b,Brow5_botsB
            andQ     ,Bcol6_topsA
            andQ    b,Bcol6_topsB
             orQ
        CASE_IS 117,over,R,203,defer s       = s + 1
        ENDM                    ; s = 0 to 3

RET                     ;end of do_near_45B

%OUT
%OUT    End of INF_45B.asm (NEAR_45B)

_ADAM ENDS
   END
```

XLI CORPORATION - CONFIDENTIAL
INF_45B.ASM PAGE 5

XLI CORPORATION - CONFIDENTIAL
INF_45C.ASM PAGE 1

---

```
        .486            ; switched to 486 to allow BWSAP instruction: 12/3/95
_TEXT   SEGMENT DWORD use32 PUBLIC 'CODE'
_TEXT   ENDS
_ADAM   SEGMENT DWORD use32 PUBLIC 'CODE'
_ADAM   ENDS
_DATA   SEGMENT DWORD use32 PUBLIC 'DATA'
_DATA   ENDS
CONST   SEGMENT DWORD use32 PUBLIC 'CONST'
CONST   ENDS
_BSS    SEGMENT DWORD use32 PUBLIC 'BSS'
_BSS    ENDS
 DGROUP GROUP   CONST, _BSS, _DATA
        ASSUME DS: DGROUP, SS: DGROUP _DATA SEGMENT
INCLUDE INF_DATA.inc            ;EXTERNDEF's and EQU's
_DATA ENDS

_ADAM SEGMENT
ASSUME CS:_ADAM,DS:_DATA

INCLUDE INF_MAC.inc     ;code MACRO's track = 3               ;used in MACRO's

PUBLIC DO_NEAR_45C

DO_NEAR_45C:                    ;main entry s       = 0

REPEAT 4                ; on s = 0-3

; Note: The new tops and bots include all terms in this VHDL:
;150sym(n) <= row1_bots(n) AND   one_zag(n) AND ((c150_As(n) AND col7_A_side_eq(n)) OR (c150_Bs(n) AND
col7_B_side_eq(n)));
;151sym(n) <= row1_bots(n) AND   two_zag(n) AND ((c151_As(n) AND col8_A_side_eq(n)) OR (c151_Bs(n) AND
col8_B_side_eq(n)));
;152sym(n) <= row1_bots(n) AND three_zag(n) AND ((c152_As(n) AND col9_A_side_eq(n)) OR (c152_Bs(n) AND
col9_B_side_eq(n)));
;153sym(n) <= row1_bots(n) AND  four_zag(n) AND ((c153_As(n) AND col0_A_side_eq(n)) OR (c153_Bs(n) AND
col0_B_side_eq(n)));

movQ    ,Brow1_botsA
                movQ    b,Brow1_botsB
                andQ    ,Bcol7_topsA
                andQ    b,Bcol7_topsB
                 orQ
                CASE_IS 150,over movQ    ,Brow1_botsA
                movQ    b,Brow1_botsB
                andQ    ,Bcol8_topsA
                andQ    b,Bcol8_topsB
                 orQ
                CASE_IS 151,over,L,176,over movQ    ,Brow1_botsA
                movQ    b,Brow1_botsB
                andQ    ,Bcol9_topsA
                andQ    b,Bcol9_topsB
                 orQ
                CASE_IS 152,over,L,177,over movQ    ,Brow1_botsA
                movQ    b,Brow1_botsB
                andQ    ,Bcol10_topsA
                andQ    b,Bcol10_topsB
                 orQ
                CASE_IS 153,over,L,178,over ;c154sym(n) <= row2_bots(n) AND   one_zag(n) AND ((c154_As(n) AND col7_A_side_eq(n)) OR (c154_Bs(n) AND
col7_B_side_eq(n)));
;c155sym(n) <= row2_bots(n) AND   two_zag(n) AND ((c155_As(n) AND col8_A_side_eq(n)) OR (c155_Bs(n) AND
col8_B_side_eq(n)));
;c156sym(n) <= row2_bots(n) AND three_zag(n) AND ((c156_As(n) AND col9_A_side_eq(n)) OR (c156_Bs(n) AND
col9_B_side_eq(n)));
;c157sym(n) <= row2_bots(n) AND  four_zag(n) AND ((c157_As(n) AND col0_A_side_eq(n)) OR (c157_Bs(n) AND
col0_B_side_eq(n)));

movQ    ,Brow2_botsA
```

XLI CORPORATION - CONFIDENTIAL
INF_45C.ASM PAGE 2

```
        movQ     b,Brow2_botsB
        andQ      ,Bcol7_topsA
        andQ     b,Bcol7_topsB
        orQ
        CASE_IS 154,over movQ      ,Brow2_botsA
        movQ     b,Brow2_botsB
        andQ      ,Bcol8_topsA
        andQ     b,Bcol8_topsB
        orQ
        CASE_IS 155,over,L,180,over movQ      ,Brow2_botsA
        movQ     b,Brow2_botsB
        andQ      ,Bcol9_topsA
        andQ     b,Bcol9_topsB
        orQ
        CASE_IS 156,over,L,181,over movQ      ,Brow2_botsA
        movQ     b,Brow2_botsB
        andQ      ,Bcol10_topsA
        andQ     b,Bcol10_topsB
        orQ
        CASE_IS 157,over,L,182,over ;c158sym(n) <= row3_bots(n) AND  one_zag(n) AND ((c158_As(n) AND col7_A_side_eq(n)) OR (c158_Bs(n) AND
col7_B_side_eq(n)));
;c159sym(n) <= row3_bots(n) AND  two_zag(n) AND ((c159_As(n) AND col8_A_side_eq(n)) OR (c159_Bs(n) AND
col8_B_side_eq(n)));
;c160sym(n) <= row3_bots(n) AND three_zag(n) AND ((c160_As(n) AND col9_A_side_eq(n)) OR (c160_Bs(n) AND
col9_B_side_eq(n)));
;c161sym(n) <= row3_bots(n) AND  four_zag(n) AND ((c161_As(n) AND col0_A_side_eq(n)) OR (c161_Bs(n) AND
col0_B_side_eq(n)));

movQ      ,Brow3_botsA
        movQ     b,Brow3_botsB
        andQ      ,Bcol7_topsA
        andQ     b,Bcol7_topsB
        orQ
        CASE_IS 158,over movQ      ,Brow3_botsA
        movQ     b,Brow3_botsB
        andQ      ,Bcol8_topsA
        andQ     b,Bcol8_topsB
        orQ
        CASE_IS 159,over,L,184,over movQ      ,Brow3_botsA
        movQ     b,Brow3_botsB
        andQ      ,Bcol9_topsA
        andQ     b,Bcol9_topsB
        orQ
        CASE_IS 160,over,L,185,over movQ      ,Brow3_botsA
        movQ     b,Brow3_botsB
        andQ      ,Bcol10_topsA
        andQ     b,Bcol10_topsB
        orQ
        CASE_IS 161,over                         ; shifted case 186 is null. 12/1/95

;c162sym(n) <= row4_bots(n) AND  one_zag(n) AND ((c162_As(n) AND col7_A_side_eq(n)) OR (c162_Bs(n) AND
col7_B_side_eq(n)));
;c163sym(n) <= row4_bots(n) AND  two_zag(n) AND ((c163_As(n) AND col8_A_side_eq(n)) OR (c163_Bs(n) AND
col8_B_side_eq(n)));
;c164sym(n) <= row4_bots(n) AND three_zag(n) AND ((c164_As(n) AND col9_A_side_eq(n)) OR (c164_Bs(n) AND
col9_B_side_eq(n)));
;c165sym(n) <= row4_bots(n) AND  four_zag(n) AND ((c165_As(n) AND col0_A_side_eq(n)) OR (c165_Bs(n) AND
col0_B_side_eq(n)));

movQ      ,Brow4_botsA
        movQ     b,Brow4_botsB
        andQ      ,Bcol7_topsA
        andQ     b,Bcol7_topsB
        orQ
        CASE_IS 162,over,R,187,over movQ      ,Brow4_botsA
        movQ     b,Brow4_botsB
        andQ      ,Bcol8_topsA
        andQ     b,Bcol8_topsB
        orQ
        CASE_IS 163,over,R,188,over
```

XLI CORPORATION - CONFIDENTIAL
INF_45C.ASM PAGE 3

```
        movQ    ,Brow4_botsA
        movQ    b,Brow4_botsB
        andQ    ,Bcol9_topsA
        andQ    b,Bcol9_topsB
         orQ
        CASE_IS 164,over,R,189,over movQ    ,Brow4_botsA
        movQ    b,Brow4_botsB
        andQ    ,Bcol10_topsA
        andQ    b,Bcol10_topsB
         orQ
        CASE_IS 165,over,R,190,over ;c166sym(n) <= row5_bots(n) AND   one_zag(n) AND ((c166_As(n) AND col7_A_side_eq(n)) OR (c166_Bs(n) AND
col7_B_side_eq(n)));
;c167sym(n) <= row5_bots(n) AND   two_zag(n) AND ((c167_As(n) AND col8_A_side_eq(n)) OR (c167_Bs(n) AND
col8_B_side_eq(n)));
;c168sym(n) <= row5_bots(n) AND three_zag(n) AND ((c168_As(n) AND col9_A_side_eq(n)) OR (c168_Bs(n) AND
col9_B_side_eq(n)));
;c169sym(n) <= row5_bots(n) AND  four_zag(n) AND ((c169_As(n) AND col0_A_side_eq(n)) OR (c169_Bs(n) AND
col0_B_side_eq(n)));

movQ    ,Brow5_botsA
        movQ    b,Brow5_botsB
        andQ    ,Bcol7_topsA
        andQ    b,Bcol7_topsB
         orQ
        CASE_IS 166,over,R,191,over movQ    ,Brow5_botsA
        movQ    b,Brow5_botsB
        andQ    ,Bcol8_topsA
        andQ    b,Bcol8_topsB
         orQ
        CASE_IS 167,over,R,192,over movQ    ,Brow5_botsA
        movQ    b,Brow5_botsB
        andQ    ,Bcol9_topsA
        andQ    b,Bcol9_topsB
         orQ
        CASE_IS 168,over,R,193,over movQ    ,Brow5_botsA
        movQ    b,Brow5_botsB
        andQ    ,Bcol10_topsA
        andQ    b,Bcol10_topsB
         orQ
        CASE_IS 169,over,R,194,over ;c170sym(n) <= row6_bots(n) AND   one_zag(n) AND ((c170_As(n) AND col7_A_side_eq(n)) OR (c170_Bs(n) AND
col7_B_side_eq(n)));
;c171sym(n) <= row6_bots(n) AND   two_zag(n) AND ((c171_As(n) AND col8_A_side_eq(n)) OR (c171_Bs(n) AND
col8_B_side_eq(n)));
;c172sym(n) <= row6_bots(n) AND three_zag(n) AND ((c172_As(n) AND col9_A_side_eq(n)) OR (c172_Bs(n) AND
col9_B_side_eq(n)));
;c173sym(n) <= row6_bots(n) AND  four_zag(n) AND ((c173_As(n) AND col0_A_side_eq(n)) OR (c173_Bs(n) AND
col0_B_side_eq(n)));

movQ    ,Brow6_botsA
        movQ    b,Brow6_botsB
        andQ    ,Bcol7_topsA
        andQ    b,Bcol7_topsB
         orQ
        CASE_IS 170,over,R,195,over movQ    ,Brow6_botsA
        movQ    b,Brow6_botsB
        andQ    ,Bcol8_topsA
        andQ    b,Bcol8_topsB
         orQ
        CASE_IS 171,over,R,196,over movQ    ,Brow6_botsA
        movQ    b,Brow6_botsB
        andQ    ,Bcol9_topsA
        andQ    b,Bcol9_topsB
         orQ
        CASE_IS 172,over,R,197,over movQ    ,Brow6_botsA
        movQ    b,Brow6_botsB
        andQ    ,Bcol10_topsA
        andQ    b,Bcol10_topsB
         orQ
        CASE_IS 173,over,R,198,over
```

XLI CORPORATION - CONFIDENTIAL
INF_45C.ASM                                                                 PAGE 4

```
;*Color* form precursors for case 122 while in 4 symmetries:
        rr      = 0
        REPEAT  4                       ; rr = 0-3      col 7-10

IF      rr eq 0
                movQ    ,Bcol%rr+7!_topsA
                movQ    b,Bcol%rr+7!_topsB
            ELSE
                orQ     ,Bcol%rr+7!_topsA
                orQ     b,Bcol%rr+7!_topsB
            ENDIF rr      = rr + 1
        ENDM                            ; on rr = 0-3 stoQ    ,case122_topA
            stoQ    b,case122_topB s       = s + 1
        ENDM                            ; on s = 0-3
; Finally, the self-symmetric cases:

rc      = 0
        s       = 0
        REPEAT  2                       ; on s = 0,1

;c134sym(n) <= row1_bots(n) AND col1_tops(n) AND ((As1s1(n) AND color(n)) OR (Bs1s1(n) AND NOT color(n)));
;c136sym(n) <= row2_bots(n) AND col2_tops(n) AND ((As2s2(n) AND color(n)) OR (Bs2s2(n) AND NOT color(n)));
;c138sym(n) <= row3_bots(n) AND col3_tops(n) AND ((As3s3(n) AND color(n)) OR (Bs3s3(n) AND NOT color(n)));
;c135sym(n) <= row4_bots(n) AND col4_tops(n) AND ((As2s1(n) AND color(n)) OR (Bs1s2(n) AND NOT color(n)));
;c137sym(n) <= row5_bots(n) AND col5_tops(n) AND ((As3s2(n) AND color(n)) OR (Bs2s3(n) AND NOT color(n)));
;c139sym(n) <= row6_bots(n) AND col6_tops(n) AND ((As4s3(n) AND color(n)) OR (Bs3s4(n) AND NOT color(n)));

movQ    ,Brow1_botsA
            movQ    b,Brow1_botsB
            andQ    ,Bcol1_topsA
            andQ    b,Bcol1_topsB
            orQ
            CASE_IS 134,over movQ    ,Brow2_botsA
            movQ    b,Brow2_botsB
            andQ    ,Bcol2_topsA
            andQ    b,Bcol2_topsB
            orQ
            CASE_IS 136,over movQ    ,Brow3_botsA
            movQ    b,Brow3_botsB
            andQ    ,Bcol3_topsA
            andQ    b,Bcol3_topsB
            orQ
            CASE_IS 138,over movQ    ,Brow4_botsA
            movQ    b,Brow4_botsB
            andQ    ,Bcol4_topsA
            andQ    b,Bcol4_topsB
            orQ
            CASE_IS 135,over,L,206,over     ;;135,137,139 shifted should be L&R movQ    ,Brow5_botsA
            movQ    b,Brow5_botsB
            andQ    ,Bcol5_topsA
            andQ    b,Bcol5_topsB
            orQ
            CASE_IS 137,over,L,204,over movQ    ,Brow6_botsA
            movQ    b,Brow6_botsB
            andQ    ,Bcol6_topsA
            andQ    b,Bcol6_topsB
            orQ
            CASE_IS 139,over,L,205,over ; case 122, pure 45 degrees, is so different from VHDL not worth copying VHDL
; still should be equivalent to VHDL, though.

movQ    ,case122_topA
            movQ    b,case122_topB s = 3 - s                       ;rotate 180 andQ    ,case122_topB       ; A,B get reversed
```

XLI CORPORATION - CONFIDENTIAL
INF_45C.ASM                                                                                    PAGE 5
---

```
        andQ    b,case122_topA s = 3 - s                    ;restore (for clarity)

orQ                                ; combine A,B sides
        CASE_IS 122,defer                  ; defer: 5/17/96
     s = 1
        ENDM                      ; on s = 0,1
                                  ;.. includes 45C RET                       ;end of do_near_45c %OUT
%OUT    End of INF_45C.asm (NEAR_45C)

_ADAM ENDS
    END
```

XLI CORPORATION - CONFIDENTIAL
INF_ASM.MAK PAGE 1
------------------------------------------------------------------------

```
MAJORH = inf_data.inc inf_mac.inc

ASSEMBLE = c:\masm611\bin\ml /c /coff inf_main.obj: inf_main.asm $(MAJORH)
        $(ASSEMBLE) inf_main.asm inf_set.obj: inf_set.asm $(MAJORH)
        $(ASSEMBLE) inf_set.asm inf_vert.obj: inf_vert.asm $(MAJORH)
        $(ASSEMBLE) inf_vert.asm inf_horz.obj: inf_horz.asm $(MAJORH)
        $(ASSEMBLE) inf_horz.asm inf_splt.obj: inf_splt.asm $(MAJORH)
        $(ASSEMBLE) inf_splt.asm inf_45a.obj: inf_45a.asm $(MAJORH)
        $(ASSEMBLE) inf_45a.asm inf_45b.obj: inf_45b.asm $(MAJORH)
        $(ASSEMBLE) inf_45b.asm inf_45c.obj: inf_45c.asm $(MAJORH)
        $(ASSEMBLE) inf_45c.asm
```

XLI CORPORATION - CONFIDENTIAL
INF_DATA.INC                                                                                              PAGE 1
-------------------------------------------------------------------------------------------------------------------

```
EXTERNDEF OUTPUT_BUFFER        :DWORD    ;test only, of course it shouldn't be here.
EXTERNDEF INPUT_BUFFER         :DWORD    ;test only
EXTERNDEF line_length          :DWORD    ; is the line_length in bytes
EXTERNDEF total_input_bytes    :DWORD    ; E.G. 4 million. This number ends the computation EXTERNDEF EBX_setup_top        :DWORD    ; in edgemap formation
EXTERNDEF EBX_setup_middle     :DWORD    ; in edgemap formation EXTERNDEF FLAGS                :DWORD    ;one-bit switches ; Variable region: the edges:
; NOTE: the edges are identified according to Richard's edge-numbering system.

; Usage of DDQ:     DDq  some_name%index+2!more_name,s3

; If the "s3" input is MISSING,
; this generates all four symmetries with the number "index+2" as part of the
; name if the HIDDEN VARIABLE e is 0. If e=1 the name is prefixed by E for "extended".
; This & feature must be within an REPEAT, if only REPEAT 1, to work.
; If the "s3" variable is specified (complete with 's'), it is used, and only that
; one symmetry is generated.

; Usage of stoQ:    stoQ  b,some_name%index+2!more_name
; STOQ uses s (symmetry) as a hidden input.

DDQ                   MACRO    name,sx

IFB      <&sx>         ; no sym. specified, generate all

IF      e EQ 0
EXTERNDEF  &name&_s0              :DWORD
EXTERNDEF  &name&_s1              :DWORD
EXTERNDEF  &name&_s2              :DWORD
EXTERNDEF  &name&_s3              :DWORD
         ELSE
EXTERNDEF E&name&_s0              :DWORD
EXTERNDEF E&name&_s1              :DWORD
EXTERNDEF E&name&_s2              :DWORD
EXTERNDEF E&name&_s3              :DWORD
         ENDIF

ELSE

IF      e EQ 0
EXTERNDEF  &name&_&sx             :DWORD
         ELSE
EXTERNDEF E&name&_&sx             :DWORD
         ENDIF ENDIF
                      ENDM             ; end of DDq ; Usage of EQUQ:    EQUq  some_name%index+2!more_name,s3,another_name%ind,s1

; this generates all four symmetries with the number "index+2" as part of the
; name if the HIDDEN VARIABLE e is 0. If e=1 the name is prefixed by E for "extended".
; This & feature must be within an REPEAT, if only REPEAT 1, to work.
; If the "s3" variable is specified, it is used, otherwise all four are generated.

; Usage of stoQ:    stoQ  b,some_name%index+2!more_name
; STOQ uses s (symmetry) as a hidden input.

EQUQ                  MACRO    name,sx,name2,sx2

IFB      <&sx>         ; no sym. specified, generate all

IF      e EQ 0
&name&_s0                 EQU      <&name2&_s0>
&name&_s1                 EQU      <&name2&_s1>
&name&_s2                 EQU      <&name2&_s2>
&name&_s3                 EQU      <&name2&_s3>
         ELSE
E&name&_s0                EQU      <E&name2&_s0>
E&name&_s1                EQU      <E&name2&_s1>
E&name&_s2                EQU      <E&name2&_s2>
E&name&_s3                EQU      <E&name2&_s3>
         ENDIF

ELSE

IF      e EQ 0
&name&_&sx                EQU      <&name2&_&sx2>
```

XLI CORPORATION - CONFIDENTIAL
INF_DATA.INC                                                                              PAGE 2
---

```
        ELSE
E&name&_&sx         EQU         <E&name2&_&sx2>
        ENDIF

ENDIF
                    ENDM                    ; end of EQUq

;-- TAG --
; ***** AUTOMATIC VARIABLE GENERATION USING THE ABOVE MACROS: ***********
                    e       = 0             ;for DDq, EQUq generation
                    REPEAT  2

; LIST OF VARIABLES THAT APPEAR IN ONE SYMMETRY,  AND BOTH E'S OF COURSE, AND
; ONLY ONE ROW OR COLUMN.

DDQ     hits,log        ; Log of hits for the current 64 pixel group

; Variables for SUPER_JOIN macro: (created in both e's)

index   = 0
        REPEAT  16
            DDq     back_connect,%index     ; e.g. Eback_connect_13
            DDq     forwd_connect,%index
        index   = index+1
        ENDM equQ    Hrow5_rightsA,s0,   Hcol5_Abar_Xes,s1
        equQ    Hrow5_rightsA,s1,   Hcol5_Abar_Xes,s0
        equQ    Hrow5_rightsA,s2,   Hcol5_Abar_Xes,s3
        equQ    Hrow5_rightsA,s3,   Hcol5_Abar_Xes,s2 equQ    Hrow5_rightsB,s0,   Hcol5_Bbar_Xes,s1
        equQ    Hrow5_rightsB,s1,   Hcol5_Bbar_Xes,s0
        equQ    Hrow5_rightsB,s2,   Hcol5_Bbar_Xes,s3
        equQ    Hrow5_rightsB,s3,   Hcol5_Bbar_Xes,s2 equQ    join_44_forwd,s0,   join_34_forwd,s3    ;*Color*splitcell
        equQ    join_44_forwd,s1,   join_34_forwd,s2
        equQ    join_44_forwd,s2,   join_34_forwd,s1
        equQ    join_44_forwd,s3,   join_34_forwd,s0 equQ    join_44_back,s0,    join_34_back,s3     ;*Color*splitcell
        equQ    join_44_back,s1,    join_34_back,s2
        equQ    join_44_back,s2,    join_34_back,s1
        equQ    join_44_back,s3,    join_34_back,s0 equQ    Bcol10_topsA,s0,    jag4_topleftB,s1
        equQ    Bcol10_topsA,s1,    jag4_topleftB,s0
        equQ    Bcol10_topsA,s2,    jag4_topleftB,s3
        equQ    Bcol10_topsA,s3,    jag4_topleftB,s2 equQ    Bcol10_topsB,s0,    jag4_topleftA,s1
        equQ    Bcol10_topsB,s1,    jag4_topleftA,s0
        equQ    Bcol10_topsB,s2,    jag4_topleftA,s3
        equQ    Bcol10_topsB,s3,    jag4_topleftA,s2

;-- TAG --
; LIST OF VARIABLES THAT APPEAR IN ALL SYMMETRIES, AND BOTH E'S OF COURSE, BUT
; ONLY ONE ROW OR COLUMN.

; for SUPER_JOIN:

index   = 0
        REPEAT  5
            DDq     back_connect_sum_bit%index  ;e.g. Eback_connect_sum_bit3_s2
            DDq     forwd_connect_sum_bit%index
        index   = index+1
        ENDM DDq     checkerboard_fix            ; 4/2/96

DDQ     temporary_hold  ; scratch, all four symmetries
        DDQ     temporary_hold2 ; scratch, all four symmetries
        DDQ     temporary_hold3 ; scratch, all four symmetries
        DDQ     temporary_hold4 ; scratch, all four symmetries
        DDQ     join_temp       ; scratch for JOIN macro, internally
        DDQ     join2_back      ; scratch for JOIN macro, internally
        DDQ     join2_forwd     ; scratch for JOIN macro, internally DDq     not_row1_blue
            DDq     Vnot_col1_blue
            DDq     Hnot_col1_blue
```

XLI CORPORATION - CONFIDENTIAL
INF_DATA.INC                                                                                                        PAGE 3

---

```
        DDq     Vcol3_eqA
        DDq     Vcol3_eqB

DDq     Vcase06_topA            ; For the "M" crotch and armpit fixes
                DDq     Vcase06_topB
                DDq     Vcase07_topA
                DDq     Vcase07_topB
                DDq     Vcase10_topA
                DDq     Vcase10_topB DDq     Vcase01_serifs_blues
        DDq     Hcol5_Abar_Xes          ; H indicates NEARHORZ (col5 doesn't exist)
        DDq     Hcol5_Bbar_Xes          ; H indicates NEARHORZ (col5 doesn't exist)

DDq     Scol0_leftsA            ; S indicates SPLITCELL
        DDq     Scol0_leftsB            ; S indicates SPLITCELL
        DDq     Scol1_leftsA            ; S indicates SPLITCELL
        DDq     Scol1_leftsB            ; S indicates SPLITCELL DDq     ArowR2_rightsA          ; A indicates NEAR_45A ;*Color*
        DDq     ArowR2_rightsB          ; A indicates NEAR_45A
        DDq     ArowR3_rightsA          ; A indicates NEAR_45A
        DDq     ArowR3_rightsB          ; A indicates NEAR_45A DDq     Bcol9_topsA
        DDq     Bcol9_topsB EQUq    Vcol3_topA_vt_vwXes,,   v40     ;*Color* V is NEARVERT
        EQUq    Vcol3_topB_vt_vwXes,,   v40     ;*Color*

; Pre-computed super-joins:

DDq     join_12_back
        DDq     join_12_forwd
        DDq     join_13_back
        DDq     join_13_forwd
        DDq     join_14_back
        DDq     join_14_forwd
        DDq     join_21_back
        DDq     join_21_forwd
        DDq     join_22_back
        DDq     join_22_forwd
        DDq     join_23_back
        DDq     join_23_forwd
        DDq     join_24_back
        DDq     join_24_forwd
        DDq     join_32_back
        DDq     join_32_forwd
        DDq     join_33_back
        DDq     join_33_forwd
        DDq     join_34_back
        DDq     join_34_forwd DDq     case122_topA
                DDq     case122_topB ; LIST OF VARIABLES THAT APPEAR IN ALL SYMMETRIES, AND BOTH E'S OF COURSE, AND
; FOUR ROWS OR COLUMNS.

rc      = 0             ;col loop
                        REPEAT 4                ;col loop    rc = 0-3

DDq     Vcol!rc+4!_topA_vt_vwXes        ;*Color*

DDq     Bcol!rc+1!_topsA                ; tops 1-4
        DDq     Bcol!rc+1!_topsB                ; tops 1-4
        DDq     Bcol!rc+5!_topsA                ; tops 5-8. tops 9,10 just above
        DDq     Bcol!rc+5!_topsB                ; tops 5-8. tops 9,10 just above DDq     Vcol!rc+3!_topsA                ;*Color*
        DDq     Vcol!rc+3!_topsB                ;*Color*

IFE rc eq 3                     ; exclude col.6
        DDq     Vnot_col!rc+3!_serif
        ENDIF DDq     Hcol!rc+1!_Abar_Xes
        DDq     Hcol!rc+1!_Bbar_Xes
        DDq     Hcol!rc+1!_leftsA
        DDq     Hcol!rc+1!_leftsB
        DDq     Hrow!rc+1!_rightsA
        DDq     Hrow!rc+1!_rightsB DDq     Scol!rc+2!_leftsA       ;*Color*  for SPLITCELL
        DDq     Scol!rc+2!_leftsB       ;*Color*
```

XLI CORPORATION - CONFIDENTIAL
INF_DATA.INC                                                                                              PAGE 4

```
        DDq       jag%rc+1!_topleftA    ;*Color*    45 A,B,C
        DDq       jag%rc+1!_topleftB    ;*Color*    45 A,B,C
        DDq       Acol%rc+1!_topsA      ; *** later: use EQU for col 4.
        DDq       Acol%rc+1!_topsB ; LIST OF VARIABLES THAT APPEAR IN ONE SYMMETRY*, AND BOTH E'S OF COURSE, AND
; FOUR ROWS OR COLUMNS:                        [*ONE SYMMETRY PER EQUATION]

EQUq      Vcol%rc+4!_topB_vt_vwXes,s0,     Vcol%rc+4!_topA_vt_vwXes,s1
        EQUq      Vcol%rc+4!_topB_vt_vwXes,s1,     Vcol%rc+4!_topA_vt_vwXes,s0
        EQUq      Vcol%rc+4!_topB_vt_vwXes,s2,     Vcol%rc+4!_topA_vt_vwXes,s3
        EQUq      Vcol%rc+4!_topB_vt_vwXes,s3,     Vcol%rc+4!_topA_vt_vwXes,s2

EQUq      Vrow%rc+2!_botsA,s0,             Vcol%rc+4!_topB_vt_vwXes,s3
        EQUq      Vrow%rc+2!_botsA,s1,             Vcol%rc+4!_topB_vt_vwXes,s2
        EQUq      Vrow%rc+2!_botsA,s2,             Vcol%rc+4!_topB_vt_vwXes,s1
        EQUq      Vrow%rc+2!_botsA,s3,             Vcol%rc+4!_topB_vt_vwXes,s0

EQUq      Vrow%rc+2!_botsB,s0,             Vcol%rc+4!_topA_vt_vwXes,s3
        EQUq      Vrow%rc+2!_botsB,s1,             Vcol%rc+4!_topA_vt_vwXes,s2
        EQUq      Vrow%rc+2!_botsB,s2,             Vcol%rc+4!_topA_vt_vwXes,s1
        EQUq      Vrow%rc+2!_botsB,s3,             Vcol%rc+4!_topA_vt_vwXes,s0

;row2_BLACK_BOTS(n+1)  <= row2_BLACK_BOTS(n);    n = 0,1 only
;row3_BLACK_BOTS(n+1)  <= row3_BLACK_BOTS(n);
;row4_BLACK_BOTS(n+1)  <= row4_BLACK_BOTS(n);
;row5_BLACK_BOTS(n+1)  <= row5_BLACK_BOTS(n);

;row2_bot_verts(n)     <= col4_top_verts(3-n);     -- 180 deg. rotated --
;row3_bot_verts(n)     <= col5_top_verts(3-n);
;row4_bot_verts(n)     <= col6_top_verts(3-n);
;
;row2_bot_Xes(n)       <= col4_top_Xes(3-n);       -- 180 deg. rotated --
;row3_bot_Xes(n)       <= col5_top_Xes(3-n);
;row4_bot_Xes(n)       <= col6_top_Xes(3-n);

;*Color*  A and B sides distinguished:

EQUq      Hrow%rc+1!_Abar_Xes,s0,          Hcol%rc+1!_Abar_Xes,s1
        EQUq      Hrow%rc+1!_Abar_Xes,s1,          Hcol%rc+1!_Abar_Xes,s0
        EQUq      Hrow%rc+1!_Abar_Xes,s2,          Hcol%rc+1!_Abar_Xes,s3
        EQUq      Hrow%rc+1!_Abar_Xes,s3,          Hcol%rc+1!_Abar_Xes,s2

EQUq      Hrow%rc+1!_Bbar_Xes,s0,          Hcol%rc+1!_Bbar_Xes,s1
        EQUq      Hrow%rc+1!_Bbar_Xes,s1,          Hcol%rc+1!_Bbar_Xes,s0
        EQUq      Hrow%rc+1!_Bbar_Xes,s2,          Hcol%rc+1!_Bbar_Xes,s3
        EQUq      Hrow%rc+1!_Bbar_Xes,s3,          Hcol%rc+1!_Bbar_Xes,s2

DDq       ArowB%rc+2!_bots,s0
        DDq       ArowB%rc+2!_bots,s2

;rowB2_bots(n+1) <= rowB2_bots(n);   -- These bottoms are L/R self-symmetric --
;rowB3_bots(n+1) <= rowB3_bots(n);
;rowB4_bots(n+1) <= rowB4_bots(n);
;rowB5_bots(n+1) <= rowB5_bots(n);

EQUq      ArowB%rc+2!_bots,s1,             ArowB%rc+2!_bots,s0
        EQUq      ArowB%rc+2!_bots,s3,             ArowB%rc+2!_bots,s2

;row1_bots(n)    <= col1_tops(3-n);    -- here's where this new organization --
;row2_bots(n)    <= col2_tops(3-n);    -- really pays off.                  --
;row3_bots(n)    <= col3_tops(3-n);
;row4_bots(n)    <= col4_tops(3-n);
;row5_bots(n)    <= col5_tops(3-n);
;row6_bots(n)    <= col6_tops(3-n);

IFE       rc EQ 0                          ;rc = 1,2,3

EQUq      Brow%rc!_botsA,s0,    Bcol%rc!_topsB,s3      ; bots 1,2,3
        EQUq      Brow%rc!_botsA,s1,    Bcol%rc!_topsB,s2      ; bots 1,2,3
        EQUq      Brow%rc!_botsA,s2,    Bcol%rc!_topsB,s1      ; bots 1,2,3
        EQUq      Brow%rc!_botsA,s3,    Bcol%rc!_topsB,s0      ; bots 1,2,3

EQUq      Brow%rc!_botsB,s0,    Bcol%rc!_topsA,s3      ; bots 1,2,3
        EQUq      Brow%rc!_botsB,s1,    Bcol%rc!_topsA,s2      ; bots 1,2,3
        EQUq      Brow%rc!_botsB,s2,    Bcol%rc!_topsA,s1      ; bots 1,2,3
        EQUq      Brow%rc!_botsB,s3,    Bcol%rc!_topsA,s0      ; bots 1,2,3

EQUq      Brow%rc+3!_botsA,s0,  Bcol%rc+3!_topsB,s3    ; bots 4,5,6
        EQUq      Brow%rc+3!_botsA,s1,  Bcol%rc+3!_topsB,s2    ; bots 4,5,6
        EQUq      Brow%rc+3!_botsA,s2,  Bcol%rc+3!_topsB,s1    ; bots 4,5,6
        EQUq      Brow%rc+3!_botsA,s3,  Bcol%rc+3!_topsB,s0    ; bots 4,5,6

EQUq      Brow%rc+3!_botsB,s0,  Bcol%rc+3!_topsA,s3    ; bots 4,5,6
```

XLI CORPORATION - CONFIDENTIAL
INF_DATA.INC                                                                                                PAGE 5

```
                EQUq    Brow&rc+3!_botsB,s1,    Bcol&rc+3!_topsA,s2   ; bots 4,5,6
                EQUq    Brow&rc+3!_botsB,s2,    Bcol&rc+3!_topsA,s1   ; bots 4,5,6
                EQUq    Brow&rc+3!_botsB,s3,    Bcol&rc+3!_topsA,s0   ; bots 4,5,6

ENDIF                           ;rc = 1,2,3 rc      = rc + 1
                ENDM                            ; loop on rc 0-3
                e       = 1
                ENDM                            ;loop on e (extended /not)

; END OF "AUTOMATIC" GENERATION OF WORKING VARIABLES...

;-- TAG --
create_edge_variables   MACRO   hv,ind

EXTERNDEF       &hv&ind&_s0             ;DWORD
EXTERNDEF       NOT_&hv&ind&_s0         ;DWORD

ENDM

Ecreate_edge_variables  MACRO   hv,ind     ; "E" means extended (to 64 bits)

EXTERNDEF       E&hv&ind&_s0            ;DWORD            ; other symmetries done by EQU's
EXTERNDEF       eNOT_&hv&ind&_s0        ;DWORD

ENDM create_symmetry_EQUs    MACRO   qsym,qhv,qhv0,qedge,qedge0              ; q to avoid confusion &qhv&qedge&_s&qsym              EQU     <&qhv0&qedge0&_s0>
        E&qhv&qedge&_s&qsym             EQU     <E&qhv0&qedge0&_s0>
        NOT_&qhv&qedge&_s&qsym          EQU     <NOT_&qhv0&qedge0&_s0>
        eNOT_&qhv&qedge&_s&qsym         EQU     <eNOT_&qhv0&qedge0&_s0>

ENDM index   =       0
        REPEAT  80
create_edge_variables h,%index
index   =       index+1
        ENDM index   =       0
        REPEAT  80
create_edge_variables b,%index                          ;*Color*
index   =       index+1
        ENDM index   =       0
        REPEAT  80
create_edge_variables f,%index                          ;*Color*
index   =       index+1
        ENDM index   =       0
        REPEAT  9
        REPEAT  9
create_edge_variables v,%index
index   =       index+1
        ENDM
;;              DD      2 dup (?)       ;tenth pair to speed indexing
                                        ;in edgemap setup
        ENDM ; Now the E's (extended .. to 64 bits)

index   = 0
        REPEAT  80
Ecreate_edge_variables h,%index
        index   = index+1
        ENDM index   = 0
        REPEAT  80
Ecreate_edge_variables b,%index                         ;*Color*
        index   = index+1
        ENDM index   = 0
        REPEAT  80
Ecreate_edge_variables f,%index                         ;*Color*
```

XLI CORPORATION - CONFIDENTIAL
INF_DATA.INC                                                                                   PAGE 6

---

```
            index   = index+1
        ENDM index   = 0
        REPEAT  9
        REPEAT  9
Ecreate_edge_variables v,%index
            index   = index+1
        ENDM
;;              DD      2 dup (?)       ;tenth pair to speed indexing
                                        ;in edgemap setup
        ENDM ;create the other symmetry variables here via EQU's
; First, the Horizontal symmetry, S1

; First, the Horizontal edge symmetries:
edge    =       0               ; new edge
        REPEAT  80              ; h,b,f edges: other symmetries edge0   =       (edge/10)*10 + 9 - edge MOD 10          ;old edge
create_symmetry_EQUs    1,h,h,%edge,%edge0
create_symmetry_EQUs    1,b,f,%edge,%edge0-1    ;*Color*
create_symmetry_EQUs    1,f,b,%edge,%edge0-1    ;*Color* edge0   = 70 - (edge/10)*10 + edge MOD 10
create_symmetry_EQUs    2,h,h,%edge,%edge0
create_symmetry_EQUs    2,b,f,%edge,%edge0      ;*Color*
create_symmetry_EQUs    2,f,b,%edge,%edge0      ;*Color* edge0   = 79 - edge
create_symmetry_EQUs    3,h,h,%edge,%edge0
create_symmetry_EQUs    3,b,b,%edge,%edge0-1    ;*Color*
create_symmetry_EQUs    3,f,f,%edge,%edge0-1    ;*Color* edge    =       edge+1
        ENDM

; Now, the Vertical edge symmetries
edge    =       0
        REPEAT  81              ; v edges: other symmetries edge0   = edge/9 *9 + 8 - edge MOD 9
create_symmetry_EQUs    1,v,v,%edge,%edge0 edge0   = 72 - edge/9 *9 + edge MOD 9
create_symmetry_EQUs    2,v,v,%edge,%edge0 edge0   = 80 - edge
create_symmetry_EQUs    3,v,v,%edge,%edge0 edge    =       edge+1
        ENDM
```

XLI CORPORATION - CONFIDENTIAL
INF_HORZ.ASM                                                            PAGE 1

```
        .486            ; switched to 486 to allow BWSAP instruction: 12/3/95
_TEXT   SEGMENT DWORD use32 PUBLIC 'CODE'
_TEXT   ENDS
_ADAM   SEGMENT DWORD use32 PUBLIC 'CODE'
_ADAM   ENDS
_DATA   SEGMENT DWORD use32 PUBLIC 'DATA'
_DATA   ENDS
CONST   SEGMENT DWORD use32 PUBLIC 'CONST'
CONST   ENDS
_BSS    SEGMENT DWORD use32 PUBLIC 'BSS'
_BSS    ENDS
DGROUP  GROUP   CONST, _BSS, _DATA
        ASSUME DS: DGROUP, SS: DGROUP _DATA SEGMENT
INCLUDE INF_DATA.inc            ;EXTERNDEF's and EQU's
_DATA ENDS

_ADAM   SEGMENT
ASSUME CS:_ADAM,DS:_DATA

INCLUDE INF_MAC.inc     ;code MACRO's track = 3               ;used in MACRO's

PUBLIC DO_NEARHORZ

DO_NEARHORZ:                    ;main entry

; ******** START OF MATERIAL COPIED FROM NEARHORZ.VHD  10/29/95 ******************

; Sequence of precedence, NEAR HORIZONTAL cases:

;       31,30,33, 34,36,32, 37,40, 38,41,35,45, 42,46,43,39*, 47,48 s    = 0
            rc   = 0
            REPEAT 4            ;beginning of new four-symmetries loop, s =0-3
;col1_left_Xes(n)  <= NOT v(81*n+31);
;col2_left_Xes(n)  <= NOT v(81*n+31) AND NOT v(81*n+30);
;col3_left_Xes(n)  <= NOT v(81*n+31) AND NOT v(81*n+30) AND NOT v(81*n+29);
;col4_left_Xes(n)  <= NOT v(81*n+31) AND NOT v(81*n+30) AND NOT v(81*n+29) AND NOT v(81*n+28);

;col1_left_bars(n) <= h(80*n+43) AND v(81*n+39) AND h(80*n+34);
;col2_left_bars(n) <= h(80*n+42) AND v(81*n+38) AND h(80*n+34) AND h(80*n+33);
;col3_left_bars(n) <= h(80*n+41) AND v(81*n+37) AND h(80*n+34) AND h(80*n+33) AND h(80*n+32);
;col4_left_bars(n) <= h(80*n+40) AND v(81*n+36) AND h(80*n+34) AND h(80*n+33) AND h(80*n+32) AND h(80*n+31);
; first two factors, above, are the JAGS, postponed to below.
            movQ    ,h,34
                                        MOVQ    b           ; ,h,34
;           andQ    ,NOT_v,31
                                        ANDQ    b,NOT_v,40  ;deleted for splitcell
            stoQ    ,Hcol1_Abar_Xes
                                        STOQ    b,Hcol1_Bbar_Xes   ;use EQU's **** andQ    ,h,33
                                        ANDQ    b,h,33
            andQ    ,NOT_v,30
                                        ANDQ    b,NOT_v,39
            stoQ    ,Hcol2_Abar_Xes
                                        STOQ    b,Hcol2_Bbar_Xes andQ    ,h,32
                                        ANDQ    b,h,32
            andQ    ,NOT_v,29
                                        ANDQ    b,NOT_v,38
            stoQ    ,Hcol3_Abar_Xes
                                        STOQ    b,Hcol3_Bbar_Xes andQ    ,h,31
                                        ANDQ    b,h,31
            andQ    ,NOT_v,28
                                        ANDQ    b,NOT_v,37
            stoQ    ,Hcol4_Abar_Xes
                                        STOQ    b,Hcol4_Bbar_Xes
```

XLI CORPORATION - CONFIDENTIAL
INF_HORZ.ASM                                                                                                           PAGE 2

---

```
        andQ      ,h,30
                                      ANDQ    b,h,30
        andQ      ,NOT_v,27
                                      ANDQ    b,NOT_v,36
        stoQ      ,Hcol5_Abar_Xes                                    ;col. 5 is virtual
                                      STOQ    b,Hcol5_Bbar_Xes s        = s + 1
        ENDM ; End of items computed in all four  symmetries but only one row/col.

; Beginning of forming LEFTs for column 1-4 NEARHORZ, all four symmetries rc       = 0              ; rc not used
        rr       = 0              ;column loop 1-4 on rr = 0-3
        REPEAT   4                ;column loop 1-4 s        = 0              ;NOTE: s loop INSIDE rr loop for variable availability
        REPEAT   4                ; s = 0-3

;***************** code brought in from NEARVERT, and substituted appropriately: ******
; Object: make algorithm identical, including red and green options.
; (we are in s = 0-3, rr = 0-3 loops)

IF rr eq 0
           movQ      ,join_33_back
           movQ      b,join_33_forwd
        ENDIF
        IF rr eq 1
           movQ      ,join_32_back
           movQ      b,join_32_forwd
        ENDIF
        IF rr ge 2
           super_join            33-rr     ; set this up for each rr > 1
        ENDIF notQ
           stoQ      ,temporary_hold   ;NOT join_(33-rr)_back
           stoQ      b,temporary_hold2 ;    join_(33-rr)_forwd s = s + 1
        ENDM                              ; end and restart to have all sym's avail.
        s = 0
        REPEAT 4                          ;s = 0-3 s = s XOR 2                    ; updown mirror
           movQ      ,temporary_hold  ;NOT join_(33-rr)_back
           notQ
           movQ   b,temporary_hold2 ;    join_(33-rr)_forwd
           s = s XOR 2                    ; restore notQ      b
           stoQ      b,temporary_hold3 ;NOT join_(43-rr)_back
           stoQ      ,temporary_hold4 ;    join_(43-rr)_forwd ; here: [[No Near-Horizontal version of NV col. 3 equations]]

IF rr EQ 0
           movQ      ,join_23_back
        ENDIF
        IF rr EQ 1
           movQ      ,join_22_back
        ENDIF
        IF rr EQ 2
           movQ      ,join_21_back      ; Fii
        ENDIF
        IF rr EQ 3
           movQ      ,h,24-rr           ; red top verticals, rr= 3
        ELSE
           notQ
           andQ      ,h,24-rr           ; v41,v50 = RED_top_vts
        ENDIF andQ      ,h,25-rr
        andQ      ,v,30-rr              ; more red terms.
;       andQ      ,h,33-rr              ; for clarity only: redundant
; small crossbars (blue) exclusions:
; We now compute HNOT_coli_blue:
```

XLI CORPORATION - CONFIDENTIAL
INF_HORZ.ASM                                                                PAGE 3

```
;col1_blue(n) <= NOT h(80*n+23) AND h(80*n+24) AND v(81*n+38) AND v(81*n+21);    --   AND h(80*n+31) AND h(80*n+32)
;col2_blue(n) <= NOT h(80*n+22) AND h(80*n+23) AND v(81*n+37) AND v(81*n+20);    --   AND h(80*n+30) AND h(80*n+31)
;col3_blue(n) <= NOT h(80*n+21) AND h(80*n+22) AND v(81*n+36) AND v(81*n+19);    --                   AND h(80*n+30)
;col4_blue(n) <= NOT h(80*n+20) AND h(80*n+21)                 AND v(81*n+18);

movQ    b,h,23-rr
          orQ          b,h,33-rr         ; added 5/23/96 for consistency with Vert.
          orQ    b,NOT_v,21-rr
          orQ    b,NOT_h,24-rr
          orQ    b,NOT_h,25-rr           ;added 5/21/96: req's length 2

IFE     rr EQ 3
          orQ    b,NOT_v,38-rr
        ENDIF
          andQ         b,h,43-rr         ; a black top condition, the new bar 3/1/96
            stoQ       b,Hnot_col1_blue  ; different for each rr, s.

; NOT_col1_blue complete in <b>.

orQ                          ; combine red and black tops

;Hnot_col5_serif calculation:  No serif computation for Horizontal at
;this time. Bring in from vertical later.

movQ    b,v,39-rr             ; black top jag
           andQ    b,Hcol%rr+1!_Abar_Xes
             andQ        b,not_v,31                ;center X put with left
           andQ    b,temporary_hold2      ;   join_(33-rr)_forwd
           andQ    b,temporary_hold3      ;NOT join_(43-rr)_back andQ
           stoQ         ,Hcol%rr+1!_leftsA ; left pieces complete, side A (top)

; Additional term for case 06,07,10, a more stringent blue crossbars exclusion
; This was added to prevent the "M" crotch being detected as a false crossbar
; and hence unsmoothed.          5/24/96 Omitted from Horz. version for now.

; The "M armpit" fix:  (case 6,7,10)   omitted from Horz. version

; compute lefts B-side:   *Color*    (B-side means BOTTOM of edge clear)

; Now to compute the thin GREEN tops, equations first:

s = s XOR 2                   ; U/D mirror: join_21-24 become 51-54

IF rr EQ 0
           movQ         ,join_24_forwd
        ENDIF
        IF rr EQ 1
           movQ         ,join_23_forwd
        ENDIF
        IF rr EQ 2
           movQ         ,join_22_forwd
        ENDIF
        IF rr EQ 3
           movQ         ,join_21_forwd
        ENDIF s = s XOR 2                   ; restore U/D mirror ;          super_join        54-rr       ; replaced by above IF's notQ                          ; NOT join_(54-rr)_back
           andQ    ,v,48-rr              ; green fixed top terms:
           andQ    ,v,49-rr
           andQ    ,h,54-rr
           andQ    ,not_h,44-rr          ; b=0 term *Color* andQ    ,h,45-rr
;          andQ    ,h,46-rr              ;_GREEN_top_vts     = v57 times v48
; requiring only length = 1 green top_vts for horizontal.

movQ    b,temporary_hold4  ;   join_(43-rr)_forwd
           andQ    b,Hnot_col1_blue      ; includes h43, effectively BLACK_tops
           orQ                           ; combine green and black tops ; Now, multiplicative factors formed in <b> that apply to both black and green:

movQ    b,temporary_hold      ;NOT join_(33-rr)_back andQ    b,v,39-rr             ; required top black jag
           andQ    b,Hcol%rr+1!_Bbar_Xes ;hold in <b> for use below.*
           andQ    b,not_v,40            ; center X put with left
```

XLI CORPORATION - CONFIDENTIAL
INF_HORZ.ASM PAGE 4

```
        andQ                              ; combine in with green and black tops
        stoQ    ,Hcol*rr+1!_leftsB        ; left pieces complete ; * <b> hold used for add'l case 06 term in NEARVERT. Not currently used in Horz.

;********* end of code brought in from NEARVERT, and substituted appropriately **** s       = s + 1                   ; NOTE: s loop INSIDE rr loop.
        ENDM                              ;end of four symmetries loop NEARHORZ
        rr      = rr + 1                  ;index columns 1-4         RR = 0-3
        ENDM rc      = 0
        s       = 0
        REPEAT  4                         ;beginning of new four-symmetries, rc=0, loop rr      = 0                       ;row loop 1-4 on rr = 0-3
        REPEAT  4                         ;row loop 1-4

;row1_right_vw(n)   <= NOT h(80*n+36) OR v(81*n+41);
;row2_right_vw(n)   <= NOT h(80*n+37) OR v(81*n+42);
;row3_right_vw(n)   <= NOT h(80*n+38) OR v(81*n+43);
;row4_right_vw(n)   <= NOT h(80*n+39) OR v(81*n+44);

;*Color* splitting A and B-sides:   [v,w]

movQ    ,NOT_h,36+rr
        movQ    b
        orQ     ,v,32+rr
        orQ     b,v,41+rr ;row1_right(n) <= row1_right_bars(n) AND row1_right_Xes(n) AND row1_right_vw(n);
;row2_right(n) <= row2_right_bars(n) AND row2_right_Xes(n) AND row2_right_vw(n);
;row3_right(n) <= row3_right_bars(n) AND row3_right_Xes(n) AND row3_right_vw(n);
;row4_right(n) <= row4_right_bars(n) AND row4_right_Xes(n) AND row4_right_vw(n);
;row5_right(n) <= row5_right_bars(n) AND row5_right_Xes(n) AND row5_right_vw(n);

andQ    ,Hrow*rr+1!_Abar_Xes
        andQ    b,Hrow*rr+1!_Bbar_Xes
        stoQ    ,Hrow*rr+1!_rightsA
        stoQ    b,Hrow*rr+1!_rightsB ; End of items computed in all four symmetries and four row/cols NEARHORZ rr      = rr + 1                  ;index columns 1-4
        ENDM rc      = 0
        s       = s + 1
        ENDM                              ;end of four symmetries loop NEARHORZ ; Start of items computed in four or two symmetries (0,2) and four row/cols NEARHORZ s       = 0
        REPEAT  4                         ;on S rr      = 0
        REPEAT  4                         ;on rr ; case 31 here for mex reasons
;c31sym(n) <= coll_left(n) AND row1_right(n) AND (coll_left_pluses(n) OR v(81*n+32)) AND
;            NOT c30tan(n) AND NOT v(81*n+47) AND NOT v(81*n+30);

IF   rr EQ 0                           ;col. 1 movQ    ,Hcoll_leftsA
        movQ    b,Hcoll_leftsB
        andQ    ,Hrow1_rightsA
        andQ    b,Hrow1_rightsB
          orQ                             ;combine sides A,B CASE_IS 31,over ; 3/6/96 31 changed from over to defer. overwrite: its own 180 and 108,109,123,124

ENDIF                                  ; col. 1

; Now, the horizontal tangents and their dependants:

;c30tan(n)   <= c30pretan(n+1) AND c30pretan(n);
;c32tan(n)   <= c32pretan(n+1) AND c32pretan(n);
;c35tan(n)   <= c35pretan(n+1) AND c35pretan(n);
;c39tan(n)   <= c39pretan(n+1) AND c39pretan(n);

IF   (s MOD 2) EQ 1                 ; s = 1,3

; Note: s = 0 or 2 has to be done before this so that both H-mirrors are available
```

XLI CORPORATION - CONFIDENTIAL
INF_HORZ.ASM PAGE 5

---

```
; for left_italics.

IF      (rr OR (rr+1)) EQ 3         ;seeking rr = 1 or 2
;c32sym(n) <= c32tan(n) AND (col2_left_pluses(n) OR v(81*n+33) OR v(81*n+34));
;c35sym(n) <= c35tan(n) AND (col3_left_pluses(n) OR v(81*n+34) OR v(81*n+35));

movQ    ,Hcol%rr+1!_leftsA
        movQ    b,Hcol%rr+1!_leftsB s       = s - 1                 ; horizontal mirror image
        andQ    ,Hcol%rr+1!_leftsA
        andQ    b,Hcol%rr+1!_leftsB ELSE                                ; rr = 0,3  [case 30,39]
;c30sym(n) <= c30tan(n);
;c39sym(n) <= c39tan(n);    -- SS: Only c39sym(0) and c39sym(2) are used -- movQ    ,Hcol%rr+1!_leftsA
        movQ    b,Hcol%rr+1!_leftsB
        s       = s - 1                 ; horizontal mirror image
        andQ    ,Hcol%rr+1!_leftsA
        andQ    b,Hcol%rr+1!_leftsB ENDIF                               ; separates row 1,4 from 2,3 orQ                             ; combine A-side and B-side ;*Color*

IF      rr + 1 EQ 1                 ; row 1
        CASE_IS 30,over                 ;using s = 0,2  defer: over: 31,108,109,123,124
    ENDIF IF      rr + 1 EQ 2                 ; row 2
        CASE_IS 32,over                 ;using s = 0,2 as case sym.
    ENDIF IF      rr + 1 EQ 3                 ; row 3
        CASE_IS 35,over                 ;using s = 0,2 as case sym.
    ENDIF IF      rr + 1 EQ 4                 ; row 4
        CASE_IS 39,over                 ;using s = 0,2 as case sym.
    ENDIF s       = s + 1                 ; horizontal mirror: restore loop's s ENDIF           ; s = 1,3   From here on:  s = 0-3 rr      = rr + 1
    ENDM                                ; on rr 0-3 s       = s + 1                     ; index on s
    ENDM                                ; on S  0-3

; now to assembly the non-tangent cases final output:

; Note: case 31 moved earlier for MEX vis-a-vis 30,108 et al.

;c33sym(n) <= col1_left(n) AND row2_right(n) AND (col1_left_pluses(n) OR v(81*n+33));
;c34sym(n) <= col2_left(n) AND row2_right(n) AND (col2_left_pluses(n) OR v(81*n+33)) AND
;             NOT c32tan(n);

rc      = 0                         ;redundant
    s       = 0
    REPEAT  4                                   ;on S
        movQ    ,Hcol1_leftsA
        movQ    b,Hcol1_leftsB
        andQ    ,Hrow2_rightsA
        andQ    b,Hrow2_rightsB
        orQ
        CASE_IS 33,over
        s       = s + 1
    ENDM                    ; on s= 0-3 s       = 0
    REPEAT  4                           ; on s= 0-3
        movQ    ,Hcol2_leftsA
        movQ    b,Hcol2_leftsB
        andQ    ,Hrow2_rightsA
        andQ    b,Hrow2_rightsB
        orQ
        CASE_IS 34,defer    ;defer       ; can hit on itself 180 or c32
        s       = s + 1
    ENDM                    ; on s= 0-3

;c36sym(n) <= col1_left(n) AND row3_right(n) AND (col1_left_pluses(n) OR v(81*n+34));
```

XLI CORPORATION - CONFIDENTIAL
INF_HORZ.ASM PAGE 6

```
;c37sym(n) <= col2_left(n) AND row3_right(n) AND (col2_left_pluses(n) OR v(81*n+34));
;c38sym(n) <= col3_left(n) AND row3_right(n) AND (col3_left_pluses(n) OR v(81*n+34)) AND
;              NOT c35tan(n);

s       = 0
        REPEAT  4                       ; on s= 0-3
            movQ    ,Hcol1_leftsA
            movQ    b,Hcol1_leftsB
            andQ    ,Hrow3_rightsA
            andQ    b,Hrow3_rightsB
            orQ
            CASE_IS 36,over
            s       = s + 1
        ENDM                            ; on s= 0-3 s       = 0
        REPEAT  4                       ; on s= 0-3
            movQ    ,Hcol2_leftsA
            movQ    b,Hcol2_leftsB
            andQ    ,Hrow3_rightsA
            andQ    b,Hrow3_rightsB
            orQ
            CASE_IS 37,over
            s       = s + 1
        ENDM                            ; on s= 0-3

;c40sym(n) <= col1_left(n) AND row4_right(n) AND (col1_left_pluses(n) OR v(81*n+35));
;c41sym(n) <= col2_left(n) AND row4_right(n) AND (col2_left_pluses(n) OR v(81*n+35));
;c42sym(n) <= col3_left(n) AND row4_right(n) AND (col3_left_pluses(n) OR v(81*n+35));
;c43sym(n) <= col4_left(n) AND row4_right(n) AND
;              NOT c39tan(n);

; is no case 44.
;c45sym(n) <= col1_left(n) AND row5_right(n) AND col1_left_pluses(n);
;c46sym(n) <= col2_left(n) AND row5_right(n) AND col2_left_pluses(n);
;c47sym(n) <= col3_left(n) AND row5_right(n) AND col3_left_pluses(n);
;c48sym(n) <= col4_left(n) AND row5_right(n);

s       = 0
        REPEAT  4                       ; on s= 0-3
            movQ    ,Hcol1_leftsA
            movQ    b,Hcol1_leftsB
            andQ    ,Hrow4_rightsA
            andQ    b,Hrow4_rightsB
            orQ
            CASE_IS 40,over
            s       = s + 1
        ENDM                            ; on s= 0-3 s       = 0
        REPEAT  4                       ; on s= 0-3
            movQ    ,Hcol3_leftsA
            movQ    b,Hcol3_leftsB
            andQ    ,Hrow3_rightsA
            andQ    b,Hrow3_rightsB
            orQ
            CASE_IS 38,defer    ;defer  ; can hit on itself 180 or c35
            s       = s + 1
        ENDM                            ; on s= 0-3 s       = 0
        REPEAT  4                       ; on s= 0-3
            movQ    ,Hcol2_leftsA
            movQ    b,Hcol2_leftsB
            andQ    ,Hrow4_rightsA
            andQ    b,Hrow4_rightsB
            orQ
            CASE_IS 41,over
            s       = s + 1
        ENDM                            ; on s= 0-3 s       = 0
        REPEAT  4                       ; on s= 0-3
            movQ    ,Hcol1_leftsA
            movQ    b,Hcol1_leftsB
            andQ    ,Hrow5_rightsA
            andQ    b,Hrow5_rightsB
            orQ
            CASE_IS 45,over
            s       = s + 1
        ENDM                            ; on s= 0-3 s       = 0
        REPEAT  4                       ; on s= 0-3
            movQ    ,Hcol3_leftsA
            movQ    b,Hcol3_leftsB
            andQ    ,Hrow4_rightsA
```

XLI CORPORATION - CONFIDENTIAL
INF_HORZ.ASM                                                                PAGE 7

```
        andQ    b,Hrow4_rightsB
          orQ
        CASE_IS 42,over
        s       = s + 1
        ENDM                    ; on s= 0-3 s       = 0
        REPEAT  4                               ; on s= 0-3
          movQ    ,Hcol2_leftsA
          movQ   b,Hcol2_leftsB
          andQ    ,Hrow5_rightsA
          andQ   b,Hrow5_rightsB
          orQ
        CASE_IS 46,over
        s       = s + 1
        ENDM                    ; on s= 0-3 s       = 0
        REPEAT  4                               ; on s= 0-3
          movQ    ,Hcol4_leftsA
          movQ   b,Hcol4_leftsB
          andQ    ,Hrow4_rightsA
          andQ   b,Hrow4_rightsB
          orQ
        CASE_IS 43,defer        ; defer   ; can hit on itself 180 or c39
        s       = s + 1
        ENDM                    ; on s= 0-3 s       = 0
        REPEAT  4                               ; on s= 0-3
          movQ    ,Hcol3_leftsA
          movQ   b,Hcol3_leftsB
          andQ    ,Hrow5_rightsA
          andQ   b,Hrow5_rightsB
          orQ
        CASE_IS 47,over
        s       = s + 1
        ENDM                    ; on s= 0-3 s       = 0
        REPEAT  4                               ; on s= 0-3
          movQ    ,Hcol4_leftsA
          movQ   b,Hcol4_leftsB
          andQ    ,Hrow5_rightsA
          andQ   b,Hrow5_rightsB
          orQ
        CASE_IS 48,over s       = s + 1         ; index on s
        ENDM                    ; on S = 0-3

; ******* END   OF MATERIAL COPIED FROM NEARHORZ.VHD  10/29/95 ******************
        RET                     ;end of do_nearhorz %OUT
%OUT    End of INF_HORZ.asm (NEARHORZ)

_ADAM ENDS
   END
```

XLI CORPORATION - CONFIDENTIAL
INF_MAC.INC                                                                    PAGE 1

```
; code-generating MACROS.  Data-name generating macros are in INF_DATA.inc
; 3/27/96 ALC
; 5/10/96 ALC -- more mods to super-join INNER_STOQ    MACRO    reg,name,ss IFDIFi   <®>,<b>
          IFe track eq 2
            mov     &name&_s&ss,EAX
          endIF
          IFe track eq 1
            mov     E&name&_s&ss,EDX
          endIF ELSE
          IFe track eq 2
            mov     &name&_s&ss,EBX
          endIF
          IFe track eq 1
            mov     E&name&_s&ss,ECX
          endIF
        ENDIF
        ENDM STOQ          MACRO    reg,name
        inner_stoq     reg,name,%s
              ENDM                  ; end of stoQ MACRO OPQ_INNER     MACRO register,hv,adjusted_edge,sym,op IFIDNI   <&register>,<b>         ; special MACRO test: IF Identical
          IFe track eq 2
            op    EBX, &hv&&adjusted_edge&_s&sym
          endIF
          IFe track eq 1
            op    ECX,E&hv&&adjusted_edge&_s&sym
          endIF ELSE
          IFe track eq 2
            op    EAX, &hv&&adjusted_edge&_s&sym
          endIF
          IFe track eq 1
            op    EDX,E&hv&&adjusted_edge&_s&sym
          endIF

ENDIF
              ENDM

OPQ     MACRO reg,hv,edge,op         ; hv is case sensitive.

IFB      <&hv>                    ;check for register to register.
          IFDIFi   <®>,<b>               ; special MACRO test: IF different IFe track eq 2
              op      EAX,EBX
            endIF
            IFe track eq 1
              op      EDX,ECX
            endIF

ELSE

IFe track eq 2
              op      EBX,EAX
            endIF
            IFe track eq 1
              op      ECX,EDX
            endIF
          ENDIF
        ELSE
          IFB      <&edge>                ; check for missing variable OPQ_INNER reg,hv,,%s,op       ; pass it on as missing

ELSE adjusted_edge = edge-10*rc          ;for h,b,f,not_h,not_b,not_f

IFIDNi   <&hv>,<NOT_v>
                     adjusted_edge = edge-9*rc
              ENDIF IFIDNi   <&hv>,<v>
```

XLI CORPORATION - CONFIDENTIAL
INF_MAC.INC  PAGE 2

```
                    adjusted_edge = edge-9*rc
            ENDIF

OPQ_INNER reg,hv,%adjusted_edge,%s,op
    ENDIF

ENDIF
            ENDM                    ; End of MACRO OPQ

; INSTRUCTIONS FOR USING MOVq, andQ, ORQ, xorQ,  ;
;If reg is "b" the alternate set of registers (EBX, ECX) are used, otherwise
; (including no item for reg) the main set of registers (EAX,EDX) are used.
;
; hv is the edge type: v, h, b, f, NOT_h, NOT_v, not_b, not_f.
; This is not CASE SENSITIVE for these 4..

; edge is the edge number. Example:
; ANDq  ,NOT_v,23      generates:     (assuming s=2)

; AND   EAX, NOT_v23_s2
; AND   EDX,eNOT_v23_s2

; ORq   ,some_name%rc+2!more_name    generates: (IF used within REPEAT )
;                                     NOTE asterisk requirement (nested MACRO)

; OR    EAX,some_name_7more_name_s2

; These MACROS pickup unspecified variables s (symmetry: 0-3) and rc (row/column: 0 - n)
; s  specifies the number ending "_v23_s0", zero in this example.
; rc specifies how many times 10 (for horizontal edges) or 9 (for vertical edges)
; is to be subtracted from the edge number.

MOVQ    MACRO reg,hv,edge
            OPQ  reg,hv,edge,mov
        ENDM

ANDQ    MACRO reg,hv,edge
            OPQ  reg,hv,edge,and
        ENDM

ORQ     MACRO reg,hv,edge
            OPQ  reg,hv,edge,or
        ENDM

XORQ    MACRO reg,hv,edge
            OPQ  reg,hv,edge,xor
        ENDM

NOTQ    MACRO reg
            IFIDNi   <®>,<b>
                IFe track eq 2
                    not    EBX
                endIF
                IFe track eq 1
                    not    ECX
                endIF
            ELSE
                IFe track eq 2
                    not    EAX
                endIF
                IFe track eq 1
                    not    EDX
                endIF
            ENDIF
        ENDM

; **** SUPER_JOIN ****

;   The function of the super_join macro is to make foreground/background decisions.
;   It examines two diagonally adjacent input pixels and determines if they
;   should be considered to "join" as opposed to the other set of two adjacent
;   input pixels at the same node, or neither.

;   AB              "back-slash" means A,D join.
;   CD              "forward-slash" means C,B join.

; SUPER_JOIN.     Format:
;
; SUPER_JOIN      33
;
; Generates the BACK-SLASH join in <a> registers, the FORWARD-SLASH in <b>.
; The node number, here 33, is the same number as for the h-edge between A and C

; ***** SPECIAL NOTE FOR VHDL CONVERSION: ************************************

;   In this software, the SUPER-JOIN macro generates an inordinate amount of the
```

XLI CORPORATION - CONFIDENTIAL
INF_MAC.INC                                                                                                              PAGE 3

```
; total code and takes up an inordinate amount of the execution time. The hard-
; ware version should be organized differently: instead of forming the super-join
; function from the formulas below for every node in the window, or almost every
; node (some aren't used), the super-join, back- and forwd-, is formed only for the right-most
; column of [8] nodes in the window. Four of the 8 nodes get full super-join,
; two get the reduced version, and the top and bottom nodes get only the b or
; f bit (one XOR gate each). This requires a preview (negative latency) of two
; clocks in the incoming data. Because color data involves so many bits, it
; should be pre-processed into elemental edges, h-, v-, b-, and f-, before
; going through shift registers to create latency and access to the rest of the
; window. The column of 8 super-join calculations is then itself delayed in
; 6 shift-register pairs (6, not 8, because the simple b,f are already input to
; shift registers of their
; own; pairs because one bit for back and one for forwd) for the width of the window
;   - approx. 9 stages each. The taps on this bank of shift-registers, appropriately
; selected, then serve as all the super-joins needed to all symmetries.        This is
; a BIG gate savings over directly emmulating the software.
;     Also, numerous places in the software have a note like "should use a
; fully super-join here" where a simple b or f has been used.
;     Resulting behavior will not be exactly same as this software, should be
; slightly better.

; ***********************************************************************

;  macros for internal use of SUPER_JOIN:
; Need to add tracking to these for speed.

STOback   MACRO     type       ; stores from <b>  Type=0-15

IF (hs XOR vs) eq 0
                         mov         back_connect_&type,EBX
                         mov         Eback_connect_&type,ECX
                    ELSE
                         mov         forwd_connect_&type,EBX
                         mov         Eforwd_connect_&type,ECX
                    ENDIF ENDM                            ; end of STOback STOforwd MACRO      type IF (hs XOR vs) eq 0
                         mov         forwd_connect_&type,EBX
                         mov         Eforwd_connect_&type,ECX
                    ELSE
                         mov         back_connect_&type,EBX
                         mov         Eback_connect_&type,ECX
                    ENDIF ENDM                            ; end of STOforwd ANDJ      MACRO     reference
          andQ          , back_&reference
          andQ          b,forwd_&reference
          ENDM                            ; end of ANDJ XORJ      MACRO     reference
          xorQ          , back_&reference
          xorQ          b,forwd_&reference
          ENDM                            ; end of XORJ STOJ      MACRO     reference
          stoQ          , back_&reference
          stoQ          b,forwd_&reference
          ENDM                            ; end of STOJ MOVJ      MACRO     reference
          mov       EAX, back_&reference[EBP*8-8]
          mov       EDX, Eback_&reference[EBP*8-8]
          mov       EBX, forwd_&reference[EBP*8-8]
          mov       ECX,Eforwd_&reference[EBP*8-8]
          ENDM                            ; end of MOVJ SUPER_JOIN     MACRO          node
LOCAL     super_join_loop ; Format:
;
;         SUPER_JOIN 34-rr ; 34-rr is the NODE number. It is the node ENDING the horizontal (h-) edge of the same number, eg. h34
; in this example.

; BACK is the diagonal direction through that node:  \ = back,  / = forwd
```

XLI CORPORATION - CONFIDENTIAL
INF_MAC.INC                                                                                          PAGE 4

---

```
; The BACK connect ends up in <a> and the FORWD in <b> on exit. Both cannot
; be 1 for the same node.

vt      = ((node)/10)*9 + (node) MOD 10

; This vt equation addresses the vertical edge ABOVE the node. (node) is in
; parens so that incoming expressions will be evaluated correctly.

join_mode = 3              ; full super_join

IF ((node-rc*10) le 19) OR ((node-rc*10) ge 60)

join_mode = 2              ; old JOIN
                    ENDIF

IF ((node) mod 10 le 1) OR ((node) mod 10 ge 8)

join_mode = 2              ; old JOIN
                    ENDIF

IF ((node-rc*10) le 9) OR ((node-rc*10) ge 70)

join_mode = 1              ; simple join
                    ENDIF

IF ((node) mod 10 le 0) OR ((node) mod 10 ge 9)

join_mode = 1              ; simple join
                    ENDIF

; changed 3/29/96 for join_mode 3 to first require join_mode 2 undecided.

IFE JOIN_MODE eq 1                             ; old JOIN

; NOW, the first-order MACRO to resolve four-corners' priority:
;           JOIN_mode = 2 or 3
;
; The MACRO then determines, for all 64 (or 32 if tracking) bits whether the two input pixels
; joined by the / or \ through the node should be interpreted as connected. They are connected if:
;
; 1. They have identical color and:

; 2. There are NOT four elemental (h,v) edges meeting at the node in question OR
; 3. There are THREE different colors of pixel meeting at the node in question OR
; 4. The pixels connected by the / or \ represent a finer line than the oppositely connected pixels.

; 5. Join is to return 0 everywhere in a true checkerboard pattern.  3/3/96
; 6. JOIN WILL TRACK rc OFFSETTING.

;            |-h-i-|        h,i m,l = horizontal edges.
;             g | j
;            |--*--|              * = node
;             n | k
;            |-m-l-|                g,j n,k = vertical edges
;
;
;

; 3/20/96: new version of JOIN that is like SUPER_JOIN, uses SUPERJOIN's registers ; 4/10/96 modified to count a "diagonal breakout" as 1 instead of 0

;;   JOIN        MACRO   node,slash vt      = ((node)/10)*9 + (node) MOD 10

; This vt equation addresses the vertical edge ABOVE the node. (node) is in
; parens so that incoming expressions will be evaluated correctly.

; checkerboard fix (4/2/96): is the node surrounded by 8 edges, neither
; forward or back is to join. [Pentium interleaved]

movQ     ,not_v,vt+10    ;k
                                           movQ    b,not_h,node+10   ;m
        orQ      ,not_v,vt-1     ;g
                                           orQ     b,not_h,node-9    ;i
        orQ      ,not_h,node+11  ;l
                                           orQ     b,not_v,vt+8      ;n
        orQ      ,not_h,node-10  ;h
                                           orQ     b,not_v,vt+1      ;j
```

XLI CORPORATION - CONFIDENTIAL
INF_MAC.INC                                                                 PAGE 5

```
                orQ
                stoQ        ,checkerboard_fix       ; 0 = no joins ;back edges                  ;forwd edges
    movQ    ,not_v,vt+10    ;k
                                        movQ    b,not_h,node+10  ;m
    xorQ    ,not_v,vt-1     ;g
                                        xorQ    b,not_h,node-9   ;i
    xorQ    ,not_h,node+11  ;l
                                        xorQ    b,not_v,vt+8     ;n
    xorQ    ,not_h,node-10  ;h
                                        xorQ    b,not_v,vt+1     ;j
                stoJ        connect_sum_bit0        ;hold old result movQ    ,v,vt+10         ;k
                                        movQ    b,h,node+10      ;m
    andQ    ,h,node+11       ;l
                                        andQ    b,v,vt+8         ;n
    andQ    ,not_b,node+11
                                        andQ    b,not_f,node+10 xorJ        connect_sum_bit0
                stoJ        connect_sum_bit0 movQ    ,v,vt-1          ;g
                                        movQ    b,h,node-9       ;i
    andQ    ,h,node-10       ;h
                                        andQ    b,v,vt+1         ;j
    andQ    ,not_b,node-11
                                        andQ    b,not_f,node-9 xorJ        connect_sum_bit0
                stoJ        connect_sum_bit0        ; complete now movQ    ,not_v,vt+10    ;k
                                        movQ    b,not_h,node+10  ;m
    andQ    ,not_v,vt-1     ;g
                                        andQ    b,not_h,node-9   ;i
    andQ    ,not_h,node+11  ;l
                                        andQ    b,not_v,vt+8     ;n
    andQ    ,not_h,node-10  ;h
                                        andQ    b,not_v,vt+1     ;j stoJ        connect_sum_bit2

; Now, that pesky bit1:       (algorithm: 2 or more open edges but not all 4)
    movQ    ,not_h,node-10  ;h
                                        movQ    b,not_h,node+11  ;l
    orQ     ,not_v,vt-1     ;g
                                        orQ     b,not_v,vt+10    ;k
    orQ     ,not_b,node-11
                                        orQ     b,not_b,node+11
            andQ
                                        orQ     b,not_v,vt-1     ;g
                                        andQ    b,not_h,node-10  ;h
            orQ
                                        movQ    b,not_h,node+11  ;l
                                        andQ    b,not_v,vt+10    ;k
            orQ
                                        movQ    b,back_connect_sum_bit2  ;sum = 4
                                        notQ    b
            andQ
            stoQ        ,back_connect_sum_bit1
; ************************************************************
    movQ    ,not_v,vt+1     ;j
                                        movQ    b,not_v,vt+8     ;n
    orQ     ,not_h,node-9   ;i
                                        orQ     b,not_h,node+10  ;m
    orQ     ,not_f,node-9
                                        orQ     b,not_f,node+9
            andQ
                                        orQ     b,not_h,node-9   ;i
                                        andQ    b,not_v,vt+1     ;j
            orQ
                                        movQ    b,not_v,vt+8     ;n
                                        andQ    b,not_h,node+10  ;m
            orQ
                                        movQ    b,forwd_connect_sum_bit2  ;sum = 4
                                        notQ    b
```

XLI CORPORATION - CONFIDENTIAL
INF_MAC.INC                                                                                                    PAGE 6

---

```
                    andQ
                    stoQ         ,forwd_connect_sum_bit1
; totals now formed, _connect_sum_bit3, bit4 unused.

; proceeding to make the comparison right-to-left for BACK:

movQ         , back_connect_sum_bit0
                    notQ
                    andQ         ,forwd_connect_sum_bit0 movQ         b, back_connect_sum_bit1
                    notQ         b
                    orQ          b,forwd_connect_sum_bit1
                    andQ movQ         b, back_connect_sum_bit1
                    notQ         b
                    andQ         b,forwd_connect_sum_bit1
                    orQ movQ         b, back_connect_sum_bit2
                    notQ         b
                    orQ          b,forwd_connect_sum_bit2
                    andQ movQ         b, back_connect_sum_bit2
                    notQ         b
                    andQ         b,forwd_connect_sum_bit2
                    orQ andQ         ,checkerboard_fix
                    orQ          ,f    ,node
                    andQ         ,not_b,node stoQ         ,join_temp ; proceeding right-to-left for FORWD:

movQ         ,forwd_connect_sum_bit0
                    notQ
                    andQ         , back_connect_sum_bit0 movQ         b,forwd_connect_sum_bit1
                    notQ         b
                    orQ          b, back_connect_sum_bit1
                    andQ movQ         b,forwd_connect_sum_bit1
                    notQ         b
                    andQ         b, back_connect_sum_bit1
                    orQ movQ         b,forwd_connect_sum_bit2
                    notQ         b
                    orQ          b, back_connect_sum_bit2
                    andQ movQ         b,forwd_connect_sum_bit2
                    notQ         b
                    andQ         b, back_connect_sum_bit2
                    orQ          b andQ         b,checkerboard_fix
                    orQ          b,b   ,node
                    andQ         b,not_f,node          ;FORWD complete in <b> movQ         ,join_temp            ;bring BACK back to <a>
                                 ;end of old JOIN macro
ENDIF                            ; join_mode NOT eq 1, the old JOIN IF JOIN_MODE eq 3                ; full super_join stoQ         ,join2_back           ;hold join_mode 2 results
                    stoQ         b,join2_forwd         ;hold join_mode 2 results ;               m n n m
;             m         m
;
;           n             n
;                   *              * = node being examined
```

XLI CORPORATION - CONFIDENTIAL
INF_MAC.INC                                                                 PAGE 7
---

```
;             n              n
;
;        m              m
;             m n n m
;

hs = 0              ;horizontal symmetry  0,1
              vs = 0              ; vertical symmetry   0,1
        REPEAT 4                  ; on hs,vs
              IF (hs XOR vs) eq 0
                 Jnot_f    EQU <not_f>
                 Jnot_b    EQU <not_b>
              ELSE
                 Jnot_f    EQU <not_b>              ; mirror image
                 Jnot_b    EQU <not_f>              ; mirror image
              ENDIF ; Note: the meanings of STOback and STOforwd may get reversed by 's', which
;is not used in STOback and STOforwd.

; Horizontal sides, m, connecting back:

movQ     b,not_h,node-20+40*vs+hs
              andQ     b,not_h,node-10+20*vs+hs movQ     ,%Jnot_f,node-21+40*vs+2*hs
              andQ     ,%Jnot_b,node-11+20*vs+2*hs
              orQ      b movQ     ,%Jnot_b,node-20+40*vs
              andQ     ,%Jnot_f,node-10+20*vs
              orQ      b
              STOback  %0+2*vs+hs           ;stores from <b> into app. symmetry ; Note: The % forces expression to be evaluated before sent to MACRO ; Horizontal sides, m, connecting forwd:

movQ     ,%Jnot_f,node-21+40*vs+2*hs
              andQ     ,%Jnot_b,node-1        +2*hs
              andQ     ,  not_h,node-11+20*vs+3*hs movQ     b,%Jnot_b,node-20+40*vs
              andQ     b,  not_h,node-9 +20*vs-hs
              orQ      b movQ     ,%Jnot_b,node-10+20*vs
              andQ     ,%Jnot_f,node-10+20*vs
              orQ      b
              STOforwd %0+2*vs+hs ; Horizontal sides, n, connecting back:

movQ     b,  not_h,node-21+40*vs+3*hs
              andQ     b,%Jnot_b,node-11+20*vs+2*hs movQ     ,%Jnot_b,node-21+40*vs+2*hs
              andQ     ,  not_h,node-10+20*vs  +hs orQ      b
              STOback  %4+2*vs+hs           ;stores from <b> into app. symmetry ; Horizontal sides, n, connecting forwd:

movQ     b,%Jnot_b,node-21+40*vs+2*hs
              andQ     b,%Jnot_b,node-10+20*vs movQ     ,  not_h,node-21+40*vs+3*hs
              andQ     ,  not_h,node-11+20*vs+3*hs
              andQ     ,%Jnot_b,node-1        +2*hs orQ      b
              STOforwd %4+2*vs+hs ; end of horizontal edges, start of vertical ; vertical sides, m, connecting back:

movQ     b,not_v,vt-2 +4*hs+9*vs
              andQ     b,not_v,vt-1 +2*hs+9*vs movQ     ,%Jnot_f,node-12+4*hs+20*vs
              andQ     ,%Jnot_b,node-11+2*hs+20*vs
              orQ      b
```

XLI CORPORATION - CONFIDENTIAL
INF_MAC.INC                                                                                    PAGE 8
------------------------------------------------------------------------------------------------

```
                            movQ      ,%Jnot_b,node- 2+4*hs
                            andQ      ,%Jnot_f,node- 1+2*hs
                            orQ       b
                            STOback   %8+0+2*vs+hs ; vertical sides, m, connecting forwd:

movQ      ,%Jnot_f,node-12+ 4*hs+20*vs
                            andQ      ,%Jnot_b,node-10     +20*vs
                            andQ      , not_v,vt  -10+ 2*hs+27*vs movQ      b,%Jnot_b,node- 2+ 4*hs
                            andQ      b, not_v,vt + 8+ 2*hs- 9*vs
                            orQ       b movQ      ,%Jnot_b,node- 1+ 2*hs
                            andQ      ,%Jnot_f,node- 1+ 2*hs
                            orQ       b
                            STOforwd  %8+0+2*vs+hs ; vertical sides, n, connecting back:

movQ      b,  not_v,  vt-11+ 4*hs+27*vs
                            andQ      b,%Jnot_b,node-11+ 2*hs+20*vs movQ      ,%Jnot_b,node-12+ 4*hs+20*vs
                            andQ      , not_v,  vt- 1+ 2*hs+ 9*vs orQ       b
                            STOback   %8+4+2*vs+hs ; vertical sides, n, connecting forwd:

movQ      b,%Jnot_b,node-12+ 4*hs+20*vs
                            andQ      b,%Jnot_b,node- 1+ 2*hs movQ      , not_v,vt -11+ 4*hs+27*vs
                            andQ      , not_v,vt -10+ 2*hs+27*vs
                            andQ      ,%Jnot_b,node-10    +20*vs orQ       b
                            STOforwd  %8+4+2*vs+hs ;symmetry indexing (not to be confused with s indexing, also active):

hs = 1 - hs          ; complement
                    IF hs eq 0
                            vs = 1               ; carry into vs
                    ENDIF ENDM                 ; REPEAT 4 loop on hs,vs = all four symmetries ; 16 STOback's and 16 STOforwd's complete.
; Now, they have to be summed.  Sum is 0-16, so requires 5 bits for each
;of the 64 bits.

; first to clear the 128  0 to 16 "counters":

xor       EAX,EAX
                            xor       EBX,EBX
                            xor       ECX,ECX
                            xor       EDX,EDX
                            stoJ      connect_sum_bit0
                            stoJ      connect_sum_bit1
                            stoJ      connect_sum_bit2
                            stoJ      connect_sum_bit3     ;bit4 doesn't need to be cleared mov EBP,16
super_join_loop:

; each of the following xxxJ Macros operates on 128 bits: [EAX,EBX,ECX,EDX]

;bit 4
                            movJ      connect_0            ; indexed
                            andJ      connect_sum_bit0
                            andJ      connect_sum_bit1
                            andJ      connect_sum_bit2
                            andJ      connect_sum_bit3
                            stoJ      connect_sum_bit4

;bit 3
                            movJ      connect_0            ; indexed
                            andJ      connect_sum_bit0
```

XLI CORPORATION - CONFIDENTIAL
INF_MAC.INC                                                                                     PAGE 9

```
                andJ        connect_sum_bit1
                andJ        connect_sum_bit2
                xorJ        connect_sum_bit3
                stoJ        connect_sum_bit3

;bit 2
                movJ        connect_0                   ; indexed
                andJ        connect_sum_bit0
                andJ        connect_sum_bit1
                xorJ        connect_sum_bit2
                stoJ        connect_sum_bit2

;bit 1
                movJ        connect_0                   ; indexed
                andJ        connect_sum_bit0
                xorJ        connect_sum_bit1
                stoJ        connect_sum_bit1

;bit 0
                movJ        connect_0                   ; indexed
                xorJ        connect_sum_bit0
                stoJ        connect_sum_bit0 dec         EBP
                jnz         super_join_loop

;Now the 5 bit counts are formed for BACK and FORWD. We get
; the final results using the rule that there is a join if for that
; direction (possibly neither) that has the greatest number of periphery joins
; but less than 9.  Equal periphery joins causes neither to hit.

; Old Formula:
; BACK = (not_b){f+  F4 +F3B3!+(B3!B4!) [B2F2!+(B2+F2!)(B1F1!+(B1+F1!)(B0F0!)}]}

; New formula: 1 if F < B
; FORWD= (not_f)(b+B4F4!+(B4+F4!)[B3F3!+(B3+F3!)[B2F2!+(B2+F2!){B1F1!+(B1+F1!)B0F0!}]]}

; BACK = reverse b,f

; proceeding right-to-left for FORWD:

movQ        ,forwd_connect_sum_bit0
                notQ
                andQ        , back_connect_sum_bit0 movQ        b,forwd_connect_sum_bit1
                notQ        b
                orQ         b, back_connect_sum_bit1
                andQ movQ        b,forwd_connect_sum_bit1
                notQ        b
                andQ        b, back_connect_sum_bit1
                orQ movQ        b,forwd_connect_sum_bit2
                notQ        b
                orQ         b, back_connect_sum_bit2
                andQ movQ        b,forwd_connect_sum_bit2
                notQ        b
                andQ        b, back_connect_sum_bit2
                orQ movQ        b,forwd_connect_sum_bit3
                notQ        b
                orQ         b, back_connect_sum_bit3
                andQ movQ        b,forwd_connect_sum_bit3
                notQ        b
                andQ        b, back_connect_sum_bit3
                orQ movQ        b,forwd_connect_sum_bit4
                notQ        b
                orQ         b, back_connect_sum_bit4
                andQ movQ        b,forwd_connect_sum_bit4
                notQ        b
                andQ        b, back_connect_sum_bit4
                orQ andQ        ,checkerboard_fix
```

XLI CORPORATION - CONFIDENTIAL
INF_MAC.INC  PAGE 10

```
                orQ        ,b       ,node
                andQ       ,not_f,node ; 3/29/96: Now require join_2 to be undecided before using join 3:

orQ        ,join2_forwd
                movQ       b,join2_back
                notQ       b
                andQ stoQ       ,join_temp ; proceeding right-to-left for BACK:

movQ       b, back_connect_sum_bit0
                notQ       b
                andQ       b,forwd_connect_sum_bit0 movQ       , back_connect_sum_bit1
                notQ
                orQ        ,forwd_connect_sum_bit1
                andQ       b movQ       , back_connect_sum_bit1
                notQ
                andQ       ,forwd_connect_sum_bit1
                orQ        b movQ       , back_connect_sum_bit2
                notQ
                orQ        ,forwd_connect_sum_bit2
                andQ       b movQ       , back_connect_sum_bit2
                notQ
                andQ       ,forwd_connect_sum_bit2
                orQ        b movQ       , back_connect_sum_bit3
                notQ
                orQ        ,forwd_connect_sum_bit3
                andQ       b movQ       , back_connect_sum_bit3
                notQ
                andQ       ,forwd_connect_sum_bit3
                orQ        b movQ       , back_connect_sum_bit4
                notQ
                orQ        ,forwd_connect_sum_bit4
                andQ       b movQ       , back_connect_sum_bit4
                notQ
                andQ       ,forwd_connect_sum_bit4
                orQ andQ       ,checkerboard_fix
                orQ        ,f       ,node
                andQ       ,not_b,node        ;BACK (level 3) complete in <a>

; 3/29/96: Now require join_2 to be undecided before using join 3:

orQ        ,join2_back
                movQ       b,join2_forwd
                notQ       b
                andQ                           ;final BACK complete in <a> movQ       b,join_temp         ;bring FORWD to <b>
ENDIF                                          ; JOIN_MODE eq 3, full super_join IF JOIN_MODE eq 1       ; vestigal JOIN, used at edges of window movQ       ,not_b,node
                movQ       b,not_f,node
                andQ       ,f,node    ; may want to drop the ANDSs later
                andQ       b,b,node   ; 3/21/96
ENDIF                                  ; join_mode eq 1, the vestigial join ENDM                           ;end of SUPER_JOIN macro.
```

XLI CORPORATION - CONFIDENTIAL
INF_MAC.INC                                                                              PAGE 11

```
; *** *** *** *** *** *** *** *** *** *** *** *** *** *** *** ***

; NOW, the MACRO to record case hits, if any:   CASE_IS

; LR = direction of shift if a shifted case version is to be generated.

; Assumes a symmetry (0-3) in s and the Qword of hits just formed in EAX,EDX.
; ASSUMES THE EDX FORMATION HAS JUST OCCURED AND ZERO-FLAG REFLECTS IT.
; (EAX for TRACK 1)
; Example:   case_is     97

; If the "prior" variable is DEFER,    will not overwrite previous hit if any.
; If the "prior" variable is OVER,     will    replace    previous hit if any.
; If the "prior" variable is omitted, will     OR over    previous hit if any.

; Likewise for "priorS" which refers to shifted case,if any.
; HOWEVER, "priorS" is ignored for write-forward symmetries. i.e. it is
; assumed no two shifted-cases can conflict with EACH OTHER in the same L/R sym.

; ** XOR Note ***   [four places below] Change the XOR 0 to XOR 1 to L/R reverse
; the symmetry reported to Dan for shifted cases, presumably also L/R ing the
; vector.H entry for all such shifted cases.

; NOTE: there cannot even be a comment before the "LOCAL" entries !!

CASE_IS         MACRO    case_num,prior,LR,shifted_case_num,priorS
 LOCAL  eax_zero, edx_zero
 LOCAL  eax_loop, edx_loop
 LOCAL  bypass_shifted1, bypass_shifted3
 LOCAL  normal1, normal3

; CASE_IS entered with 64 candidate hits in EAX,EDX
; Note: CASE_IS looses EBX,EAX,EDX,EBP.   ECX ok.

;    q       = 3 - s                          ; 180 to be compatible with TEST.EXE
                      q = s                                       ; Dan's new display = correct
                                                        ; finally straightened out 2/20/96
               t      = q mod 2 + 4*(q - q mod 2)      ;split the bits for output word placement IFIDNi   <&LR>,<L>               ; setting up direction of shift
                      left    = 0             ; note: direction of data placement is
             ELSE                              ; opposite direction of diagram shift
                      left    = 1
             ENDIF
             left     = left XOR s mod 2      ; go back one: left = 1. Forward: left = 0

IFE      TRACK EQ 1                       ;EAX ONLY path jz       short edx_zero  ;assumed final operation on EDX IFIDNi <&prior>,<defer>          ; check for mutual-exclusivity checking mov      EBX,Ehits_log
                     not      EBX             ; change hits to zero
                     and      EDX,EBX         ;kill incoming hits already hit
                     jz       short edx_zero  ; any left?
                     not      EBX             ;restore
                     or       EBX,EDX         ; saving a two-way mem. access
                     mov      Ehits_log,EBX ELSE                              ; i.e. non-defer operation
                     or       Ehits_log,EDX   ;record in current log
             ENDIF BSF     EBX,EDX                  ;find a one-bit EDX_loop:
             BTR     EDX,EBX                  ;clear the bit IFNB    <&LR>
               mov       EBP,EBX              ; hold for shifted-cases use.
             ENDIF neg     EBX IFIDNi  <&prior>,<over> ;overwrite non-shifted?
                     AND     word ptr [EBX*2+EDI+64],NOT 9FFh   ;erase what's there
                     ENDIF OR      word ptr [EBX*2+EDI+64],case_num+t*256  ; to output buffer.
; The foregoing instruction (and others with the +64) can write 128 bytes beyond out.buffer
```

XLI CORPORATION - CONFIDENTIAL
INF_MAC.INC                                                                                                          PAGE 12

```
        IFNB    <&LR>                       ; bypass if no shifted case
        IF      left EQ 0                   ; left vs right shift?

bt      Ev41_s0,EBP         ;exclude center bar, shifted
                jc      SHORT bypass_shifted1

IFIDNi  <&priorS>,<defer>
                        cmp     BYTE ptr [EBX*2+EDI+64+2],0
                        jne     SHORT bypass_shifted1   ;non-zero prior case hit
                ENDIF
                IFIDNi  <&priorS>,<over>
                        and     word ptr [EBX*2+EDI+64+2],NOT 9FFh ;kill prior hit
                ENDIF OR      word ptr [EBX*2+EDI+64+2],shifted_case_num+(t XOR 0)*256  ; to output buffer.
                                                                ; * XOR NOTE *

ELSE                                ; i.e. left = 1
                bt      Ev39_s0,EBP         ;exclude center bar, shifted
                jc      SHORT bypass_shifted1

IFIDNi  <&priorS>,<defer>
                        cmp     BYTE ptr [EBX*2+EDI+64-2],0
                        jne     SHORT bypass_shifted1   ;non-zero prior case hit
                ENDIF
                IFIDNi  <&priorS>,<over>
                        and     word ptr [EBX*2+EDI+64-2],NOT 9FFh ;kill prior hit
                ENDIF OR      word ptr [EBX*2+EDI+64-2],shifted_case_num+(t XOR 0)*256  ; to output buffer.
                                                                ; * XOR NOTE *

ENDIF                               ; end of left vs right shifting IF
; now to log the successful shifted hit:
        IF      left EQ 0                   ; new left vs right shift IF dec     EBP                 ; right one
                js      SHORT bypass_shifted1 ; outside current 64 bits
        ELSE
                add     EBP,1 OR NOT 31     ; left one. Force carry if sum >31

IF track EQ 3
                        jnc     SHORT normal1
                        or      hits_log,1          ;into other hits_log
                        jmp     SHORT bypass_shifted1
                  normal1:
                ELSE
                        jc      SHORT bypass_shifted1 ;outside current 32 bits
                ENDIF                       ; track 3 IF AND     EBP,1Fh             ; make the BTS behave.
        ENDIF                               ; end of left vs right shifting IF BTS     Ehits_log,EBP       ; set it hit.

; The preceding !!&! instruction cost me two days debugging. It will write
; to memory PRECEDING Ehits_log without the (new) AND instruction before it.
bypass_shifted1:
        ENDIF                               ;end of no-shifted-case bypass BSF     EBX,EDX                     ;find next one-bit, if any.
        jnz     short edx_loop edx_zero:

ENDIF                   ; on IFE TRACK EQ 1        * HALFWAY THRU CASE_IS *
        IFE     TRACK EQ 2      ; EDX only                 *** HALFWAY THRU CASE_IS ***

; Now to do the same for the low (EAX) 32 bits:

IFIDNi <&prior>,<defer>             ; check for mutual-exclusivity checking mov     EBX,hits_log
                not     EBX                 ; change hits to zero
                and     EAX,EBX             ; kill incoming hits already hit
                jz      short eax_zero      ; any left?
                not     EBX                 ; restore
                or      EBX,EAX             ; saving a two-way mem. access
                mov     hits_log,EBX
                BSF     EBX,EAX             ; find first hit ELSE                                ; i.e. non-defer operation
```

XLI CORPORATION - CONFIDENTIAL
INF_MAC.INC                                                                PAGE 13

```
            BSF     EBX,EAX           ; find first hit
            jz      short eax_zero or      hits_log,EAX      ; record in current log
    ENDIF EAX_loop:
        BTR     EAX,EBX                 ;clear the bit IFNB    <&LR>
            mov     EBP,EBX             ; hold for exclusion of v40 in shifted.
        ENDIF neg     EBX IFIDNi  <&prior>,<over> ;overwrite non-shifted?
                    AND     word ptr [EBX*2+EDI],NOT 9FFh    ;erase what's there
                ENDIF OR      word ptr [EBX*2+EDI],case_num+t*256       ; to output buffer.

IFNB    <&LR>                   ; bypass if no shifted version
        IF      left EQ 0               ; left vs right shift?

BT      v41_s0,EBP      ;exclude center bar, shifted
                jc      SHORT bypass_shifted3

IFIDNi  <&priorS>,<defer>
                        cmp     BYTE ptr [EBX*2+EDI+2],0
                        jne     SHORT bypass_shifted3               ;non-zero prior case hit
                    ENDIF
                    IFIDNi  <&priorS>,<over>
                        and     word ptr [EBX*2+EDI+2],NOT 9FFh     ;kill prior hit
                    ENDIF OR      word ptr [EBX*2+EDI+2],shifted_case_num+(t XOR 0)*256  ; to output buffer.
                                                                    ; * XOR NOTE *

ELSE
                bt      v39_s0,EBP                          ;exclude center bar, shifted
                jc      SHORT bypass_shifted3

IFIDNi  <&priorS>,<defer>
                        cmp     BYTE ptr [EBX*2+EDI-2],0
                        jne     SHORT bypass_shifted3               ;non-zero prior case hit
                    ENDIF
                    IFIDNi  <&priorS>,<over>
                        and     word ptr [EBX*2+EDI-2],NOT 9FFh     ;kill prior hit
                    ENDIF OR      word ptr [EBX*2+EDI-2],shifted_case_num+(t XOR 0)*256  ; to output buffer.
                                                                    ; * XOR NOTE *
        ENDIF                           ; end of left vs right shifting IF
; now to log the successful shifted hit:
        IF      left EQ 0               ; new left vs right shift IF dec     EBP             ; right one IF track EQ 3
                        jns     SHORT normal3
                        or      Ehits_log,80000000h     ;into other hits_log
                        jmp     SHORT bypass_shifted3
                    normal3:
                    ELSE
                        js      SHORT bypass_shifted3   ;outside current 32 bits
                    ENDIF                               ; track 3 IF ELSE
                add     EBP,1 OR NOT 31         ; left one. Force carry if sum >31
                jc      SHORT bypass_shifted3   ; outside current 64 bits
                and     EBP,1Fh                 ; make the BTS behave.

ENDIF                           ; end of left vs right shifting IF
                BTS     hits_log,EBP    ; set it hit.
bypass_shifted3:

ENDIF                           ; end of no-shifted bypass

BSF     EBX,EAX                 ;find next one-bit, if any
        jnz     SHORT EAX_loop
```

XLI CORPORATION - CONFIDENTIAL
INF_MAC.INC PAGE 14

```
eax_zero:
   ENDIF                        ; on IFE TRACK EQ 2
              ENDM              ; end of CASE_IS macro
;-- TAG --
```

XLI CORPORATION - CONFIDENTIAL
INF_MAIN.ASM                                                                                    PAGE 1

```
            page    ,132
;
;       PENT61          to be assembled with MASM 6.1
;       PENT61i         fast casemap setup.        12/2/95
;       PENT61j         Instruction interleaving.  12/6/95
;
;       INF_COL         extensive modifications for color sources 1/18/96
;       INF_MAIN        split into several obj files because of assembler overload. 3/26/96
;
;
; Conversion of Inferential algorithm II VDHL into
;   Pentium-optimized code for FAX
;
; Assembly switches:

EIGHT_BIT_PIXELS  = 1         ; 0 = 1 bit (old), 1 = color pixels in

;;      THIRTY_TWO_BIT    = 1    ; 1 = causes all segments to be 32, not 16-bit

OMIT_NOHIT_CHECKS = 0         ; =1 for debug only (runs slower)

; Case classes checked for:

NEARVERT        = 1     ; 0 = bypass, don't call
        NEARHORZ        = 1
        SPLITCELL       = 1     ; requires NEARHORZ
        NEAR_45A        = 1     ; requires NEARVERT
        NEAR_45B        = 1
        NEAR_45C        = 1     ; requires NEAR_45B, NEARHORZ, NEARVERT

ITALICS_CORNERS = 0

; Special timing switches (normally all zero):

BYPASS_SETUP            = 0             ;bypasses setup of case map with center left/right
        BYPASS_ALGORITHM        = 0             ; skips all below here.
        DO_ONLY_NOHIT_CHECK     = 0
        DO_ONLY_EDGEMAP         = 0             ; EXITs after edgemap formed, before it is used.

; Note: search for "VHDL" for formulas that differ from and are not equivalent
;to the VHDL. They are updates and should be changed in the VHDL.
;       Search for "TAG" for important demarkations.

.486            ; switched to 486 to allow BWSAP instruction: 12/3/95

_TEXT   SEGMENT DWORD use32 PUBLIC 'CODE'
_TEXT   ENDS
_ADAM   SEGMENT DWORD use32 PUBLIC 'CODE'
_ADAM   ENDS
_DATA   SEGMENT DWORD use32 PUBLIC 'DATA'
_DATA   ENDS
CONST   SEGMENT DWORD use32 PUBLIC 'CONST'
CONST   ENDS
_BSS    SEGMENT DWORD use32 PUBLIC 'BSS'
_BSS    ENDS
DGROUP  GROUP   CONST, _BSS, _DATA
        ASSUME DS: DGROUP, SS: DGROUP

_DATA SEGMENT

INCLUDE INF_DATA.inc            ;EXTERNDEF and EQU's

OUTPUT_BUFFER           DD      ?       ;test only, of course it shouldn't be here.
INPUT_BUFFER            DD      ?       ;test only
line_length             dd      ?       ; is the line_length in bytes
total_input_bytes       dd      ?       ; E.G. 4 million. This number ends the computation EBX_setup_top           DD      ?       ; in edgemap formation
EBX_setup_middle        DD      ?       ; in edgemap formation FLAGS                   DD      ?       ;one-bit switches ; Variable region: the edges:
; NOTE: the edges are identified according to Richard's edge-numbering system.

; Usage of DDQ:     DDq some_name%index+2!more_name,s3

; If the "s3" input is MISSING,
```

XLI CORPORATION - CONFIDENTIAL
INF_MAIN.ASM                                                                                                                        PAGE 2
---

```
; this generates all four symmetries with the number "index+2" as part of the
; name if the HIDDEN VARIABLE e is 0. If e=1 the name is prefixed by E for "extended".
; This & feature must be within an REPEAT, if only REPEAT 1, to work.
; If the "s3" variable is specified (complete with 's'), it is used, and only that
; one symmetry is generated.

; Usage of stoQ:       stoQ  b,some_name%index+2!more_name
; STOQ uses s (symmetry) as a hidden input.

DDQ                     MACRO     name,sx

IFB       <&sx>         ; no sym. specified, generate all

IF    e EQ 0
&name&_s0               dd        ?
&name&_s1               dd        ?
&name&_s2               dd        ?
&name&_s3               dd        ?
           ELSE
E&name&_s0              dd        ?
E&name&_s1              dd        ?
E&name&_s2              dd        ?
E&name&_s3              dd        ?
           ENDIF

ELSE

IF    e EQ 0
&name&_&sx              dd        ?
           ELSE
E&name&_&sx             dd        ?
           ENDIF ENDIF
                        ENDM                    ; end of DDq ; Usage of EQUQ:    EQUq some_name%index+2!more_name,s3,another_name%ind,s1

; this generates all four symmetries with the number "index+2" as part of the
; name if the HIDDEN VARIABLE e is 0. If e=1 the name is prefixed by E for "extended".
; This & feature must be within an REPEAT, if only REPEAT 1, to work.
; If the "s3" variable is specified, it is used, otherwise all four are generated.

; Usage of stoQ:       stoQ  b,some_name%index+2!more_name
; STOQ uses s (symmetry) as a hidden input.

EQUQ                    MACRO     name,sx,name2,sx2

IFB       <&sx>         ; no sym. specified, generate all

IF    e EQ 0
&name&_s0               EQU       <&name2&_s0>
&name&_s1               EQU       <&name2&_s1>
&name&_s2               EQU       <&name2&_s2>
&name&_s3               EQU       <&name2&_s3>
           ELSE
E&name&_s0              EQU       <E&name2&_s0>
E&name&_s1              EQU       <E&name2&_s1>
E&name&_s2              EQU       <E&name2&_s2>
E&name&_s3              EQU       <E&name2&_s3>
           ENDIF

ELSE

IF    e EQ 0
&name&_&sx              EQU       <&name2&_&sx2>
           ELSE
E&name&_&sx             EQU       <E&name2&_&sx2>
           ENDIF ENDIF
                        ENDM                    ; end of EQUq ;-- TAG --
; *** AUTOMATIC VARIABLE GENERATION USING THE ABOVE MACROS: ********** e     = 0              ;for DDq, EQUq generation
                        REPEAT 2

; LIST OF VARIABLES THAT APPEAR IN ONE SYMMETRY,   AND BOTH E'S OF COURSE, AND
; ONLY ONE ROW OR COLUMN.
```

XLI CORPORATION - CONFIDENTIAL
INF_MAIN.ASM
PAGE 3

```
        DDQ      hits,log          ; Log of hits for the current 64 pixel group ; Variables for SUPER_JOIN macro: (created in both e's)

index   = 0
        REPEAT  16
          DDq        back_connect,%index        ; e.g. Eback_connect_13
          DDq        forwd_connect,%index
        index   = index+1
        ENDM equQ     Hrow5_rightsA,s0,       Hcol5_Abar_Xes,s1
        equQ     Hrow5_rightsA,s1,       Hcol5_Abar_Xes,s0
        equQ     Hrow5_rightsA,s2,       Hcol5_Abar_Xes,s3
        equQ     Hrow5_rightsA,s3,       Hcol5_Abar_Xes,s2 equQ     Hrow5_rightsB,s0,       Hcol5_Bbar_Xes,s1
        equQ     Hrow5_rightsB,s1,       Hcol5_Bbar_Xes,s0
        equQ     Hrow5_rightsB,s2,       Hcol5_Bbar_Xes,s3
        equQ     Hrow5_rightsB,s3,       Hcol5_Bbar_Xes,s2 equQ     join_44_forwd,s0,       join_34_forwd,s3    ;*Color*splitcell
        equQ     join_44_forwd,s1,       join_34_forwd,s2
        equQ     join_44_forwd,s2,       join_34_forwd,s1
        equQ     join_44_forwd,s3,       join_34_forwd,s0 equQ     join_44_back,s0,        join_34_back,s3     ;*Color*splitcell
        equQ     join_44_back,s1,        join_34_back,s2
        equQ     join_44_back,s2,        join_34_back,s1
        equQ     join_44_back,s3,        join_34_back,s0 equQ     Bcol10_topsA,s0,        jag4_topleftB,s1
        equQ     Bcol10_topsA,s1,        jag4_topleftB,s0
        equQ     Bcol10_topsA,s2,        jag4_topleftB,s3
        equQ     Bcol10_topsA,s3,        jag4_topleftB,s2 equQ     Bcol10_topsB,s0,        jag4_topleftA,s1
        equQ     Bcol10_topsB,s1,        jag4_topleftA,s0
        equQ     Bcol10_topsB,s2,        jag4_topleftA,s3
        equQ     Bcol10_topsB,s3,        jag4_topleftA,s2

;-- TAG --
; LIST OF VARIABLES THAT APPEAR IN ALL SYMMETRIES, AND BOTH E'S OF COURSE, BUT
; ONLY ONE ROW OR COLUMN.

; for SUPER_JOIN:

index   = 0
        REPEAT  5
          DDq        back_connect_sum_bit%index  ;e.g. Eback_connect_sum_bit3_s2
          DDq        forwd_connect_sum_bit%index
        index   = index+1
        ENDM DDq      checkerboard_fix     ; 4/2/96

DDQ      temporary_hold   ; scratch, all four symmetries
        DDQ      temporary_hold2  ; scratch, all four symmetries
        DDQ      temporary_hold3  ; scratch, all four symmetries
        DDQ      temporary_hold4  ; scratch, all four symmetries
        DDQ      join_temp        ; scratch for JOIN macro, internally
        DDQ      join2_back       ; scratch for JOIN macro, internally
        DDQ      join2_forwd      ; scratch for JOIN macro, internally DDq      not_row1_blue
          DDq        Vnot_col1_blue
          DDq        Hnot_col1_blue DDq      Vcol3_eqA
        DDq      Vcol3_eqB DDq        Vcase06_topA                 ; For the "M" crotch and armpit fixes
        DDq        Vcase06_topB
        DDq        Vcase07_topA
        DDq        Vcase07_topB
        DDq        Vcase10_topA
        DDq        Vcase10_topB DDq        Vcase01_serifs_blues
        DDq      Hcol5_Abar_Xes        ; H indicates NEARHORZ (col5 doesn't exist)
        DDq      Hcol5_Bbar_Xes        ; H indicates NEARHORZ (col5 doesn't exist)

DDq      Scol0_leftsA          ; S indicates SPLITCELL
        DDq      Scol0_leftsB          ; S indicates SPLITCELL
        DDq      Scol1_leftsA          ; S indicates SPLITCELL
        DDq      Scol1_leftsB          ; S indicates SPLITCELL
```

XLI CORPORATION - CONFIDENTIAL
INF_MAIN.ASM                                                                PAGE 4

```
        DDq     ArowR2_rightsA          ; A indicates NEAR_45A ;*Color*
        DDq     ArowR2_rightsB          ; A indicates NEAR_45A
        DDq     ArowR3_rightsA          ; A indicates NEAR_45A
        DDq     ArowR3_rightsB          ; A indicates NEAR_45A DDq     Bcol9_topsA
        DDq     Bcol9_topsB EQUq    Vcol3_topA_vt_vwXes,,      v40     ;*Color* V is NEARVERT
        EQUq    Vcol3_topB_vt_vwXes,,      v40     ;*Color*

; Pre-computed super_joins:

DDq     join_12_back
        DDq     join_12_forwd
        DDq     join_13_back
        DDq     join_13_forwd
        DDq     join_14_back
        DDq     join_14_forwd
        DDq     join_21_back
        DDq     join_21_forwd
        DDq     join_22_back
        DDq     join_22_forwd
        DDq     join_23_back
        DDq     join_23_forwd
        DDq     join_24_back
        DDq     join_24_forwd
        DDq     join_32_back
        DDq     join_32_forwd
        DDq     join_33_back
        DDq     join_33_forwd
        DDq     join_34_back
        DDq     join_34_forwd DDq     case122_topA
        DDq     case122_topB ; LIST OF VARIABLES THAT APPEAR IN ALL SYMMETRIES, AND BOTH E'S OF COURSE, AND
; FOUR ROWS OR COLUMNS.

rc      = 0             ;col loop
                        REPEAT 4                ;col loop    rc = 0-3

DDq     Vcol%rc+4!_topA_vt_vwXes        ;*Color*

DDq     Bcol%rc+1!_topsA        ; tops 1-4
        DDq     Bcol%rc+1!_topsB        ; tops 1-4
        DDq     Bcol%rc+5!_topsA        ; tops 5-8. tops 9,10 just above
        DDq     Bcol%rc+5!_topsB        ; tops 5-8. tops 9,10 just above DDq     Vcol%rc+3!_topsA        ;*Color*
        DDq     Vcol%rc+3!_topsB        ;*Color*

IFE rc eq 3             ; exclude col.6
        DDq     Vnot_col%rc+3!_serif
        ENDIF DDq     Hcol%rc+1!_Abar_Xes
        DDq     Hcol%rc+1!_Bbar_Xes
        DDq     Hcol%rc+1!_leftsA
        DDq     Hcol%rc+1!_leftsB
        DDq     Hrow%rc+1!_rightsA
        DDq     Hrow%rc+1!_rightsB IFE     rc EQ 0                         ;rc = 1,2,3
            IF ITALICS_CORNERS
        DDq     Hcol%rc!_left_italics
            ENDIF
        ENDIF                                   ;rc = 1,2,3

DDq     Scol%rc+2!_leftsA       ;*Color*  for SPLITCELL
        DDq     Scol%rc+2!_leftsB       ;*Color*

DDq     jag%rc+1!_topleftA      ;*Color*   45 A,B,C
        DDq     jag%rc+1!_topleftB      ;*Color*   45 A,B,C
        DDq     Acol%rc+1!_topsA        ; *** later: use EQU for col 4.
        DDq     Acol%rc+1!_topsB ; LIST OF VARIABLES THAT APPEAR IN ONE SYMMETRY*, AND BOTH E'S OF COURSE, AND
; FOUR ROWS OR COLUMNS:                   [*ONE SYMMETRY PER EQUATION]

EQUq    Vcol%rc+4!_topB_vt_vwXes,s0,    Vcol%rc+4!_topA_vt_vwXes,s1
        EQUq    Vcol%rc+4!_topB_vt_vwXes,s1,    Vcol%rc+4!_topA_vt_vwXes,s0
```

XLI CORPORATION - CONFIDENTIAL
INF_MAIN.ASM PAGE 5

```
        EQUq    Vcol%rc+4!_topB_vt_vwXes,s2,     Vcol%rc+4!_topA_vt_vwXes,s3
        EQUq    Vcol%rc+4!_topB_vt_vwXes,s3,     Vcol%rc+4!_topA_vt_vwXes,s2

EQUq    Vrow%rc+2!_botsA,s0,             Vcol%rc+4!_topB_vt_vwXes,s3
        EQUq    Vrow%rc+2!_botsA,s1,             Vcol%rc+4!_topB_vt_vwXes,s2
        EQUq    Vrow%rc+2!_botsA,s2,             Vcol%rc+4!_topB_vt_vwXes,s1
        EQUq    Vrow%rc+2!_botsA,s3,             Vcol%rc+4!_topB_vt_vwXes,s0

EQUq    Vrow%rc+2!_botsB,s0,             Vcol%rc+4!_topA_vt_vwXes,s3
        EQUq    Vrow%rc+2!_botsB,s1,             Vcol%rc+4!_topA_vt_vwXes,s2
        EQUq    Vrow%rc+2!_botsB,s2,             Vcol%rc+4!_topA_vt_vwXes,s1
        EQUq    Vrow%rc+2!_botsB,s3,             Vcol%rc+4!_topA_vt_vwXes,s0

;row2_BLACK_BOTS(n+1)   <= row2_BLACK_BOTS(n);   n = 0,1 only
;row3_BLACK_BOTS(n+1)   <= row3_BLACK_BOTS(n);
;row4_BLACK_BOTS(n+1)   <= row4_BLACK_BOTS(n);
;row5_BLACK_BOTS(n+1)   <= row5_BLACK_BOTS(n);

;row2_bot_verts(n)      <= col4_top_verts(3-n);  -- 180 deg. rotated --
;row3_bot_verts(n)      <= col5_top_verts(3-n);
;row4_bot_verts(n)      <= col6_top_verts(3-n);
;
;row2_bot_Xes(n)        <= col4_top_Xes(3-n);    -- 180 deg. rotated --
;row3_bot_Xes(n)        <= col5_top_Xes(3-n);
;row4_bot_Xes(n)        <= col6_top_Xes(3-n);

;*Color* A and B sides distinguished:

EQUq    Hrow%rc+1!_Abar_Xes,s0,          Hcol%rc+1!_Abar_Xes,s1
        EQUq    Hrow%rc+1!_Abar_Xes,s1,          Hcol%rc+1!_Abar_Xes,s0
        EQUq    Hrow%rc+1!_Abar_Xes,s2,          Hcol%rc+1!_Abar_Xes,s3
        EQUq    Hrow%rc+1!_Abar_Xes,s3,          Hcol%rc+1!_Abar_Xes,s2

EQUq    Hrow%rc+1!_Bbar_Xes,s0,          Hcol%rc+1!_Bbar_Xes,s1
        EQUq    Hrow%rc+1!_Bbar_Xes,s1,          Hcol%rc+1!_Bbar_Xes,s0
        EQUq    Hrow%rc+1!_Bbar_Xes,s2,          Hcol%rc+1!_Bbar_Xes,s3
        EQUq    Hrow%rc+1!_Bbar_Xes,s3,          Hcol%rc+1!_Bbar_Xes,s2

DDq     ArowB%rc+2!_bots,s0
        DDq     ArowB%rc+2!_bots,s2

;rowB2_bots(n+1) <= rowB2_bots(n);   -- These bottoms are L/R self-symmetric --
;rowB3_bots(n+1) <= rowB3_bots(n);
;rowB4_bots(n+1) <= rowB4_bots(n);
;rowB5_bots(n+1) <= rowB5_bots(n);

EQUq    ArowB%rc+2!_bots,s1,             ArowB%rc+2!_bots,s0
        EQUq    ArowB%rc+2!_bots,s3,             ArowB%rc+2!_bots,s2

;row1_bots(n)   <= col1_tops(3-n);    -- here's where this new organization --
;row2_bots(n)   <= col2_tops(3-n);    -- really pays off.                  --
;row3_bots(n)   <= col3_tops(3-n);
;row4_bots(n)   <= col4_tops(3-n);
;row5_bots(n)   <= col5_tops(3-n);
;row6_bots(n)   <= col6_tops(3-n);

IFE     rc EQ 0                          ;rc = 1,2,3

EQUq    Brow%rc!_botsA,s0,     Bcol%rc!_topsB,s3    ; bots 1,2,3
        EQUq    Brow%rc!_botsA,s1,     Bcol%rc!_topsB,s2    ; bots 1,2,3
        EQUq    Brow%rc!_botsA,s2,     Bcol%rc!_topsB,s1    ; bots 1,2,3
        EQUq    Brow%rc!_botsA,s3,     Bcol%rc!_topsB,s0    ; bots 1,2,3

EQUq    Brow%rc!_botsB,s0,     Bcol%rc!_topsA,s3    ; bots 1,2,3
        EQUq    Brow%rc!_botsB,s1,     Bcol%rc!_topsA,s2    ; bots 1,2,3
        EQUq    Brow%rc!_botsB,s2,     Bcol%rc!_topsA,s1    ; bots 1,2,3
        EQUq    Brow%rc!_botsB,s3,     Bcol%rc!_topsA,s0    ; bots 1,2,3

EQUq    Brow%rc+3!_botsA,s0,   Bcol%rc+3!_topsB,s3  ; bots 4,5,6
        EQUq    Brow%rc+3!_botsA,s1,   Bcol%rc+3!_topsB,s2  ; bots 4,5,6
        EQUq    Brow%rc+3!_botsA,s2,   Bcol%rc+3!_topsB,s1  ; bots 4,5,6
        EQUq    Brow%rc+3!_botsA,s3,   Bcol%rc+3!_topsB,s0  ; bots 4,5,6

EQUq    Brow%rc+3!_botsB,s0,   Bcol%rc+3!_topsA,s3  ; bots 4,5,6
        EQUq    Brow%rc+3!_botsB,s1,   Bcol%rc+3!_topsA,s2  ; bots 4,5,6
        EQUq    Brow%rc+3!_botsB,s2,   Bcol%rc+3!_topsA,s1  ; bots 4,5,6
        EQUq    Brow%rc+3!_botsB,s3,   Bcol%rc+3!_topsA,s0  ; bots 4,5,6

ENDIF                                    ;rc = 1,2,3 rc      = rc + 1
                ENDM                ; loop on rc 0-3
                e       = 1
                ENDM                ;loop on e (extended /not)
```

XLI CORPORATION - CONFIDENTIAL
INF_MAIN.ASM                                                                                          PAGE 6

```
; END OF "AUTOMATIC" GENERATION OF WORKING VARIABLES...

;-- TAG --
create_edge_variables   MACRO    hv,ind

&hv&ind&_s0         dd       ?
NOT_&hv&ind&_s0          dd       ?

ENDM

Ecreate_edge_variables   MACRO    hv,ind         ; "E" means extended (to 64 bits)

E&hv&ind&_s0        dd       ?              ; other symmetries done by EQU's
  eNOT_&hv&ind&_s0       dd       ?

ENDM create_symmetry_EQUs     MACRO    qsym,qhv,qhv0,qedge,qedge0              ; q to avoid confusion &qhv&qedge&_s&qsym              EQU        <&qhv0&qedge0&_s0>
     E&qhv&qedge&_s&qsym             EQU        <E&qhv0&qedge0&_s0>
  NOT_&qhv&qedge&_s&qsym             EQU        <NOT_&qhv0&qedge0&_s0>
 eNOT_&qhv&qedge&_s&qsym             EQU        <eNOT_&qhv0&qedge0&_s0>

ENDM
REPEAT   1                  ;0 = kill edgemap variable generation for now index    =       0
         REPEAT   80
create_edge_variables h,%index
index    =       index+1
         ENDM index    =       0
         REPEAT   80
create_edge_variables b,%index                   ;*Color*
index    =       index+1
         ENDM index    =       0
         REPEAT   80
create_edge_variables f,%index                   ;*Color*
index    =       index+1
         ENDM index    =       0
         REPEAT   9
         REPEAT   9
create_edge_variables v,%index
index    =       index+1
         ENDM
                         DD       2 dup (?)      ;tenth pair to speed indexing
                                                 ;in edgemap setup
         ENDM ; Now the E's (extended .. to 64 bits)

index    = 0
         REPEAT   80
Ecreate_edge_variables h,%index
         index    = index+1
         ENDM index    = 0
         REPEAT   80
Ecreate_edge_variables b,%index                  ;*Color*
         index    = index+1
         ENDM index    = 0
         REPEAT   80
Ecreate_edge_variables f,%index                  ;*Color*
         index    = index+1
         ENDM index    = 0
         REPEAT   9
         REPEAT   9
Ecreate_edge_variables v,%index
         index    = index+1
         ENDM
```

XLI CORPORATION - CONFIDENTIAL
INF_MAIN.ASM                                                                                        PAGE 7

```
                    DD      2 dup (?)       ;tenth pair to speed indexing
                                            ;in edgemap setup
        ENDM ;create the other symmetry variables here via EQU's
; First, the Horizontal symmetry, S1

; First, the Horizontal edge symmetries:
edge    =       0                   ; new edge
        REPEAT     80               ; h,b,f edges: other symmetries edge0   =       (edge/10)*10 + 9 - edge MOD 10      ;old edge
create_symmetry_EQUs    1,h,h,%edge,%edge0
create_symmetry_EQUs    1,b,f,%edge,%edge0-1        ;*Color*
create_symmetry_EQUs    1,f,b,%edge,%edge0-1        ;*Color* edge0   = 70 - (edge/10)*10 + edge MOD 10
create_symmetry_EQUs    2,h,h,%edge,%edge0
create_symmetry_EQUs    2,b,f,%edge,%edge0          ;*Color*
create_symmetry_EQUs    2,f,b,%edge,%edge0          ;*Color* edge0   = 79 - edge
create_symmetry_EQUs    3,h,h,%edge,%edge0
create_symmetry_EQUs    3,b,b,%edge,%edge0-1        ;*Color*
create_symmetry_EQUs    3,f,f,%edge,%edge0-1        ;*Color* edge    =       edge+1
        ENDM

; Now, the Vertical edge symmetries
edge    =       0
        REPEAT     81               ; v edges: other symmetries edge0   = edge/9 *9 + 8 - edge MOD 9
create_symmetry_EQUs    1,v,v,%edge,%edge0 edge0   = 72 - edge/9 *9 + edge MOD 9
create_symmetry_EQUs    2,v,v,%edge,%edge0 edge0   = 80 - edge
create_symmetry_EQUs    3,v,v,%edge,%edge0 edge    =       edge+1
        ENDM

ENDM            ; end of REPEAT 0 to kill edgemap variable creation

_DATA ENDS public  _AdamEnhance
        public  _FillLRPixels
        public  _DanBreak ;.SALL           ;suppress MACRO expansion printing
;.XCREF          ;suppress symbol cross-reference listing

_ADAM SEGMENT
ASSUME CS:_ADAM,DS:_DATA

_DanBreak proc
        nop
        ret
_DanBreak endp

;error_exit:
;       jmp     AE01884                 ; not used

;-- TAG --
_AdamEnhance proc

INCLUDE INF_MAC.inc         ;the code MACRO's push    ebp
    mov     ebp,esp
            push    eax
            push    ebx
            push    ecx
            push    edx mov     eax,DWORD PTR ss:[ebp + 8]
```

XLI CORPORATION - CONFIDENTIAL
INF_MAIN.ASM                                                                                     PAGE 8

```
        mov     INPUT_Buffer, eax mov     eax,DWORD PTR ss:[ebp + 12]
        mov     OUTPUT_Buffer, eax mov     eax,DWORD PTR ss:[ebp + 16]
        mov     line_length, eax mov     eax,DWORD PTR ss:[ebp + 1a]
        mov     total_input_bytes, eax push    esi
        push    edi CLD                             ; direction for string instructions.
                                        ; flow continues at next -- TAG --

;-- TAG --
; ******** NOW TO START THE ACTUAL CODE *********************************************
        IF      BYPASS_ALGORITHM
                jmp     final_exit              ;******** timing test *********
        ENDIF TRACK   = 3                     ; We start on track III ;Firstly, to form the edgemap:

; ESI setup:

mov     esi, 0
        mov     esi,INPUT_BUFFER        ; starting index into source bitmap, bytes.

; final exit setup:
        add     ESI,total_input_bytes
        mov     EBX_setup_top,ESI mov     EAX,line_length
        shl     EAX,2                   ; times four: to middle line of window
        add     ESI,EAX
        mov     EBX_setup_middle,ESI mov     ESI,total_input_bytes IF EIGHT_BIT_PIXELS                                     ; make sure we aren't negative immediately
        add     ESI,64          ; to next string of 64 pixels (64 bytes)
ELSE
        add     ESI,8           ; to next string of 64 bits   (8 bytes)
ENDIF neg     ESI             ; setup for SIGN FLAG to indicate finished ; EDI setup
        mov     edi, 0          ; to clear high-word
        mov     edi,OUTPUT_BUFFER  ; starting address in output area
;       MOV     EAX,line_length
;       DEC     EAX             ; observed error
;       shl     EAX,6           ; x 64 = two output bytes x 8 bits/input byte x 4-line error observed
;       add     EDI,EAX
;;      add     edi,6           ; sychronizing with Dan's display, observed error.
;       add     edi,8           ; changed 12/3/95 due to new pixel fill
        ; sub    edi, 56                ; Just a strange constant to deal with aligning the center pixels with
the case info...
                sub     edi,66          ;empirical adjust, alc 2/14/96 grand_loop:                     ; return to try 64 more input pixels

MOV     EBX,EBX_setup_middle grand_loopB:                    ; entry for blankspace loop only add     EDI,128

IF EIGHT_BIT_PIXELS
        add     ESI,64          ; to next string of 64 pixels (64 bytes)
ELSE
        add     ESI,8           ; to next string of 64 bits   (8 bytes)
ENDIF
        jns     page_done       ; ESI becomes positive = done ; tighter-than-tight short exit for blank space:
;               [paired as they are intended to pair in Pentium pipelines]
```

XLI CORPORATION - CONFIDENTIAL
INF_MAIN.ASM                                                                         PAGE 9

```
IF EIGHT_BIT_PIXELS

IF OMIT_NOHIT_CHECKS
            jmp     SHORT no_easy_exit
        ENDIF mov     EAX,[esi+ebx]               ;pixels 4,3,2,1 in from input buffer mov     ECX,[esi+ebx+4]             ;2nd DD from input buffer 8,7,6,5
            mov     edx,eax                 ;hold
            SHRD    eax,ecx,8               ;pixels 5,4,3,2

XOR     eax,edx
        jnz     SHORT no_easy_exit mov     EAX,[esi+ebx+8]             ;3rd DD from input buffer 12,11,10,9
            mov     edx,ecx                 ;hold
            SHRD    ecx,eax,8               ;pixels 9,8,7,6

XOR     ecx,edx
        jnz     SHORT no_easy_exit mov     ECX,[esi+ebx+12]            ;4th DD from input buffer 16,15,14,13
            mov     edx,eax                 ;hold
            SHRD    eax,ecx,8               ;13,12,11,10 pixels XOR     eax,edx
        jnz     SHORT no_easy_exit          ;3rd XOR fork: 12 v edges checked = 3 windows
keep_sliding:
        mov     EAX,[esi+ebx+16]            ;5th DD from input buffer 20,19,18,17
            mov     edx,ecx                 ;hold
            SHRD    ecx,eax,8               ;17,16,15,14 pixels XOR     ecx,edx
        jnz     SHORT are_four_OK1 mov     ECX,[esi+ebx+20]
            mov     edx,eax                 ;hold
            SHRD    eax,ecx,8

XOR     eax,edx
        jnz     SHORT are_four_OK2 add     ESI,8                       ; 11 windows no-hit, go eight deeper
        jns     page_done                   ; ESI becomes positive = done
        add     EDI,16
        jmp     SHORT keep_sliding are_four_OK1:
        test    ECX,0FFh                    ;check first byte
        jnz     SHORT no_easy_exit          ;only 9 + 3 clear
        add     ESI,4                       ; OK to start processing in 4 pixels
        add     EDI,8
        jmp     SHORT no_easy_exit are_four_OK2:
        add     ESI,4
        add     EDI,8
        test    EAX,0FFh                    ;check first byte
        jnz     SHORT no_easy_exit          ;only 9 + 3 clear
        add     ESI,4                       ; OK to start processing in 4 pixels
        add     EDI,8
;       jmp     SHORT no_easy_exit          ;redundant: fall through ELSE                                        ; now the old one-bit-input-pixel stuff:

mov     EDX,[esi+ebx+8]             ; 3rd DD  from input buffer
        mov     ECX,[esi+ebx+4]             ; 2nd DD  from input buffer mov     EBP,EDX                     ; 3rd DD  hold
        add     EDX,EDX                     ; 3rd DD  shift left 1, set carry F.

mov     EAX,ECX                     ; 2nd DD  hold.  Carry carried.
        ADC     ECX,ECX                     ; 2nd DD  shift left 1, carry F. in.

xor     EDX,EBP                     ; 3rd DD  vertical edges
        and     EDX,0FF000000h   ;*;        ; 3rd DD  mask for active 8 edges.

jnz     no_easy_exit
        xor     ECX,EAX                     ; 2nd DD  vertical edges jnz     no_easy_exit
        mov     EDX,[esi+ebx]               ; 1st DD  from input buffer add     EAX,EAX                     ; 2nd DD  obtain carry bit
        mov     EAX,EDX                     ; 1st DD  hold
```

XLI CORPORATION - CONFIDENTIAL
INF_MAIN.ASM     PAGE 10

```
            adc     EDX,EDX              ; 1st DD   shift left 1, carry F. in
            xor     EAX,EDX      ;*;     ; 1st DD   vertical edges jz      grand_loopB          ;*; = pipeline stall cycle   ;;**
ENDIF                                    ;8_bit pixel fork no_easy_exit:
            MOV     EBX,EBX_setup_top IF      DO_ONLY_NOHIT_CHECK
            jmp     grand_loopB          ; **** timing test *****
ENDIF ; End of short exit routine for blank space PUSH    EDI
            XOR     EDI,EDI              ; edgemap index 0-80 * 8 + 64 next_row:

IF EIGHT_BIT_PIXELS                      ;*Color* byte4       EQU     0FF000000h
byte3       EQU     0FF0000h
byte2       EQU     0FF00h
byte1       EQU     0FFh mov     EAX,[esi+ebx]        ;first 4 pixels this row ;*Color*
            mov     ECX,23               ; becomes 19 times around loop
                                         ; 64+12 pixels = 19 * 4  ;*Color* vert_compare_loop:
            mov     EBP,[esi+ebx+4]      ;next 4 pixels
            SHRD    EAX,EBP,8            ;shift by one pixel
            XOR     EAX,[esi+ebx]        ;compare 4 adjacent pix. for equal ;turn 32 bits into four:                 ;*Color* add     AL,byte1             ;will carry if edge
            adc     EDX,EDX              ;shift the carry in add     AX,byte2             ;will carry if edge
            adc     EDX,EDX              ;shift the carry in add     edx,edx              ;shift left 1
            test    EAX,byte3
            jz      SHORT no_byte3_edge
            or      edx,1                ; can't do ADC trick on byte 3
no_byte3_edge:
            add     EAX,byte4            ;will carry if edge
            adc     EDX,EDX              ;shift the carry in test    ECX,7
            jnz     SHORT loop_19_index PUSH    EDX                  ;every eighth. Produces TWO pushes.

cmp     ecx,8
            jne     SHORT loop_19_index
            mov     ecx,4                ;three more times around loop.Tot:19 loop_19_index:
            add     esi,4                ;next input word
            mov     EAX,EBP              ;next word
            loop    SHORT vert_compare_loop   ;*Color*

POP     ECX
            POP     EAX
            SHL     EDX,20               ;Left justify: 32-3*4 bits.
            SUB     ESI,19*4             ;restore to row beginning ;*Color*

;edge bits now set up in EAX,ECX,EDX just as one-bit does it.

ELSE                                     ;8 bit pixel fork. ;*Color*

;old code for 1-bit input pixels:

mov     EAX,[esi+ebx]        ; from input buffer
            mov     ECX,[esi+ebx+4]      ; from input buffer
            mov     EDX,[esi+ebx+8]      ; from input buffer
```

XLI CORPORATION - CONFIDENTIAL
INF_MAIN.ASM PAGE 11

```
            ADD      EDX,EDX              ;shift left 1
            ADC      ECX,ECX
            ADC      EAX,EAX xor      EAX,[esi+ebx]        ; from input buffer
            xor      ECX,[esi+ebx+4]      ; from input buffer
            xor      EDX,[esi+ebx+8]
ENDIF                                     ;8 bit pixel fork. ;*Color* mov      EBP,4                ;nine edges per row for the v-edges vertical_edgemap_loop:

mov      v0_s0[EDI],EAX       ; store edgemap quadword
            mov      Ev0_s0[EDI],ECX not      EAX
            not      ECX
            not      EDX mov      NOT_v0_s0[EDI],EAX
            mov      ENOT_v0_s0[EDI],ECX ADD      EDX,EDX              ;shift left 1
            ADC      ECX,ECX
            ADC      EAX,EAX mov      NOT_v0_s0+8[EDI],EAX ; which is NOT_h1_s0
            mov      ENOT_v0_s0+8[EDI],ECX not      EAX
            not      ECX
            not      EDX mov      v0_s0[EDI+8],EAX
            mov      Ev0_s0[EDI+8],ECX ADD      EDX,EDX              ;shift left 1
            ADC      ECX,ECX
            ADC      EAX,EAX ADD      EDI,16               ;to next edgemap entries dec      EBP
            JNZ      SHORT vertical_edgemap_loop    ;moving horizontally !

; Now the stub (ninth) edge per row:

mov      v0_s0[EDI],EAX       ; store edgemap quadword
            mov      Ev0_s0[EDI],ECX not      EAX
            not      ECX
            not      EDX mov      NOT_v0_s0[EDI],EAX
            mov      ENOT_v0_s0[EDI],ECX CMP      EDI,80*8+4*16 ; still valid exit criterion for *Color*
            JAE      edgemap_formed ; about to place h80 [in h-, below]
                                    ; which doesn't exist ; Now a row of horizontals:

SUB      EDI,4*16             ; back to row beginning

; (remember, the vertical s0's are padded with a dummy tenth edge per line
; so that this indexing works. Only nine are computed and stored, tenth
; stays blank)

IFE EIGHT_BIT_PIXELS                      ;the following not needed if *Color* mov      EAX,[esi+ebx]        ; from input buffer
            mov      ECX,[esi+ebx+4]      ; from input buffer
            mov      EDX,[esi+ebx+8]

; WE insert here a check for the center row in order to capture the center left
;and center-right pixels (x64 of course). DELETED: < 5/25/96

ENDIF                                     ;*Color* NOT 8-bit-pixels IF

IF EIGHT_BIT_PIXELS

; now horizontal [h-] edgemapping for *Color*
```

XLI CORPORATION - CONFIDENTIAL
INF_MAIN.ASM   PAGE 12

```
                mov     EBP,11                  ; loop 9 times, plus 1 pixel then exit *Color*
horz_compare_loop:
                mov     EAX,[esi+ebx]           ; from input buffer
                mov     ECX,[esi+ebx+4]         ; from input buffer
; EAX, ECX loaded with pixels 4,3,2,1,  8,7,6,5 add     EBX,line_length         ; next line

XOR     EAX,[esi+ebx]
                XOR     ECX,[esi+ebx+4]         ; now: eight 8-bit edges to be tested ;turn 32 bits [EAX] into four:                  ;*Color* add     AL,byte1                ;will carry if edge
                adc     EDX,EDX                 ;shift the carry in cmp     EBP,2
                jbe     horz_row_complete       ;exit one bit into final [10th] loop.

add     AX,byte2                ;will carry if edge
                adc     EDX,EDX                 ;shift the carry in add     edx,edx                 ;shift left 1
                test    EAX,byte3
                jz      SHORT no_byte3A_edge
                or      edx,1                   ; can't do ADC trick on byte 3
no_byte3A_edge:
                add     EAX,byte4               ;will carry if edge
                adc     EDX,EDX                 ;shift the carry in ;turn 32 bits [ECX] into four:                  ;*Color* add     CL,byte1                ;will carry if edge
                adc     EDX,EDX                 ;shift the carry in add     CX,byte2                ;will carry if edge
                adc     EDX,EDX                 ;shift the carry in add     edx,edx                 ;shift left 1
                test    ECX,byte3
                jz      SHORT no_byte3C_edge
                or      edx,1                   ; can't do ADC trick on byte 3
no_byte3C_edge:
                add     ECX,byte4               ;will carry if edge
                adc     EDX,EDX                 ;shift the carry in. 8 BITS NOW IN test    EBP,3                   ; 32-bit output word complete in EDX?
                jnz     SHORT loop_horz_index PUSH    EDX                     ;every fourth. Produces TWO pushes.

loop_horz_index:
                add     esi,8                   ;next input word pair
                sub     EBX,line_length         ; back to current row
                dec     EBP                     ;loop index. The exit is above @ EBP=2
                jmp     SHORT horz_compare_loop ;*Color* horz_row_complete:                              ; [short] exit from loop *Color*
;;              sub     EBX,line_length         ; back to current row ;leave next row for b
                POP     ECX
                POP     EAX
                SHL     EDX,32-9                ;Left justify. 9 bits in.
                SUB     ESI,9*8                 ;restore to row beginning *Color*

;edge bits now set up in EAX,ECX,EDX just as one-bit does it. ;*Color*

ELSE                                            ;now old 1-bit coding:       *Color*
                add     EBX,line_length xor     EAX,[esi+ebx]           ; from input buffer
                xor     ECX,[esi+ebx+4]         ; from input buffer
                xor     EDX,[esi+ebx+8]         ; from input buffer ENDIF                                           ;*Color* eight_bit_pixels ;shared: old 1-bit and new *Color*:
```

XLI CORPORATION - CONFIDENTIAL
INF_MAIN.ASM PAGE 13

```
            mov     EBP,5                   ;ten edges per row for the h-edges
horizontal_edgemap_loop:
            mov     h0_s0[EDI],EAX
            mov     Eh0_s0[EDI],ECX not     EAX
            not     ECX
            not     EDX mov     NOT_h0_s0[EDI],EAX
            mov     ENOT_h0_s0[EDI],ECX ADD     EDX,EDX                 ;shift left 1
            ADC     ECX,ECX
            ADC     EAX,EAX mov     NOT_h0_s0+8[EDI],EAX    ; which is NOT_h1_s0
            mov     ENOT_h0_s0+8[EDI],ECX not     EAX
            not     ECX
            not     EDX mov     h0_s0+8[EDI],EAX
            mov     Eh0_s0+8[EDI],ECX ADD     EDX,EDX                 ;shift left 1
            ADC     ECX,ECX
            ADC     EAX,EAX ADD     EDI,16                  ;to next edgemap entries dec     EBP
            JNZ     SHORT horizontal_edgemap_loop   ;moving horizontally !

; checking for guaranteed no-hits: fast exit
            cmp     EDI,8*50                ;about to do h50

IF EIGHT_BIT_PIXELS
                    jne     continue_this_row
            ELSE
            jne     next_row
            ENDIF mov     EAX, v40_s0             ;same formula OK for *Color*:
            mov     EDX, Ev40_s0

OR      EAX, h34_s0
            OR      EDX, Eh34_s0
            OR      EAX, h35_s0
            OR      EDX, Eh35_s0

OR      EAX, h44_s0
            OR      EDX, Eh44_s0
            OR      EAX, h45_s0
            OR      EDX, Eh45_s0            ;zero bit = no-hit jnz     SHORT maybe_hits        ;EDX
            or      EAX,EAX                 ;zero flag set
            jnz     SHORT maybe_hits IFE OMIT_NOHIT_CHECKS                                           ; fall through if no fast exit here.
            POP     EDI                     ; mustn't forget!
            JMP     GRAND_LOOP              ; abort (no hits), move to next 64
            ENDIF
maybe_hits:
            not     EAX                     ; zero = resolved
            not     EDX                     ; zero = resolved
            mov     hits_log,EAX            ; initialize - treat no-hits as
            mov     Ehits_log,EDX           ; hits: i.e. the pixel is resolved

IF EIGHT_BIT_PIXELS continue_this_row:

; *Color**Color*
; Now to compute the new "diagonal" edges b (backslash) and
; f (forward slash). As in v,h  bit = zero means pixels identical.
; The edge numbering refers to the same numbering as h-edges. The node
; examined is at the right-hand end of the same-numbered h-edge. *Color*

SUB     EDI,5*16                ; back to row beginning
```

XLI CORPORATION - CONFIDENTIAL
INF_MAIN.ASM                                                                                          PAGE 14

```
; NOTE: we enter here with EBX pointing at NEXT row

; now backslash (b-) edgemapping for *Color* mov     EBP,11              ; loop 9 times exactly backslash_compare_loop:

mov     EAX,[esi+ebx]       ; from input buffer:next row
        mov     ECX,[esi+ebx+4]     ; from input buffer:next row ; EAX, ECX loaded with pixels 4,3,2,1,  8,7,6,5

SHRD    EAX,ECX,8           ; EAX: 5,4,3,2       backslash logic
        mov     CL,[esi+ebx+8]      ; pixel 9 ECX: 8,7,6,9
        ROR     ECX,8               ;                    ECX: 9,8,7,6 sub     EBX,line_length     ; back to current row

XOR     EAX,[esi+ebx]
        XOR     ECX,[esi+ebx+4]     ; now: eight 8-bit edges to be tested ;turn 32 bits (EAX) into four:      ;*Color* add     AL,byte1            ;will carry if edge
        adc     EDX,EDX             ;shift the carry in add     AX,byte2            ;will carry if edge
        adc     EDX,EDX             ;shift the carry in add     edx,edx             ;shift left 1
        test    EAX,byte3
        jz      SHORT no_byte3A_b_edge
        or      edx,1               ; can't do ADC trick on byte 3
no_byte3A_b_edge:

add     EAX,byte4           ;will carry if edge
        adc     EDX,EDX             ;shift the carry in ;turn 32 bits (ECX) into four:      ;*Color* add     CL,byte1            ;will carry if edge
        adc     EDX,EDX             ;shift the carry in add     CX,byte2            ;will carry if edge
        adc     EDX,EDX             ;shift the carry in add     edx,edx             ;shift left 1
        test    ECX,byte3
        jz      SHORT no_byte3C_b_edge
        or      edx,1               ; can't do ADC trick on byte 3
no_byte3C_b_edge:

add     ECX,byte4           ;will carry if edge
        adc     EDX,EDX             ;shift the carry in. 8 BITS NOW IN test    EBP,3               ; 32-bit output word complete in EDX?
        jnz     SHORT loop_backslash_index PUSH    EDX                 ;every fourth. Produces TWO pushes.

loop_backslash_index:

add     esi,8                       ; next input word pair
        dec     EBP                         ; loop index.
        add     EBX,line_length             ; to next row
        cmp     EBP,2                       ; exactly 9 loops
        ja      SHORT backslash_compare_loop ;*Color* backslash_row_complete:             ; [short] exit from loop *Color* sub     EBX,line_length     ; back to current row for f's

POP     ECX
        POP     EAX
        SHL     EDX,32-8            ;Left justify. 8 bits have come in.
        SUB     ESI,9*8             ;restore to row beginning *Color*

;backslash edge bits now set up in EAX,ECX,EDX just as one-bit does it.*Color*
; we now place them ala the vertical, which also has 9 per row:

mov     EBP,4               ;nine edges per row for the b-edges backslash_edgemap_loop:

mov     b0_80[EDI],EAX      ; store edgemap quadword
```

XLI CORPORATION - CONFIDENTIAL
INF_MAIN.ASM                                                                                                          PAGE 15

---

```
        mov     Eb0_s0[EDI],ECX not     EAX
        not     ECX
        not     EDX mov     NOT_b0_s0[EDI],EAX
        mov     ENOT_b0_s0[EDI],ECX ADD     EDX,EDX                 ;shift left 1
        ADC     ECX,ECX
        ADC     EAX,EAX mov     NOT_b0_s0+8[EDI],EAX    ; which is NOT_h1_s0
        mov     ENOT_b0_s0+8[EDI],ECX not     EAX
        not     ECX
        not     EDX mov     b0_s0[EDI+8],EAX
        mov     Eb0_s0[EDI+8],ECX ADD     EDX,EDX                 ;shift left 1
        ADC     ECX,ECX
        ADC     EAX,EAX ADD     EDI,16                  ;to next edgemap entries dec     EBP
        JNZ     SHORT backslash_edgemap_loop    ;moving horizontally !
; Now the stub (ninth) edge per row:

mov     b0_s0[EDI],EAX          ; store edgemap quadword
        mov     Eb0_s0[EDI],ECX not     EAX
        not     ECX
        not     EDX mov     NOT_b0_s0[EDI],EAX
        mov     ENOT_b0_s0[EDI],ECX ; backslash edgemap complete ;*Color*;*Color*

SUB     EDI,4*16                ; back to row beginning

; now fwdslash [f-] edgemapping for *Color* mov     EBP,11                  ; loop 9 times exactly fwdslash_compare_loop:
        mov     EAX,[esi+ebx]           ; from input buffer:this row
        mov     ECX,[esi+ebx+4]         ; from input buffer:this row ; EAX, ECX loaded with pixels 4,3,2,1. 8,7,6,5

SHRD    EAX,ECX,8               ; EAX: 5,4,3,2      fwdslash logic
        mov     CL,[esi+ebx+8]          ; pixel 9 ECX: 8,7,6,9
        ROR     ECX,8                   ;                ECX: 9,8,7,6 add     EBX,line_length         ; to next row

XOR     EAX,[esi+ebx]
        XOR     ECX,[esi+ebx+4]         ; now: eight 8-bit edges to be tested ;turn 32 bits [EAX] into four:          ;*Color*
        add     AL,byte1                ;will carry if edge
        adc     EDX,EDX                         ;shift the carry in add     AX,byte2                ;will carry if edge
        adc     EDX,EDX                         ;shift the carry in add     edx,edx                 ;shift left 1
        test    EAX,byte3
        jz      SHORT no_byte3A_f_edge
        or      edx,1                   ; can't do ADC trick on byte 3
no_byte3A_f_edge:
        add     EAX,byte4               ;will carry if edge
        adc     EDX,EDX                         ;shift the carry in ;turn 32 bits [ECX] into four:          ;*Color*
```

XLI CORPORATION - CONFIDENTIAL
INF_MAIN.ASM   PAGE 16

```
            add     CL,byte1            ;will carry if edge
            adc     EDX,EDX             ;shift the carry in add     CX,byte2            ;will carry if edge
            adc     EDX,EDX             ;shift the carry in add     edx,edx             ;shift left 1
            test    ECX,byte3
            jz      SHORT no_byte3C_f_edge
            or      edx,1               ; can't do ADC trick on byte 3
no_byte3C_f_edge:
            add     ECX,byte4           ;will carry if edge
            adc     EDX,EDX             ;shift the carry in. 8 BITS NOW IN test    EBP,3               ; 32-bit output word complete in EDX?
            jnz     SHORT loop_fwdslash_index PUSH    EDX                 ;every fourth. Produces TWO pushes.

loop_fwdslash_index:
            add     esi,8               ;next input word pair
            dec     EBP                 ;loop index.
            sub     EBX,line_length     ; back to current row
            cmp     EBP,2                              ;exactly 9 loops
            ja      SHORT fwdslash_compare_loop    ;*Color* fwdslash_row_complete:                  ; [short] exit from loop *Color*

POP     ECX
            POP     EAX
            SHL     EDX,32-8            ;Left justify. 8 bits have come in.
            SUB     ESI,9*8             ;restore to row beginning *Color*

;fwdslash edge bits now set up in EAX,ECX,EDX just as one-bit does it.*Color*
; we now place them ala the vertical, which also has 9 per row:

mov     EBP,4               ;nine edges per row for the f-edges fwdslash_edgemap_loop:

mov     f0_s0[EDI],EAX      ; store edgemap quadword
            mov     Ef0_s0[EDI],ECX not     EAX
            not     ECX
            not     EDX mov     NOT_f0_s0[EDI],EAX
            mov     ENOT_f0_s0[EDI],ECX ADD     EDX,EDX             ;shift left 1
            ADC     ECX,ECX
            ADC     EAX,EAX mov     NOT_f0_s0+8[EDI],EAX    ; which is NOT_h1_s0
            mov     ENOT_f0_s0+8[EDI],ECX not     EAX
            not     ECX
            not     EDX mov     f0_s0[EDI+8],EAX
            mov     Ef0_s0[EDI+8],ECX ADD     EDX,EDX             ;shift left 1
            ADC     ECX,ECX
            ADC     EAX,EAX ADD     EDI,16              ;to next edgemap entries dec     EBP
            JNZ     SHORT fwdslash_edgemap_loop    ;moving horizontally !

; Now the stub (ninth) edge per row:

mov     f0_s0[EDI],EAX      ; store edgemap quadword
            mov     Ef0_s0[EDI],ECX not     EAX
            not     ECX
            not     EDX mov     NOT_f0_s0[EDI],EAX
            mov     ENOT_f0_s0[EDI],ECX
```

XLI CORPORATION - CONFIDENTIAL
INF_MAIN.ASM
PAGE 17

```
            add     EBX,line_length         ; to next row
            add     EDI,16                              ;skip over tenth b,f
ENDIF                                       ; 8-bit: computation of b,f ended JMP     next_row                ; one-bit: EBX already at next row edgemap_formed:                             ; exits to here following last
                                            ; vertical edgemap row

POP     EDI                     ; EDGEMAP COMPLETE

IF      DO_ONLY_EDGEMAP
            JMP     grand_loop              ; ******** timing test point *******
ENDIF

;-- TAG --
;********** COMPUTATION OF SPECIAL "NO-HIT" CASES    ***************

; These are (currently unnumbered) cases that currently cause no-hit but are
;detected here in order to speed processing by bypassing windows with no-hit.

rc      = 0
            s       = 0

; No need to interleave these for pentium REGISTERS, we haven't forked yet,
; but still might help on the memory accesses.

movQ    b,NOT_v36               ; Xes across middle of window
            andQ    b,NOT_v37               ; These Xes are quadrupply self-symmetric
            andQ    b,NOT_v38
            andQ    b,NOT_v39
            andQ    b,NOT_v40
            andQ    b,NOT_v41
            andQ    b,NOT_v42
            andQ    b,NOT_v43
            andQ    b,NOT_v44               ; case formed: horizontal center-bar movQ    ,v,4                    ;vertical edge straight down middle of window
            andQ    ,v,13
            andQ    ,v,22
            andQ    ,v,31
            andQ    ,v,40
            andQ    ,v,49
            andQ    ,v,58
            andQ    ,v,67
            andQ    ,v,76 andQ    ,NOT_h,4                ; its Xes
            andQ    ,NOT_h,14               ; this pattern is quadrupply self-symmetric
            andQ    ,NOT_h,24               ; in two-color only
            andQ    ,NOT_h,34
            andQ    ,NOT_h,44
            andQ    ,NOT_h,54
            andQ    ,NOT_h,64
            andQ    ,NOT_h,74

IF EIGHT_BIT_PIXELS                         ;The color case needs both sides clear;*Color* andQ    ,NOT_h,5                ;its Xes:other side of line
            andQ    ,NOT_h,15
            andQ    ,NOT_h,25
            andQ    ,NOT_h,35
            andQ    ,NOT_h,45
            andQ    ,NOT_h,55
            andQ    ,NOT_h,65
            andQ    ,NOT_h,75               ; case formed: vertical edge down mid. window
ENDIF                                       ;*Color* orQ                             ; other no-hit situation ORed in.
            or      hits_log,EAX            ;track req'd
            or      Ehits_log,EDX

;-- TAG --
;********** TRACK INDEXING: ****************************************

; causes switching from 64 to 32 bit processing
; when one of the two 32-bit doublewords can have no further hits
; Insert the FORK macro whenever checking is desired.

; TRACK 1: compute only EAX and non-E variables
; TRACK 2: compute only EDX and      E variables
; TRACK 3: compute both.  (full 64 bits)
```

XLI CORPORATION - CONFIDENTIAL
INF_MAIN.ASM    PAGE 18

```
; ALL TRACKING AND FORKING DELETED FOR MULTIPLE .ASM VERSION.  SEE OLD INF_COL.ASM
;FOR THESE FEATURES.

;********** TRACK INDEXING:  *******************************************
;
;                       s = 3       ;*test*
;         super_join    16          ;*test*
;
;         join          16          ;*test*
;
;-- TAG --

EXTERN SETUP_JOINS:proc
EXTERN DO_NEARVERT:proc
EXTERN DO_NEARHORZ:proc
EXTERN DO_SPLTCELL:proc
EXTERN DO_NEAR_45A:proc
EXTERN DO_NEAR_45B:proc
EXTERN DO_NEAR_45C:proc ; NOTE: the order of the following routines is important because of multiple
; case hit precedence AND data previously computed.

call setup_joins          ;sets up variable for use by all case types

IF NEARVERT
call do_nearvert
ENDIF

IF NEAR_45A
call do_near_45A
ENDIF

IF NEARHORZ
call do_nearhorz
ENDIF

IF SPLITCELL
call do_spltcell
ENDIF

IF NEAR_45B
call do_near_45B
ENDIF

IF NEAR_45C
call do_near_45C
ENDIF

JMP     GRAND_LOOP         ; move right 64 bits

%OUT
            %OUT arrived bottom of INF_MAIN.asm

PAGE_DONE:

FINAL_EXIT:

AE01884:
    pop    edi
    pop    esi
    pop    edx
    pop    ecx
    pop    ebx
    pop    eax
    pop    ebp
%OUT End of Assembly
    ret    ;OFFSET 0

_AdamEnhance endp

; Takes as arguments:
;       the source 1-bit data (DWORD huge *)
;       the destination word data (WORD huge *)
;       the width in DWORDS (int)
;       the height in lines (int)
; This simply takes the source bitmap and fills in the
; center left and center right pixels in the output array.
```

XLI CORPORATION - CONFIDENTIAL
INF_MAIN.ASM PAGE 19

```
; Bits 10 and 9 in the output WORDs are the center pixels.
;
_FillLRPixels proc
        push    ebp
        mov     ebp,esp
        push    eax
        push    ebx
        push    ecx
        push    edx
        push    esi
        push    edi

IF      BYPASS_SETUP
        JMP     EXIT_SETUP
ENDIF

IF      EIGHT_BIT_PIXELS        ;*Color*
        JMP     EXIT_SETUP
ENDIF mov     esi,ss:[ebp+8]          ; address of source
        mov     edi,ss:[ebp+12]         ; address of destination mov     eax,ss:[ebp+16]         ; width  of bitmap in dwords
        mul     dword ptr ss:[ebp+1a]   ; height of bitmap in lines
        shl     EAX,2                   ; to bytes mov     ebx,eax                 ; exit criterion
        add     ebx,esi                 ; source displacement ; Dan's version seems to take just under a second. Hopefully this cuts most
;of that:       12/2/95

; center-left and center-right pixels:

cent_right1     EQU     200h
cent_left1      EQU     400h
cent_right2     EQU     2000000h        ;for some reason, ML rejected label "CR2"
cent_left2      EQU     4000000h ref_000         EQU     0
ref_001         EQU                                             cent_right2
ref_010         EQU             cent_right1 + cent_left2
ref_011         EQU             cent_right1 + cent_left2 + cent_right2
ref_100         EQU     cent_left1
ref_101         EQU     cent_left1                              + cent_right2
ref_110         EQU     cent_left1 + cent_right1 + cent_left2
ref_111         EQU     cent_left1 + cent_right1 + cent_left2 + cent_right2

; Note: "carrying zero/one" refers to carrying an input bit via position
; in the code. We store up to three bits in the instruction counter.

LABEL_HERE      MACRO the_name          ; This MACRO appearED earlier in the program, used now
        &the_name&:
                        ENDM JUMP_FORK       MACRO the_op,the_name,nearfar
                        the_op  nearfar &the_name&
                        ENDM                    ; This MACRO appeared earlier in the program, used now.

carrying_zero_column:

mov     eax, [esi]      ; Get next value.
        BSWAP   eax
        mov     [esi],eax       ; store for edgemap use.

m  = 0                  ; 0 - 31
        REPEAT  16              ; for each EAX bit pair add     EAX,EAX                 ; shift left first  bit into carry
        JUMP_FORK jnc,  now_00_found_%m, SHORT add     EAX,EAX                 ; shift left second bit into carry
        JUMP_FORK jnc,  now_010_found_%m, SHORT mov     dword ptr [EDI+4*m],ref_011
        JUMP_FORK jmp,  carrying_one_%m LABEL_HERE now_010_found_%m mov     dword ptr [EDI+4*m],ref_010
        JUMP_FORK jmp,  carrying_zero_%m, SHORT LABEL_HERE now_00_found_%m
```

XLI CORPORATION - CONFIDENTIAL
INF_MAIN.ASM PAGE 20

```
            add     EAX,EAX                             ; shift left second bit into carry
            JUMP_FORK jnc,     now_000_found_%m, SHORT mov     dword ptr [EDI+4*m],ref_001
            JUMP_FORK jmp,     carrying_one_%m LABEL_HERE now_000_found_%m mov     dword ptr [EDI+4*m],ref_000

LABEL_HERE carrying_zero_%m                 ;cross-column entry m       = m + 1
            ENDM                            ; carrying-zero, [REPEAT 16]

add     ESI,4           ; input index
            add     EDI,16*4        ; output index cmp     ESI,EBX         ; check for end_point
            jb      carrying_zero_column    ;loop
            jmp     done_casemap_setup carrying_one_column:

mov     eax, [esi]      ; Get next value.
            BSWAP   eax
            mov     [esi],eax       ; store for edgemap use.

m       = 0             ; 0 - 31
            REPEAT  16              ; for each EAX bit pair add     EAX,EAX                             ; shift left first bit into carry
            JUMP_FORK jnc,     now_10_found_%m, SHORT add     EAX,EAX                             ; shift left second bit into carry
            JUMP_FORK jnc,     now_110_found_%m, SHORT mov     dword ptr [EDI+4*m],ref_111
            JUMP_FORK jmp,     carrying_one_%m, SHORT LABEL_HERE now_110_found_%m mov     dword ptr [EDI+4*m],ref_110
            JUMP_FORK jmp,     carrying_zero_%m LABEL_HERE now_10_found_%m add     EAX,EAX                             ; shift left second bit into carry
            JUMP_FORK jc,      now_101_found_%m, SHORT    ; note JC: different from carrying-zero column mov     dword ptr [EDI+4*m],ref_100
            JUMP_FORK jmp,     carrying_zero_%m
LABEL_HERE now_101_found_%m mov     dword ptr [EDI+4*m],ref_101

LABEL_HERE carrying_one_%m                  ;cross-column entry m       = m + 1
            ENDM                            ; carrying-one, [REPEAT 16]

add     ESI,4           ; input index
            add     EDI,16*4        ; output index cmp     ESI,EBX         ; check for end_point
            jb      carrying_one_column     ;loop
done_casemap_setup:

REPEAT 0                        ; Dan's original version mov     esi,ss:[ebp+8]          ; address of source
            mov     edi,ss:[ebp+12]         ; address of destination mov     ebx, 0                  ; Clear the line count.

Fill_height:

mov     ecx,ss:[ebp+16]         ; width of bitmap in dwords
            dec     ecx                     ; Do this for all but the last DWORD in the source line.
Fill_width:
```

XLI CORPORATION - CONFIDENTIAL
INF_MAIN.ASM                                                                    PAGE 21

```
            mov     eax, [esi]              ; Get next value.
            add     esi, 4 mov     edx, eax                ; Get the current data DWORD
            shr     eax, 21                 ; Shift top two bits to 10 and 9
            and     eax, 0600h              ; Mask other data.

mov     [edi], ax
            add     edi, 2 shl     edx,1 mov     eax, [esi]              ; Get next value (all we want is one bit)
            shr     eax, 31                 ; just leave a bit
            and     eax, 1
            or      edx, eax push    ecx                     ; Save count.
            mov     ecx, 31

Fill_dword:
            mov     eax, edx                ; Get the current data DWORD
            shr     eax, 21                 ; Shift top two bits to 10 and 9
            and     eax, 0600h              ; Mask other data.

mov     [edi], ax
            add     edi, 2 shl     edx,1 dec     ecx
            jg      Fill_dword              ; Loop until we finish this DWORD.

pop     ecx                     ; Get the count of the DWORD in the line that we are working on.
            dec     ecx
            jg      Fill_width mov     eax, [esi]              ; Get next value.
            add     esi, 4
            mov     edx, eax                ; Move to working value.

mov     ecx, 32

Fill_dword_last:
            mov     eax, edx                ; Get the current data DWORD
            shr     eax, 21                 ; Shift top two bits to 10 and 9
            and     eax, 0600h              ; Mask other data.

mov     [edi], ax
            add     edi, 2 shl     edx,1 dec     ecx
            jg      Fill_dword_last         ; Loop until we finish this DWORD.

inc     ebx
            cmp     ebx, ss:[ebp+1a]        ; height of bitmap in lines
            jl      Fill_height ENDM                            ; REPEAT 0:  Dan's original version
EXIT_SETUP:
            pop     edi
            pop     esi
            pop     edx
            pop     ecx
            pop     ebx
            pop     eax
            mov     esp,ebp
            pop     ebp
            ret _FillLRPixels endp

_ADAM ENDS
      END
```

XLI CORPORATION - CONFIDENTIAL
INF_SET.ASM                                                                PAGE 1

```
        .486            ; switched to 486 to allow BWSAP instruction: 12/3/95
_TEXT   SEGMENT DWORD use32 PUBLIC 'CODE'
_TEXT   ENDS
_ADAM   SEGMENT DWORD use32 PUBLIC 'CODE'
_ADAM   ENDS
_DATA   SEGMENT DWORD use32 PUBLIC 'DATA'
_DATA   ENDS
CONST   SEGMENT DWORD use32 PUBLIC 'CONST'
CONST   ENDS
_BSS    SEGMENT DWORD use32 PUBLIC 'BSS'
_BSS    ENDS
DGROUP  GROUP   CONST, _BSS, _DATA
        ASSUME DS: DGROUP, SS: DGROUP _DATA   SEGMENT
INCLUDE INF_DATA.inc            ;EXTERNDEF's and EQU's
_DATA   ENDS

_ADAM   SEGMENT
ASSUME CS:_ADAM,DS:_DATA

INCLUDE INF_MAC.inc             ;code MACRO's track = 3                       ;used in MACRO's

PUBLIC SETUP_JOINS

SETUP_JOINS:                    ;main entry

; Some preparatory super-join calculations:

rc      = 0             ;not used in case 01, must be 0
        s       = 0             ;index on symmetries
        REPEAT  4               ;index on symmetries  s = 0-3

;       START of items computed in all four  symmetries but only one row/col.

super_join   12
        stoQ    ,join_12_back
        stoQ    b,join_12_forwd super_join   13
        stoQ    ,join_13_back
        stoQ    b,join_13_forwd super_join   14
        stoQ    ,join_14_back
        stoQ    b,join_14_forwd super_join   21
        stoQ    ,join_21_back
        stoQ    b,join_21_forwd super_join   22
        stoQ    ,join_22_back
        stoQ    b,join_22_forwd super_join   23
        stoQ    ,join_23_back
        stoQ    b,join_23_forwd super_join   24
        stoQ    ,join_24_back
        stoQ    b,join_24_forwd super_join   32
        stoQ    ,join_32_back
        stoQ    b,join_32_forwd super_join   33
        stoQ    ,join_33_back
        stoQ    b,join_33_forwd super_join   34
        stoQ    ,join_34_back           ;*Color*
        stoQ    b,join_34_forwd                 ;*Color*

;       join_44_forwd,back  created by EQU's from join_34_forwd,back

; Additional super-join's computed by in-line code:

; NEARVERT      04                      03
```

XLI CORPORATION - CONFIDENTIAL
INF_SET.ASM PAGE 2

```
; NEAR_45A      01 (line 151)           00,11 (line 167)
; NEARHORZ      31,30 (line 121)
; SPLITCELL     none
; NEAR_45B      07 (line 134)

s       = s + 1         ;complete these stored joins in all 4 symmetries.
        ENDM                    ; index on s = 0-3

RET                     ;end of SETUP_JOINS
%OUT
%OUT    End of inf_set.asm (SETUP_JOINS)

_ADAM ENDS
    END
```

XLI CORPORATION - CONFIDENTIAL
INF_SPLT.ASM  PAGE 1

```
        .486            ; switched to 486 to allow BWSAP instruction: 12/3/95

_TEXT   SEGMENT DWORD use32 PUBLIC 'CODE'
_TEXT   ENDS
_ADAM   SEGMENT DWORD use32 PUBLIC 'CODE'
_ADAM   ENDS
_DATA   SEGMENT DWORD use32 PUBLIC 'DATA'
_DATA   ENDS
CONST   SEGMENT DWORD use32 PUBLIC 'CONST'
CONST   ENDS
_BSS    SEGMENT DWORD use32 PUBLIC 'BSS'
_BSS    ENDS
 DGROUP  GROUP   CONST, _BSS, _DATA
        ASSUME DS: DGROUP, SS: DGROUP _DATA SEGMENT
INCLUDE INF_DATA.inc            ;EXTERNDEF's and EQU's
_DATA ENDS

_ADAM  SEGMENT
ASSUME CS:_ADAM,DS:_DATA

INCLUDE INF_MAC.inc     ;code MACRO's track = 3               ;used in MACRO's

PUBLIC DO_SPLTCELL

DO_SPLTCELL:                    ;main entry

; ******* START OF MATERIAL COPIED FROM SPLTCELL.VHD  11/2/95 *************

; NOTE: SPLITCELL requires data computed in HORIZONTAL and NEAR_45A

; 3/6/95 case 56 moved from splitcell to NEARVERT for precedence reasons.
; 5/15/96 column 1 expanded to cover (by overwrite) certain former case 99's
; 5/25/96 column 0 added: cases 57,60,64,69

;prered(n)      <= h(80*n+45);
;   red(n)      <= (NOT color(n) AND prered(n)) OR (color(n) AND prered(3-n));

;row2_right(n)  <= (v(81*n+33)  OR v(81*n+42)) AND
;                  NOT v(81*n+32) AND h(80*n+35)  AND h(80*n+36) AND v(81*n+40);

;row3_right(n)  <= (v(81*n+34)  OR     v(81*n+43)) AND
;                  NOT v(81*n+32) AND NOT v(81*n+33) AND h(80*n+35) AND h(80*n+36) AND
;                      h(80*n+37) AND     v(81*n+40);

;row4_right(n)  <= (v(81*n+35) OR      v(81*n+44)) AND (NOT h(80*n+34) OR NOT h(80*n+45)) AND
;                  NOT v(81*n+32) AND NOT v(81*n+33)  AND  NOT v(81*n+34) AND
;                      h(80*n+35) AND     h(80*n+36)  AND h(80*n+37) AND h(80*n+38) AND v(81*n+40);

;row5_right(n)  <= NOT v(81*n+32) AND NOT v(81*n+33) AND NOT v(81*n+34) AND NOT v(81*n+35)
;                  AND h(80*n+35) AND     h(80*n+36) AND h(80*n+37) AND h(80*n+38) AND h(80*n+39) AND v(81*n+40);

;col1_blue(n)   <= NOT h(80*n+24) AND h(80*n+25) AND v(81*n+22);

rc      = 0
        s       = 0
        REPEAT  4                       ;loop on four symmetries
; Setup the cross-thru conditions:

movQ            ,join_44_back
        movQ    b,join_34_back
        notQ
        notQ    b
        andQ            ,join_34_forwd
        andQ    b,join_44_forwd
        stoQ            ,temporary_hold    ; A-side cross-thru's
        stoQ    b,temporary_hold2          ; B-side cross-thru's rr = 0
        REPEAT  4                          ;cols 2,3,4,5

IFE     rr EQ 0                    ; first pass: carrying the cross-thru's
        movQ            ,temporary_hold
        movQ    b,temporary_hold2
        ENDIF                              ; rr = 1,2,3 s = 3 - s                          ; 180 degree
        andQ            ,Hrow&rr+2!_rightsB ; becomes A-side. Data from HORIZONTAL
        andQ    b,Hrow&rr+2!_rightsA       ; becomes B-side  Data from HORIZONTAL
```

XLI CORPORATION - CONFIDENTIAL
INF_SPLT.ASM                                                                                                          PAGE 2

```
        s = 3 - s                       ; restore
        andQ     ,v,40
        andQ    b,v,40 stoQ     ,Scol%rr+2!_leftsA
        stoQ    b,Scol%rr+2!_leftsB rr = rr + 1
        ENDM                            ; rr = 0-3, cols 2-5

; Now col. 1:     [rc = 0]

movQ    ,h,24
        orQ     ,v,30                   ;*Color*
        orQ     ,v,31                   ;*Color*
        orQ     ,NOT_h,25
        orQ     ,NOT_h,26               ; added 5/21/96 length 2 req'd
        orQ     ,NOT_v,22               ;NOT coll_blue formed, an A-side feature ;coll_left(n)  <=    ((color(n) AND NOT v(81*n+31))             -- color term
;                OR (NOT color(n) AND NOT v(81*n+48) AND NOT v(81*n+49)))  -- no color term
;                AND  h(80*n+44) AND    v(81*n+39)              -- fixed edges
;                AND NOT coll_blue(n);                          -- excl.small crossbars andQ     ,v,40                  ;common to all [A,B-side] coll lefts
        andQ     ,h,44
        andQ     ,v,39 s = s XOR 2
        movQ    b,jag1_topleftA         ; this para: pseudo-99 override 5/15/96
        s = s XOR 2                     ; from 45A
        andQ    b,v,57
        andQ    b,not_h,53              ; A-side X orQ                             ; pseudo-99 in
        andQ     ,temporary_hold        ; has join_33,34 conditions: A-side
        stoQ     ,Scol1_leftsA          ; carried forward movQ    b,v,40                  ;common to all [A,B-side] coll lefts
        andQ    b,h,44
        andQ    b,v,39
        andQ    b,not_v,48              ; "a"

s = s XOR 2                     ; this para: pseudo-99 override 5/15/96
        movQ     ,jag1_topleftB         ; from 45A
        s = s XOR 2
        andQ     ,v,57
        andQ     ,not_h,54              ; B-side X orQ     b                       ; pseudo-99 in
        andQ    b,temporary_hold2       ; has join_33,34 conditions: B-side
        stoQ    b,Scol1_leftsB ; Compute col0 lefts:
; **************** code adapted from HORIZONTAL reds, greens: ***********

;***************** code brought in from NEARVERT, and substituted appropriately: ******
;       rr = -1                         ; to get column 0 movQ     ,join_34_back
        movQ    b,join_34_forwd         ;no sense in computing these again notQ
        stoQ     ,temporary_hold        ;NOT join_(33-rr)_back
        stoQ    b,temporary_hold2 ;     join_(33-rr)_forwd s = s + 1
        ENDM                            ; end and restart to have all sym's avail.

rc = 0
        rr = -1                         ; to get column 0
        s = 0
        REPEAT 4                        ;s = 0-3 s = s XOR 2                     ; updown mirror
        movQ     ,temporary_hold        ;NOT join_(33-rr)_back
        notQ
        movQ    b,temporary_hold2 ;     join_(33-rr)_forwd
        s = s XOR 2                     ; restore notQ    b
        stoQ    b,temporary_hold3 ;NOT join_(43-rr)_back
        stoQ     ,temporary_hold4 ;     join_(43-rr)_forwd
```

XLI CORPORATION - CONFIDENTIAL
INF_SPLT.ASM                                                                                       PAGE 3

```
        movQ        ,join_24_back
        notQ
        andQ    ,h,24-rr            ; v41,v50 = RED_top_vts
        andQ    ,h,25-rr
        andQ    ,v,30-rr            ; more red terms.
;       andQ    ,h,33-rr            ; for clarity only: redundant ;       orQ                         ; combine red and black tops. SPLITCELL: red only ; * try to OR in here, from NV, red hit absent* all L/R reversed movQ    b,join_33_back      ;super_join 35; ,forwd Pii
        notQ    b
        andQ    b,v,39              ; v41,v50 = RED_top_vts andQ    b,v,48              ; was v50
        andQ    b,h,34              ; more red terms.
;       andQ    b,v,31              ; for clarity only: redundant ;       andQ    b,Vcol3_eqB  ; only use
        andQ    b,h,35              ; black top jag redundant??
;       andQ    b,v,40              ;Vcol*rc+3!_topB_vt_vwXes ; col. 3 : v40 only
                                    ; v40 redundant
;       andQ    b,join_34_forwd ;   = join_34_back, redundant ; * try to OR in above, from NV, red hit absent* notQ    b                   ; red vertical hit absent

; SPLITCELL: additional red terms: vert.length two (case 06) only orQ     b,h,54              ; 'v'
        orQ     b,not_v,58          ; not 'w'
        andQ                        ; and the sum in andQ    ,not_h,44           ; to preclude 45
        andQ    ,v,49

; end of red terms movQ    b,v,39-rr           ; black top jag
        andQ    b,temporary_hold2   ;   join_(33-rr)_forwd
        andQ    b,temporary_hold3   ;NOT join_(43-rr)_back
        andQ
        stoQ    ,Scol*rr+1!_leftsA  ; left pieces complete, side A (top)

; compute lefts B-side:  *Color*   (B-side means BOTTOM of edge clear)

; Now to compute the thin GREEN tops, equations first:

; remember:  rr = -1
        s = 3-s                     ; 180 rotate
        movQ    ,join_23_back
        s = 3-s                     ; 180 rotate restore
        notQ                        ; NOT join_(54-rr)_back formed andQ    ,v,48-rr            ; green fixed top terms:
        andQ    ,v,49-rr
        andQ    ,h,54-rr
        andQ    ,not_h,44-rr        ; b=0 term *Color* andQ    ,h,45-rr
;       andQ    ,h,46-rr            ;_GREEN_top_vts  = v57 times v48
; requiring only length = 1 green top_vts for horizontal.

;       orQ                         ; combine green and black tops
; green only in Splitcell ; Now, multiplicative factors formed in <b> that apply to both black and green:

movQ    b,temporary_hold    ;NOT join_(33-rr)_back
        andQ    b,v,39-rr           ; required top black jag
        andQ                        ; combine in with green and black tops
        stoQ    ,Scol*rr+1!_leftsB  ; left pieces complete ; * <b> hold used for add'l case 06 term in NEARVERT. Not currently used in Horz.

;********** end of code brought in from NEARVERT, and substituted appropriately ****
;***************** end of code adapted from HORIZONTAL reds, greens *********** s       = s + 1
        ENDM                        ;close and reopen four symmetries
        s       = 0                 ;for cross-symmetry availability of cols
        REPEAT  4
```

XLI CORPORATION - CONFIDENTIAL
INF_SPLT.ASM   PAGE 4

```
; Now to assemble the cases themselves:
        movQ        b,Scol0_leftsB
        movQ         ,Scol0_leftsA
        andQ        b,Hrow2_rightsB
        andQ         ,Hrow2_rightsA
        orQ                                 ;combine A and B-sides
        CASE_IS 57,over movQ        b,Scol1_leftsB
        movQ         ,Scol1_leftsA
        andQ        b,Hrow2_rightsB
        andQ         ,Hrow2_rightsA
        orQ                                 ;combine A and B-sides
        CASE_IS 58,over s       = s + 1
ENDM                                        ;close and reopen four symmetries
s       = 0
REPEAT  4 movQ        b,Scol0_leftsB
        movQ         ,Scol0_leftsA
        andQ        b,Hrow3_rightsB
        andQ         ,Hrow3_rightsA
        orQ                                 ;combine A and B-sides
        CASE_IS 60,over movQ         ,Scol1_leftsA
        movQ        b,Scol1_leftsB
        andQ         ,Hrow3_rightsA
        andQ        b,Hrow3_rightsB
        orQ                                 ;combine A and B-sides
        CASE_IS 61,over movQ         ,Scol2_leftsA
        movQ        b,Scol2_leftsB
        andQ         ,Hrow3_rightsA
        andQ        b,Hrow3_rightsB
        orQ                                 ;combine A and B-sides
        CASE_IS 62,over s       = s + 1
ENDM                                        ;close and reopen four symmetries
s       = 0
REPEAT  4 movQ        b,Scol0_leftsB
        movQ         ,Scol0_leftsA
        andQ        b,Hrow4_rightsB
        andQ         ,Hrow4_rightsA
        orQ                                 ;combine A and B-sides
        CASE_IS 64,over movQ         ,Scol1_leftsA
        movQ        b,Scol1_leftsB
        andQ         ,Hrow4_rightsA
        andQ        b,Hrow4_rightsB
        orQ                                 ;combine A and B-sides
        CASE_IS 65,over movQ         ,Scol2_leftsA
        movQ        b,Scol2_leftsB
        andQ         ,Hrow4_rightsA
        andQ        b,Hrow4_rightsB
        orQ                                 ;combine A and B-sides
        CASE_IS 66,over movQ         ,Scol3_leftsA
        movQ        b,Scol3_leftsB
        andQ         ,Hrow4_rightsA
        andQ        b,Hrow4_rightsB
        orQ                                 ;combine A and B-sides
        CASE_IS 67,over s       = s + 1
ENDM                                        ;close and reopen four symmetries
s       = 0
REPEAT  4 movQ        b,Scol0_leftsB
        movQ         ,Scol0_leftsA
        andQ        b,Hrow5_rightsB
        andQ         ,Hrow5_rightsA
        orQ                                 ;combine A and B-sides
        CASE_IS 69,over
```

XLI CORPORATION - CONFIDENTIAL
INF_SPLT.ASM                                                                PAGE 5
---

```
        movQ    ,Scol1_leftsA
        movQ    b,Scol1_leftsB
        andQ    ,Hrow5_rightsA
        andQ    b,Hrow5_rightsB
        orQ                             ;combine A and B-sides
        CASE_IS 70,over movQ    ,Scol2_leftsA
        movQ    b,Scol2_leftsB
        andQ    ,Hrow5_rightsA
        andQ    b,Hrow5_rightsB
        orQ                             ;combine A and B-sides
        CASE_IS 71,over movQ    ,Scol3_leftsA
        movQ    b,Scol3_leftsB
        andQ    ,Hrow5_rightsA
        andQ    b,Hrow5_rightsB
        orQ                             ;combine A and B-sides
        CASE_IS 72,over movQ    ,Scol4_leftsA
        movQ    b,Scol4_leftsB
        andQ    ,Hrow5_rightsA
        andQ    b,Hrow5_rightsB
        orQ                             ;combine A and B-sides
        CASE_IS 73,over s       = s + 1
        ENDM                            ;close and reopen four symmetries
        s       = 0
        REPEAT  4

IF      s LE 1                          ;following are SS, only computed s=0,1 movQ    ,Scol2_leftsA
        movQ    b,Scol2_leftsB
        andQ    ,Hrow2_rightsA
        andQ    b,Hrow2_rightsB
        orQ                             ;combine A and B-sides
        CASE_IS 59,over movQ    ,Scol3_leftsA
        movQ    b,Scol3_leftsB
        andQ    ,Hrow3_rightsA
        andQ    b,Hrow3_rightsB
        orQ                             ;combine A and B-sides
        CASE_IS 63,over movQ    ,Scol4_leftsA
        movQ    b,Scol4_leftsB
        andQ    ,Hrow4_rightsA
        andQ    b,Hrow4_rightsB
        orQ                             ;combine A and B-sides
        CASE_IS 68,over movQ    ,Scol5_leftsA
        movQ    b,Scol5_leftsB
        andQ    ,Hrow5_rightsA
        andQ    b,Hrow5_rightsB
        orQ                             ;combine A and B-sides
        CASE_IS 74,over                 ;;*Color* "over" added to all cases ENDIF                           ; s = 0,1 s       = s + 1
        ENDM                            ;four symmetries s = 0-3
;c97_fixed(n) <= h(80*n+33) AND h(80*n+34) AND NOT h(80*n+45) AND h(80*n+55) AND
;                v(81*n+29) AND NOT v(81*n+30) AND v(81*n+40) AND v(81*n+49);
;
;c97sym(n)    <= (((NOT h(80*n+56) OR  NOT v(81*n+59)) AND NOT color(n)    -- bottom B
;            AND (NOT v(81*n+20) OR  NOT h(80*n+22)) AND NOT h(80*n+35))   -- top, center B
;             OR (NOT h(80*n+54) AND NOT v(81*n+38) AND     color(n)))     -- the As
;            AND (h(80*n+22) OR      v(81*n+59)) AND c97_fixed(n);

; Form of c97sym: {[e+e)e(e+e)e]+eee}(e+e)eee       e = edge rc      = 0
        s       = 0
        REPEAT 4                        ;beginning of new symmetries loop s = 0-3

;various join conditions added: 5/27/96
```

XLI CORPORATION - CONFIDENTIAL
INF_SPLT.ASM                                                                                  PAGE 6

```
        movQ    b,join_22_forwd         ;forming A side exclusion
        andQ    b,h,22                  ;"+"
        movQ    ,v,59                   ;"+"

s = 3-s                         ; 180 rotate
        andQ    ,join_23_forwd          ; becomes _55_forwd
        orQ     b                       ; combine
        movQ    ,join_23_back           ; becomes _55_back
        s = 3-s                         ; 180 rotate restore orQ     ,NOT_v,59               ;"+"
        orQ     b,join_34_forwd
        notQ    b
        stoQ    b,temporary_hold        ;A-side exclusion movQ    b,join_22_back  ; B
        orQ     b,NOT_H,22      ;"+"
        andQ                            ;combine movQ    b,join_32_forwd ; forming B side in <a> and A side in <b>: (historical accident)

s = s XOR 2             ;updown mirror
                                 orQ    b,join_24_back          ;really join_54_forwd
                                 notQ   b
        andQ                    ;bring in cross-thru suppress: B side
                                 movQ   b,join_24_forwd         ;really join_54_back
        s = s XOR 2             ; restore andQ   b,join_32_back
        andQ    ,NOT_h,45
                                 andQ   b,temporary_hold ;A-side cross-thru ex.
        andQ    ,NOT_v,30
                         andQ    b,not_h,44
        andQ    ,join_34_back
                         andQ    b,not_v,39
                                                                                         andQ
b,not_b,32                      ;should be super-join
        orQ                     ;combine                ; A-side, B-side combine MOVQ    b,H,22          ; the plus condition:
                                ORQ     b,V,59
        andQ                    ;combine in the plus condition ; fixed edges, case 97:
        movQ    b,h,34
        andQ    b,v,40
        andQ    ,v,49
        andQ    b,h,33
        andQ    ,h,55
        andQ    b,v,29
        andQ                            ;bring in interleaved b's CASE_IS 97,over,R,29,over       ;a shifted right case ; c97 complete
        s       = s + 1
        . ENDM                          ;end of symmetries loop  s = 0-3

; ******** END  OF MATERIAL COPIED FROM SPLTCELL.VHD  11/2/95 *************

RET                             ;end of do_spltcell

%OUT
%OUT    End of INF_SPLT.asm (splitcell)

_ADAM ENDS
     END
```

XLI CORPORATION - CONFIDENTIAL
INF_VERT.ASM                                                               PAGE 1

---

```
        .486            ; switched to 486 to allow BWSAP instruction: 12/3/95
_TEXT   SEGMENT DWORD use32 PUBLIC 'CODE'
_TEXT   ENDS
_ADAM   SEGMENT DWORD use32 PUBLIC 'CODE'
_ADAM   ENDS
_DATA   SEGMENT DWORD use32 PUBLIC 'DATA'
_DATA   ENDS
CONST   SEGMENT DWORD use32 PUBLIC 'CONST'
CONST   ENDS
_BSS    SEGMENT DWORD use32 PUBLIC 'BSS'
_BSS    ENDS
DGROUP  GROUP   CONST, _BSS, _DATA
        ASSUME DS: DGROUP, SS: DGROUP _DATA SEGMENT
INCLUDE INF_DATA.inc            ;EXTERNDEF's and EQU's
_DATA ENDS

_ADAM   SEGMENT
ASSUME CS:_ADAM,DS:_DATA

INCLUDE INF_MAC.inc     ;code MACRO's serifs = 1                      ; 1 means exclude purple serifs
blues  = 1                      ; 1 means exclude blue crossbars track = 3               ;used in MACRO's

PUBLIC DO_NEARVERT

DO_NEARVERT:                    ;main entry

;
;********** MATERIAL COPIED FROM NEARVERT.VHD   10/7/95****************

; 5/6/96 Added "M armpit" fix  alc

; 5/30/96 Changing the SERIF (purple) and CROSSBARS (blue) exclusions
; to work as follows:
;
; If The exclusion(s) apply to the A-side (inside of a character), and the
; A-side hits, then both A and B sides are killed.

; Precedance order of hits in NEARVERT: [1/20/96]:

; 01,56,02*,06,97,04,10,05*,07*,11,15,08,16,09*,12*,17,13,14*,18*,21,22,23,24
;                 * two-fold self-symmetric. Others: all four symmetries calculated.

;thin_col7_up_rt_vts(n)    <= v(81*n+32) AND v(81*n+23) AND v(81*n+14) AND v(81*n+05);
;
;thin_row5_RED_bot_vts(n)   <= thin_col7_up_rt_vts(n+2);
;thin_row5_RED_bot_vts(n+2) <= thin_col7_up_rt_vts(n);

;c01sym(n) <= h(80*n+34) AND      h(80*n+44) AND    v(81*n+30) AND    v(81*n+40) AND
;             NOT v(81*n+48) AND ((NOT v(81*n+31) AND NOT v(81*n+49)) OR     color(n)) AND
;             NOT row1_blue(n) AND NOT (h(80*n+42) AND    h(80*n+43) AND NOT v(81*n+38) AND   -- serif exclusion
;             thin_row5_RED_bot_vts(3-n)           AND NOT  color(n) AND                     -- serif verts
;             NOT h(80*n+24)    AND NOT h(80*n+14) AND NOT h(80*n+05));                      -- serif X's ; coding for case 01:

rc       = 0
            s        = 0           ;index on symmetries
            REPEAT   4             ;index on symmetries  s = 0-3

IF blues
              movQ    ,NOT_v,29    ;this paragraph: NOT_row1_blue
              orQ     ,NOT_v,20    ; added 5/21/96: two v's req'd
              orQ     ,NOT_h,32
                orQ      ,h,23     ;  5/30/96: X between two v's
              orQ     ,v,38
              orQ     ,h,33
              stoQ    ,not_row1_blue
            ENDIF IF serifs
              movQ    b,NOT_h,42   ; this paragraph: thin_row5_RED_bot_vts(3-n)
              orQ     b,NOT_h,43   ; forms the purple serif exclusion
              orQ     b,NOT_v,3
              orQ     b,NOT_v,12
              orQ     b,NOT_v,21
```

XLI CORPORATION - CONFIDENTIAL
INF_VERT.ASM                                                                                              PAGE 2

```
        orQ     b,v,38
        orQ     b,h,23          ; the purple X's:
        orQ     b,h,13
        orQ     b,h,3
        orQ     b,h,35          ; 5/30/96: serif must not touch anything
        orQ     b,h,33          ;*Color*  NOT_01_serif now formed
        ELSE
        movQ    b               ; blues in both <a> and <b> if no serifs
        ENDIF IF blues
        andQ    b               ;combine with NOT_row1_blue
        ENDIF
        notQ    b
        stoQ    b,Vcase01_serifs_blues        ;contains junk if neither selected ; A-side clear computation:    ;*Color* Note: blue and serif,above,part of A
        movQ    ,join_34_forwd
        orQ     ,join_44_back
        notQ
        andQ    ,join_33_back   ; A-side formed in <a>

; B-side clear computation:    ; *Color* [s.b. interleaved]

movQ    b,join_33_forwd
        notQ    b
        andQ    b,join_34_back
        andQ    b,join_44_forwd ;New serif,blue logic 5/30/96:

orQ     b                ;*Color* combine A-side and B-side
        andQ    ,Vcase01_serifs_blues   ; multiple by A-side
        notQ                     ; exclude formed
        andQ                     ; bring in <a> or <b>: the case itself andQ    ,h,34            ;this para: case 01 fixed edges
        andQ    ,v,40
        andQ    ,h,44
        andQ    ,NOT_v,48        ; *** OUTSIDE BOTTOM X, an A|B-side asymetry
        andQ    ,v,30

; 5/27/96 split off some former case 01's as case 02's
        movQ    b
        andQ    b,not_v,39
        stoQ    b,temporary_hold2   ;hold for case 02
        andQ    ,v,39            ; the "over" on 02 takes care of this term CASE_IS 01               ;output it.

IF s ge 2                ; other s, 0,1, OR'd into case 02, below
        movQ    ,temporary_hold2
        or      EDX,EDX          ; set zero flag for CASE_IS
        CASE_IS 02,over
        ENDIF s       = s + 1
        ENDM                     ;end of four symmetries loop   s = 0-3

;c56sym(n) <= (v(81*n+32) OR  v(81*n+41)) AND                     -- the "+" condition
;              h(80*n+35) AND v(81*n+39) AND h(80*n+44) AND v(81*n+40)    -- edges present
;              AND ((color(n) AND NOT v(81*n+31)) OR
;                   (NOT color(n) AND NOT v(81*n+49) AND (NOT v(81*n+48) OR (v(81*n+31) AND v(81*n+41)))));

;*Color* version:

rc = 0
        s  = 0
        REPEAT 4                 ; s = 0-3, for low priority defer's
                movQ    ,join_44_back
                movQ    b,join_34_back
                notQ
                notQ    b                                        ; cross-thru suppress.  3/9/96
                                                                 ; cross-thru suppress.  3/9/96
                andQ    ,v,32            ; A-side
                andQ    b,v,41           ; B-side andQ    ,join_34_forwd
                andQ    b,join_44_forwd
                orQ                                              ; combine A- B-sides ;               movQ    b,not_h,34       ; 4/3/96 The old case 56 = condition restored
;               orQ     b,not_h,45
;               andQ                     ; 5/18/96: out again--rely on super_joins
```

XLI CORPORATION - CONFIDENTIAL
INF_VERT.ASM                                                                                             PAGE 3

```
            andQ    ,h,35
            andQ    ,v,39
            andQ    ,v,40
            andQ    ,h,44
            CASE_IS 56,over                ; defer: to exclude its own 180 sym.various 45's s       = s + 1
    ENDM                              ; s = 0-3

; coding for case 02 computed in two symetries (0,1), one row/col rc      = 0

;reg_c02sym(n)     <=         v(81*n+30) AND          v(81*n+40)
;                    AND col3_fixed_tops(n) AND col3_fixed_tops(n+2)
;                    AND NOT    row1_blue(n) AND NOT   row1_blue(n+2)
;                    AND   ((NOT h(80*n+35) AND NOT      h(80*n+45))
;                     OR   (NOT v(81*n+39) AND           color(n)));

; structure of c02: (which is Self-Symmetric)
;       eeyyyy(ee+ee)          e = edge    y = expression
;
; The A-side of case 02 in "a", B-side in "b" :    ;*Color* s       = 0
            REPEAT  2             ; s = 0,1 movQ    b,join_34_back
            movQ    ,join_34_forwd
            andQ    b,join_44_forwd
            orQ     ,join_44_back
            notQ                                                    ; exclude cross-thrus: A side
            andQ    ,not_b,34            ; 3/4/95: the MathBlaster thumb fix.
            andQ    ,not_f,44            ; 3/4/95: the thumb fix.
            stoQ    ,temporary_hold      ; the new end-bar version of 02. 3/7/96 andQ    ,join_33_back
            s = s XOR 2         ;U/D reverse
            andQ    ,join_33_back
            s = s XOR 2         ;U/D restore notQ                                 ; not A-side
            andQ    b                            ; multiply B-side with not-A
            notQ                                 ; restore A-side IF blues
            andQ    ,not_row1_blue
            s       = s XOR 2       ;U/D reverse
            andQ    ,not_row1_blue
            s       = s XOR 2       ;U/D reverse
    ENDIF orQ                          ;combine A- and B-sides
                            movQ    b,temporary_hold
            andQ    ,v,30                      ;this para: the fixed case 02 edges
                            andQ    b,h,33
            andQ    ,v,48
                            andQ    b,h,43
                            andQ    b,not_v,39
            orQ                                  ;bring in new end-bar version 02
                ;combine in the new 02 bar case 3/7/96
            andQ    ,v,40
            andQ    ,h,34
            andQ    ,h,44 orQ     ,temporary_hold2     ;some case 01's moved to here

CASE_IS 02,over s       = 1           ; end L/R self-symmetric loop, rc = 0  s = 0,1
    ENDM                          ; s = 0,1

; case 03 computation:   3/1/96
            rc      = 0
            s       = 0
            REPEAT  4                 ;beginning of new symmetries loop s = 0-3 movQ    ,join_34_forwd
            orQ     ,join_33_back
            notQ andQ    ,h,34
            andQ    ,not_h,44
            andQ    ,v,40
            andQ    ,v,49
```

XLI CORPORATION - CONFIDENTIAL
INF_VERT.ASM                                                                       PAGE 4

```
           CASE_IS  03,defer           ; defer for possible 02 conflict?

s       = s + 1
        ENDM                                                    ; s = 0-3

;col3_top_verts(n)    <= v(81*n+40);
;col4_top_verts(n)    <= v(81*n+40) AND v(81*n+31);
;col5_top_verts(n)    <= v(81*n+40) AND v(81*n+31) AND v(81*n+22);
;col6_top_verts(n)    <= v(81*n+40) AND v(81*n+31) AND v(81*n+22) AND v(81*n+13);
;
        rc      = 0                    ; redundant ;col4_top_Xes(n)      <= NOT h(80*n+34);
;col5_top_Xes(n)      <= NOT h(80*n+34) AND NOT h(80*n+24);
;col6_top_Xes(n)      <= NOT h(80*n+34) AND NOT h(80*n+24) AND NOT h(80*n+14);

;row5_bot_verts(n)    <= v(81*n+49) AND v(81*n+58) AND v(81*n+67) AND v(81*n+76);
;row5_bot_Xes(n)      <= NOT h(80*n+45) AND NOT h(80*n+55) AND
;                         NOT h(80*n+65) AND NOT h(80*n+75);

;row5_bot_pluses(n)   <= '1';
;row5_BLACK_BOTS(n)   <= row5_bot_verts(n) AND row5_bot_Xes(n) AND row5_bot_pluses(n);
;

; compute vTOPA_vt_vwXes:      ;*Color*
        s       = 0            ;index on       symmetries
        REPEAT  4              ;index on four symmetries  s = 0-3 rc      = 0
        REPEAT  4              ; rc 0-3              representing cols 4-7

IF rc EQ 0
            movQ    ,v,40                              ; all must have center bar
        ENDIF andQ    ,not_h,34
            andQ    ,v,31

IF rc EQ 3                             ;no v,w on last row
            stoQ    ,Vcol&rc+4!_topA_vt_vwXes
        ELSE
            movQ    b,not_v,22                 ; "w"
            orQ     b,h,24                     ; "v"
            andQ    b                          ; combine in ; Note: the v,w term above is always "1" when used as a TOP, intended for
; use as bottom also where it matters. The logic that it is always "1" when a
; top is subtle.
            stoQ    b,Vcol&rc+4!_topA_vt_vwXes ; now includes v40   2/15/96
        ENDIF rc      = rc + 1        ; must loop: data in 'a'
        ENDM                    ; on rc = 0-3 s       = s + 1
        ENDM                    ;index  on s = 0-3

;NOTE: the vt_vwXes are used as Vrow?_bots[A|B]  ? = 2-5
; later in NearVert and by NEAR45A through EQU's ;row2_bot_pluses(n)   <= h(80*n+54) OR h(80*n+55);
;row3_bot_pluses(n)   <= h(80*n+64) OR h(80*n+65);
;row4_bot_pluses(n)   <= h(80*n+74) OR h(80*n+75);

;row2_BLACK_BOTS(n)   <= row2_bot_verts(n) AND row2_bot_Xes(n) AND row2_bot_pluses(n);
;row3_BLACK_BOTS(n)   <= row3_bot_verts(n) AND row3_bot_Xes(n) AND row3_bot_pluses(n);
;row4_BLACK_BOTS(n)   <= row4_bot_verts(n) AND row4_bot_Xes(n) AND row4_bot_pluses(n);

; Start of items computed in all 4 symmetries and 4 rows or 4 columns s       = 0             ;index on symmetries
        REPEAT  4               ;index on symmetries ; Beginning of forming TOPS for column 3-6, NEARVERT.

rc      = 0             ;column loop 3-6
        REPEAT  4               ;column loop 3-6

IF rc eq 0
            movQ    ,join_34_back
            movQ    b,join_34_forwd
        ENDIF
        IF rc eq 1
            movQ    ,join_24_back
            movQ    b,join_24_forwd
        ENDIF
```

XL1 CORPORATION - CONFIDENTIAL
INF_VERT.ASM                                                                                     PAGE 5
_____

```
        IF rc eq 2
            movQ       ,join_14_back
            movQ      b,join_14_forwd
        ENDIF
        IF rc eq 3
            super_join       34         ;becomes super_join 04 with rc indexing
        ENDIF notQ      b
            stoQ      b,temporary_hold   ;NOT join_(34-10rc)_forwd
            stoQ       ,temporary_hold2 ;   join_(34-10rc)_back IF rc eq 0
            movQ       ,join_33_back
            movQ      b,join_33_forwd
        ENDIF
        IF rc eq 1
            movQ       ,join_23_back
            movQ      b,join_23_forwd
        ENDIF
        IF rc eq 2
            movQ       ,join_13_back
            movQ      b,join_13_forwd
        ENDIF
        IF rc eq 3
            super_join       33         ; becomes super_join 03 with rc indexing
        ENDIF notQ      b
            stoQ      b,temporary_hold3 ;NOT join_(33-10rc)_forwd
            stoQ       ,temporary_hold4 ;   join_(33-10rc)_back ;col5_serif(n) <= color(n) AND h(80*n+04) AND h(80*n+05) AND h(80*n+06)
;              AND v(81*n+12) AND NOT v(81*n+13) AND NOT v(81*n+14);
;col4_serif(n) <= color(n) AND h(80*n+14) AND h(80*n+15) AND h(80*n+16)
;              AND v(81*n+21) AND NOT v(81*n+22) AND NOT v(81*n+23);
;col3_serif(n) <= color(n) AND h(80*n+24) AND h(80*n+25) AND h(80*n+26)
;              AND v(81*n+30) AND NOT v(81*n+31) AND NOT v(81*n+32);

IF serifs
        IFE rc eq 3                     ; no col. 6 serifs
            movQ      b,NOT_h,24        ;use only to exclude B-side
            orQ       b,NOT_h,25
            orQ       b,NOT_h,26
            orQ       b,NOT_v,30
            orQ       b,v,31
            orQ       b,v,32
            orQ       b,h,33            ; 5/30/96 require serif not touch anything
            stoQ      b,Vnot_col%rc+3!_serif
        ENDIF                            ; exclude rc = 3
        ENDIF                            ; if serifs ; ******** start of main NEARVERT computation: *********************
; (we are in s = 0-3, rc = 0-3 loops)

;thin_col3_RED_top_vts(n) <= v(81*n+41) AND v(81*n+50);
;thin_col4_RED_top_vts(n) <= v(81*n+32) AND v(81*n+41);
;thin_col5_RED_top_vts(n) <= v(81*n+23) AND v(81*n+32);
;thin_col6_RED_top_vts(n) <= v(81*n+14) AND v(81*n+23);

;col3_eq(n)  <=  NOT h(80*n+23) OR NOT v(81*n+20)  OR  NOT v(81*n+30)
;             OR ((h(80*n+35) OR   h(80*n+24)) AND  -- this line: The ! B's condition
;                 (h(80*n+33) OR   h(80*n+22)));    -- this line: The ! A's condition ; These col. 3 equations are to exclude NEAR_45 hits (cases 80-95)

IF rc EQ 0                      ; col 3 equations, color versions:
            movQ       ,join_23_back
            andq      ,h,23
            andq      ,v,20
            notQ
            orQ        ,join_22_forwd
            stoQ       ,Vcol3_eqB       ; B-side equation formed ;*Color* movQ       ,join_22_back
            andq      ,h,23
            andq      ,v,20
            notQ
            orQ        ,join_23_forwd
            stoQ       ,Vcol3_eqA       ; A-side equation formed ;*Color*
        ENDIF s = s XOR 1                 ; LR Mirror
```

XLI CORPORATION - CONFIDENTIAL
INF_VERT.ASM PAGE 6

```
        IF  rc eq 0
            movQ    ,join_33_back   ; is _35_forwd
        ENDIF
        IF  rc eq 1
            movQ    ,join_23_back   ; is _25_forwd
        ENDIF
        IF  rc eq 2
            movQ    ,join_13_back   ; is _15_forwd
        ENDIF
            s = s XOR 1              ; LR Mirror restore IFE rc EQ 3                  ; append to each of the above
            notQ
            andQ    ,v,41            ; v41,v50 = RED_top_vts
        ELSE
            movQ    ,v,41            ; red top verticals, rc= 3
        ENDIF andQ    ,v,50
        andQ    ,h,35                ; more red terms.
;       andQ    ,v,31                ; for clarity only: redundant
;NOT_COLi_blue computation:
; (we are in s = 0-3, rc = 0-3 loops)

;col3_blue(n) <= v(81*n+41) AND h(80*n+36) AND NOT v(81*n+32);
;col4_blue(n) <= v(81*n+32) AND h(80*n+26) AND NOT v(81*n+23);
;col5_blue(n) <= v(81*n+23) AND h(80*n+16) AND NOT v(81*n+14);
;col6_blue(n) <= v(81*n+14) AND h(80*n+06) AND NOT v(81*n+05);

IF blues
            movq    b,not_v,41
            orq     b,not_v,50       ; added 5/21/96: req's length 2 opposite.
            orq     b,not_h,36
            orQ     b,h,45           ; 5/30/96: the X between two v's
            orQ     b,v,31
            orq     b,v,32
            andQ    b,v,30           ; a black top condition, the new bar 3/1/96
        ELSE
            movQ    b,v,30           ; a black top condition, the new bar 3/1/96
        ENDIF                        ; blues stoQ    b,Vnot_coli_blue; different for each rc.
            andQ    b,temporary_hold3   ; = NOT join_(33-10rc)_forwd
                                        ; black tops in <b>
            orQ                         ; combine red and black tops IF  rc EQ 0                  ; col 3 *Color*
            movQ    b,Vcol3_eqB      ; only use
            andQ    b,h,34           ; black top jag
        ELSE
            movQ    b,h,34           ; black top jag
        ENDIF ;thin_col3_RED_jags(n) <= h(80*n+35) AND NOT v(81*n+32) AND NOT v(81*n+30);
;thin_col4_RED_jags(n) <= h(80*n+25) AND NOT v(81*n+23);
;thin_col5_RED_jags(n) <= h(80*n+15) AND NOT v(81*n+14);
;thin_col6_RED_jags(n) <= h(80*n+05) AND NOT v(81*n+05);
;
;thin_col3_RED_TOPS(n) <= thin_col3_RED_jags(n) AND thin_col3_RED_top_vts(n) AND color(n);
;thin_col4_RED_TOPS(n) <= thin_col4_RED_jags(n) AND thin_col4_RED_top_vts(n) AND color(n);
;thin_col5_RED_TOPS(n) <= thin_col5_RED_jags(n) AND thin_col5_RED_top_vts(n) AND color(n);
;thin_col6_RED_TOPS(n) <= thin_col6_RED_jags(n) AND thin_col6_RED_top_vts(n) AND color(n);
; (we are in s = 0-3, rc = 0-3 loops)

andQ    b,Vcol\rc+3!_topB_vt_vwXes  ; col. 3 : v40 only andQ    b,temporary_hold2   ;   = join_34_back, with rc indexing: 34,24,14

IF  rc LE 1
            stoQ    b,temporary_hold2   ; for "M armpit" use
        ENDIF ;           andQ    b,temporary_hold3   ; = NOT join_(33-10rc)_forwd
                                        ; moved to black only,not red,5/24/96
            andQ
            stoQ    ,Vcol\rc+3!_topsB ; Additional term for case 06,07,10, a more stringent blue crossbars exclusion
; This was added to prevent the "M" crotch being detected as a false crossbar
; and hence unsmoothed.

IF  rc LE 1                  ; col. 3,4
            andQ    b,v,30           ; black condition
            andQ    b,not_h,24       ; add'l blue crossbars factor
            andQ    b,temporary_hold3   ; = NOT join_(33-10rc)_forwd
```

XLI CORPORATION - CONFIDENTIAL
INF_VERT.ASM                                                                                                   PAGE 7

```
                orQ                                   ; bring in with common factors
; The "M armpit" fix:  (case 6,7,10)
                movQ    b,temporary_hold3     ; is NOT join_(33-10rc)_forwd
                notQ    b
                andQ    b,temporary_hold2     ; from several lines above.
                andQ    b,v,39
                ENDIF                                 ; col. 3,4

IF      rc EQ 0               ; col. 3, cases 06,10
                stoQ    ,Vcase06_topB         ; partial; a temp. hold, incl's red hits
                movQ                          ; copy <b> into <a> to distinq.06,10 andQ    ,v,59                 ; for case06 use
                andQ    b,v,68                ; case 10 moved to here: 5/21/96 s = 3-s                       ;rotate 180
                andQ    ,join_23_back         ; becomes join_55_back when unrotated
                andQ    b,join_13_back        ; becomes join_65_back when unrotated
                s = 3-s                       ;rotate 180 restore notQ                          ; invert logic <a>
                notQ    b                     ; invert logic <b>
                s = s XOR 2                   ;UD reverse
                orQ     ,join_24_back         ; becomes AND NOT join_54_forwd
                orQ     b,join_14_back        ; becomes AND NOT join_64_forwd
                s = s XOR 2                   ;UD reverse restore
                notQ                          ; restore logic     <a>
                notQ    b                     ; restore logic     <b> orQ     ,Vcase06_topB
                orQ     b,Vcase06_topB
                stoQ    ,Vcase06_topB
                stoQ    b,Vcase10_topB
                ENDIF                                 ; col. 3

IF      rc EQ 1               ; col. 4 (doing case 07 tops)
                andQ    b,v,68 s = 3-s                       ;rotate 180
                andQ    b,join_23_back        ; becomes join_(65-10rc)_back
                s = 3-s                       ;rotate 180 restore notQ    b                     ; invert logic <b>
                s = s XOR 2                   ;UD reverse
                orQ     b,join_24_back        ; becomes AND NOT join_(64-10rc)_forwd
                s = s XOR 2                   ;UD reverse restore
                notQ    b                     ; restore logic     <b> orQ                           ; bring in regular 07 tops.
                stoQ    ,Vcase07_topB
                ENDIF                                 ; col 4

; compute tops A-side:   *Color*    (A-side means LEFT of edge clear)

; Now to compute the thin GREEN tops, equations first:
; (we are in s = 0-3, rc = 0-3 loops)

;thin_col3_GREEN_eqs(n)   <=  (NOT v(81*n+31) OR color(n)) AND NOT v(81*n+30);
;thin_col4_GREEN_eqs(n)   <=  NOT v(81*n+22) OR color(n);
;thin_col5_GREEN_eqs(n)   <=  NOT v(81*n+13) OR color(n);
;thin_col6_GREEN_eqs(n)   <=  NOT v(81*n+04) OR color(n);

;thin_col3_GREEN_preTOPS(n)  <= h(80*n+33) AND h(80*n+43) and v(81*n+38) AND thin_col3_GREEN_top_vts(n);
;thin_col4_GREEN_preTOPS(n)  <= h(80*n+23) AND h(80*n+33) and v(81*n+29) AND thin_col4_GREEN_top_vts(n);
;thin_col5_GREEN_preTOPS(n)  <= h(80*n+13) AND h(80*n+23) and v(81*n+20) AND thin_col5_GREEN_top_vts(n);
;thin_col6_GREEN_preTOPS(n)  <= h(80*n+03) AND h(80*n+13) and v(81*n+11) AND thin_col6_GREEN_top_vts(n);

IF rc eq 0
                s = s XOR 2                   ; U/D mirror
                movQ    b,join_32_back        ; becomes _42_forwd
                s = s XOR 2                   ; U/D mirror restore
                ENDIF
                IF rc eq 1
                movQ    b,join_32_forwd       ;condition added 5/24/96
                ENDIF
                IF rc eq 2
                movQ    b,join_22_forwd       ;condition added 5/24/96
                ENDIF
                IF rc eq 3
                movQ    b,join_12_forwd       ;condition added 5/24/96
                ENDIF notQ    b                     ; NOT join_(42-10rc)_forwd
                andQ    b,h,33                ; green fixed top terms:
```

XLI CORPORATION - CONFIDENTIAL
INF_VERT.ASM                                                                                                      PAGE 8

```
        andQ    b,h,43
        andQ    b,v,38
        andQ    b,not_v,39           ; b=0 term *Color* andQ    b,v,57               ;_GREEN_top_vts    = v57 times v48
        andQ    b,v,48
        andQ    b,not_h,54           ; X between v57,v48. 6/3/96 movQ    ,temporary_hold4     ; contains join_33,back rc-indexed
IF rc eq 0                           ; col. 3
        andQ    ,Vcol3_eqA           ; has NOT join-22-back in it.
ENDIF                                ; col. 3
        andQ    ,Vnot_coli_blue      ; includes v30, effectively BLACK_tops
        orQ                          ; combine green and black tops ; Now, multiplicative factors formed in <b> that apply to both black and green:

movQ    b,temporary_hold     ; NOT join_(34-10rc)_forwd andQ    b,h,34                               ; required top black jag
        andQ    b,Vcol*rc+3!_topA_vt_vwXes  ; col3: is v40 only. Hold in <b>
                                                     ; for use below.
        andQ                                         ; combine in with green and black tops
        stoQ    ,Vcol*rc+3!_topsA    ; side A tops complete ; holding common factors in <b>.
; Additional term for case 06, a more stringent, less exclusive, blue crossbars exclusion
; This logic also inadequately excludes 45A now, requires use of precedence.

IF      rc LE 1              ; col. 3,4
        stoQ    b,temporary_hold
        andQ    b,temporary_hold4    ; = join_(33-10rc)_back
        andQ    b,v,30               ; black condition
        andQ    b,not_h,24           ; add'l blue crossbars factor
        orQ                          ; OR in the term.

; The "M armpit" fix, side A:  (case 6,7,10)

movQ    b,temporary_hold
        andQ    b,v,39
        ENDIF                        ; col. 3,4

IF      rc EQ 0              ; col. 3, cases 06,10
        stoQ    ,Vcase06_topA        ; partial: a temp. hold, incl's red hits
        movQ                         ; copy <b> into <a> to distinq.06,10 andQ    ,v,59
        andQ    b,v,68 s = s XOR 2                  ;U/d mirror
        andQ    ,join_24_forwd       ; becomes join__54_back
        andQ    b,join_14_forwd      ; becomes join__64_back
        s = s XOR 2                  ;U/d mirror restore notQ                         ; invert logic <a>
        notQ    b                    ; invert logic <b>
        s = 3-s                      ;rotate 180
        orQ     ,join_23_forwd       ; becomes AND NOT join_55_forwd
        orQ     b,join_13_forwd      ; becomes AND NOT join_65_forwd
        s = 3-s                      ;rotate 180 restore
        notQ                         ; invert logic <a>
        notQ    b                    ; invert logic <b> orQ     ,Vcase06_topA
        orQ     b,Vcase06_topA
        stoQ    ,Vcase06_topA
        stoQ    b,Vcase10_topA
        ENDIF                        ; col. 3

IF      rc EQ 1              ; col. 4
        andQ    b,v,68 s = s XOR 2                  ;U/d mirror
        andQ    b,join_24_forwd      ; becomes join_(64-10rc)_back
        s = s XOR 2                  ;U/d mirror restore notQ    b                    ; invert logic <b>
        s = 3-s                      ;rotate 180
        orQ     b,join_23_forwd      ; becomes AND NOT join_(65-10rc)_forwd
        s = 3-s                      ;rotate 180 restore
        notQ    b                    ; invert logic <b> orQ                          ; bring in ordinary case 07 tops
        stoQ    ,Vcase07_topA
        ENDIF                        ; col 4

; End of items computed in all four  symmetries and four row/cols
```

XLI CORPORATION - CONFIDENTIAL
INF_VERT.ASM                                                                                                                    PAGE 9

```
        rc      = rc + 1        ;index columns 3-6
        ENDM s       = s + 1
        ENDM                    ;end of symmetries loop  s = 0 3

;thin_col3_GREEN_TOPS(n) <= thin_col3_GREEN_preTOPS(n) AND thin_col3_GREEN_eqs(n);
;thin_col4_GREEN_TOPS(n) <= thin_col4_GREEN_preTOPS(n) AND thin_col4_GREEN_eqs(n);
;thin_col5_GREEN_TOPS(n) <= thin_col5_GREEN_preTOPS(n) AND thin_col5_GREEN_eqs(n);
;thin_col6_GREEN_TOPS(n) <= thin_col6_GREEN_preTOPS(n) AND thin_col6_GREEN_eqs(n);
;
;col3_abc(n) <= ((NOT v(81*n+31) AND v(81*n+30)) OR ((v(81*n+30) OR v(81*n+39)) AND color(n))) AND col3_eq(n);
;col4_abc(n) <=  (NOT v(81*n+22) AND v(81*n+21)) OR ((v(81*n+21) OR v(81*n+30)) AND color(n));
;col5_abc(n) <=  (NOT v(81*n+13) AND v(81*n+12)) OR ((v(81*n+12) OR v(81*n+21)) AND color(n));
;col6_abc(n) <=  (NOT v(81*n+04) AND v(81*n+03)) OR ((v(81*n+03) OR v(81*n+12)) AND color(n));

;col3_TOPS(n) <= col3_fixed_tops(n) AND (thin_col3_RED_TOPS(n) OR thin_col3_GREEN_TOPS(n) OR  col3_abc(n));
;col4_TOPS(n) <= col4_fixed_tops(n) AND (thin_col4_RED_TOPS(n) OR thin_col4_GREEN_TOPS(n) OR  col4_abc(n));
;col5_TOPS(n) <= col5_fixed_tops(n) AND (thin_col5_RED_TOPS(n) OR thin_col5_GREEN_TOPS(n) OR  col5_abc(n))
;               AND NOT col5_serif(n);
;col6_TOPS(n) <= col6_fixed_tops(n) AND (thin_col6_RED_TOPS(n) OR thin_col6_GREEN_TOPS(n) OR  col6_abc(n));

;col3_fixed_tops(n) <= h(80*n+34) AND col3_top_verts(n);
;col4_fixed_tops(n) <= h(80*n+24) AND col4_top_verts(n) AND col4_top_Xes(n);
;col5_fixed_tops(n) <= h(80*n+14) AND col5_top_verts(n) AND col5_top_Xes(n);
;col6_fixed_tops(n) <= h(80*n+04) AND col6_top_verts(n) AND col6_top_Xes(n);
;

; We reopen the symmetries loop to allow sequential exclusion:

rc      = 0
        s       = 0
        REPEAT  4               ;beginning of new symmetries loop s = 0-3

; Note: NOT_coli_blues, below, have already been included in coli_TOPS

;reg_c06sym(n) <= col3_TOPS(n) AND row2_BLACK_BOTS(n) AND NOT col3_blue(n) AND NOT c97sym(n);
;reg_c04sym(n) <= col4_TOPS(n) AND row2_BLACK_BOTS(n) AND NOT col4_blue(n);
;reg_c10sym(n) <= col3_TOPS(n) AND row3_BLACK_BOTS(n) AND NOT col3_blue(n);

;c04sym(n) <= (reg_c04sym(n)) AND NOT ic05 AND NOT ic07; [handled with 'over']

; Note: "defer" is the mutual exclusivity option in the CASE_IS macro.

movQ    ,Vcase06_topA           ;*Color*   ;special 06 tops
        movQ    b,Vcase06_topB          ;*Color*
        andQ    ,Vrow2_botsA
        andQ    b,Vrow2_botsB
        orQ                             ;*Color*
        CASE_IS 06,over                 ; over: 06 must overwrite 03 s       = s + 1         ;Loop closed,reopened to allow precedance:
        ENDM                    ;    end of old symmetries loop s = 0-3

;CASE 97 moved to NEARVERT from NEAR_45A:
; moved again to SPLITCELL to override 31, 57   5/26/96 s       = 0             ;beginning of new symmetries loop s = 0-3
        REPEAT  4 movQ    ,Vcol4_topsA
        movQ    b,Vcol4_topsB
        andQ    ,Vrow2_botsA
        andQ    b,Vrow2_botsB
        orQ                             ;*Color*
        CASE_IS 04,over                 ; defer: to exclude 05,07 movQ    ,Vcase10_topA           ;*Color*   ;special 10 tops
        movQ    b,Vcase10_topB          ;*Color*
        andQ    ,Vrow3_botsA
        andQ    b,Vrow3_botsB
        orQ
          CASE_IS 10,over s       = s + 1
        ENDM                    ;end of four symmetries loop s = 0-3

; items computed in two symmetries (0,1), one row/col:
;       (self-symmetric cases)

;    c05sym(n)  <= col4_TOPS(n) AND col4_TOPS(n+2);
;reg_c07sym(n)  <= col4_TOPS(n) AND col4_TOPS(3-n);

s       = 0
        rc      = 0
        REPEAT  2                       ; s = 0,1
```

XLI CORPORATION - CONFIDENTIAL
INF_VERT.ASM                                                                          PAGE 10

```
        movQ    ,Vcol4_topsA
        movQ    b,Vcol4_topsB s       = s + 2                 ; flip U/D
        andQ    ,Vcol4_topsA
        andQ    b,Vcol4_topsB
        s       = s - 2                 ;restore
        orQ                             ;combine A-side, B-side
        CASE_IS 05,over movQ    ,Vcase07_topA           ;*Color*    ;special 07 tops
        movQ    b,Vcase07_topB          ;*Color* s       = 3 - s                 ; rotate 180  ;*Color*
        andQ    ,Vcase07_topB           ;*Color*    ;special 07 tops
        andQ    b,Vcase07_topA          ;*Color*
        s       = 3 - s                 ;restore
        orQ                             ;combine A-side, B-side
        CASE_IS 07,over s       = s + 1
        ENDM                            ;end of two symmetries loop  s = 0,1

;reg_c11sym(n) <= col4_TOPS(n) AND row3_BLACK_BOTS(n) AND NOT col4_blue(n);
;reg_c15sym(n) <= col3_TOPS(n) AND row4_BLACK_BOTS(n) AND NOT col3_blue(n);
;reg_c08sym(n) <= col5_TOPS(n) AND row3_BLACK_BOTS(n) AND NOT col5_blue(n);

;       c08sym(n) <= (reg_c08sym(n)) AND NOT ic09 AND NOT ic12;

s       = 0                     ;index on symmetries
        REPEAT  4                       ;index on symmetries  s = 0-3 movQ    ,Vcol4_topsA
        movQ    b,Vcol4_topsB
        andQ    ,Vrow3_botsA
        andQ    b,Vrow3_botsB
        orQ
        CASE_IS 11,over movQ    ,Vcol3_topsA
        movQ    b,Vcol3_topsB
        andQ    ,Vrow4_botsA
        andQ    b,Vrow4_botsB
        orQ
        CASE_IS 15,over s       = s + 1                 ;Loop closed,reopened to allow precedence:
        ENDM                            ;     end of old symmetries loop s = 0-3
        s       = 0                     ;beginning of new symmetries loop s = 0-3
        REPEAT 4 movQ    ,Vcol5_topsA
        movQ    b,Vcol5_topsB
        andQ    ,Vrow3_botsA
        andQ    b,Vrow3_botsB IF serifs
           notQ   b
           andQ                         ; kill side A if both hit
           notQ   b                     ;restore side B
           andQ   b,Vnot_col5_serif
        ENDIF orQ
        CASE_IS 08,over ;reg_c16sym(n) <= col4_TOPS(n) AND row4_BLACK_BOTS(n) AND NOT col4_blue(n) AND NOT col4_serif(n);

movQ    ,Vcol4_topsA
        movQ    b,Vcol4_topsB
        andQ    ,Vrow4_botsA
        andQ    b,Vrow4_botsB IF serifs
           notQ   b
           andQ                         ; kill side A if both hit
           notQ   b                     ;restore side B
           andQ   b,Vnot_col4_serif
        ENDIF orQ                             ;combine sides
        CASE_IS 16,over s       = s + 1
        ENDM                            ;end of four symmetries loop s = 0-3
```

XLI CORPORATION - CONFIDENTIAL
INF_VERT.ASM                                                                    PAGE 11
_____

```
; items computed in two symmetries (0,1), one row/col:
;       (self-symmetric cases)

;   c09sym(n)    <= col5_TOPS(n) AND col5_TOPS(n+2) AND NOT col5_serif(n) AND NOT col5_serif(n+2);
;reg_c12sym(n)   <= col5_TOPS(n) AND col5_TOPS(3-n);

s       = 0
        rc      = 0
        REPEAT  2                       ; s = 0,1 movQ    b,Vcol5_topsB
        movQ    ,Vcol5_topsA s       = s + 2                 ; flip U/D
        andQ    b,Vcol5_topsB
        andQ    ,Vcol5_topsA IF serifs
          notQ    b
          andQ                          ; make sides mutually exclusive
          notQ    b                     ; restore side B
          andQ    b,Vnot_col5_serif
          s       = s - 2               ;restore
          andQ    b,Vnot_col5_serif     ; B-side only
        ELSE
          s       = s - 2               ;restore
        ENDIF                           ; IF serifs orQ                             ;combine A-side, B-side
        CASE_IS 09,over movQ    ,Vcol5_topsA
        movQ    b,Vcol5_topsB s       = 3 - s                 ; rotate 180  ;*Color*
        andQ    ,Vcol5_topsB
        andQ    b,Vcol5_topsA
        s       = 3 - s                 ;restore
        orQ                             ;combine A-side, B-side
        CASE_IS 12,over s       = s + 1
        ENDM                            ;end of two symmetries loop s = 0,1

;    c13sym(n)    <= (reg_c13sym(n)) AND NOT ic14 AND NOT ic18;
;reg_c13sym(n)   <= col6_TOPS(n)   AND row4_BLACK_BOTS(n) AND NOT col6_blue(n);
;reg_c17sym(n)   <= col5_TOPS(n)   AND row4_BLACK_BOTS(n) AND NOT col5_blue(n);

s       = 0                     ;index on symmetries
        REPEAT  4                       ;index on symmetries  s = 0-3 movQ    ,Vcol5_topsA
        movQ    b,Vcol5_topsB
        andQ    ,Vrow4_botsA
        andQ    b,Vrow4_botsB IF serifs
          notQ    b
          andQ                          ; kill side A if both hit
          notQ    b                     ;restore side B
          andQ    b,Vnot_col5_serif
        ENDIF orQ
        CASE_IS 17,over s       = s + 1                 ;Loop closed,reopened to allow precedance:
        ENDM                            ;     end of old symmetries loop s = 0-3
        s       = 0                     ;beginning of new symmetries loop s = 0-3
        REPEAT  4 movQ    ,Vcol6_topsA
        movQ    b,Vcol6_topsB
        andQ    ,Vrow4_botsA
        andQ    b,Vrow4_botsB
        orQ                             ;*Color*
        CASE_IS 13,over                 ; defer: to exclude 14,18 s       = s + 1
        ENDM                            ; s = 0-3

; items computed in two symmetries (0,1), one row/col:
;       (self-symmetric cases)

;    c14sym(n)    <= col6_TOPS(n) AND col6_TOPS(n+2);
;reg_c18sym(n)   <= col6_TOPS(n) AND col6_TOPS(3-n);
```

XLI CORPORATION - CONFIDENTIAL
INF_VERT.ASM                                                                                           PAGE 12

```
        s       = 0
        rc      = 0
        REPEAT  2                       ; s = 0,1 movQ    ,Vcol6_topsA
        movQ    b,Vcol6_topsB s       = s + 2                 ; flip U/D
        andQ    ,Vcol6_topsA
        andQ    b,Vcol6_topsB
        s       = s - 2                 ;restore
        orQ                             ;combine A-side, B-side
        CASE_IS 14,over movQ    ,Vcol6_topsA
        movQ    b,Vcol6_topsB s       = 3 - s                 ; rotate 180  ;*Color*
        andQ    ,Vcol6_topsB
        andQ    b,Vcol6_topsA
        s       = 3 - s                 ;restore
        orQ                             ;combine A-side, B-side
        CASE_IS 18,over s       = s + 1
        ENDM                            ;end of two symmetries loop s = 0,1 s       = 0                     ;index on symmetries
        REPEAT  4                       ;index on symmetries  s = 0-3

;reg_c21sym(n) <= col3_TOPS(n) AND row5_BLACK_BOTS(n) AND NOT col3_blue(n) AND NOT col3_serif(n);
;reg_c22sym(n) <= col4_TOPS(n) AND row5_BLACK_BOTS(n) AND NOT col4_blue(n) AND NOT col4_serif(n);
;reg_c23sym(n) <= col5_TOPS(n) AND row5_BLACK_BOTS(n) AND NOT col5_blue(n);
;reg_c24sym(n) <= col6_TOPS(n) AND row5_BLACK_BOTS(n) AND NOT col6_blue(n);

movQ    ,Vcol3_topsA
        movQ    b,Vcol3_topsB
        andQ    ,Vrow5_botsA
        andQ    b,Vrow5_botsB IF serifs
            notQ    b
            andQ                        ; kill side A if both hit
            notQ    b                   ;restore side B
            andQ    b,Vnot_col3_serif
        ENDIF orQ
        CASE_IS 21,over s       = s + 1                 ;Loop closed,reopened to allow precedance:
        ENDM                            ;    end of old symmetries loop s = 0-3
        s       = 0                     ;beginning of new symmetries loop s = 0-3
        REPEAT  4 movQ    ,Vcol4_topsA
        movQ    b,Vcol4_topsB
        andQ    ,Vrow5_botsA
        andQ    b,Vrow5_botsB IF serifs
            notQ    b
            andQ                        ; kill side A if both hit
            notQ    b                   ;restore side B
            andQ    b,Vnot_col4_serif
        ENDIF orQ
        CASE_IS 22,over s       = s + 1                 ;Loop closed,reopened to allow precedance:
        ENDM                            ;    end of old symmetries loop s = 0-3
        s       = 0                     ;beginning of new symmetries loop s = 0-3
        REPEAT  4 movQ    ,Vcol5_topsA
        movQ    b,Vcol5_topsB
        andQ    ,Vrow5_botsA
        andQ    b,Vrow5_botsB IF serifs
            notQ    b
            andQ                        ; kill side A if both hit
            notQ    b                   ;restore side B
            andQ    b,Vnot_col5_serif
        ENDIF
```

XLI CORPORATION - CONFIDENTIAL
INF_VERT.ASM PAGE 13

```
        orQ
        CASE_IS 23,over s       = s + 1           ;Loop closed,reopened to allow precedance:
        ENDM              ;    end of old symmetries loop s = 0-3
s       = 0               ;beginning of new symmetries loop s = 0-3
        REPEAT 4 movQ    ,Vcol6_topsA
        movQ    b,Vcol6_topsB
        andQ    ,Vrow5_botsA
        andQ    b,Vrow5_botsB
         orQ
        CASE_IS 24,over s       = s + 1
        ENDM              ;end of four symmetries loop s = 0-3
; End of items computed in all four  symmetries but only one row/col.

s       = 3               ; using symmetry 3 to flag it in Dan's display.

movQ    ,Vcol7_topA_vt_vwXes
        movQ    b,Vcol7_topB_vt_vwXes
        andQ    ,Vrow5_botsA
        andQ    b,Vrow5_botsB
         orQ
        CASE_IS 0,over            ;four-way Self-sym, need only be computed one sym.
                                  ; case represents edge right down middle.

s       = 0       ; for safety
rc      = 0

; ******* END  OF MATERIAL COPIED FROM NEARVERT.VHD  10/ 7/95 ******************
        RET                       ;end of do_nearvert
%OUT
%OUT    End of INF_VERT.asm (NEARVERT)

_ADAM ENDS
        END
```

XLI CORPORATION

APPENDIX "B"

CONTENTS:

BITMAP.C
       BITS.C
       CASES.INI
       COLOR.C
       COLOR.H
       COLOR.RC
       DIBAPI.H
       DIBUTIL.H
       EEU.C
       ENTRY.C
       PAINT.C
       PRINT.C
       RESOURCE.H
       VECTOR.C
       VECTOR.H
       XLIHDFAX.H
       XLITIFF.H

XLI CORPORATION - CONFIDENTIAL
BITMAP.C  PAGE 1

```c
/*
    This code deals with the bitmap files.
*/ include "windows.h"
include "color.h"
#include "string.h"
#include <stdio.h>
#include <io.h>
#include "commdlg.h"
#include "dibapi.h"
#include "dibutil.h"

HANDLE ReadDIBFile (int);
BOOL MyRead (int, LPSTR, DWORD);

/*
    FUNCTION: LoadDIB
*/
HDIB FAR LoadDIB (LPSTR lpFileName)
{
    HDIB hDIB;
    int hFile;
    OFSTRUCT ofs;

if ((hFile = OpenFile (lpFileName, &ofs, OF_READ)) != -1) {
        hDIB = ReadDIBFile (hFile);
        _lclose (hFile);
        return hDIB;
        }
    else {
        MessageBox (NULL, "Failed to open file", NULL, MB_OK);
        return NULL;
        }
}

WORD FAR DestroyDIB (HDIB hDib)
{
    GlobalFree (hDib);
    return 0;
}

/***************************************************************
 *
 * Function:  ReadDIBFile (int)
 * Purpose:   Reads in the specified DIB file into a global chunk of
 *            memory.
 * Returns:   A handle to a dib (hDIB) if successful.
 *            NULL if an error occurs.
 *
 * Comments:  BITMAPFILEHEADER is stripped off of the DIB.  Everything
 *            from the end of the BITMAPFILEHEADER structure on is
 *            returned in the global memory handle.
 *
 * NOTE: The DIB API were not written to handle OS/2 DIBs, so this
 * function will reject any file that is not a Windows DIB.
 ***************************************************************/
//int filelength (int);

HANDLE ReadDIBFile (int hFile)
{
    BITMAPFILEHEADER bmfHeader;
    DWORD dwBitsSize;
    UINT nNumColors;    // Number of colors in table
    HANDLE hDIB;
    HANDLE hDIBtmp;     // Used for GlobalRealloc() //MPB
    LPBITMAPINFOHEADER lpbi;
    DWORD offBits;

// Get length of DIB in bytes for use when reading
    dwBitsSize = filelength(hFile);

// Allocate memory for header & color table. We'll enlarge this
    // memory as needed.

hDIB = GlobalAlloc (GMEM_MOVEABLE,
        (DWORD)(sizeof(BITMAPINFOHEADER) + 256 * sizeof(RGBQUAD)));

if (!hDIB) return NULL;

lpbi = (LPBITMAPINFOHEADER)GlobalLock (hDIB);
    if (!lpbi) {
        GlobalFree (hDIB);
        return NULL;
        }
```

XLI CORPORATION - CONFIDENTIAL
BITMAP.C PAGE 2

```c
    // read the BITMAPFILEHEADER from our file
    if (sizeof (BITMAPFILEHEADER) != _lread (hFile, (LPSTR)&bmfHeader, sizeof (BITMAPFILEHEADER)))
        goto ErrExit;

if (bmfHeader.bfType != 0x4d42)  /* 'BM' */
        goto ErrExit;

// read the BITMAPINFOHEADER
    if (sizeof(BITMAPINFOHEADER) != _lread (hFile, (LPSTR)lpbi, sizeof(BITMAPINFOHEADER)))
        goto ErrExit;

// Check to see that it's a Windows DIB -- an OS/2 DIB would cause
    // strange problems with the rest of the DIB API since the fields
    // in the header are different and the color table entries are
    // smaller.
    //
    // If it's not a Windows DIB (e.g. if biSize is wrong), return NULL.
    if (lpbi->biSize == sizeof(BITMAPCOREHEADER))
        goto ErrExit;

// Now determine the size of the color table and read it.  Since the
    // bitmap bits are offset in the file by bfOffBits, we need to do some
    // special processing here to make sure the bits directly follow
    // the color table (because that's the format we are susposed to pass
    // back)
    if (!(nNumColors = (UINT)lpbi->biClrUsed)) {
        // no color table for 24-bit, default size otherwise
        if (lpbi->biBitCount != 24)
            nNumColors = 1 << lpbi->biBitCount;  /* standard size table */
    }

// fill in some default values if they are zero
    if (lpbi->biClrUsed == 0)
        lpbi->biClrUsed = nNumColors;

if (lpbi->biSizeImage == 0) {
        lpbi->biSizeImage = ((((lpbi->biWidth * (DWORD)lpbi->biBitCount) + 31) & ~31) >> 3)
                            * lpbi->biHeight;
    }

// get a proper-sized buffer for header, color table and bits
    GlobalUnlock (hDIB);
    hDIBtmp = GlobalReAlloc (hDIB, lpbi->biSize +
                        nNumColors * sizeof(RGBQUAD) +
                        lpbi->biSizeImage, 0);

if (!hDIBtmp) // can't resize buffer for loading
        goto ErrExitNoUnlock;  //MPB
    else
        hDIB = hDIBtmp;

lpbi = (LPBITMAPINFOHEADER)GlobalLock(hDIB);

// read the color table
    _lread (hFile, (LPSTR)(lpbi) + lpbi->biSize, nNumColors * sizeof(RGBQUAD));

// offset to the bits from start of DIB header
    offBits = lpbi->biSize + nNumColors * sizeof(RGBQUAD);

// If the bfOffBits field is non-zero, then the bits might *not* be
    // directly following the color table in the file.  Use the value in
    // bfOffBits to seek the bits.
    if (bmfHeader.bfOffBits != 0L)
        _llseek (hFile, bmfHeader.bfOffBits, SEEK_SET);

if (MyRead (hFile, (LPSTR)lpbi + offBits, lpbi->biSizeImage))
        goto OKExit;

ErrExit:
    GlobalUnlock (hDIB);
ErrExitNoUnlock:
    GlobalFree (hDIB);
    return NULL;

OKExit:
    GlobalUnlock (hDIB);
    return hDIB;
}

/**************************************************************************
 Function: MyRead (int, LPSTR, DWORD)
 Purpose:  Routine to read files greater than 64K in size.

Returns:  TRUE if successful.
           FALSE if an error occurs.
**************************************************************************/
BOOL MyRead (int hFile, LPSTR lpBuffer, DWORD dwSize)
```

XLI CORPORATION - CONFIDENTIAL
BITMAP.C PAGE 3

```
{
    char *lpInBuf = (char *)lpBuffer;
    int nBytes;

// Read in the data in 32767 byte chunks (or a smaller amount if it's
    // the last chunk of data read)

while (dwSize) {
        nBytes = (int)(dwSize > (DWORD)32767 ? 32767 : LOWORD (dwSize));
        if (_lread (hFile, (LPSTR)lpInBuf, nBytes) != (WORD)nBytes)
            return FALSE;
        dwSize -= nBytes;
        lpInBuf += nBytes;
    }
    return TRUE;
}
```

XLI CORPORATION - CONFIDENTIAL
BITS.C                                                                                                              PAGE 1

```c
// This code deals with the table loading for the algorithm.

#include <windows.h>
//#define POINTDEFINE 1
#include "vector.h"

void Set2NoHit (LPWORD lpX, int w, int h)
{
    int i;
    WORD x[17] = {0, 0x8000, 0xc000, 0xe000, 0xf000, 0xf800, 0xfc00, 0xfe00, 0xff00, 0xff80, 0xffc0, 0xffe0, 0xfff0, 0xfff8,
 0xfffc, 0xfffe, 0xffff};

for (i = 0; i < h; i++) {   // For each line of bits...
        // Set to white since neither center pixel is black.
        *(lpX + (h * 0x000)) =
        *(lpX + (h * 0x100)) =
        *(lpX + (h * 0x800)) =
        *(lpX + (h * 0x900)) = 0xffff;
        // Center right is black.
        *(lpX + (h * 0x200)) =
        *(lpX + (h * 0x300)) =
        *(lpX + (h * 0xa00)) =
        *(lpX + (h * 0xb00)) = ~(x[(w + 1) / 2] >> (w / 2));         // shift pattern right half the cell
//      *(lpX + (h * 0xb00)) = ~(x[(w + 1) / 2] >> ((w + 1) / 2));   // shift pattern right half the cell
        // Center left is black.
        *(lpX + (h * 0x400)) =
        *(lpX + (h * 0x500)) =
        *(lpX + (h * 0xc00)) =
        *(lpX + (h * 0xd00)) = ~x[w / 2];
        // Both center bits are black.
        *(lpX + (h * 0x600)) =
        *(lpX + (h * 0x700)) =
        *(lpX + (h * 0xe00)) =
        *(lpX + (h * 0xf00)) = ~x[w];

// Add offset to next line of the bitmaps.
        lpX++;
    }
}

/*
    Given the slope and the intercept fill in the bitmap where the points are above
    the line.
*/
void FillAbove (LPWORD lpX, int w, int h, float m, float b)
{
    int i, j;
    float x, y;

for (i = 0; i < h; i++) {
        y = ((float)(h - i) - 0.5F) / (float)h;     // Calculate the percent up from the bottom of the cell.
        *lpX = 0xffff;
        for (j = 0; j < w; j++) {
            x = ((float)j + 0.5F) / (float)w;       // Calculate percent from left edge of cell.
            if (y > ((m * x) + b))   // If the bit is above the line, clear the bit
                *lpX &= ~(1 << (15 - j));
            else   // else below or equal, set the bit
                *lpX |= 1 << (15 - j);
        }
        lpX++;
    }
}

/*
    Given the slope and the intercept fill in the bitmap where the points are below or equal to
    the line.
*/
void FillBelow (LPWORD lpX, int w, int h, float m, float b)
{
    int i, j;
    float x, y;

for (i = 0; i < h; i++) {
        y = ((float)(h - i) - 0.5F) / (float)h;     // Calculate the percent up from the bottom of the cell.
        *lpX = 0xffff;
        for (j = 0; j < w; j++) {
            x = ((float)j + 0.5F) / (float)w;       // Calculate percent from left edge of cell.
            if (y <= ((m * x) + b))  // If the bit is below or equal to the line, clear the bit
                *lpX &= ~(1 << (15 - j));
            else   // else below or equal, set the bit
                *lpX |= 1 << (15 - j);
        }
        lpX++;   // After a line of the bitmap is processed, point to the next.
    }
}
```

XLI CORPORATION - CONFIDENTIAL
BITS.C PAGE 2

```c
/*
    This takes the bitmap and mirrors the bits horizontally.  lpS it the source bitmap
    and lpD is the destination.  w and h are the dimensions of the bitmap.
*/
void HorMirror2 (LPWORD lpS, LPWORD lpD, int w, int h)
{
    int i, j;
    WORD Mask;

for (i = 0; i < h; i++) {
        *lpD = 0xffff;
        for (j = 0; j < w; j++) {
            Mask = 1;
            Mask <<= 15 - j;
            if (!(*lpS & Mask))  // If this bit is zero...
                *lpD &= ~(1 << (16 - (w - j)));      // clear the mirrored bit in the destination bitmap.
        }
        lpS++;    // Point to next line of source.
        lpD++;    // Point to next line of destination.
    }
}

/*
    This takes the bitmap and mirrors the bits vertically.  lpS it the source bitmap
    and lpD is the destination.  w and h are the dimensions of the bitmap.
*/
void VertMirror (LPWORD lpS, LPWORD lpD, int h)
{
    int i;
    for (i = 1; i <= h; i++)
        *lpD++ = *(lpS + (h - i));
}

/*
    This takes the bitmap and mirrors the bits vertically.  lpS it the source bitmap
    and lpD is the destination.  w and h are the dimensions of the bitmap.
*/
void JustCopy (LPWORD lpS, LPWORD lpD, int h)
{
    int i;
    for (i = 0; i < h; i++)
        *lpD++ = *lpS++;
}

/*
    This takes the bitmap in lpS and make a color reversed copy in lpD.
    w and h are the dimensions of the bitmap.
*/
void RevColor (LPWORD lpS, LPWORD lpD, int w, int h)
{
    int i, j;

for (i = 0; i < h; i++) {
        *lpD = 0xffff;
        for (j = 0; j < w; j++) {
            if (*lpS & (1 << (15 - j)))   // If this bit is one...
                *lpD &= ~(1 << (15 - j));      // Clear the same bit in the destination bitmap.
        }
        lpS++;    // Point to next line of source.
        lpD++;    // Point to next line of destination.
    }
}

// Just change the color of one bit pattern.
void RevColor2 (LPWORD lpS, int h)
{
    int i;

for (i = 0; i < h; i++) {
        *lpS++ = ~*lpS;
    }
}

// Exchanges the bits between two.
void SwapBits (LPWORD lpS, LPWORD lpT, int h)
{
    WORD tmp;
    int i;

for (i = 0; i < h; i++) {
        tmp = *lpT;
        *lpT++ = *lpS;
        *lpS++ = tmp;
```

XLI CORPORATION - CONFIDENTIAL  
BITS.C                                                                                              PAGE 3

```c
        }
}
/*
    The array being filled here is 4096 bitmaps.  Each bitmap is 16 bits wide and H bits
    high. Actually the bitmaps are W bits wide but on 16 bit boundaries.  The bitmaps
    built here will be used to output the enhanced pages on different resolution printers.
*/
void LoadBits (LPWORD lpBits, int W, int H)
{
    int i, j;
    float x1, x2, y1, y2;
    float M, B;
    LPWORD lpTmp;
    WORD cl[8] = { 0x000, 0x100, 0x200, 0x300, 0x800, 0x900, 0xa00, 0xb00 };

for (i = 0; i < 256; i++) {
        x1 = Point[i][0];
        y1 = Point[i][1];
        x2 = Point[i][2];
        y2 = Point[i][3];
        lpTmp = lpBits + (i * H);
        if ((x1 == 0) && (y1 == 0) && (x2 == 0) && (y2 == 0)) {     // If no-hit
            Set2NoHit (lpTmp, W, H);
        }
        else {
            // Convert units and origin.
            x1 = (x1 + 1) / 2;
            y1 = (y1 + 1) / 2;
            x2 = (x2 + 1) / 2;
            y2 = (y2 + 1) / 2;

// Calculate slope.
            if ((x1 - x2) == 0) {
                // Vertical line.
//              int j;
                LPWORD lpX = lpTmp;
                float x;

*lpX = 0xffff;     // Initialize entire value.
                // Calculate the value for one line of the bitmap.
                for (j = 0; j < W; j++) {
                    x = ((float)j + 0.5F) / (float)W;       // Calculate percent from left edge of cell.
                    if (x < x1)    // If the bit is left of the line, clear the bit
                        *lpX &= ~(1 << (15 - j));
                    else // else set the bit
                        *lpX |= 1 << (15 - j);
                }
                lpX++;     // Point to next line of bitmap.

for (j = 0; j < (H - 1); j++) {       // For remaining lines of the bitmap.
                    *lpX++ = *lpTmp;   // Copy the first value.
                }
                RevColor (lpTmp, lpTmp + (0x200 * H), W, H);
                HorMirror2 (lpTmp + (0x200 * H), lpTmp + (0x100 * H), W, H);
                HorMirror2 (lpTmp, lpTmp + (0x300 * H), W, H);
                VertMirror (lpTmp + (0x000 * H), lpTmp + (0x800 * H), H);
                VertMirror (lpTmp + (0x100 * H), lpTmp + (0x900 * H), H);
                VertMirror (lpTmp + (0x200 * H), lpTmp + (0xa00 * H), H);
                VertMirror (lpTmp + (0x300 * H), lpTmp + (0xb00 * H), H);
                for (j = 0; j < 8; j++) // Make the center left pixel a don't-care.
                    JustCopy (lpTmp + (cl[j] * H), lpTmp + ((0x400 + cl[j]) * H), H);
            }
            else {     // Finite slope!
                M = (y1 - y2) / (x1 - x2);
                B = y1 - (M * x1);         // Calculate intercept.
                if (B == 0) {    // If line goes through 0,0
                    FillAbove (lpTmp, W, H, M, B);
                    RevColor (lpTmp, lpTmp + (0x200 * H), W, H);
                    HorMirror2 (lpTmp + (0x200 * H), lpTmp + (0x100 * H), W, H);
                    HorMirror2 (lpTmp, lpTmp + (0x300 * H), W, H);
                    VertMirror (lpTmp + (0x000 * H), lpTmp + (0x800 * H), H);
                    VertMirror (lpTmp + (0x100 * H), lpTmp + (0x900 * H), H);
                    VertMirror (lpTmp + (0x200 * H), lpTmp + (0xa00 * H), H);
                    VertMirror (lpTmp + (0x300 * H), lpTmp + (0xb00 * H), H);
                    for (j = 0; j < 8; j++) // Make the center left pixel a don't-care.
                        JustCopy (lpTmp + (cl[j] * H), lpTmp + ((0x400 + cl[j]) * H), H);
                } else if (B == 1) {    // If line goes through 0,1 (top-left corner)
                    FillBelow (lpTmp, W, H, M, B);
                    RevColor (lpTmp, lpTmp + (0x200 * H), W, H);
                    HorMirror2 (lpTmp + (0x200 * H), lpTmp + (0x100 * H), W, H);
                    HorMirror2 (lpTmp, lpTmp + (0x300 * H), W, H);
                    VertMirror (lpTmp + (0x000 * H), lpTmp + (0x800 * H), H);
                    VertMirror (lpTmp + (0x100 * H), lpTmp + (0x900 * H), H);
                    VertMirror (lpTmp + (0x200 * H), lpTmp + (0xa00 * H), H);
```

XLI CORPORATION - CONFIDENTIAL
BITS.C PAGE 4

```c
        VertMirror (lpTmp + (0x300 * H), lpTmp + (0xb00 * H), H);
        for (j = 0; j < 8; j++)  // Make the center left pixel a don't-care.
            JustCopy (lpTmp + (cl[j] * H), lpTmp + ((0x400 + cl[j]) * H), H);
        }
    else if ((B > 0) && (B < 1)) {      // If line goes through left edge of cell...
        // Set X to 1 and determine Y.
        if (M >= 0) {  // If line goes up
            FillAbove (lpTmp, W, H, M, B);
            RevColor (lpTmp, lpTmp + (0x200 * H), W, H);
            HorMirror2 (lpTmp + (0x200 * H), lpTmp + (0x100 * H), W, H);
            HorMirror2 (lpTmp, lpTmp + (0x300 * H), W, H);
            VertMirror (lpTmp + (0x000 * H), lpTmp + (0x800 * H), H);
            VertMirror (lpTmp + (0x100 * H), lpTmp + (0x900 * H), H);
            VertMirror (lpTmp + (0x200 * H), lpTmp + (0xa00 * H), H);
            VertMirror (lpTmp + (0x300 * H), lpTmp + (0xb00 * H), H);
            for (j = 0; j < 8; j++)  // Make the center left pixel a don't-care.
                JustCopy (lpTmp + (cl[j] * H), lpTmp + ((0x400 + cl[j]) * H), H);
            }
        else {
            FillBelow (lpTmp, W, H, M, B);
            RevColor (lpTmp, lpTmp + (0x200 * H), W, H);
            HorMirror2 (lpTmp + (0x200 * H), lpTmp + (0x100 * H), W, H);
            HorMirror2 (lpTmp, lpTmp + (0x300 * H), W, H);
            VertMirror (lpTmp + (0x000 * H), lpTmp + (0x800 * H), H);
            VertMirror (lpTmp + (0x100 * H), lpTmp + (0x900 * H), H);
            VertMirror (lpTmp + (0x200 * H), lpTmp + (0xa00 * H), H);
            VertMirror (lpTmp + (0x300 * H), lpTmp + (0xb00 * H), H);
            for (j = 0; j < 8; j++)  // Make the center left pixel a don't-care.
                JustCopy (lpTmp + (cl[j] * H), lpTmp + ((0x400 + cl[j]) * H), H);
            }
        }
    else if (B < 0) {   // If line goes through bottom edge of cell...
        FillAbove (lpTmp, W, H, M, B);
        RevColor (lpTmp, lpTmp + (0x200 * H), W, H);
        HorMirror2 (lpTmp + (0x200 * H), lpTmp + (0x100 * H), W, H);
        HorMirror2 (lpTmp, lpTmp + (0x300 * H), W, H);
        VertMirror (lpTmp + (0x000 * H), lpTmp + (0x800 * H), H);
        VertMirror (lpTmp + (0x100 * H), lpTmp + (0x900 * H), H);
        VertMirror (lpTmp + (0x200 * H), lpTmp + (0xa00 * H), H);
        VertMirror (lpTmp + (0x300 * H), lpTmp + (0xb00 * H), H);
        for (j = 0; j < 8; j++)  // Make the center left pixel a don't-care.
            JustCopy (lpTmp + (cl[j] * H), lpTmp + ((0x400 + cl[j]) * H), H);
        }
    else if (B > 1) {   // If line goes through top edge of cell...
        FillBelow (lpTmp, W, H, M, B);
        RevColor (lpTmp, lpTmp + (0x200 * H), W, H);
        HorMirror2 (lpTmp + (0x200 * H), lpTmp + (0x100 * H), W, H);
        HorMirror2 (lpTmp, lpTmp + (0x300 * H), W, H);
        VertMirror (lpTmp + (0x000 * H), lpTmp + (0x800 * H), H);
        VertMirror (lpTmp + (0x100 * H), lpTmp + (0x900 * H), H);
        VertMirror (lpTmp + (0x200 * H), lpTmp + (0xa00 * H), H);
        VertMirror (lpTmp + (0x300 * H), lpTmp + (0xb00 * H), H);
        for (j = 0; j < 8; j++)  // Make the center left pixel a don't-care.
            JustCopy (lpTmp + (cl[j] * H), lpTmp + ((0x400 + cl[j]) * H), H);
        }
    else    // Error - set to no-hit
        Set2NoHit (lpTmp, W, H);
    }
// Reverse the symetries.
SwapBits (lpTmp + (0x000 * H), lpTmp + (0x100 * H), H);
SwapBits (lpTmp + (0x200 * H), lpTmp + (0x300 * H), H);
SwapBits (lpTmp + (0x400 * H), lpTmp + (0x500 * H), H);
SwapBits (lpTmp + (0x600 * H), lpTmp + (0x700 * H), H);
SwapBits (lpTmp + (0x800 * H), lpTmp + (0x900 * H), H);
SwapBits (lpTmp + (0xa00 * H), lpTmp + (0xb00 * H), H);
SwapBits (lpTmp + (0xc00 * H), lpTmp + (0xd00 * H), H);
SwapBits (lpTmp + (0xe00 * H), lpTmp + (0xf00 * H), H);

SwapBits (lpTmp + (0x000 * H), lpTmp + (0x800 * H), H);
SwapBits (lpTmp + (0x100 * H), lpTmp + (0x900 * H), H);
SwapBits (lpTmp + (0x200 * H), lpTmp + (0xa00 * H), H);
SwapBits (lpTmp + (0x300 * H), lpTmp + (0xb00 * H), H);
SwapBits (lpTmp + (0x400 * H), lpTmp + (0xc00 * H), H);
SwapBits (lpTmp + (0x500 * H), lpTmp + (0xd00 * H), H);
SwapBits (lpTmp + (0x600 * H), lpTmp + (0xe00 * H), H);
SwapBits (lpTmp + (0x700 * H), lpTmp + (0xf00 * H), H);

if (((i >= 30) && (i <= 48)) || (i == 108) || (i == 109)   ||
    ((i >= 176) && (i <= 178)) || ((i >= 180) && (i <= 182)) ||
    ((i >= 184) && (i <= 186)) || ((i >= 204) && (i <= 206)) ||
    (i == 123) || (i == 124) || (i == 200)) {
    // Reverse color for the ones with the hsym bit set.
    for (j = 0; j < 16; j += 2)
```

XLI CORPORATION - CONFIDENTIAL
BITS.C  PAGE 5

```
            RevColor2 (lpTmp + ((j << 8) * H), H);
        }
        else {
            switch (i) {
                case 29:
                case 82:
                case 86:
                case 90:
                case 187:
                case 188:
                case 189:
                case 190:
                case 191:
                case 192:
                case 193:
                case 194:
                case 195:
                case 196:
                case 197:
                case 198:
                case 201:
                case 202:
                case 203:
                    // Reverse color
                    for (j = 1; j < 16; j += 2)
                        RevColor2 (lpTmp + ((j << 8) * H), H);
                    break;
            }
        }
    }
}
```

XLI CORPORATION - CONFIDENTIAL
CASES.INI PAGE 1

```
; 1=Near Vertical
; 2=Near Horizontal
; 3=Split Cell
; 4=Near 45
; 5=Shifted cases (There are 4 versions of this: 5, 15, 25, 35 depending on where the little triangle is.)
;      5 = upper left triangle (as seen from SHIFTED cell)
;     15 = lower left
;     25 = upper right
;     35 = lower right
; Add 10 for pink case verses blue case
[type]
1=1
2=1
3=4
4=1
5=1
6=1
7=1
8=1
9=1
10=1
11=1
12=1
13=1
14=1
15=1
16=1
17=1
18=1
19=4
21=1
22=1
23=1
24=1
29=0x25
30=12
31=12
32=12
33=12
34=12
35=12
36=12
37=12
38=12
39=12
40=12
41=12
42=12
43=12
44=4
45=12
46=12
47=12
48=12
55=4
56=3
57=4
58=13
59=13
60=4
61=13
62=13
63=13
64=4
65=13
66=13
67=13
68=13
69=4
70=13
71=13
72=13
73=13
74=13
75=4
76=4
77=4
78=4
79=4
80=4
81=4
82=0x25
83=4
84=4
85=4
86=0x25
87=4
```

XLI CORPORATION - CONFIDENTIAL
CASES.INI PAGE 2
---

```
88=4
89=4
90=0x25
91=4
92=4
93=4
94=4
95=4
97=4
98=13
99=4
100=4
101=4
102=4
103=4
104=4
105=4
106=4
107=4
108=0x15
109=0x15
110=4
111=4
112=4
113=4
116=4
117=4
122=4
123=0x15
124=0x15
125=4
126=4
127=4
128=4
129=4
130=4
131=4
132=4
133=4
134=4
135=4
136=4
137=4
138=4
139=4
150=4
151=4
152=4
153=4
154=4
155=4
156=4
157=4
158=4
159=4
160=4
161=4
162=4
163=4
164=4
165=4
166=4
167=4
168=4
169=4
170=4
171=4
172=4
173=4
175=5
176=5
177=5
178=5
180=5
181=5
182=5
184=5
185=5
186=5
187=0x35
188=0x35
189=0x35
190=0x35
191=0x35
192=0x35
193=0x35
194=0x35
```

XLI CORPORATION - CONFIDENTIAL
CASES.INI PAGE 3
---

```
195=0x35
196=0x35
197=0x35
198=0x35
199=0x35
200=5
201=0x35
202=0x35
203=0x35
204=5
205=5
206=5
```

XLI CORPORATION - CONFIDENTIAL
COLOR.C                                                                                      PAGE 1
--------------------------------------------------------------------------------

```c
/**************************************************************************
    PROGRAM: color.c
    PURPOSE: Test Adam's color enahcnement code.
**************************************************************************/
#include <windows.h>
#include <string.h>
#include <stdio.h>
#include <io.h>
#include <stdlib.h>
#include <commdlg.h>
#include "dibapi.h"
#include "dibutil.h"
#include "color.h"
#include "resource.h"

#ifdef DEBUGGING_CASES
extern HANDLE hCases;           // When we enhance something we save the case numbers.
endif HANDLE hInst;
HANDLE hAccTable;                       /* handle to accelerator table */
HWND hEditWnd;                          /* handle to edit window */
/* Additional includes needed for the fstat() function */
#include <sys\types.h>
include <sys\stat.h> char FileName[128];
char PathName[128];
char OpenName[128];
char DefPath[128];
char DefSpec[13] = "*.*";
char DefExt[] = ".txt";
char str[255];
HANDLE hEditBuffer;                     /* handle to editing buffer     */
HANDLE hOldBuffer;                      /* old buffer handle            */
HANDLE hHourGlass;                      /* handle to hourglass cursor   */
HANDLE hSaveCursor;                     /* current cursor handle        */
HFILE hFile;                            /* file handle                  */
int count;                              /* number of chars read or written */
PSTR pBuffer;                           /* address of read/write buffer */
OFSTRUCT OfStruct;                      /* information from OpenFile()  */
struct stat FileStatus;                 /* information from fstat()     */
BOOL bChanges = FALSE;                  /* TRUE if the file is changed  */
BOOL bSaveEnabled = FALSE;              /* TRUE if text in the edit buffer */
PSTR pEditBuffer;                       /* address of the edit buffer   */
//RECT Rect;                            /* dimension of the client window */
HWND hwnd;                              /* handle to main window        */ char Untitled[] =                       /* default window title         */
    "HD Color";

// XET Variables!!!!
char Xet2[] = "HDColor";

int Open8BitFile (HWND, LPHANDLE, LPWORD, LPWORD, LPHANDLE, LPWORD, LPWORD, LPWORD, LPHANDLE, float *, float *);
void EEPaint (HWND, HGLOBAL, WORD, WORD, HGLOBAL, WORD, WORD, int, int, int, int, float, WORD, HANDLE, float, float);
BOOL FAR PASCAL GetDataDlg (HWND, unsigned, WORD, LONG);
char GetDataString[40];
WORD GetDataValue;
WORD GetDataMode;

/**************************************************************************
    FUNCTION: WinMain(HANDLE, HANDLE, LPSTR, int)
    PURPOSE: calls initialization function, processes message loop
**************************************************************************/
int PASCAL WinMain (HANDLE hInstance, HANDLE hPrevInstance, LPSTR lpCmdLine, int nCmdShow)
{
    MSG msg;
//    char junk[80];
//    char junk2[80];

if (!hPrevInstance)
        if (!InitApplication(hInstance))
            return (FALSE);

if (!InitInstance(hInstance, nCmdShow))
        return (FALSE);
    // Load name of INI file based on the EXE directory.
//    GetModuleFileName (hInstance, sTemp, sizeof(sTemp));
//    SeparateFile ((HWND)0, junk, junk2, sTemp);
//    wsprintf (TableFile,"%stable.ini", junk);

while (GetMessage(&msg, 0, 0, 0)) {
        /* Only translate message if it is not an accelerator message */
        if (!TranslateAccelerator(hwnd, hAccTable, &msg)) {
            TranslateMessage(&msg);
```

XLI CORPORATION - CONFIDENTIAL
COLOR.C PAGE 2

```
            DispatchMessage(&msg);
        }
    }
    return (msg.wParam);
}

/****************************************************************
    FUNCTION: InitApplication(HANDLE)
    PURPOSE: Initializes window data and registers window class
****************************************************************/
BOOL InitApplication (HANDLE hInstance)
{
    WNDCLASS wc;

wc.style = CS_BYTEALIGNCLIENT;
    wc.lpfnWndProc = (WNDPROC)MainWndProc;
    wc.cbClsExtra = 0;
    wc.cbWndExtra = 0;
    wc.hInstance = hInstance;
    wc.hIcon = LoadIcon (hInstance, "HD Fax");
    wc.hCursor = NULL;
    wc.hCursor = LoadCursor(NULL, IDC_ARROW);
    wc.hbrBackground = GetStockObject(WHITE_BRUSH);
    wc.lpszMenuName = "HDFaxMenu";
    wc.lpszClassName = "HDFaxWClass";

return (RegisterClass(&wc));
}

/****************************************************************
    FUNCTION: InitInstance(HANDLE, int)
    PURPOSE: Saves instance handle and creates main window
****************************************************************/
BOOL InitInstance (HANDLE hInstance, int nCmdShow)
{
//  RECT Rect;

hInst = hInstance;
    hAccTable = LoadAccelerators (hInst, "HDFaxAcc");
    hwnd = CreateWindow ("HDFaxWClass", "HD Fax", WS_OVERLAPPEDWINDOW,
//         40, 40, 780, 500, NULL, NULL, hInstance, NULL);
           CW_USEDEFAULT, CW_USEDEFAULT, CW_USEDEFAULT, CW_USEDEFAULT, NULL, NULL, hInstance, NULL);

if (!hwnd)
        return (FALSE);

/* Get an hourglass cursor to use during file transfers */
    hHourGlass = LoadCursor (NULL, IDC_WAIT);
    ShowWindow (hwnd, nCmdShow);
    UpdateWindow (hwnd);
    return (TRUE);
}

/****************************************************************
    FUNCTION: MainWndProc(HWND, unsigned, WORD, LONG)
    PURPOSE: Processes messages
    MESSAGES:
        WM_COMMAND      - application menu (About dialog box)
        WM_DESTROY      - destroy window
        WM_SIZE         - window size has changed
        WM_QUERYENDSESSION - willing to end session?
        WM_ENDSESSION   - end Windows session
        WM_CLOSE        - close the window
        WM_SIZE         - window resized COMMENTS:
        WM_COMMAND processing:
            IDM_NEW - query to save current file if there is one and it has
                    been changed, clear buffer and start new file.
            IDM_OPEN - query to save current file if there is one and it
                    has been changed, open a new file.
            IDM_SAVE - save current file, prompt for name if none exists.
            IDM_SAVEAS - prompt for new filename to save to, save file.
            IDC_EDIT - change "bChanges" flag to indicate if edit buffer has
                    been modified. Affects actions of IDM_NEW and
                    IDM_OPEN. Reset when file is saved.
            IDM_EXIT - query to save current file if there is one and it
                    has been changed, then exit.
            IDM_ABOUT - display "About" box.

****************************************************************/
char sTemp[512];   // General purpose string.
char sTmp[40];  // For little things.
```

XLI CORPORATION - CONFIDENTIAL
COLOR.C PAGE 3

```c
// From PROCESS.C
// Globals needed by the display function.
HDIB hResult;
HDIB hSource;
WORD SourceWidth, SourceHeight;
WORD ResultWidth, ResultHeight;
WORD BitsPerPixel;
HANDLE hPalette;    // For less than 24bit color images.
float ScaleFactor;  // Ratio of display pixels to bitmap bits, not the difference between the source and result images!!!!!
int X, Y;   // origin of the displayed image within the bitmap
int OneBit; // Actually selects either new or source bitmap for display
int Grid;   // Grid on or off
LONG LastMouse;
BOOL PrintIt (HWND, HGLOBAL, WORD, WORD);
float xScaleRatio, yScaleRatio;
int HighLite;

long FAR PASCAL MainWndProc (HWND hWnd, unsigned message, WORD wParam, LONG lParam)
{
    FARPROC lpProcAbout;

switch (message) {
        case WM_CREATE:
            ScaleFactor = 8.0F;
            X = Y = 0;   // Start display from origin of the cellmap.
            OneBit = 0;
                            CheckMenuItem (GetMenu (hWnd), TOGGLE_0, MF_CHECKED);
                            CheckMenuItem (GetMenu (hWnd), TOGGLE_1, MF_UNCHECKED);
                            CheckMenuItem (GetMenu (hWnd), TOGGLE_2, MF_UNCHECKED);
            Grid = 0;
                            CheckMenuItem (GetMenu (hWnd), GRID_ON, MF_UNCHECKED);
                            CheckMenuItem (GetMenu (hWnd), GRID_OFF, MF_CHECKED);
                            CheckMenuItem (GetMenu (hWnd), GRID_EDGES, MF_UNCHECKED);
            return (DefWindowProc (hWnd, message, wParam, lParam));

case WM_COMMAND:
            switch (wParam) {
                case GRID_ON:
                    Grid = 1;
                                            CheckMenuItem (GetMenu (hWnd), GRID_ON, MF_CHECKED);
                                            CheckMenuItem (GetMenu (hWnd), GRID_OFF, MF_UNCHECKED);
                                            CheckMenuItem (GetMenu (hWnd), GRID_EDGES, MF_UNCHECKED);
                    InvalidateRect (hWnd, NULL, TRUE);
                    break;

case GRID_OFF:
                    Grid = 0;
                                            CheckMenuItem (GetMenu (hWnd), GRID_ON, MF_UNCHECKED);
                                            CheckMenuItem (GetMenu (hWnd), GRID_OFF, MF_CHECKED);
                                            CheckMenuItem (GetMenu (hWnd), GRID_EDGES, MF_UNCHECKED);
                    InvalidateRect (hWnd, NULL, TRUE);
                    break;

case GRID_EDGES:
                    Grid = 2;
                                            CheckMenuItem (GetMenu (hWnd), GRID_ON, MF_UNCHECKED);
                                            CheckMenuItem (GetMenu (hWnd), GRID_OFF, MF_UNCHECKED);
                                            CheckMenuItem (GetMenu (hWnd), GRID_EDGES, MF_CHECKED);
                    InvalidateRect (hWnd, NULL, TRUE);
                    break;

case TOGGLE_0: // result
                    OneBit = 0;
                                            CheckMenuItem (GetMenu (hWnd), TOGGLE_0, MF_CHECKED);
                                            CheckMenuItem (GetMenu (hWnd), TOGGLE_1, MF_UNCHECKED);
                                            CheckMenuItem (GetMenu (hWnd), TOGGLE_2, MF_UNCHECKED);
                    InvalidateRect (hWnd, NULL, TRUE);
                    break;
                case TOGGLE_1: // source
                    OneBit = 1;
                                            CheckMenuItem (GetMenu (hWnd), TOGGLE_0, MF_UNCHECKED);
                                            CheckMenuItem (GetMenu (hWnd), TOGGLE_1, MF_CHECKED);
                                            CheckMenuItem (GetMenu (hWnd), TOGGLE_2, MF_UNCHECKED);
                    InvalidateRect (hWnd, NULL, TRUE);
                    break;
                case TOGGLE_2: // split screen
                    OneBit = 2;
                                            CheckMenuItem (GetMenu (hWnd), TOGGLE_0, MF_UNCHECKED);
                                            CheckMenuItem (GetMenu (hWnd), TOGGLE_1, MF_UNCHECKED);
                                            CheckMenuItem (GetMenu (hWnd), TOGGLE_2, MF_CHECKED);
                    InvalidateRect (hWnd, NULL, TRUE);
                    break;
                                    case IDM_HIGHLITE:
                                        {
                                            FARPROC lpProc;
```

XLI CORPORATION - CONFIDENTIAL
COLOR.C PAGE 4

```
                                        GetDataMode = 0;  // decimal
                                        wsprintf (GetDataString, "Enter the case to highlite.");   // Load the dialog
box string
                                        GetDataValue = HighLite;    // Enter the initial data lpProc = MakeProcInstance (MyGetData, hInst);
                                        DialogBox (hInst, "GETDATADLG", hWnd, lpProc);
                                        HighLite = GetDataValue;     // Get the new data
                                        }
            InvalidateRect (hWnd, NULL, TRUE);
                                        break;

case IDM_ABOUT:
            lpProcAbout = MakeProcInstance (About, hInst);
            DialogBox (hInst, "AboutBox", hWnd, lpProcAbout);
            FreeProcInstance (lpProcAbout);
            break;

case IDM_OPEN_1:
            // Reset some paramters.
            ScaleFactor = 8.0f;
            X = Y = 0;
            OneBit = 0;
                                        CheckMenuItem (GetMenu (hWnd), TOGGLE_0, MF_CHECKED);
                                        CheckMenuItem (GetMenu (hWnd), TOGGLE_1, MF_UNCHECKED);
                                        CheckMenuItem (GetMenu (hWnd), TOGGLE_2, MF_UNCHECKED);

Open8BitFile (hWnd, &hSource, &SourceWidth, &SourceHeight, &hResult, &ResultWidth, &ResultHeight,
&BitsPerPixel, &hPalette, &xScaleRatio, &yScaleRatio);

InvalidateRect (hWnd, NULL, TRUE);
            break;

case IDM_PRINT:
            if (OneBit == 1)
                PrintIt (hWnd, hSource, SourceWidth, SourceHeight);
            else
                PrintIt (hWnd, hResult, ResultWidth, ResultHeight);
            break;

case IDM_EXIT:
            QuerySaveFile (hWnd);
            DestroyWindow (hWnd);
            break;

case IDC_EDIT:
            if (HIWORD (lParam) == EN_ERRSPACE) {
                MessageBox (GetFocus (), "Out of memory.", NULL, MB_ICONHAND | MB_OK);
                }
            break;
            }
        break;

case WM_SIZE:
        InvalidateRect (hWnd, NULL, TRUE);
        break;

case WM_QUERYENDSESSION:            /* message: to end the session? */
        return (QuerySaveFile (hWnd));

case WM_CLOSE:                      /* message: close the window   */
        if (QuerySaveFile (hWnd))
            DestroyWindow (hWnd);
        break;

case WM_DESTROY:
#ifdef DEBUGGING_CASES
                        if (hCases)
                                GlobalFree (hCases);
#endif
        if (hResult)
            DestroyDIB (hResult);
        if (hSource)
            DestroyDIB (hSource);

PostQuitMessage(0);
        break;

case WM_PAINT:
        // If nothing is loaded to display...
#ifdef MAKE_BITMAP
        if (hResult == 0) {
            HDC hdc;
            PAINTSTRUCT ps;
            hdc = BeginPaint (hWnd, &ps);
            EndPaint (hWnd, &ps);
```

XLI CORPORATION - CONFIDENTIAL
COLOR.C PAGE 5

```
                }
                                   else
                        EEPaint (hWnd, hSource, SourceWidth, SourceHeight, hResult, ResultWidth, ResultHeight, X, Y, Grid, OneBit,
ScaleFactor, BitsPerPixel, hPalette, xScaleRatio, yScaleRatio);
#else
                if (hSource == 0) {
                        HDC hdc;
                        PAINTSTRUCT ps;
                        hdc = BeginPaint (hWnd, &ps);
                        EndPaint (hWnd, &ps);
                        }
                                   else
                        EEPaint (hWnd, hSource, SourceWidth, SourceHeight, hResult, ResultWidth, ResultHeight, X, Y, Grid, OneBit,
ScaleFactor, BitsPerPixel, hPalette, 1.0f, 1.0f);
endif break;

case WM_MOUSEMOVE:
                                {
                                WORD x, y;
                                PWORD pC;
                                x = (WORD)(LOWORD(lParam) / ScaleFactor) + X;
                                y = (WORD)(HIWORD(lParam) / ScaleFactor) + Y;
#ifndef DEBUGGING_CASES
                                if ((hCases) && (x < ResultWidth) && (y < ResultHeight)) {
                                        pC = GlobalLock (hCases);
                        wsprintf (sTemp, "HD Color - (%d, %d) = %4.4X", x, y, *(pC + (DWORD)(x / xScaleRatio) + ((DWORD)(y /
yScaleRatio) * ((ResultWidth + 3) & 0xfffc))));
                                        GlobalUnlock (hCases);
                                        }
                                else
                        wsprintf (sTemp, "HD Color - (%d, %d)", x, y);
#else
                                if ((hCases) && (x < SourceWidth) && (y < SourceHeight)) {
                                        pC = GlobalLock (hCases);
                        wsprintf (sTemp, "HD Color - (%d, %d) = Case %d, H = %d, V = %d", x, y, (*(pC + x + (y *
SourceWidth))) & 0xff, (*(pC + x + (y * SourceWidth))) & 0x100 ? 1 : 0, (*(pC + x + (y * SourceWidth))) & 0x800 ? 1 :
0);
                                        GlobalUnlock (hCases);
                                        }
                                else
                        wsprintf (sTemp, "HD Color - (%d, %d)", x, y);
#endif
                SetWindowText (hWnd, sTemp);
                                }
                break;

case WM_LBUTTONDOWN:
                LastMouse = lParam;
                break;

case WM_LBUTTONUP:      // When the left button is clicked...
                {
                RECT rc;
                GetClientRect (hWnd, &rc);

// Either zoom in if the mouse was not moved, or pan if it was.
                if ((abs ((int)LOWORD(LastMouse) - (int)LOWORD(lParam)) < 10) &&
                    (abs ((int)HIWORD(LastMouse) - (int)HIWORD(lParam)) < 10)) {
                        X += (int)(LOWORD(lParam) / ScaleFactor);
                        Y += (int)(HIWORD(lParam) / ScaleFactor);
                        ScaleFactor *= 2.0F;
                        // Change X and Y so that the place where the user clicked will
                        // come out centered during the next PAINT.
                        X -= (int)((rc.right / ScaleFactor) / 2);
                        Y -= (int)((rc.bottom / ScaleFactor) / 2);
                        if (X < 0)
                                X = 0;
                        if (Y < 0)
                                Y = 0;

wsprintf (sTemp, "HD Fax - Scale factor - %d.%2.2d", (int)ScaleFactor, (int)((ScaleFactor -
(int)ScaleFactor) * 100));
                        SetWindowText (hWnd, sTemp);
                        }
                else {
                        X += (int)((int)(LOWORD(LastMouse) - LOWORD(lParam)) / ScaleFactor);
                        Y += (int)((int)(HIWORD(LastMouse) - HIWORD(lParam)) / ScaleFactor);
                        if (X < 0)
                                X = 0;
                        if (Y < 0)
                                Y = 0;
                        }
                }
                InvalidateRect (hWnd, NULL, TRUE);
                break;
```

XLI CORPORATION - CONFIDENTIAL
COLOR.C

```
        case WM_RBUTTONUP:
            {
            RECT rc;
            GetClientRect (hWnd, &rc);

X -= (int)((rc.right / ScaleFactor) / 2);
            Y -= (int)((rc.bottom / ScaleFactor) / 2);
            ScaleFactor /= 2.0F;

if (X <= 0)
                X = 0;
            if (Y <= 0)
                Y = 0;
            wsprintf (sTemp, "HD Fax - Scale factor - %d.%2.2d", (int)ScaleFactor, (int)((ScaleFactor - (int)ScaleFactor) *
100));
            SetWindowText (hWnd, sTemp);
            }
            InvalidateRect (hWnd, NULL, TRUE);
            break;

default:
            return (DefWindowProc (hWnd, message, wParam, lParam));
        }
    return 0;
}

// Take a path and filename and remove the file name.
void JustPath (LPSTR s)
{
    LPSTR lpTemp;

lpTemp = s + (long)lstrlen (s);   // Point to end of string.
    while ((*lpTemp != ':') && (*lpTemp != '\\') && (lpTemp > s))
        lpTemp--;
    if (lpTemp <= s)    // If no path delimiters found...
        s[0] = 0;       // Delete string.
    else if (*lpTemp == '\\')
        *lpTemp = 0;
    else
        *(lpTemp + 1) = 0;   // leave the delimiter.
}

/****************************************************************

FUNCTION: SaveAsDlg(HWND, unsigned, WORD, LONG)

PURPOSE: Allows user to change name to save file to

COMMENTS:

This will initialize the window class if it is the first time this
        application is run.  It then creates the window, and processes the
        message loop until a PostQuitMessage is received.  It exits the
        application by returning the value passed by the PostQuitMessage.

****************************************************************/
int FAR PASCAL SaveAsDlg(hDlg, message, wParam, lParam)
HWND hDlg;
unsigned message;
WORD wParam;
LONG lParam;
{
    LPSTR TempName = sTemp;

switch (message) {
        case WM_INITDIALOG:

/* If no filename is entered, don't allow the user to save to it */
            if (!FileName[0])
                bSaveEnabled = FALSE;
            else {
                bSaveEnabled = TRUE;

/* Process the path to fit within the IDC_PATH field */
                DlgDirList(hDlg, (LPSTR)DefPath, 0, IDC_PATH, 0x4010);

/* Send the current filename to the edit control */
                SetDlgItemText(hDlg, IDC_EDIT, FileName);

/* Accept all characters in the edit control */
                SendDlgItemMessage(hDlg, IDC_EDIT, EM_SETSEL, 0,
                    MAKELONG(0, 0x7fff));
            }
```

XLI CORPORATION - CONFIDENTIAL
COLOR.C PAGE 7

```
            /* Enable or disable the save control depending on whether the
             * filename exists.
             */
            EnableWindow(GetDlgItem(hDlg, IDOK), bSaveEnabled);

/* Set the focus to the edit control within the dialog box */
            SetFocus(GetDlgItem(hDlg, IDC_EDIT));
            return (FALSE);              /* FALSE since Focus was changed */ case WM_COMMAND:
            switch (wParam) {
                case IDC_EDIT:
                    /* If there was previously no filename in the edit
                     * control, then the save control must be enabled as soon as
                     * a character is entered.
                     */
                    if (HIWORD(lParam) == EN_CHANGE && !bSaveEnabled)
                        EnableWindow(GetDlgItem(hDlg, IDOK), bSaveEnabled = TRUE);
                    return (TRUE);

case IDOK:
                    /* Get the filename from the edit control */
                    GetDlgItemText(hDlg, IDC_EDIT, TempName, 128);

/* If there are no wildcards, then separate the name into
                     * path and name. If a path was specified, replace the
                     * default path with the new path.
                     */
                    if (CheckFileName(hDlg, FileName, TempName)) {
                        SeparateFile(hDlg, (LPSTR) str, (LPSTR) DefSpec,
                            (LPSTR) FileName);
                        if (str[0])
                            strcpy(DefPath, str);

/* Tell the caller a filename was selected */
                        EndDialog(hDlg, IDOK);
                    }
                    return (TRUE);

case IDCANCEL:
                    /* Tell the caller the user canceled the SaveAs function */
                    EndDialog(hDlg, IDCANCEL);
                    return (TRUE);
            }
            break;
        }
    return (FALSE);
}

/***********************************************************************
    FUNCTION: OpenDlg(HWND, unsigned, WORD, LONG)
    PURPOSE: Let user select a file, and open it.
***********************************************************************/
//BOOL DlgDirSelect(HWND, LPSTR, int);

HANDLE FAR PASCAL OpenDlg (HWND hDlg, unsigned message, WORD wParam, LONG lParam)
{
    HFILE hFile;

switch (message) {
        case WM_COMMAND:

switch (wParam) {
                case IDC_LISTBOX:

switch (HIWORD(lParam)) {
                        case LBN_SELCHANGE:
                            /* If item is a directory name, append "*.*" */
                            if (DlgDirSelectEx (hDlg, (LPSTR)str, 255, IDC_LISTBOX))
                                strcat (str, DefSpec);

SetDlgItemText (hDlg, IDC_EDIT, str);
                            SendDlgItemMessage (hDlg, IDC_EDIT, EM_SETSEL, 0, MAKELONG(0, 0x7fff));
                            break;

case LBN_DBLCLK:
                            goto openfile;
                    }
                    return (HANDLE)1;

case IDOK:
openfile:
                    GetDlgItemText(hDlg, IDC_EDIT, OpenName, 128);
                    if (strchr(OpenName, '*') || strchr(OpenName, '?')) {
                        SeparateFile (hDlg, (LPSTR) str, (LPSTR) DefSpec, (LPSTR) OpenName);
                        if (str[0])
```

XLI CORPORATION - CONFIDENTIAL
COLOR.C PAGE 8

```c
                strcpy (DefPath, str);
                ChangeDefExt (DefExt, DefSpec);
                UpdateListBox (hDlg);
                return (HANDLE)1;
                } if (!OpenName[0]) {
                MessageBox (hDlg, "No filename specified.", NULL, MB_OK | MB_ICONHAND);
                return (HANDLE)1;
                }

AddExt(OpenName, DefExt);

/* Open the file */
            if ((hPile = OpenFile(OpenName, (LPOFSTRUCT) &OfStruct, OF_READ)) == -1) {
                sprintf(str, "Error %d opening %s.", OfStruct.nErrCode, OpenName);
                MessageBox(hDlg, str, NULL, MB_OK | MB_ICONHAND);
                }
            else {
                /* Make sure there's enough room for the file */
                fstat(hFile, &FileStatus);
                if (FileStatus.st_size > MAXFILESIZE) {
                    sprintf (str, "Not enough memory to load %s.\n%s exceeds %ld bytes.",
                        OpenName, OpenName, MAXFILESIZE);
                    MessageBox (hDlg, str, NULL, MB_OK | MB_ICONHAND);
                    return (HANDLE)1;
                    }

/* File is opened and there is enough room so return
                 * the handle to the caller.
                 */
                strcpy(FileName, OpenName);
                EndDialog(hDlg, hFile);
                return (HANDLE)1;
                }
            return (HANDLE)1;

case IDCANCEL:
            EndDialog(hDlg, 0);
            return (HANDLE)1;
            }
        break;

case WM_INITDIALOG:                       /* message: initialize    */
        UpdateListBox(hDlg);
        SetDlgItemText(hDlg, IDC_EDIT, DefSpec);
        SendDlgItemMessage (hDlg,
            IDC_EDIT,                         /* dialog handle          */
            EM_SETSEL,                        /* where to send message  */
            0,                                /* select characters      */
            MAKELONG (0, 0x7fff));            /* additional information */
        SetFocus(GetDlgItem(hDlg, IDC_EDIT)); /* entire contents        */
        return (FALSE); /* Indicates the focus is set to a control */
        }
    return FALSE;
}

/***********************************************************************

FUNCTION: UpdateListBox(HWND);

PURPOSE: Update the list box of OpenDlg

***********************************************************************/
void UpdateListBox (HWND hDlg)
{
    strcpy(str, DefPath);
    strcat(str, DefSpec);
    DlgDirList(hDlg, str, IDC_LISTBOX, IDC_PATH, 0x4010);

/* To ensure that the listing is made for a subdir. of
     * current drive dir...
     */
    if (!strchr (DefPath, ':'))
        DlgDirList(hDlg, DefSpec, IDC_LISTBOX, IDC_PATH, 0x4010);

/* Remove the '..' character from path if it exists, since this
     * will make DlgDirList move us up an additional level in the tree
     * when UpdateListBox() is called again.
     */
    if (strstr (DefPath, ".."))
        DefPath[0] = '\0';

SetDlgItemText(hDlg, IDC_EDIT, DefSpec);
}
```

XLI CORPORATION - CONFIDENTIAL
COLOR.C  PAGE 9

```c
/*************************************************************
   FUNCTION: ChangeDefExt(PSTR, PSTR);
   PURPOSE: Change the default extension
*************************************************************/
void ChangeDefExt (LPSTR Ext, LPSTR Name)
{
    LPSTR pTptr;

pTptr = Name;
    while (*pTptr && *pTptr != '.')
        pTptr++;
    if (*pTptr)
        if (!strchr(pTptr, '*') && !strchr(pTptr, '?'))
            lstrcpy(Ext, pTptr);
}

/*************************************************************
   FUNCTION: SeparateFile(HWND, LPSTR, LPSTR, LPSTR)
   PURPOSE: Separate filename and pathname
*************************************************************/
void SeparateFile (HWND hDlg, LPSTR lpDestPath, LPSTR lpDestFileName, LPSTR lpSrcFileName)
{
    LPSTR lpTmp;
    char cTmp;

lpTmp = lpSrcFileName + (long) lstrlen(lpSrcFileName);
    while (*lpTmp != ':' && *lpTmp != '\\' && lpTmp > lpSrcFileName)
        lpTmp = AnsiPrev(lpSrcFileName, lpTmp);
    if (*lpTmp != ':' && *lpTmp != '\\') {
        lstrcpy(lpDestFileName, lpSrcFileName);
        lpDestPath[0] = 0;
        return;
    }
    lstrcpy(lpDestFileName, lpTmp + 1);
    cTmp = *(lpTmp + 1);
    lstrcpy(lpDestPath, lpSrcFileName);
    *(lpTmp + 1) = cTmp;
    lpDestPath[(lpTmp - lpSrcFileName) + 1] = 0;
}

/*************************************************************
   FUNCTION: AddExt(PSTR, PSTR);
   PURPOSE: Add default extension
*************************************************************/
void AddExt (LPSTR Name, LPSTR Ext)
{
    LPSTR pTptr;

pTptr = Name;
    while (*pTptr && *pTptr != '.')
        pTptr++;
    if (*pTptr != '.')
        lstrcat(Name, Ext);
}

/*************************************************************
   FUNCTION: CheckFileName(HWND, PSTR, PSTR)
   PURPOSE: Check for wildcards, add extension if needed
   COMMENTS:
      Make sure you have a filename and that it does not contain any
      wildcards.  If needed, add the default extension.  This function is
      called whenever your application wants to save a file.
*************************************************************/
BOOL CheckFileName (HWND hWnd, LPSTR pDest, LPSTR pSrc)
{
    LPSTR pTmp;

if (!pSrc[0])
        return (FALSE);              /* Indicates no filename was specified */ pTmp = pSrc;
    while (*pTmp) {                   /* Searches the string for wildcards */
        switch (*pTmp++) {
            case '*':
            case '?':
                MessageBox(hWnd, "Wildcards not allowed.",
                    NULL, MB_OK | MB_ICONEXCLAMATION);
                return (FALSE);
        }
    }

AddExt(pSrc, DefExt);            /* Adds the default extension if needed */ if (OpenFile(pSrc, (LPOFSTRUCT) &OfStruct, OF_EXIST) >= 0) {
        sprintf(str, "Replace existing %s?", pSrc);
        if (MessageBox(hWnd, str, "EditFile",
            MB_OKCANCEL | MB_ICONHAND) == IDCANCEL)
```

XLI CORPORATION - CONFIDENTIAL
COLOR.C                                                                                                          PAGE 10

```
            return (FALSE);
        }
    lstrcpy(pDest, pSrc);
    return (TRUE);
}

/************************************************************************
    FUNCTION: SaveFile(HWND)
    PURPOSE: Save current file
    COMMENTS:
        This saves the current contents of the Edit buffer, and changes
        bChanges to indicate that the buffer has not been changed since the
        last save.

Before the edit buffer is sent, you must get its handle and lock it
        to get its address. Once the file is written, you must unlock the
        buffer. This allows Windows to move the buffer when not in immediate
        use.
************************************************************************/
BOOL SaveFile (HWND hWnd)
{
    BOOL bSuccess;
    int  IOStatus;                              /* result of a file write */ if ((hFile = OpenFile(FileName, &OfStruct,
        OF_PROMPT | OF_CANCEL | OF_CREATE)) < 0) {

/* If the file can't be saved */
        sprintf(str, "Cannot write to %s.", FileName);
        MessageBox(hWnd, str, NULL, MB_OK | MB_ICONEXCLAMATION);
        return (FALSE);
    } hEditBuffer = (HANDLE) SendMessage(hEditWnd, EM_GETHANDLE, 0, 0L);
    pEditBuffer = LocalLock(hEditBuffer);

/* Set the cursor to an hourglass during the file transfer */
    hSaveCursor = SetCursor(hHourGlass);
    IOStatus = write(hFile, pEditBuffer, strlen(pEditBuffer));
    close(hFile);
    SetCursor(hSaveCursor);
    if (IOStatus != (int) strlen(pEditBuffer)) {
        sprintf(str, "Error writing to %s.", FileName);
        MessageBox(hWnd, str,
            NULL, MB_OK | MB_ICONHAND);
        bSuccess = FALSE;
    }
    else {
        bSuccess = TRUE;             /* Indicates the file was saved     */
        bChanges = FALSE;            /* Indicates changes have been saved */
    }

LocalUnlock(hEditBuffer);
    return (bSuccess);
}

/************************************************************************
    FUNCTION: QuerySaveFile(HWND);
    PURPOSE: Called when some action might lose current contents
    COMMENTS:
        This function is called whenever we are about to take an action that
        would lose the current contents of the edit buffer.
************************************************************************/
BOOL QuerySaveFile (HWND hWnd)
{
    int Response;
    FARPROC lpSaveAsDlg;

if (bChanges) {
        sprintf(str, "Save current changes: %s", FileName);
        Response = MessageBox(hWnd, str,
            "EditFile", MB_YESNOCANCEL | MB_ICONEXCLAMATION);
        if (Response == IDYES) {
check_name:

/* Make sure there is a filename to save to */ if (!FileName[0]) {
                lpSaveAsDlg = MakeProcInstance(SaveAsDlg, hInst);
                Response = DialogBox(hInst, "SaveAs",
                    hWnd, lpSaveAsDlg);
                FreeProcInstance(lpSaveAsDlg);
                if (Response == IDOK)
                    goto check_name;
                else
                    return (FALSE);
            }
```

XLI CORPORATION - CONFIDENTIAL
COLOR.C PAGE 11

```c
        SaveFile(hWnd);
        }
        else if (Response == IDCANCEL)
            return (FALSE);
    }
    else
        return (TRUE);
}

/************************************************************************
    FUNCTION: About(HWND, unsigned, WORD, LONG)
    PURPOSE:  Processes messages for "About" dialog box
    MESSAGES:
        WM_INITDIALOG - initialize dialog box
        WM_COMMAND    - Input received
************************************************************************/
BOOL FAR PASCAL About (HWND hDlg, unsigned message, WORD wParam, LONG lParam)
{
    switch (message) {
        case WM_INITDIALOG:
#ifdef USING_DLL
            {
            HINSTANCE hDllInstance;
            XLI_VERSION fpDllVersion;
            DWORD status;

GetCurrentDirectory (256, sTemp);
            lstrcat (sTemp, "\\xlihddll.dll");
            // Check version of DLL
            hDllInstance = LoadLibrary (sTemp);
            if (hDllInstance != NULL) {
                fpDllVersion = (XLI_VERSION)GetProcAddress (hDllInstance, "XLI_Version");
                if (fpDllVersion != NULL)
                    status = (fpDllVersion)();  // Should matter later.
                else
                    status = 0;
                FreeLibrary (hDllInstance);
                }
            else {
                wsprintf (sTemp, "Windows System Directory or Path - xlihddll.dll");
                hDllInstance = LoadLibrary ("xlihddll.dll");
                if (hDllInstance != NULL) {
                    fpDllVersion = (XLI_VERSION)GetProcAddress (hDllInstance, "XLI_Version");
                    if (fpDllVersion != NULL)
                        status = (fpDllVersion)();    // Should matter later.
                    else
                        status = 0;
                    FreeLibrary (hDllInstance);
                    }
                else {
                    wsprintf (sTemp, "DLL not found");
                    status = 0; // Cannot proceed.
                    }
                }
            wsprintf (sTmp, "%s - Version %d.%2.2d", sTemp, status / 100, status % 100);
            SendDlgItemMessage (hDlg, DLL_VERSION_STRING, WM_SETTEXT, 0, (DWORD)(LPSTR)sTmp);
            }
endif
            return (TRUE);

case WM_COMMAND:
            if (wParam == IDOK
                || wParam == IDCANCEL) {
                EndDialog(hDlg, TRUE);
                return (TRUE);
                }
            break;
        }
    return (FALSE);
} unsigned int ascii2hex(LPSTR);

unsigned int ascii2hex (LPSTR string)
{
    unsigned int x = 0;

while (*string) {
        x *= 0x10;
        if ((*string >= '0') && (*string <= '9')) {
            x += *string - '0';
            }
        if ((*string >= 'a') && (*string <= 'f')) {
            x += (*string - 'a') + 10;
            }
```

XLI CORPORATION - CONFIDENTIAL
COLOR.C                                                                                                PAGE 12

```
        if ((*string >= 'A') && (*string <= 'F')) {
            x += (*string - 'A') + 10;
        }
        string++;
    }
    return (x);
} unsigned int ascii2dec (LPSTR);

unsigned int ascii2dec (LPSTR string)
{
    unsigned int x = 0;

while (*string) {
        x *= 10;
        if ((*string >= '0') && (*string <= '9')) {
            x += *string - '0';
        }
        string++;
    }
    return (x);
}

// Used to get a single number from the user.  Can work in Hex or Decimal.
// Load the GetDataString with the string for the dialog box, GetDataValue
// with the current value, and GetDataMode with 0 for decimal and 1 for hex.
// Returns the value in GetDataValue.
BOOL FAR PASCAL MyGetData (HWND hWndDlg, unsigned uMsg, WORD wParam, LONG lParam)
{
    int stat;

switch (uMsg) {
        case WM_INITDIALOG:
            if (GetDataMode == 1) {  // hex mode
                wsprintf ((LPSTR)sTemp, "%x", GetDataValue);
                lstrcat (GetDataString, " (hex)");
            }
            else {  // decimal
                wsprintf ((LPSTR)sTemp, "%d", GetDataValue);
                lstrcat (GetDataString, " (dec)");
            }
            SendDlgItemMessage (hWndDlg, GET_DATA_STRING, WM_SETTEXT, 0, (DWORD)(LPSTR)GetDataString);
            SendDlgItemMessage (hWndDlg, GET_DATA_VALUE, WM_SETTEXT, 0, (DWORD)(LPSTR)sTemp);
            SendDlgItemMessage (hWndDlg, GET_DATA_VALUE, EM_SETSEL, 0, 0x7fff); // Select the text
            SetFocus (GetDlgItem(hWndDlg, GET_DATA_VALUE));
            return FALSE;

case WM_COMMAND: { switch (wParam) {
                case IDOK:
                    sTemp[0] = (char)0x27;  // Sets the length of the buffer.
                    sTemp[1] = (char)0;
                    stat = (int)SendDlgItemMessage (hWndDlg, GET_DATA_VALUE, EM_GETLINE, 0, (DWORD)(LPSTR)sTemp);
                    sTemp[stat] = 0;

if (GetDataMode == 1)  // hex mode
                        GetDataValue = ascii2hex (sTemp);
                    else
                        GetDataValue = ascii2dec (sTemp);

EndDialog (hWndDlg, wParam);  /* Zap the dialog box */
                    return TRUE;
                    break;

} /* end of switch (wParam) */
        } /* end of case WM_COMMAND */
        break;

default:
            return FALSE;
    } /* end of switch (uMsg) */
    return FALSE;
} int ConvertStore (int width, LPSTR lpTmp, LPHANDLE hBitmap, LPDWORD BitmapSize)
{
    int i, j;
    int *lpData;
//    WORD x;
    LPSTR lpTmp2 = lpTmp;

j = width / 5;  // There are 5 characters per output INT.
```

XLI CORPORATION - CONFIDENTIAL
COLOR.C                                                                                      PAGE 13

```c
    // Check to see if this puts us over the limit of the allocated memory.
    // Allocate more in necessary.

lpData = (int *)GlobalLock (*hBitmap);  // Point to the buffer.
    lpData += (*BitmapSize);   // Point to the next location to store data.

for (i = 0; i < j; i++) {
//      sscanf (lpTmp + (i * 5), "%x", (LPINT)lpData);
        if ((*lpTmp2 >= '0') && (*lpTmp2 <= '9'))
            *lpData = (*lpTmp2 - '0') << 12;
        else if ((*lpTmp2 >= 'A') && (*lpTmp2 <= 'F'))
            *lpData = (*lpTmp2 + 10 - 'A') << 12;
        else
            *lpData = 0;
        lpTmp2++;

if ((*lpTmp2 >= '0') && (*lpTmp2 <= '9'))
            *lpData |= (*lpTmp2 - '0') << 8;
        else if ((*lpTmp2 >= 'A') && (*lpTmp2 <= 'F'))
            *lpData |= (*lpTmp2 + 10 - 'A') << 8;
        lpTmp2++;

if ((*lpTmp2 >= '0') && (*lpTmp2 <= '9'))
            *lpData |= (*lpTmp2 - '0') << 4;
        else if ((*lpTmp2 >= 'A') && (*lpTmp2 <= 'F'))
            *lpData |= (*lpTmp2 + 10 - 'A') << 4;
        lpTmp2++;

if ((*lpTmp2 >= '0') && (*lpTmp2 <= '9'))
            *lpData |= (*lpTmp2 - '0');
        else if ((*lpTmp2 >= 'A') && (*lpTmp2 <= 'F'))
            *lpData |= (*lpTmp2 + 10 - 'A');
        lpTmp2++;

lpTmp2++;   // For the space between values lpData++;
        (*BitmapSize)++;
        if (((*BitmapSize) & 0x7fff) == 0) { // If we have just filled another 64k block, allocate more memory.
            GlobalUnlock (*hBitmap);
            *hBitmap = GlobalReAlloc (*hBitmap, ((*BitmapSize) * 2) + 0x10000, GMEM_ZEROINIT);
            if (*hBitmap == NULL)
                return 0;
            lpData = (int *)GlobalLock (*hBitmap);
            lpData += (*BitmapSize);
        }
    }

GlobalUnlock (*hBitmap);
    return 1;
} int CheckTwTb (LPSTR lpTmp)
{
    char TwTb[] = " tw    tb\r\n";
    if (lstrcmp (TwTb, lpTmp) == 0)   // Is strings match...
        return 1;   // Return true.
    return 0;
}

// Read from the file upto the end of a line or the end of the file.
int ReadLine (HFILE hFile, LPSTR lpTmp)
{
    int width = 0;
    while (_lread (hFile, lpTmp + width, 1) == 1) {
        if (*(lpTmp + width) == 0x0a) {
            width++;
            *(lpTmp + width) = 0x0; // Terminate string.
            break;  // have reached the end of a line, stop scanning.
        }
        width++;
    }
    return width;
}
```

XLI CORPORATION - CONFIDENTIAL
COLOR.H                                                                                              PAGE 1

---

```c
#define DEBUGGING_CASES 1

/* file menu items */
#define    IDM_NEW         100
#define    IDM_OPEN        101
#define    IDM_SAVE        102
#define    IDM_SAVEAS      103
#define    IDM_PRINT       104
#define    IDM_EXIT        105
#define    IDM_ABOUT       106
#define    IDM_SAVE_SETTINGS 107
#define    TOGGLE_0 110
#define    TOGGLE_1 111
#define    TOGGLE_2 112
#define    GRID_ON 113
#define    GRID_OFF 114
//#define      GRID_EDGES 115
#define    EDIT_CASE 124
#define    IDM_OPEN_1 125
#define    IDM_OPEN_1_RAW 126
#define    IDM_OPEN_ADAM 128
#define    HIGH_LIGHT 127

/* edit menu items */
#define    IDM_UNDO       200
#define    IDM_CUT        201
#define    IDM_COPY       202
#define    IDM_PASTE      203
#define    IDM_CLEAR      204

// Board menu items
#define BOARD_ADDRESS 210
#define BOARD_INTERRUPT 211
#define BOARD_MODULATOR 212
#define BOARD_LEFT 213
#define BOARD_RIGHT 214
#define BOARD_TOP 215

// Debug menu
#define  DEBUG_READ_TABLE 220
#define  DEBUG_WRITE_TABLE 221
#define  DEBUG_WRITE_FIFO 222
#define  DEBUG_REPEAT 223
#define  DEBUG_READ_STATUS 224

// Test menu
#define  TEST_PRINT  230
#define  TEST_FIFO   231
#define  TEST_TABLE  232
#define  TEST_PATTERN 233

// Table menu
#define TABLE_BIT     240
#define TABLE_NORM    241
#define TABLE_HOR     242
#define TABLE_VER     243
#define TABLE_SPLIT   244
define TABLE_PART    245 define TEXT_BASE 248 define ID_BUTTON 250
define ID_BUTTON_STR  1250
#define IDS_FILTERSTRING 1200
#define IDS_FILTERSTRING2 1201
define IDS_FILTERSTRING3 1202 define GET_DATA_VALUE  240
define GET_DATA_STRING 241 define DLL_VERSION_STRING 500

/* Control IDs */
#define     IDC_FILENAME  400
#define     IDC_EDIT      401
#define     IDC_FILES     402
#define     IDC_PATH      403
define     IDC_LISTBOX   404 define MAXFILESIZE 0x7fff         /* maximum file size that can be loaded */ int PASCAL WinMain (HANDLE, HANDLE, LPSTR, int);
BOOL InitApplication (HANDLE);
BOOL InitInstance (HANDLE, int);
long FAR PASCAL MainWndProc (HWND, unsigned, WORD, LONG);
```

XLI CORPORATION - CONFIDENTIAL
COLOR.H                                                                PAGE 2
------------------------------------------------------------------------------------

```c
BOOL FAR PASCAL About (HWND, unsigned, WORD, LONG);
HANDLE FAR PASCAL OpenDlg (HWND, unsigned, WORD, LONG);
int FAR PASCAL SaveAsDlg (HWND, unsigned, WORD, LONG);
BOOL CheckFileName (HWND, LPSTR, LPSTR);
BOOL SaveFile (HWND);
BOOL QuerySaveFile (HWND);
void SeparateFile (HWND, LPSTR, LPSTR, LPSTR);
void UpdateListBox (HWND);
void SetNewBuffer (HWND, HANDLE, LPSTR);
void AddExt (LPSTR, LPSTR);
void ChangeDefExt (LPSTR, LPSTR);

#define CONTROL_0 0x1fe0
#define CONTROL_1 0x1fe2
#define LEFT_MARGIN 0x1fe4
#define RIGHT_MARGIN 0x1fe6
#define FIFO_DATA 0x1fe8
define INT_ACK 0x1fec define TABLE_BASE 0
define CAPTURE_DATA 0x1000
#define STATUS_DATA 0x1800

// Status register bits
#define VSYNC_INT 0x01
#define HSYNC_INT 0x02
#define HALF_INT 0x04
#define EMPTY_INT 0x08
#define EMPTY_FLAG 0x80
#define HALF_FLAG 0x40
#define CAPTURE_EMPTY 0x20
define CAL_OUT 0x10 define TA_BITS 0xa
define CELL_SIZE 4
//#define CELL_SIZE 6
#define ENABLE_VIDEO 0x2000
#define B_BIT 0x2
#define A_BIT 0x4
#define X_BIT 0x1
define BD_LEVEL 0x8 define MAX_TRANSITION 256

// XLI Functions
BOOL FAR PASCAL MyGetData (HWND, unsigned, WORD, LONG);
void AddText (LPSTR);
void ClearText (void);
void JustPath (LPSTR);

define EDIT_SIZE 8192 extern HANDLE hInst;

extern char sTemp[512];   // General purpose string.
extern char sTmp[40]; // For little things.
extern char Xet2[8];

#define _GLOBALINC

/* Menu Defines */
#define IDM_PRINTSETUP 102
#define IDM_FONTS      103

/* Function Prototypes */
BOOL            ShowPrintSetup (HWND hWnd);
HDC             GetPrinterDC (void);
int  FAR PASCAL PrintAbortDlg (HWND hWnd, unsigned msg, WORD wParam, LONG lParam);
BOOL FAR PASCAL PrintAbortProc (HDC hDC, short code);
```

XLI CORPORATION - CONFIDENTIAL
COLOR.RC                                                                                        PAGE 1

```
//Microsoft Visual C++ generated resource script.
//
#include "resource.h"

#define APSTUDIO_READONLY_SYMBOLS
/////////////////////////////////////////////////////////////////////////////
//
// Generated from the TEXTINCLUDE 2 resource.
//
#define APSTUDIO_HIDDEN_SYMBOLS
#include "windows.h"
#undef APSTUDIO_HIDDEN_SYMBOLS
#include "color.h"

/////////////////////////////////////////////////////////////////////////////
undef APSTUDIO_READONLY_SYMBOLS /////////////////////////////////////////////////////////////////////////////
//
// Icon
//

XET                     ICON    DISCARDABLE     "color.ico"

/////////////////////////////////////////////////////////////////////////////
//
// Menu
//

HDFAXMENU MENU DISCARDABLE
BEGIN
    POPUP "&File"
    BEGIN
        MENUITEM "Open TIFF",               IDM_OPEN_1
        MENUITEM "Write TIFF",              IDM_WRITE_TIFF
        MENUITEM "&Print",                  IDM_PRINT
        MENUITEM "&About HD Fax...",        IDM_ABOUT
        MENUITEM SEPARATOR
        MENUITEM "E&xit",                   IDM_EXIT
    END
    POPUP "&Grid"
    BEGIN
        MENUITEM "O&n",                     GRID_ON
        MENUITEM "O&ff",                    GRID_OFF
        MENUITEM "Edge",                    GRID_EDGES
    END
    POPUP "&View"
    BEGIN
        MENUITEM "&Enhanced",               TOGGLE_0
        MENUITEM "&Source",                 TOGGLE_1
        MENUITEM SEPARATOR
        MENUITEM "Highlite",                IDM_HIGHLITE
    END
END /////////////////////////////////////////////////////////////////////////////
//
// Accelerator
//

HDFAXACC ACCELERATORS MOVEABLE PURE
BEGIN
    VK_BACK,        IDM_UNDO,           VIRTKEY, ALT
    VK_DELETE,      IDM_CUT,            VIRTKEY, SHIFT
    VK_INSERT,      IDM_COPY,           VIRTKEY, CONTROL
    VK_INSERT,      IDM_PASTE,          VIRTKEY, SHIFT
    VK_DELETE,      IDM_CLEAR,          VIRTKEY, SHIFT
    VK_RETURN,      DEBUG_REPEAT,       VIRTKEY, ALT
END

/////////////////////////////////////////////////////////////////////////////
//
// Dialog
//

SAVEAS DIALOG DISCARDABLE  10, 10, 180, 53
STYLE DS_MODALFRAME | WS_CAPTION | WS_SYSMENU
CAPTION "Save As "
BEGIN
    LTEXT           "Save As File &Name:",IDC_FILENAME,4,4,72,10
    LTEXT           "",IDC_PATH,84,4,92,10
    EDITTEXT        IDC_EDIT,4,16,100,12
    DEFPUSHBUTTON   "Save",IDOK,120,16,50,14
    PUSHBUTTON      "Cancel",IDCANCEL,120,36,50,14
```

XLI CORPORATION - CONFIDENTIAL
COLOR.RC                                                                                          PAGE 2

```
END

ABOUTBOX DIALOG DISCARDABLE  22, 17, 144, 75
STYLE DS_MODALFRAME | WS_CAPTION | WS_SYSMENU
CAPTION "About"
FONT 8, "System"
BEGIN
    CTEXT           "Copyright 1996, XLI Technology, Inc.",-1,0,5,144,8
    CTEXT           "HD Color Demo",-1,0,14,144,8
    CTEXT           "Version 0.1  February 8, 1996",-1,0,23,144,8
    DEFPUSHBUTTON   "OK",IDOK,56,60,32,14,WS_GROUP
    CTEXT           "",DLL_VERSION_STRING,0,35,143,20
END CANCELDLG DIALOG DISCARDABLE  20, 32, 158, 64
STYLE WS_POPUP | WS_VISIBLE | WS_CAPTION | WS_SYSMENU
CAPTION "HD Fax Printer"
FONT 10, "Helv"
BEGIN
    CTEXT           "Printing",-1,5,5,148,12,NOT WS_GROUP
    CTEXT           "Enhanced text",-1,5,16,148,12,NOT WS_GROUP
    CTEXT           "",300,5,27,148,12,NOT WS_GROUP
    DEFPUSHBUTTON   "Cancel",IDCANCEL,55,41,48,14
END GETDATADLG DIALOG DISCARDABLE  40, 40, 155, 108
STYLE DS_MODALFRAME | WS_POPUP | WS_VISIBLE
FONT 8, "System"
BEGIN
    DEFPUSHBUTTON   "OK",IDOK,55,89,40,14
    CTEXT           "",GET_DATA_STRING,9,11,138,38,NOT WS_GROUP
    EDITTEXT        GET_DATA_VALUE,29,66,90,13,ES_CENTER | ES_AUTOHSCROLL |
                    ES_NOHIDESEL
END ifdef APSTUDIO_INVOKED
/////////////////////////////////////////////////////////////////////////
//
// TEXTINCLUDE
//

1 TEXTINCLUDE DISCARDABLE
BEGIN
    "resource.h\0"
END

2 TEXTINCLUDE DISCARDABLE
BEGIN
    "#define APSTUDIO_HIDDEN_SYMBOLS\r\n"
    "#include ""windows.h""\r\n"
    "#undef APSTUDIO_HIDDEN_SYMBOLS\r\n"
    "#include ""test.h""\r\n"
    "\0"
END 3 TEXTINCLUDE DISCARDABLE
BEGIN
    "\r\n"
    "\0"
END /////////////////////////////////////////////////////////////////////////
endif    // APSTUDIO_INVOKED /////////////////////////////////////////////////////////////////////////
//
// String Table
//

STRINGTABLE DISCARDABLE
BEGIN
    IDS_FILTERSTRING        "Any files(*.*)|*.*|"
    IDS_FILTERSTRING2       "TIFF files(*.TIF)|*.tif|Any files(*.*)|*.*|"
    IDS_FILTERSTRING3       "BMP files(*.BMP)|*.bmp|Any files(*.*)|*.*|"
END ifndef APSTUDIO_INVOKED
/////////////////////////////////////////////////////////////////////////
//
// Generated from the TEXTINCLUDE 3 resource.
//

/////////////////////////////////////////////////////////////////////////
```

XLI CORPORATION - CONFIDENTIAL
COLOR.RC PAGE 3

```
#endif   // not APSTUDIO_INVOKED
```

XLI CORPORATION - CONFIDENTIAL
DIBAPI.H                                                                                                     PAGE 1

```
/*
 * dibapi.h
 *
 * Copyright (c) 1991 Microsoft Corporation. All rights reserved
 *
 * Header file for Device-Independent Bitmap (DIB) API.  Provides
 * function prototypes and constants for the following functions:
 *
 * BitmapToDIB()          Creates a DIB from a bitmap
 * ChangeBitmapFormat()  - Changes a bitmap to a specified DIB format
 * ChangeDIBFormat()     - Changes a DIB's BPP and/or compression format
 * CopyScreenToBitmap()  - Copies entire screen to a standard Bitmap
 * CopyScreenToDIB()      Copies entire screen to a DIB
 * CopyWindowToBitmap()  - Copies a window to a standard Bitmap
 * CopyWindowToDIB()     - Copies a window to a DIB
 * CreateDIBPalette()    - Creates a palette from a DIB
 * CreateDIB()           - Creates a new DIB
 * DestroyDIB()          - Deletes DIB when finished using it
 * DIBError()            - Displays message box with error message
 * DIBHeight()           - Gets the DIB height
 * DIBNumColors()        - Calculates number of colors in the DIB's color table
 * DIBToBitmap()         - Creates a bitmap from a DIB
 * DIBWidth()            - Gets the DIB width
 * FindDIBBits()         - Sets pointer to the DIB bits
 * GetSystemPalette()    - Gets the current palette
 * LoadDIB()             - Loads a DIB from a file
 * PaintBitmap()         - Displays standard bitmap in the specified DC
 * PaintDIB()            - Displays DIB in the specified DC
 * PalEntriesOnDevice()  - Gets the number of palette entries
 * PaletteSize()         - Calculates the buffer size required by a palette
 * PrintDIB()            - Prints the specified DIB
 * PrintScreen()         - Prints the entire screen
 * PrintWindow()         - Prints all or part of a window
 * SaveDIB()             - Saves the specified dib in a file
 *
 * See the file DIBAPI.TXT for more information about these functions.
 *
 */

/* Handle to a DIB */
#define HDIB HANDLE

/* Print Area selection */
#define PW_WINDOW      1
#define PW_CLIENT      2

/* Print Options selection */
#define PW_BESTFIT         1
#define PW_STRETCHTOPAGE   2
#define PW_SCALE           3

/* DIB Macros*/

// WIDTHBYTES performs DWORD-aligning of DIB scanlines.  The "bits"
// parameter is the bit count for the scanline (biWidth * biBitCount),
// and this macro returns the number of DWORD-aligned bytes needed
// to hold those bits.

#define WIDTHBYTES(bits)    (((bits) + 31) / 32 * 4)

/* Error constants */
enum {
        ERR_MIN = 0,                    // All error #s >= this value
        ERR_NOT_DIB = 0,                // Tried to load a file, NOT a DIB!
        ERR_MEMORY,                     // Not enough memory!
        ERR_READ,                       // Error reading file!
        ERR_LOCK,                       // Error on a GlobalLock()!
        ERR_OPEN,                       // Error opening a file!
        ERR_CREATEPAL,                  // Error creating palette.
        ERR_GETDC,                      // Couldn't get a DC.
        ERR_CREATEDDB,                  // Error create a DDB.
        ERR_STRETCHBLT,                 // StretchBlt() returned failure.
        ERR_STRETCHDIBITS,              // StretchDIBits() returned failure.
        ERR_SETDIBITSTODEVICE,          // SetDIBitsToDevice() failed.
        ERR_STARTDOC,                   // Error calling StartDoc().
        ERR_NOGDIMODULE,                // Couldn't find GDI module in memory.
        ERR_SETABORTPROC,               // Error calling SetAbortProc().
        ERR_STARTPAGE,                  // Error calling StartPage().
        ERR_NEWFRAME,                   // Error calling NEWFRAME escape.
        ERR_ENDPAGE,                    // Error calling EndPage().
        ERR_ENDDOC,                     // Error calling EndDoc().
        ERR_SETDIBITS,                  // Error calling SetDIBits().
        ERR_FILENOTFOUND,               // Error opening file in GetDib()
        ERR_INVALIDHANDLE,              // Invalid Handle
```

XLI CORPORATION - CONFIDENTIAL
DIBAPI.H                                                                                                          PAGE 2

---

```
        ERR_DIBFUNCTION,                // Error on call to DIB function
        ERR_MAX                         // All error #s < this value
    };

/* Function prototypes */

HDIB       FAR  BitmapToDIB (HBITMAP hBitmap, HPALETTE hPal);
HDIB       FAR  ChangeBitmapFormat (HBITMAP  hBitmap,
                                    WORD     wBitCount,
                                    DWORD    dwCompression,
                                    HPALETTE hPal);
HDIB       FAR  ChangeDIBFormat (HDIB hDIB, WORD wBitCount,
                                 DWORD dwCompression);
HBITMAP    FAR  CopyScreenToBitmap (LPRECT);
HDIB       FAR  CopyScreenToDIB (LPRECT);
HBITMAP    FAR  CopyWindowToBitmap (HWND, WORD);
HDIB       FAR  CopyWindowToDIB (HWND, WORD);
HPALETTE   FAR  CreateDIBPalette (HDIB hDIB);
HDIB       FAR  CreateDIB(DWORD, DWORD, WORD);
WORD       FAR  DestroyDIB (HDIB);
void       FAR  DIBError (int ErrNo);
DWORD      FAR  DIBHeight (LPSTR lpDIB);
WORD       FAR  DIBNumColors (LPSTR lpDIB);
HBITMAP    FAR  DIBToBitmap (HDIB hDIB, HPALETTE hPal);
DWORD      FAR  DIBWidth (LPSTR lpDIB);
LPSTR      FAR  FindDIBBits (LPSTR lpDIB);
HPALETTE   FAR  GetSystemPalette (void);
HDIB       FAR  LoadDIB (LPSTR);
BOOL       FAR  PaintBitmap (HDC, LPRECT, HBITMAP, LPRECT, HPALETTE);
BOOL       FAR  PaintDIB (HDC, LPRECT, HDIB, LPRECT, HPALETTE);
int        FAR  PalEntriesOnDevice (HDC hDC);
WORD       FAR  PaletteSize (LPSTR lpDIB);
WORD       FAR  PrintDIB (HDIB, WORD, WORD, WORD, LPSTR);
WORD       FAR  PrintScreen (LPRECT, WORD, WORD, WORD, LPSTR);
WORD       FAR  PrintWindow (HWND, WORD, WORD, WORD, WORD, LPSTR);
WORD       FAR  SaveDIB (HDIB, LPSTR);
```

XLI CORPORATION - CONFIDENTIAL
DIBUTIL.H PAGE 1

---

```
/*
 * dibutil.h
 *
 * Copyright (c) 1991 Microsoft Corporation. All rights reserved.
 *
 * Header file for Device-Independent Bitmap (DIB) API.  Provides
 * function prototypes and constants for the following functions:
 *
 * AllocRoomForDIB()     - Allocates memory for a DIB
 *
 */

/* DIB constants */
#define PALVERSION   0x300

/* DIB macros */
#define IS_WIN30_DIB(lpbi)     ((*(LPDWORD)(lpbi)) == sizeof(BITMAPINFOHEADER))
#define RECTWIDTH(lpRect)      ((lpRect)->right - (lpRect)->left)
#define RECTHEIGHT(lpRect)     ((lpRect)->bottom - (lpRect)->top)

/* function prototypes */
HANDLE          AllocRoomForDIB(BITMAPINFOHEADER bi, HBITMAP hBitmap);
```

XLI CORPORATION - CONFIDENTIAL
EEU.C PAGE 1

```c
#include <windows.h>
#include <string.h>
#include <stdio.h>
#include <io.h>
#include "commdlg.h"
#include "dibapi.h"
#include "dibutil.h"
#include "xlitiff.h"
#include <stdlib.h>
#include "color.h"
#include "xlihdfax.h"

int read_header (int, int *, int *, long *, int *, int *, long *);
extern char GetDataString[40];
extern WORD GetDataValue;
extern WORD GetDataMode;

/*
    Open a multi-bit TIFF file and do a software edge enhancement generating case numbers (etc)
    for normal display.

Prompt the user for the name of the file.
    Get the TIFF header.
    Allocate space for the entire file in RAM.
    Read the data into RAM.
    Allocate space for the result case values for the entire image.
    Make Vertical and Horizontal transition maps.
    Fill the result data with no-hit values.
    Process the source:
        Look for a transition.
        Follow the transitions around the start point to get the case number for the start point.
        Follow the transitions adjacent to the start point given that we know what the previous
        transitions were.
        Stop when back at the beginning.
        Find a new transition path and process it.
    Return.
*/
int xTiff,yTiff;
long offset_to_data;
int photointerp;
int bitsperpixel;
long offset_to_palette;
#define VERTMARGIN 32
BOOL FAR PASCAL GetDataDlg (HWND, unsigned, WORD, LONG);

/*
        This code gets called to open a file and scale it to the new size.  The handles of the
        data and the size of the source and destination bitmaps are all passed as pointers since
        this code must set all of these.  After opening the source file and determining the size
        the source bitmap is allocated and the file is read.  Then the user is prompted for the
        destination size and the destination bitmap is allocated.  Then the scaling DLL is called
        to perform the scaling.

A return of 0 means error, 1 for success.
*/
char sDirName[80];
char sFile[40], sFileTitle[40];
char sFilter[40];
int hFile;
OFSTRUCT ofs;
DWORD XLI_Scale (LP_XLI_HD_DLL_DATA);

int Open8BitFile (HWND hWnd, LPHANDLE lphSrc, LPWORD lpSrcX, LPWORD lpSrcY, LPHANDLE lphDest,
                                                    LPWORD lpDestX, LPWORD lpDestY, LPWORD
BitsPerPixel, LPHANDLE lphPalette,
                                                            float *xRatio, float *yRatio)
{
    DWORD BitmapSize = 0;
    OPENFILENAME ofn;
    int i, cbString;
    char cReplace;    /* string separator for szFilter */
    PBYTE lpSrc;
        PBYTE lpDest;
            int DestLongs;
    int status;
    int xByte;  // How many bytes in a line. For reading file.
    int xLongs; // How many long words in a line. For processing output 32bits at a time.

#ifdef USING_DLL
        HINSTANCE hDllInstance;
        XLI_VERSION fpDllVersion;
        XLI_SCALE fpDllScale;
```

XLI CORPORATION - CONFIDENTIAL
EEU.C PAGE 2

```
            GetCurrentDirectory (256, sTemp);
            lstrcat (sTemp, "\\xlihddll.dll");
            // Check version of DLL
//          hDllInstance = LoadLibrary ("d:\\xet\\faxdll\\win32_dl\\xlihddll.dll");
            hDllInstance = LoadLibrary (sTemp);
            if (hDllInstance != NULL) {
                    fpDllVersion = (XLI_VERSION)GetProcAddress (hDllInstance, "XLI_Version");
                    if (fpDllVersion != NULL)
                            status = (fpDllVersion)();    // Should matter later.
                    else
                            return 0;
            }
     else {
                    hDllInstance = LoadLibrary ("xlihddll.dll");
                    if (hDllInstance != NULL) {
                            fpDllVersion = (XLI_VERSION)GetProcAddress (hDllInstance, "XLI_Version");
                            if (fpDllVersion != NULL)
                                    status = (fpDllVersion)();   // Should matter later.
                            else
                                    return 0;
                    }
                    else {
                            MessageBox (NULL, "Missing the XLIHDDLL.DLL", NULL, MB_OK);
                            return 0; // Cannot proceed.
                    }
            }
endif if (*lphSrc) {  // If a bitmap was loaded, then release it first.
        DestroyDIB (*lphSrc);
        *lphSrc = 0;
        }
ifdef MAKE_BITMAP
    if (*lphDest) {  // Same for destination.
        DestroyDIB (*lphDest);
        *lphDest = 0;
        }
endif // Get the directory that we used before and store in sDirName
    // if none found, then use the Windows directory.
    if (GetProfileString (Xet2, "directory", NULL, (LPSTR)sDirName, sizeof(sDirName)) == 0)
        GetWindowsDirectory (sDirName, sizeof(sDirName));
    GetProfileString (Xet2, "file", "", (LPSTR)sFile, sizeof(sFile));

if ((cbString = LoadString (hInst, IDS_FILTERSTRING2, sFilter, sizeof(sFilter))) == 0) {
        return 0;
        }
    cReplace = sFilter[cbString - 1]; /* retrieve wild character */ for (i = 0; sFilter[i] != '\0'; i++) {
        if (sFilter[i] == cReplace)
            sFilter[i] = '\0';
        }

/* Set all structure members to zero. */
    memset (&ofn, 0, sizeof(OPENFILENAME));

ofn.lStructSize = sizeof(OPENFILENAME);
    ofn.hwndOwner  = hWnd;
    ofn.lpstrFilter = sFilter;
    ofn.nFilterIndex = 1;
    ofn.lpstrFile= sFile;
    ofn.nMaxFile = sizeof(sFile);
    ofn.lpstrFileTitle = sFileTitle;

ofn.nMaxFileTitle = sizeof (sFileTitle);
    ofn.lpstrInitialDir = sDirName;
    ofn.Flags = OFN_SHOWHELP | OFN_PATHMUSTEXIST | OFN_FILEMUSTEXIST;

if (!GetOpenFileName (&ofn)) {
            MessageBox (NULL, "Error selecting file.", NULL, MB_OK);
        return 0;
        }
    // Set the cursor to a hourglass, in case the loading operation
    // takes more than a sec, the user will know what's going on.
    SetCursor (LoadCursor (NULL, IDC_WAIT));

// Load the data!
    if ((hFile = OpenFile (ofn.lpstrFile, &ofs, OF_READ)) != -1) {

/* read the TIFF header */
                    offset_to_palette = 0;
        if ((status = read_header (hFile, &xTiff, &yTiff, &offset_to_data,
                            &photointerp, &bitsperpixel, &offset_to_palette)) != 0) {
            return (-1);
            }
```

XLI CORPORATION - CONFIDENTIAL
EEU.C  PAGE 3

```c
                // If there is a palette, read it into memory.
                if (offset_to_palette) {
                        LPWORD lpPalette;
                        *lphPalette = GlobalAlloc (GMEM_MOVEABLE, 4096);
                        if (*lphPalette == 0) {
                                MessageBox (NULL, "Failed to allocate palette space", NULL, MB_OK);
                                }
                        else {
                                lpPalette = GlobalLock (*lphPalette);
                                _llseek (hFile, offset_to_palette, SEEK_SET);
                _lread (hFile, lpPalette, 256 * 3 * 2);
                                GlobalUnlock (*lphPalette);
                                }
                        }
                else
                        *lphPalette = 0;

*BitsPerPixel = bitsperpixel;
                if (*BitsPerPixel == 1)
        xByte = (xTiff + 7) / 8;   // x is the number of bits in a line, convert to bytes.
                        else if (*BitsPerPixel == 8)
        xByte = xTiff;
                        else if (*BitsPerPixel == 24)
        xByte = xTiff * 3;
    xLongs = (xByte + 3) / 4;

if (xTiff <= 0)
        return (-1);
    if (yTiff <= 0)
        return (-1);
                *lpSrcX = xTiff;
                *lpSrcY = yTiff;

_llseek (hFile, offset_to_data, SEEK_SET);

// Allocate space for the source bitmap.
    *lphSrc = GlobalAlloc (GMEM_MOVEABLE, (DWORD)xLongs * (DWORD)yTiff * 4);
    if (*lphSrc == NULL) {
       MessageBox (NULL, "Failed to allocate space for source bitmap", NULL, MB_OK);
       return 0;
       }
    lpSrc = (PBYTE)GlobalLock (*lphSrc);
                if (lpSrc == NULL) {
                        MessageBox (NULL, "Failed to lock source bitmap", NULL, MB_OK);
                        return 0;
                        }

// Read data into the source array. Always on dword boundaries.
    for (i = 0; i < yTiff; i++) {
        *(PDWORD)(lpSrc + ((i + 1) * (DWORD)xLongs * 4) - 4) = 0;   // In case the data does not fill up the last long
word, zero it out first.
        // Read the next line of source data into the memory buffer.
        if ((int)_lread (hFile, lpSrc + (i * (DWORD)xLongs * 4), xByte) != xByte) {
           MessageBox (NULL, "Error reading file", NULL, MB_OK);
           return -1;
           }
        }
    _lclose (hFile);
    }
  else {
     return 0;
     }

// Save this so the next time we know which file to open.
  JustPath (ofn.lpstrFile);
  WriteProfileString (Xet2, "directory", ofn.lpstrFile);
  WriteProfileString (Xet2, "file", ofn.lpstrFileTitle);

#ifdef MAKE_BITMAP
          // Ask the user for the new size...
          {
  FARPROC lpProc;

GetDataMode = 0;   // decimal
  wsprintf (GetDataString, "Source bitmap is %d wide, enter new width", *lpSrcX);   // Load the dialog box string
  GetDataValue = *lpSrcX;    // Enter the initial data lpProc = MakeProcInstance (MyGetData, hInst);
  DialogBox (hInst, "GETDATADLG", hWnd, lpProc);
  *lpDestX = GetDataValue;    // Get the new data wsprintf (GetDataString, "Source bitmap is %d high, enter new height", *lpSrcY);   // Load the dialog box string
  GetDataValue = *lpSrcY;    // Enter the initial data
  DialogBox (hInst, "GETDATADLG", hWnd, lpProc);
  FreeProcInstance (lpProc);
  *lpDestY = GetDataValue;    // Get the new data
```

XLI CORPORATION - CONFIDENTIAL
EEU.C  PAGE 4

---

```c
            *xRatio = (float)*lpDestX / (float)*lpSrcX;
            *yRatio = (float)*lpDestY / (float)*lpSrcY;

if ((*lpDestX <= 1) || (*lpDestY <= 1)) {
                    wsprintf (sTemp, "Invalid size specified: %d x %d", *lpDestX, *lpDestY);
                    MessageBox (NULL, sTemp, NULL, MB_OK);
                    return 0;
                    } if (*BitsPerPixel == 1)
                    DestLongs = (*lpDestX + 31) / 32;        // round up to get width of destination in long-words.
            else if (*BitsPerPixel == 8)
            DestLongs = (*lpDestX + 3) / 4;
            else if (*BitsPerPixel == 24)
            DestLongs = ((*lpDestX * 3) + 3) / 4;
            }

// Process the data...
// lpSrc points to the source.
// Allocate enough space for the result data on long word boundaries.
*lphDest = GlobalAlloc (GMEM_MOVEABLE, (DWORD)DestLongs * (DWORD)*lpDestY * 4);
if (*lphDest == NULL) {
    MessageBox (NULL, "Error allocating destination bitmap space", NULL, MB_OK);
    return 0;
    }
lpDest = GlobalLock (*lphDest);
        if (lpDest == NULL) {
                MessageBox (NULL, "Error locking destination bitmap space", NULL, MB_OK);
                return 0;
                }
endif // Call the dll to scale this bitmap.
        {
        XLI_HD_DLL_DATA Fx;

Fx.SrcWidth = *lpSrcX;
        Fx.SrcHeight = *lpSrcY;
        Fx.lpSrc = lpSrc;

Fx.DestWidth = *lpDestX;
        Fx.DestHeight = *lpDestY;
        Fx.lpDest = lpDest;

Fx.BandHeight = Fx.DestHeight;      // number of lines each band can hold.
        Fx.RenderedLines = 0;        // For DLL use, must be 0 for first band.
        Fx.Color = 0;        // 0 means that "0" is white and "1" is black. Non-0 is opposite.
        Fx.Error = 0;        // 0 means no problem, otherwise check include file.

#ifdef USING_DLL
        // We found the library earlier and now assume that it is available.
        fpDllScale = (XLI_SCALE)GetProcAddress (hDllInstance, "XLI_Scale");
        if (fpDllScale != NULL)
                status = (fpDllScale)(&Fx);
        FreeLibrary (hDllInstance);
#else
        // Not calling the DLL
        status = XLI_Scale (&Fx);

#endif
        } ifdef MAKE_BITMAP
        GlobalUnlock (*lphDest);        // Finished with the destination.

// Now take the source and do a simple scale to the new size so we can easily compare the difference.
        if (*BitsPerPixel == 1) {
                HANDLE hTmp;
            PBYTE lpTmp, lpS, lpD;
                float ScaleX, ScaleY;
                int j, k, l;

ScaleX = (float)*lpDestX / (float)*lpSrcX;
                ScaleY = (float)*lpDestY / (float)*lpSrcY;

hTmp = GlobalAlloc (GMEM_MOVEABLE, (DWORD)DestLongs * (DWORD)*lpDestY * 4);
            if (hTmp == NULL) {
                MessageBox (NULL, "Error allocating temp bitmap space", NULL, MB_OK);
                return 0;
                }
            lpTmp = GlobalLock (hTmp);
                    if (lpTmp == NULL) {
                            MessageBox (NULL, "Error locking temp bitmap space", NULL, MB_OK);
                            return 0;
                            }
```

XLI CORPORATION - CONFIDENTIAL
EEU.C                                                                                               PAGE 5

```
                        for (i = 0; i < *lpSrcY; i++) { // for each source line...
                                // make temp pointers for this line.
                                lpS = lpSrc + (i * xLongs * 4);
                                lpD = lpTmp + ((int)(i * ScaleY) * DestLongs * 4);
                                FillMemory (lpD, DestLongs * 4, 0);     // Start the destination at 0.
                                for (j = 0; j < *lpSrcX; j++) { // for each pixel in a source line...
                                        // Or in the 1's to the destination line, it gets copied to do the vertical scaling later.
                                        if (*(lpS + (j >> 3)) & (1 << (7 - (j & 7)))) {   // If this source bit is set...
                                                for (k = 0; k < ScaleX; k++) {
                                                        l = (int)(j * ScaleX) + k;
                                                        *(lpD + (l >> 3)) |= (1 << (7 - (l & 7)));
                                                }
                                        }
                                }
                                for (j = 1; j < ScaleY; j++)
                                        CopyMemory (lpD + (j * DestLongs * 4), lpD, DestLongs * 4);
                        }
                        GlobalUnlock (*lphSrc);
                        GlobalFree (*lphSrc);
                        GlobalUnlock (hTmp);
                        *lphSrc = hTmp;         // Change to scaled source.
                        *lpSrcX = *lpDestX;
                        *lpSrcY = *lpDestY;
                }
                else if (*BitsPerPixel == 8) {
                        HANDLE hTmp;
                        PBYTE lpTmp, lpS, lpD;
                        float ScaleX, ScaleY;
                        int j, k;

ScaleX = (float)*lpDestX / (float)*lpSrcX;
                        ScaleY = (float)*lpDestY / (float)*lpSrcY;

hTmp = GlobalAlloc (GMEM_MOVEABLE, (DWORD)DestLongs * (DWORD)*lpDestY * 4);
                if (hTmp == NULL) {
                        MessageBox (NULL, "Error allocating temp bitmap space", NULL, MB_OK);
                        return 0;
                }
                lpTmp = GlobalLock (hTmp);
                        if (lpTmp == NULL) {
                                MessageBox (NULL, "Error locking temp bitmap space", NULL, MB_OK);
                                return 0;
                        } for (i = 0; i < *lpSrcY; i++) { // for each source line...
                                // make temp pointers for this line.
                                lpS = lpSrc + (i * xLongs * 4);
                                lpD = lpTmp + ((int)(i * ScaleY) * DestLongs * 4);
                                for (j = 0; j < *lpSrcX; j++) { // for each pixel in a source line...
                                        for (k = 0; k < (int)(ScaleX + 0.5f); k++) {
                                                *(lpD + (DWORD)(j * ScaleX) + k) = *(lpS + j);
                                        }
                                }
                                for (j = 1; j < ScaleY; j++)
                                        CopyMemory (lpD + (j * DestLongs * 4), lpD, DestLongs * 4);
                        }
                        GlobalUnlock (*lphSrc);
                        GlobalFree (*lphSrc);
                        GlobalUnlock (hTmp);
                        *lphSrc = hTmp;         // Change to scaled source.
                        *lpSrcX = *lpDestX;
                        *lpSrcY = *lpDestY;
                }
endif SetCursor (LoadCursor (NULL, IDC_ARROW)); // Restore cursor.

return 1;
}

// TIFF READER ///////////////////////////////

/* This reads only XLI style TIFF files. That is the only tags of interest
are width, height, and offset to data. The data must be uncompressed, one
bit, and in one strip. That's it, that's all you get...

Call read_header after opening the file, and then if there are no errors,
start reading data at the data_offset location.
*/ struct TIFF {
char byteorder[2];
unsigned char version[2];
long ifd_offset;
```

XLI CORPORATION - CONFIDENTIAL
EEU.C                                                                                                           PAGE 6
----------------------------------------------------------------------------------------------------------------------

```c
};

struct TIFF rtiff;
int rnum_tags_used;    /* This is the pointer as tags are used and count later */ struct TAG {
  short tag_value;
  short tag_type;
  long tag_length;
  union {
    unsigned char byte_value[4];
    char ascii_value[4];
    short short_value[2];
    long long_value;
    long value_offset;
    } value;
  unsigned char *data_block; /* in case this tag has more data */
  int bytes_per;
  /* we have the length of the data block already, although we do have to
  calculate it based on the count and size */
};

/* let's be verbose */
struct TAG rtags[40];    /* select some large number of tags */

/***********************************************************************/
/* This reads everything from the file sans the data, returns the offset to
the data block, along with the x and y sizes. */ int read_header (int file, int *xsize, int *ysize, long *data_offset, int *photoi, int *bitsperpixel, long
*palette_offset)
{
  int i;
  long tmp = 0;
  long line_length, line_count, strip_offset;

rtiff.byteorder[0] = 'I';
  rtiff.byteorder[1] = 'I';
  rtiff.version[0] = 42;
  rtiff.version[1] = 0;
  rtiff.ifd_offset = 8;

/* start by reading the 8 byte header */
  _llseek(file,(long)0,SEEK_SET);
  _lread(file,&rtiff.byteorder[0],sizeof(rtiff));
  if (rtiff.byteorder[0] != 'I')
    return(-1);
  if (rtiff.byteorder[1] != 'I')
    return(-1);
  if (rtiff.version[0] != 42)
    return(-1);
  if (rtiff.version[1] != 0)
    return(-1);

/* next comes the count of tags for this image */
  _llseek (file,(long)rtiff.ifd_offset,SEEK_SET);
  _lread (file,&rnum_tags_used,2);

for (i = 0; i < rnum_tags_used; i++) {
    _lread (file,&rtags[i].tag_value,12);    /* tags are always 12 bytes */
    if (rtags[i].tag_value == (short)TGIMAGEWIDTH)
      line_length = rtags[i].value.long_value;

if (rtags[i].tag_value == (short)TGIMAGELENGTH)
      line_count = rtags[i].value.long_value;

if (rtags[i].tag_value == (short)TGSTRIPOFFSETS) {
      /* I had assumed that this field always just pointed to the data.
         Now I allow for the possibility that this points to a bunch of
         strip offsets.  However, all I do is return the first one,
         since I still require contiguous data. */
      if (rtags[i].tag_length > 1) {
        /* Seek to where the offsets really are... */
        _llseek (file,(long)rtags[i].value.long_value,SEEK_SET);
        _lread (file,&strip_offset,4);     /* read the first strip offset */

/* Re-seek to where we were */
        _llseek (file,((long)rtiff.ifd_offset + ((i + 1) * 12)),SEEK_SET);
        }
      else
        strip_offset = rtags[i].value.long_value;
      } if (rtags[i].tag_value == (short)TGPHOTOMETRICINTERPRETATION)
      *photoi = (int)rtags[i].value.long_value;
    if (rtags[i].tag_value == (short)TGBITSPERSAMPLE)
```

XLI CORPORATION - CONFIDENTIAL
EEU.C PAGE 7

```
        *bitsperpixel = (int)rtags[i].value.long_value;
    if (rtags[i].tag_value == (short)TGCOLORMAP)
        *palette_offset = rtags[i].value.long_value;
    }
    *xsize = (int)line_length;
    *ysize = (int)line_count;
    *data_offset = (long)strip_offset;
    return (0);
}
```

XLI CORPORATION - CONFIDENTIAL
ENTRY.C                                                                                       PAGE 1

---

```
// Main entry point for DLL

/*
This DLL will take a 1-bit bitmap and scale it to some other bitmap.
The importance is the quality with which this is done.  The source
bitmap is converted to case numbers which imply the slope and intercept
at each source pixel.  The destination bitmap gets the best possible
rendering of the source with lines and curves reproduced well.

The calling routine passes a pointer to a structure of data which this
DLL acts on (there are no variables in the DLL which must be initialized
or remembered).  This means that the DLL is share-able among threads.
The structure contains pointers to the source and destination bitmaps and
information about them.  See below.

The DLL must be given the entire source bitmap but since destination
bitmaps can be large, the destination can be handled in bands.  (Note:
that the destination is built sequentially so virtual memory might not
be too bad for handling large bitmaps.)  To have the DLL work in bands
(pieces of the destination which are full width, but not height) the
value of lines per band must be set to match the allocated space.  To
process the entire destination without multiple bands, just set the
band size to the destination height.

For example: a 200dpi fax converted to 600dpi would require 500K for the
source bitmap and 4M for the destination.  This is probably too much to
assume to be available.  The source bitmap has to be available so that's
500K and if we make the destination band 512K we have only used 1M.  If
the destination bitmap is going to a laserprinter, then the page width
is really 8 inches or 4800 pixels.  4800 pixels is exactly 150 DWORDS, so
that is 600 bytes per line.  512K / 600 bytes = 873 and change.  So each
band would get 873 lines.

BY THE WAY: The lines of the source and destination bitmaps must be 32-bit
aligned!!!!!  When you pass the size of the bitmap, do it in pixels but
the DLL converts these numbers to DWORDs by rounding up and deals with
the entire number of DWORDs.

The banding process means that there are values in the structure which
allow the DLL to keep track of the progress and these must not be changed
by the calling routine in between calls for each band.  (Unless you call
me and ask how to do things differently.)  Also, the banding process does
not take much additional time.

If you do not want to pass the entire source bitmap to the DLL, there is
a way around this, but the calling function will have to deal with the
boundary conditions very carefully, and make sure that the version of
the DLL works with what you are doing.  If this is needed, I would want
to change the DLL to assist in this.

One thing I avoided was having the destination bitmap size specified as
scale factors of the source.  That is your problem.  But that is also
why you should pass the real size of the source and destination bitmaps,
not the count of pixels rounded up to 32-bits, since the scale factor
will be based on the actual pixel counts.  Also the destination bitmap
width (and line spacing) is based on the specified width (and 32-bit
alignment) which means that you cannot just scale up the number
of DWORDs per line from the source.

The color variable in the structure has to do with the orientation of the
algorithm.  The problem is whether the code should always make one color
dominant: so when it is not clear which color is the feature to enhance,
choose the one specified by the color value.  This occurs in 1-pixel wide
fonts at an intersection, like on a small 'b'.  At the point of the 'b'
where the upper curve meets the vertical bar you get:

X
        X
        X
        X XXXX      =         a bc
        XX            X       =         de
        X                     X
        X                     X
        XX                    X
        X XXXX

The letters match-up with the point on the 'b' that I described above.  The problem
is whether or not the curve to follow is from b to e or at 90 degrees to them.  If
the pixels marked X were black (on white) then we would know to connect b to e, but
if this was white on black then we would still want to connect the same ones.  The
algorithm does not know this and must be told.

When in doubt, check the source code provided!

*/ include <windows.h>
```

XLI CORPORATION - CONFIDENTIAL
ENTRY.C PAGE 2

```c
#include "XLIHDFAX.H"
#include "color.h"

#ifdef DEBUGGING_CASES
HANDLE hCases;
#endif

DWORD XLI_Scale (LP_XLI_HD_DLL_DATA HdData)
{
        long ReturnValue = -1;
        HANDLE hCase;
        PWORD pCase;
#ifdef DEBUGGING_CASES
        PWORD pCases;       // for the buffer where we save everything for debugging.
#endif
        HANDLE hBitTmp;
        PBYTE pBitTmp;
        DWORD xLongsSrc;
        DWORD xLongsDest;
        DWORD Line;
        DWORD Height;
        PBYTE pTmp = HdData->lpSrc;
        long SourceLine;
#ifdef MAKE_BITMAP
    float ScaleX, ScaleY;    // Ratio of Dest to Source
        HGLOBAL hBits;
        LPWORD pBits;
        DWORD BitsX, BitsY;
#endif
        long y;

//      DanBreak();

//      xLongsSrc = (HdData->SrcWidth + 31) / 32;       // Round pixels up to DWORDs
        xLongsSrc = (HdData->SrcWidth + 3) / 4; // Round pixels up to DWORDs
        xLongsDest = (HdData->DestWidth + 3) / 4;       // Round pixels up to DWORDs
        Height = HdData->SrcHeight;

#ifdef MAKE_BITMAP
        // How many output bits are there to a source cell?
        ScaleX = (float)HdData->DestWidth / (float)HdData->SrcWidth;
        ScaleY = (float)HdData->DestHeight / (float)HdData->SrcHeight;
        BitsX = (int)(ScaleX + 0.9999f);
        BitsY = (int)(ScaleY + 0.9999f);
endif // Allocate enough space for the result data on long word boundaries.
//      hCase = GlobalAlloc (GMEM_MOVEABLE, (DWORD)xLongsSrc * /* (DWORD)HdData->SrcHeight * */ 64 * 2);
        hCase = GlobalAlloc (GMEM_MOVEABLE, ((xLongsSrc + 2) * 4 * 2) + 256);
        if (hCase == NULL) {
                HdData->Error = CASE_ALLOC;
                goto exit1;
        }
        pCase = GlobalLock (hCase);
        if (pCase == NULL) {
                HdData->Error = CASE_LOCK;
                goto exit2;
        }
        pCase += 64;

#ifdef DEBUGGING_CASES
        if (hCases) {
                GlobalFree (hCases);
                hCases = 0;
        }
    hCases = GlobalAlloc (GMEM_MOVEABLE, xLongsSrc * 4 * 2 * Height);
    if (hCases == NULL) {
                HdData->Error = CASE_ALLOC;
                goto exit1;
        }
    pCases = GlobalLock (hCases);
    if (pCases == NULL) {
                HdData->Error = CASE_LOCK;
                goto exit2;
        }
endif // Allocate space for temp bitmap.  We will be copying source data to this space before case recognition.
        hBitTmp = GlobalAlloc (GMEM_MOVEABLE, (xLongsSrc + 2) * 4 * 9);
        if (hBitTmp == NULL) {
                HdData->Error = TEMP_ALLOC;
                goto exit3;
        }
    pBitTmp = GlobalLock (hBitTmp);
    if (pBitTmp == NULL) {
                HdData->Error = TEMP_ALLOC;
                goto exit4;
```

XL1 CORPORATION - CONFIDENTIAL
ENTRY.C                                                                                                                         PAGE 3
------------------------------------------------------------------------------------------------------------------------------------

```
        }
ifdef MAKE_BITMAP
            // Build the bit patterns that tell us where to place the colors.
            // Assume that one word holds the bits in the X dimension.
        hBits = GlobalAlloc (GMEM_MOVEABLE, 4096L * BitsY * 2);  // Times 2 for making every line 16 bits.
        if (hBits == NULL) {
                    HdData->Error = BITS_ALLOC;
                    goto exit5;
        }
        pBits = (LPWORD)GlobalLock (hBits);
        if (pBits == NULL) {
                    HdData->Error = BITS_LOCK;
                    goto exit6;
        }
    LoadBits (pBits, BitsX, BitsY);
#endif
            // In this loop we analyze one source line at a time and render as many output
            // lines as this one covers.  Before entering the loop, the temp bitmap for the
            // source data was set-up for the output lines that we are working on.  That means
            // that the middle line in the temp bitmap is the source line of interest.
            // FillLRPixels will go through the source line (middle of pBitTmp lines) and copy
            // the two center pixels into pCase array.  pCase is just for one source line but
            // it is 16bits per one source bit.

// Which source line will generate the first destination line which is requested.
#ifdef MAKE_BITMAP
            SourceLine = (long)(HdData->RenderedLines / ScaleY);  // This line must be in the middle of our temp bitmap.
#else
            SourceLine = (long)HdData->RenderedLines;  // This line must be in the middle of our temp bitmap.
#endif
            for (y = 0; y < WINDOW_HEIGHT; y++) {
                    // See if the line in the temp bitmap comes from the real source or margins around it.
                    if (((SourceLine - (WINDOW_HEIGHT / 2) + y) >= 0) && ((SourceLine - (WINDOW_HEIGHT / 2) + y) <
(long)HdData->SrcHeight)) {
                            // Before we copy the data into the temp line, fill the temp buffer with the color
specified.  We
                            // then copy the data into the temp space but with a long-word margin on left and right.
                            FillMemory (pBitTmp + (4 * (y * (xLongsSrc + 2))), (xLongsSrc + 2) * 4, HdData->Color ?
0xff : 0);
                            CopyMemory (pBitTmp + (4 * ((y * (xLongsSrc + 2)) + 1)), HdData->lpSrc + ((SourceLine -
(WINDOW_HEIGHT / 2) + y) * xLongsSrc * 4), xLongsSrc * 4);
                            }
                    else {    // fill with the specified color.
                            FillMemory (pBitTmp + (4 * (y * (xLongsSrc + 2))), (xLongsSrc + 2) * 4, HdData->Color ?
0xff : 0);
                            }
                    } for (Line = 0; Line < HdData->SrcHeight; Line++) {
                    FillMemory (pCase, 2 * 4 * (xLongsSrc + 2), 0);  // Zero it so Adam can just OR data.
                    // Process the source bitmap into the intermediate array. Find cases and symetries
                AdamEnhance ((PBYTE)pBitTmp, pCase, (xLongsSrc + 2) * 4, (xLongsSrc + 2) * 4);

#ifdef DEBUGGING_CASES
                    // Copy but not to long-word boundaries.
                    CopyMemory (pCases + (HdData->SrcWidth * Line), pCase, 2 * HdData->SrcWidth); // This had a bug
since pCases is a WORD pointer, but I fixed it.
endif ifdef MAKE_BITMAP
                    // Now just fill the destination bitmap.
                    for (y = 0; y < (long)BitsY; y++) {
                            if (((y + (ScaleY * SourceLine)) >= HdData->RenderedLines) &&
                                ((y + (ScaleY * SourceLine)) < (long)(HdData->RenderedLines + HdData-
>BandHeight)))
                                    FillLine (HdData->SrcWidth, ScaleX, HdData->lpDest + ((DWORD)(y + (ScaleY *
SourceLine)) * xLongsDest * 4),
                                                                xLongsSrc * 4, pBits, pCase, BitsX, BitsY, y, pBitTmp,
(xLongsSrc + 2) * 4);    // pCase + 2 is for the left margin that we added.
                            }
endif // Move to next source line.
                    SourceLine++;
                    // Move the data in the temp space up 1 line, then fill the bottom line.
                    MoveMemory (pBitTmp, pBitTmp + (4 * (xLongsSrc + 2)), (xLongsSrc + 2) * (WINDOW_HEIGHT - 1) * 4);
                    // See if the line in the temp bitmap comes from the real source or margins around it.
                    if (((SourceLine + (WINDOW_HEIGHT / 2)) >= 0) && ((SourceLine + (WINDOW_HEIGHT / 2)) < (long)HdData-
>SrcHeight)) {
                            CopyMemory (pBitTmp + (4 * (((WINDOW_HEIGHT - 1) * (xLongsSrc + 2)) + 1)), HdData->lpSrc +
((SourceLine + (WINDOW_HEIGHT / 2)) * xLongsSrc * 4), xLongsSrc * 4);
                            }
                    else {    // fill with the specified color.
                            FillMemory (pBitTmp + (4 * ((WINDOW_HEIGHT - 1) * (xLongsSrc + 2))), (xLongsSrc + 2) * 4,
HdData->Color ? 0xff : 0);
```

XLI CORPORATION - CONFIDENTIAL
ENTRY.C                                                                                    PAGE 4
_____

```
                    }
            }
#ifdef DEBUGGING_CASES
            GlobalUnlock (hCases);
#endif
            // Error-free exit comes here first!
            HdData->Error = NO_ERROR;
            ReturnValue = 0;

#ifdef MAKE_BITMAP
            // Error exits must clean-up memory first.
            GlobalUnlock (hBits);
exit6:
            GlobalFree (hBits);
exit5:
#endif
            GlobalUnlock (hBitTmp);
exit4:
            GlobalFree (hBitTmp);
exit3:
            GlobalUnlock (hCase);
exit2:
            GlobalFree (hCase);
exit1:
            return ReturnValue;;
}

DWORD XLI_Version (void)
{
            return (1);
}

BOOL XOR (BOOL x, BOOL y)
{
            if ((x && !y) || (!x && y))
                        return TRUE;
            else
                        return FALSE;
}

// Cases are either:
// 0=no hit
// 1=Near Vertical
// 2=Near Horizontal
// 3=Split Cell
// 4=Near 45
// Add 10 for pink case verses blue case
int CaseType[256];

// Xbits and Ybits are the width and height of the bit patterns rounded to integers
// HOWEVER we also need Ybit!!! Ybit is which of the Ybits we want for this
// output line.
void FillLine (DWORD width, float ScaleX, PBYTE Dest, DWORD WidthBytes, PWORD pBits, PWORD pCases,
                                           DWORD Xbits, DWORD Ybits, DWORD Ybit, PBYTE pSource, DWORD SourceWidth)
{
            WORD C;
            DWORD xx;
            DWORD j, l;
            PWORD lpwTmp;

// If the case type values are undefined...
            if (CaseType[1] == 0) {
                        // Read in from the INI file, the values for the case types.
                        for (j = 0; j < 256; j++) {
                                    wsprintf (sTmp, "%d", j);
                                    CaseType[j] = GetPrivateProfileInt ("type", sTmp, 0, "cases.ini");
                                    }
                        } for (j = 0; j < width; j++) { // For each source bit...
                        xx = (DWORD)(j * ScaleX);  // Calculate left edge of cell in output bitmap.
                        C = 0xfff & *pCases++;  // Get the case number ready for the LUT.

if (CaseType[C & 0xff] == 0) { // If no-hit...
                                    for (l = 0; l < Xbits; l++) { // for each horizontal bit in the bit pattern...
                                                if (l < (Xbits / 2))
                                                            *(Dest + xx + l) = *(pSource + (4 * SourceWidth) + 4 + j); // pSource points to the 9 source lines that we are working with.
                                                else
                                                            *(Dest + xx + l) = *(pSource + (4 * SourceWidth) + 4 + j + 1); // pSource points to the 9 source lines that we are working with.
```

XLI CORPORATION - CONFIDENTIAL
ENTRY.C                                                                                                          PAGE 5
------------------------------------------------------------------------------------------------------------------------

```
                        }
                }
                else if (CaseType[C & 0xff] == 1) {
                        lpwTmp = pBits + ((C & 0x8ff) * Ybits) + Ybit;    // Point to the LUT entry for this case
and this line of the bit pattern, without symetry bits.
                        for (l = 0; l < Xbits; l++) { // for each horizontal bit in the bit pattern...
                                if (XOR (!(*lpwTmp & (1 << (15 - l))), C & 0x100))    // If the bit is
clear...
                                        *(Dest + xx + l) = *(pSource + (4 * SourceWidth) + 4 + j); // pSource
points to the 9 source lines that we are working with.
                                else
                                        *(Dest + xx + l) = *(pSource + (4 * SourceWidth) + 4 + j + 1); //
pSource points to the 9 source lines that we are working with.
                        }
                }
                else if (CaseType[C & 0xff] == 3) {
                        for (l = 0; l < Xbits; l++) { // for each horizontal bit in the bit pattern...
                                if (l <= (Xbits / 2))
                                        *(Dest + xx + l) = *(pSource + (4 * SourceWidth) + 4 + j); // pSource
points to the 9 source lines that we are working with.
                                else
                                        *(Dest + xx + l) = *(pSource + (4 * SourceWidth) + 4 + j + 1); //
pSource points to the 9 source lines that we are working with.
                        }
                }
                else if (CaseType[C & 0xff] == 4) {
                        for (l = 0; l < Xbits; l++) { // for each horizontal bit in the bit pattern...
                                if (l <= (Xbits / 2))
                                        *(Dest + xx + l) = *(pSource + (4 * SourceWidth) + 4 + j); // pSource
points to the 9 source lines that we are working with.
                                else
                                        *(Dest + xx + l) = *(pSource + (4 * SourceWidth) + 4 + j + 1); //
pSource points to the 9 source lines that we are working with.
                        }
                }
                else if (CaseType[C & 0xff] == 12) {
                        for (l = 0; l < Xbits; l++) { // for each horizontal bit in the bit pattern...
                                if (l <= (Xbits / 2))
                                        *(Dest + xx + l) = *(pSource + (4 * SourceWidth) + 4 + j); // pSource
points to the 9 source lines that we are working with.
                                else
                                        *(Dest + xx + l) = *(pSource + (4 * SourceWidth) + 4 + j + 1); //
pSource points to the 9 source lines that we are working with.
                        }
                }
                else if (CaseType[C & 0xff] == 13) {
                        for (l = 0; l < Xbits; l++) { // for each horizontal bit in the bit pattern...
                                if (l <= (Xbits / 2))
                                        *(Dest + xx + l) = *(pSource + (4 * SourceWidth) + 4 + j); // pSource
points to the 9 source lines that we are working with.
                                else
                                        *(Dest + xx + l) = *(pSource + (4 * SourceWidth) + 4 + j + 1); //
pSource points to the 9 source lines that we are working with.
                        }
                }
                else {    // default to case 0.
                        for (l = 0; l < Xbits; l++) { // for each horizontal bit in the bit pattern...
                                if (l <= (Xbits / 2))
                                        *(Dest + xx + l) = *(pSource + (4 * SourceWidth) + 4 + j); // pSource
points to the 9 source lines that we are working with.
                                else
                                        *(Dest + xx + l) = *(pSource + (4 * SourceWidth) + 4 + j + 1); //
pSource points to the 9 source lines that we are working with.
                        }
                }
        }
}
```

XLI CORPORATION - CONFIDENTIAL
PAINT.C                                                                                                                              PAGE 1

```
// Edited for tricolor edge rendering.. ALC 6/1/96
// Search for 'alc' include <windows.h>
include "color.h"
#include "vector.h"

extern int HighLite;
extern HANDLE hCases;
BOOL XOR (BOOL, BOOL);

BOOL DisplayPoints (HDC hdc, LPPOINT pt, int Count, COLORREF cr)
{
        BOOL st;
        HPEN hP, hPold;
        HBRUSH hB, hBold;

hP = CreatePen (PS_NULL, 0, RGB(0,0,0));
        if (hP == NULL)
                return FALSE;
        hPold = SelectObject (hdc, hP);
        hB = CreateSolidBrush (cr);
        if (hB == NULL)
                return FALSE;
        hBold = SelectObject (hdc, hB);
    st = Polygon (hdc, pt, Count);
        SelectObject (hdc, hBold);
        DeleteObject (hB);
        SelectObject (hdc, hPold);
        DeleteObject (hP);
        return st;
}

// We get in points which may be inside or outside the cell.  Make the points be at the
// edges of the cell.
void Normalize2Points (float *x1, float *y1, float *x2, float *y2, float *x3, float *y3)
{
        float M, B;

if (*x2 == *x1) {    // If infinite slope...
                *y1 = 1.0F;         // Set ends of the vertical line to the cell edges.
                *y2 = 0.0F;
                if (x3 && y3) {     // If pointers included for the third point, then calculate the point.
                        // This point is half way across the cell so x = 0.5 and then we determine y.
                        // However since this is a vertical line, we can only do this.
                        *x3 = *x1;
                        *y3 = 0.5F;
                        }
                }
        else {    // Finite slope and intercept!
        M = (*y1 - *y2) / (*x1 - *x2);
        B = *y1 - (M * *x1);          // Calculate intercept.

if (B < 0) {            // If the intercept is below the cell the line must come up through the bottom.
                                *y1 = 0.0F;
                                *x1 = (0 - B) / M;
                                // It is possible that the line intersects the top, bottom or right side of the cell.
                                // If it goes out the right side we set x2 to 1 and determine y2 = (m * x) + b
                                // If it goes out the top we set y2 to 1 and determine x2 = (y - b) / m
                                // If it goes out the bottom we set y2 to 0 and determine x2 = (y - b) / m if ((M + B) > 1) {    // If the lines goes out the top of the cell...
                                        *y2 = 1.0F;
                                        *x2 = (1 - B) / M;
                                        }
                                else if ((M + B) < 0) {    // If it goes out the bottom...
                                        *y2 = 0.0F;
                                        *x2 = (0 - B) / M;
                                        }
                                else {
                                        *x2 = 1.0F;
                                        *y2 = M + B;
                                        }
                                }
                        else if (B > 1) {  // If the intercept is above the cell the line must go down through the cell top.
                                *y1 = 1.0F;
                                *x1 = (1 - B) / M;
                                // It is possible that the line intersects the top, bottom or right side of the cell.
                                // If it goes out the right side we set x2 to 1 and determine y2 = (m * x) + b
                                // If it goes out the top we set y2 to 1 and determine x2 = (y - b) / m
                                // If it goes out the bottom we set y2 to 0 and determine x2 = (y - b) / m if ((M + B) > 1) {    // If the lines goes out the top of the cell...
                                        *y2 = 1.0F;
                                        *x2 = (1 - B) / M;
```

XLI CORPORATION - CONFIDENTIAL
PAINT.C                                                                                                   PAGE 2
------------------------------------------------------------------------------------------------------------------

```
                                }
                        else if ((M + B) < 0) {      // If it goes out the bottom...
                                *y2 = 0.0F;
                                *x2 = (0 - B) / M;
                                }
                        else {
                                *x2 = 1.0F;
                                *y2 = M + B;
                                }
                        }
                else {
                        *x1 = 0.0F;
                        *y1 = B;
                        // It is possible that the line intersects the top, bottom or right side of the cell.
                        // If it goes out the right side we set x2 to 1 and determine y2 = (m * x) + b
                        // If it goes out the top we set y2 to 1 and determine x2 = (y - b) / m
                        // If it goes out the bottom we set y2 to 0 and determine x2 = (y - b) / m if ((M + B) > 1) {      // If the lines goes out the top of the cell...
                                *y2 = 1.0F;
                                *x2 = (1 - B) / M;
                                }
                        else if ((M + B) < 0) {      // If it goes out the bottom...
                                *y2 = 0.0F;
                                *x2 = (0 - B) / M;
                                }
                        else {
                                *x2 = 1.0F;
                                *y2 = M + B;
                                }
                        } if (x3 && y3) {     // If pointers included for the third point, then calculate the point.
                        // This point is half way across the cell so x = 0.5 and then we determine y.
                        *x3 = 0.5F;
                        *y3 = (M * *x3) + B;
                        if (*y3 > 1)          // Bound check it.
                                *y3 = 1.0F;
                        if (*y3 < 0)
                                *y3 = 0.0F;
                        }
                }
        } void EEPaint (HWND hWnd, HGLOBAL hSource, WORD SourceWidth, WORD SourceHeight, HGLOBAL hResult,
                            WORD ResultWidth, WORD ResultHeight, int X, int Y, int Grid, int OneBit,
                            float ScaleFactor, WORD BitsPerPixel, HANDLE hPalette, float xRatio, float
yRatio)
{
        long i, j, row, col;
        HDC hdc;
        RECT rc;
        PAINTSTRUCT ps;
        PBYTE pTmp;
        HPEN hpen, hpenOld;
        long Width, Height;
        HGLOBAL hBitmap;
        DWORD xLongs;
                HANDLE bi;
                LPBITMAPINFO BitsInfo;
                LPWORD lpPalette;
                DWORD Error = 0;

hdc = BeginPaint (hWnd, &ps);
        GetClientRect (hWnd, &rc);
                rc.bottom -= rc.top;           // normalize data.
                rc.right -= rc.left;

bi = GlobalAlloc (GMEM_MOVEABLE, 2048L);
                if (bi == NULL) {
                        MessageBox (NULL, "Failed to allocate DIB space", NULL, MB_OK);
                        return;
                        }
                BitsInfo = (LPBITMAPINFO)GlobalLock (bi);

#ifdef MAKE_BITMAP
        if (OneBit == 0) {
           Width = ResultWidth;
           Height = ResultHeight;
           hBitmap = hResult;
           }
        else if (OneBit == 1) {
           Width = SourceWidth;
           Height = SourceHeight;
           hBitmap = hSource;
           }
```

XLI CORPORATION - CONFIDENTIAL
PAINT.C                                                                                        PAGE 3

---

```
#else
   Width = SourceWidth;
   Height = SourceHeight;
   hBitmap = hSource;
endif xLongs = (Width + 3) / 4;
   pTmp = (PBYTE)GlobalLock (hBitmap);
   if (pTmp == 0) {
      MessageBox (NULL, "Lock of destination failed", NULL, MB_OK);
      return;
   }

BitsInfo->bmiHeader.biSize = sizeof(BITMAPINFOHEADER);
         BitsInfo->bmiHeader.biWidth = Width;
         BitsInfo->bmiHeader.biHeight = Height;
         BitsInfo->bmiHeader.biPlanes = 1;
         BitsInfo->bmiHeader.biBitCount = 8;
         BitsInfo->bmiHeader.biCompression = BI_RGB;
         BitsInfo->bmiHeader.biSizeImage = 0;
         BitsInfo->bmiHeader.biXPelsPerMeter = 0;
         BitsInfo->bmiHeader.biYPelsPerMeter = 0;
         BitsInfo->bmiHeader.biClrUsed = 0;
         BitsInfo->bmiHeader.biClrImportant = 0;

lpPalette = GlobalLock (hPalette);
         for (j = 0; j < 256; j++) {
                 BitsInfo->bmiColors[j].rgbRed   = *(lpPalette + j + 0) / 256;
                 BitsInfo->bmiColors[j].rgbGreen = *(lpPalette + j + 256) / 256;
                 BitsInfo->bmiColors[j].rgbBlue  = *(lpPalette + j + 512) / 256;
         }
         GlobalUnlock (hPalette);

#ifdef USE_DIB
         Error = StretchDIBits (hdc, 0, (int)(ScaleFactor * Height) - 1, (int)(ScaleFactor * Width), (int)(ScaleFactor
* Height * -1),
                                                  X, Y, Width, Height, pTmp, BitsInfo, DIB_RGB_COLORS,
SRCCOPY);
         if (Error == GDI_ERROR) {
                 Error = GetLastError();
                 wsprintf (sTemp, "StretchDIBits error %d", Error);
                 MessageBox (NULL, sTemp, NULL, MB_OK);
         }
else
         {
         PWORD pCases = GlobalLock (hCases);
         HBRUSH hB, hBold;
         HPEN hP, hPold;
         long TmpSize = Width * Height;

// Cases are either:
         // 0=no hit
         // 1=Near Vertical
         // 2=Near Horizontal
         // 3=Split Cell
         // 4=Near 45
         // 5=Shifted cases (There are 4 versions of this: 5, 15, 25, 35 depending on where the little triangle is.)
         //                  5 = upper left triangle
         //     15 = lower left
         //     25 = upper right
         //     35 = lower right
         // Add 10 for pink case verses blue case
         int CaseType[256];
         DWORD j;

// Memory stuff for the polygon points.
   HGLOBAL hPtTable;
   LPPOINTTABLE lpPtTable;

// Read in from the INI file, the values for the case types.
         WritePrivateProfileString (NULL, NULL, NULL, "cases.ini");
         for (j = 0; j < 256; j++) {
                 wsprintf (sTmp, "%d", j);
                 CaseType[j] = GetPrivateProfileInt ("type", sTmp, 0, "cases.ini");
         } if (ScaleFactor <= 4) {
                 // Make room for the polygons.
            hPtTable = GlobalAlloc (GMEM_MOVEABLE, 2048L * sizeof(POINTTABLE));
            if (hPtTable == NULL) {
               MessageBox (NULL, "Failed to allocate table memory", NULL, MB_OK);
               return;
            }
            lpPtTable = (LPPOINTTABLE)GlobalLock (hPtTable);
            if (lpPtTable == NULL) {
```

XLI CORPORATION - CONFIDENTIAL
PAINT.C PAGE 4
-----------------------------------------------------------------------------------------------------------------

```
                MessageBox (NULL, "Table memory lock failed", NULL, MB_OK);
                GlobalFree (hPtTable);
                return;
                }
        LoadVectors (lpPtTable, ScaleFactor);

// Use polygons based on the case values.
                for (row = 0; (row < rc.bottom / ScaleFactor) && (row + Y < Height); row++) {
                        for (col = 0; (col < rc.right / ScaleFactor) && (col + X < Width); col++) {
                                WORD wC; // Case number.
                                BYTE bSrc[8]; // Source values.
                                long dwIndex;      // selects the values that go with the cell we are drawing.
                                //   0  1
                                // 2  3  4  5
                                //   6  7

// BOUNDS CHECK EVERYTHING
                                dwIndex = X + col + ((Y + row) * Width);
                                if ((dwIndex < 0) || (dwIndex > TmpSize))
                                        wC = 0;
                                else
                                        wC = *(pCases + dwIndex);

if ((dwIndex < Width) || (dwIndex > (TmpSize - Width)))
                                        bSrc[0] = 0;
                                else
                                        bSrc[0] = *(pTmp + dwIndex - Width);

if ((dwIndex < Width + 1) || (dwIndex > (TmpSize - Width + 1)))
                                        bSrc[1] = 0;
                                else
                                        bSrc[1] = *(pTmp + dwIndex - Width + 1);

if ((dwIndex < 1) || (dwIndex > (TmpSize + 1)))
                                        bSrc[2] = 0;
                                else
                                        bSrc[2] = *(pTmp + dwIndex - 1);

if ((dwIndex < 0) || (dwIndex > TmpSize))
                                        bSrc[3] = 0;
                                else
                                        bSrc[3] = *(pTmp + dwIndex);

if ((dwIndex < -1) || (dwIndex > (TmpSize - 1)))
                                        bSrc[4] = 0;
                                else
                                        bSrc[4] = *(pTmp + dwIndex + 1);

if ((dwIndex < -2) || (dwIndex > (TmpSize - 2)))
                                        bSrc[5] = 0;
                                else
                                        bSrc[5] = *(pTmp + dwIndex + 2);

if ((dwIndex < -1 * Width) || (dwIndex > (TmpSize - Width)))
                                        bSrc[6] = 0;
                                else
                                        bSrc[6] = *(pTmp + dwIndex + Width);

if ((dwIndex < -1 * (1 + Width)) || (dwIndex > (TmpSize - 1 - Width)))
                                        bSrc[7] = 0;
                                else
                                        bSrc[7] = *(pTmp + dwIndex + Width + 1);

// If the case is a real hit, and we care.
                                if (((CaseType[wC & 0xff]) && (OneBit == 0)) {
                                        // Fix bit alignment.
                                        wC = (wC & 0x1ff) | ((wC >> 2) & 0x200);
                                        if ((CaseType[wC & 0xff] == 1) || (CaseType[wC & 0xff] == 4)) {
                POINT pt[6];
                int xx, yy, c;
                xx = (int)(col * ScaleFactor);        // Calculate left edge of cell
                yy = (int)(row * ScaleFactor);        // Calculate top edge of cell hP = CreatePen (PS_NULL, 0, RGB(0,0,0));
                                                        hPold = SelectObject (hdc, hP);
                                                        // Do left half
                                                        hB = CreateSolidBrush (RGB(BitsInfo-
>bmiColors[bSrc[3]].rgbRed, BitsInfo->bmiColors[bSrc[3]].rgbGreen, BitsInfo->bmiColors[bSrc[3]].rgbBlue));
                                                        hBold = SelectObject (hdc, hB);

if (wC & 0x100) {    // If horizontal symmetry bit is set...
                                // Copy this cases points and add the offset to the cell.
                                for (c = 0; c < lpPtTable[wC | 0x400].Count; c++) {
                                        pt[c].x = xx + lpPtTable[wC | 0x400].p[c].x;
                                        pt[c].y = yy + lpPtTable[wC | 0x400].p[c].y;
                                }
                                Polygon (hdc, pt, lpPtTable[wC | 0x400].Count);
```

XLI CORPORATION - CONFIDENTIAL
PAINT.C                                                                                                              PAGE 5

```
                                            }
                                      else {
                  // Copy this cases points and add the offset to the cell.
                  for (c = 0; c < lpPtTable[wC].Count; c++) {
                      pt[c].x = xx + lpPtTable[wC].p[c].x;
                      pt[c].y = yy + lpPtTable[wC].p[c].y;
                  }
                  Polygon (hdc, pt, lpPtTable[wC].Count);
                                      }

SelectObject (hdc, hBold);
                                              DeleteObject (hB);
                                              // Right half
                                              hB = CreateSolidBrush (RGB(BitsInfo-
>bmiColors[bSrc[4]].rgbRed, BitsInfo->bmiColors[bSrc[4]].rgbGreen, BitsInfo->bmiColors[bSrc[4]].rgbBlue));
                                              hBold = SelectObject (hdc, hB);

if (wC & 0x100) {   // If horizontal symmetry bit is set...
                  // Copy this cases points and add the offset to the cell.
                  for (c = 0; c < lpPtTable[wC].Count; c++) {
                      pt[c].x = xx + lpPtTable[wC].p[c].x;
                      pt[c].y = yy + lpPtTable[wC].p[c].y;
                  }
                  Polygon (hdc, pt, lpPtTable[wC].Count);
                                              }
                                      else {
                  // Copy this cases points and add the offset to the cell.
                  for (c = 0; c < lpPtTable[wC | 0x400].Count; c++) {
                      pt[c].x = xx + lpPtTable[wC | 0x400].p[c].x;
                      pt[c].y = yy + lpPtTable[wC | 0x400].p[c].y;
                  }
                  Polygon (hdc, pt, lpPtTable[wC | 0x400].Count);
                                      }

SelectObject (hdc, hBold);
                                              DeleteObject (hB);
                                              SelectObject (hdc, hPold);
                                              DeleteObject (hP);
                                      }
                                      else if (CaseType[wC & 0xff] == 3) {
                                              goto NoHit;
                                      }
                                      else if (CaseType[wC & 0xff] == 12) {
                                              goto NoHit;
                                      }
                                      else /* if (CaseType[wC & 0xff] == 13) */ {
                                              goto NoHit;
                                      }
                              }
                      else {    // No hit!!!
          NoHit:
                                              hP = CreatePen (PS_NULL, 0, RGB(0,0,0));
                                              hPold = SelectObject (hdc, hP);
                                              // Do left helf
                                              hB = CreateSolidBrush (RGB(BitsInfo->bmiColors[bSrc[3]].rgbRed,
BitsInfo->bmiColors[bSrc[3]].rgbGreen, BitsInfo->bmiColors[bSrc[3]].rgbBlue));
                                              hBold = SelectObject (hdc, hB);
                                              Rectangle (hdc, (int)(col * ScaleFactor), (int)(row * ScaleFactor),
(int)(((float)col + 0.5F) * ScaleFactor) + 1, (int)((row + 1) * ScaleFactor) + 1);
                                              SelectObject (hdc, hBold);
                                              DeleteObject (hB);
                                              // Right half
                                              hB = CreateSolidBrush (RGB(BitsInfo->bmiColors[bSrc[4]].rgbRed,
BitsInfo->bmiColors[bSrc[4]].rgbGreen, BitsInfo->bmiColors[bSrc[4]].rgbBlue));
                                              hBold = SelectObject (hdc, hB);
                                              Rectangle (hdc, (int)(((float)col + 0.5F) * ScaleFactor), (int)(row *
ScaleFactor), (int)((col + 1) * ScaleFactor) + 1, (int)((row + 1) * ScaleFactor) + 1);
                                              SelectObject (hdc, hBold);
                                              DeleteObject (hB);
                                              SelectObject (hdc, hPold);
                                              DeleteObject (hP);
                                      }
                              }
                      }
                      GlobalUnlock (hPtTable);
                      GlobalFree (hPtTable);
                      } else { // Use polygons based on the case values.
                      for (row = 0; (row < rc.bottom / ScaleFactor) && (row + Y < Height); row++) {
                              for (col = 0; (col < rc.right / ScaleFactor) && (col + X < Width); col++) {
                                      WORD wC; // Case number.
                                      BYTE bSrc[6]; // Source values.
                                      long dwIndex;       // selects the values that go with the cell we are drawing.
                                      //    0  1
                                      // 2  3  4  5
```

XLI CORPORATION - CONFIDENTIAL
PAINT.C                                                                                                   PAGE 6
------------------------------------------------------------------------------------------------------------------

```
                                        //   6  7
                                        // BOUNDS CHECK EVERYTHING
                                        dwIndex = X + col + ((Y + row) * Width);
                                        if ((dwIndex < 0) || (dwIndex > TmpSize))
                                                    wC = 0;
                                        else
                                                    wC = *(pCases + dwIndex);

if ((dwIndex < Width) || (dwIndex > (TmpSize - Width)))
                                                    bSrc[0] = 0;
                                        else
                                                    bSrc[0] = *(pTmp + dwIndex - Width);

if ((dwIndex < Width + 1) || (dwIndex > (TmpSize - Width + 1)))
                                                    bSrc[1] = 0;
                                        else
                                                    bSrc[1] = *(pTmp + dwIndex - Width + 1);

if ((dwIndex < 1) || (dwIndex > (TmpSize + 1)))
                                                    bSrc[2] = 0;
                                        else
                                                    bSrc[2] = *(pTmp + dwIndex - 1);

if ((dwIndex < 0) || (dwIndex > TmpSize))
                                                    bSrc[3] = 0;
                                        else
                                                    bSrc[3] = *(pTmp + dwIndex);

if ((dwIndex < -1) || (dwIndex > (TmpSize - 1)))
                                                    bSrc[4] = 0;
                                        else
                                                    bSrc[4] = *(pTmp + dwIndex + 1);

if ((dwIndex < -2) || (dwIndex > (TmpSize - 2)))
                                                    bSrc[5] = 0;
                                        else
                                                    bSrc[5] = *(pTmp + dwIndex + 2);

if ((dwIndex < -1 * Width) || (dwIndex > (TmpSize - Width)))
                                                    bSrc[6] = 0;
                                        else
                                                    bSrc[6] = *(pTmp + dwIndex + Width);

if ((dwIndex < -1 * (1 + Width)) || (dwIndex > (TmpSize - 1 - Width)))
                                                    bSrc[7] = 0;
                                        else
                                                    bSrc[7] = *(pTmp + dwIndex + Width + 1);

// If the case is a real hit, and we care.
                                        if ((CaseType[wC & 0xff]) && (OneBit == 0)) {
                                                    // Fix bit alignment.
                                                    wC = (wC & 0x1ff) | ((wC >> 2) & 0x200);
                                                    if ((CaseType[wC & 0xff] == 1) || (CaseType[wC & 0xff] == 3) ||
(CaseType[wC & 0xff] == 4)) {
                                                                POINT pt[6];
                                                                float x1, x2, x3, y1, y2, y3;
                                        int xx, yy;
                                        xx = (int)(col * ScaleFactor);        // Calculate left edge of cell
                                        yy = (int)(row * ScaleFactor);        // Calculate top edge of cell x1 = Point[wC & 0xff][0];
                                                    y1 = Point[wC & 0xff][1];
                                                    x2 = Point[wC & 0xff][2];
                                                    y2 = Point[wC & 0xff][3];
                                                                x3 = Point[wC & 0xff][4];
                                                                y3 = Point[wC & 0xff][5];
                                                    if ((x1 == 0) && (y1 == 0) && (x2 == 0) && (y2 == 0))    // If no-hit
                                                                goto NoHit2;

// Convert units and origin. Now the cell is 1 wide and high and the origin
                                                                // is the lower left corner.
                                                    x1 = (x1 + 1) / 2;
                                                    y1 = (y1 + 1) / 2;
                                                    x2 = (x2 + 1) / 2;
                                                    y2 = (y2 + 1) / 2;
                                                    x3 = (x3 + 1) / 2;
                                                    y3 = (y3 + 1) / 2;

if (x3 >= 100) { // If third point not really used...
                                                                            Normalize2Points (&x1, &y1, &x2, &y2, NULL, NULL);
                                                                            if (wC & 0x100) {       // If horizontal symmetry bit
is set...
                                                                                        x1 = 1 - x1;
                                                                                        x2 = 1 - x2;
                                                                            }
```

XLI CORPORATION - CONFIDENTIAL
PAINT.C                                                           PAGE 7

---

```c
            if (wC & 0x200) {     // If vertical symmetry bit is set...
                y1 = 1 - y1;
                y2 = 1 - y2;
            }
            // Order the 2 points so that the point 2 has a higher Y than point 1.
            if (y2 < y1) {
                // switch points
                float t;
                t = x1;
                x1 = x2;
                x2 = t;
                t = y1;
                y1 = y2;
                y2 = t;
            }

// Do left half polygon.
            if ((y2 == 1) && (y1 == 0)) { // If the line goes through the top and bottom of the cell...
                pt[0].x = xx + 0;     // Upper left corner.
                pt[0].y = yy + 0;
                pt[1].x = xx + 0;     // Lower left corner.
                pt[1].y = yy + (long)ScaleFactor;
                pt[2].x = xx + (long)(ScaleFactor * x1);
                pt[2].y = yy + (long)(ScaleFactor * (1 - y1));
                pt[3].x = xx + (long)(ScaleFactor * x2);
                pt[3].y = yy + (long)(ScaleFactor * (1 - y2));
                DisplayPoints (hdc, pt, 4, RGB(BitsInfo->bmiColors[bSrc[3]].rgbRed, BitsInfo->bmiColors[bSrc[3]].rgbGreen, BitsInfo->bmiColors[bSrc[3]].rgbBlue));
                // Right half
                pt[0].x = xx + (long)ScaleFactor;    // Upper right corner.
                pt[0].y = yy + 0;
                pt[1].x = xx + (long)ScaleFactor;    // Lower right corner.
                pt[1].y = yy + (long)ScaleFactor;
                pt[2].x = xx + (long)(ScaleFactor * x1);
                pt[2].y = yy + (long)(ScaleFactor * (1 - y1));
                pt[3].x = xx + (long)(ScaleFactor * x2);
                pt[3].y = yy + (long)(ScaleFactor * (1 - y2));
                DisplayPoints (hdc, pt, 4, RGB(BitsInfo->bmiColors[bSrc[4]].rgbRed, BitsInfo->bmiColors[bSrc[4]].rgbGreen, BitsInfo->bmiColors[bSrc[4]].rgbBlue));
            }
            else if ((y2 != 1) && (y1 == 0)) { // If the line goes through the side and bottom of the cell...
                if (x2 == 0) {       // line goes through left side of cell.
                    pt[0].x = xx + 0;     // Lower left corner.
                    pt[0].y = yy + (long)ScaleFactor;
                    pt[1].x = xx + (long)(ScaleFactor * x1);
                    pt[1].y = yy + (long)(ScaleFactor * (1 - y1));
                    pt[2].x = xx + (long)(ScaleFactor * x2);
                    pt[2].y = yy + (long)(ScaleFactor * (1 - y2));
                    DisplayPoints (hdc, pt, 3, RGB(BitsInfo->bmiColors[bSrc[3]].rgbRed, BitsInfo->bmiColors[bSrc[3]].rgbGreen, BitsInfo->bmiColors[bSrc[3]].rgbBlue));
                    // Right half
                    pt[0].x = xx + 0;     // Upper left corner.
                    pt[0].y = yy + 0;
                    pt[1].x = xx + (long)ScaleFactor;  // Upper right corner.
                    pt[1].y = yy + 0;
                    pt[2].x = xx + (long)ScaleFactor;  // Lower right corner.
                    pt[2].y = yy + (long)ScaleFactor;
                    pt[3].x = xx + (long)(ScaleFactor * x1);
                    pt[3].y = yy + (long)(ScaleFactor * (1 - y1));
```

XLI CORPORATION - CONFIDENTIAL
PAINT.C PAGE 8

---

```
                                             pt[4].x = xx +
(long)(ScaleFactor * x2);
                                             pt[4].y = yy +
(long)(ScaleFactor * (1 - y2));
                                             DisplayPoints (hdc, pt, 5,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                             }
                                             else { // line goes through right side
of cell.
                                             pt[0].x = xx + 0;    // Upper
left corner.
                                             pt[0].y = yy + 0;
                                             pt[1].x = xx + 0;    // Lower
left corner.
                                             pt[1].y = yy +
(long)ScaleFactor;
                                             pt[2].x = xx +
(long)(ScaleFactor * x1);
                                             pt[2].y = yy +
(long)(ScaleFactor * (1 - y1));
                                             pt[3].x = xx +
(long)(ScaleFactor * x2);
                                             pt[3].y = yy +
(long)(ScaleFactor * (1 - y2));
                                             pt[4].x = xx +
(long)ScaleFactor;   // Upper right corner.
                                             pt[4].y = yy + 0;
                                             DisplayPoints (hdc, pt, 5,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                             // Right half
                                             pt[0].x = xx +
(long)ScaleFactor;   // Lower right corner.
                                             pt[0].y = yy +
(long)ScaleFactor;
                                             pt[1].x = xx +
(long)(ScaleFactor * x1);
                                             pt[1].y = yy +
(long)(ScaleFactor * (1 - y1));
                                             pt[2].x = xx +
(long)(ScaleFactor * x2);
                                             pt[2].y = yy +
(long)(ScaleFactor * (1 - y2));
                                             DisplayPoints (hdc, pt, 3,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                             }
                                             else if ((y2 == 1) && (y1 != 0)) { // If the line
goes through the side and top of the cell...
                                             if (x1 == 0) {        // line goes through
left side of cell.
                                             pt[0].x = xx + 0;    // upper
left corner.
                                             pt[0].y = yy + 0;
                                             pt[1].x = xx +
(long)(ScaleFactor * x1);
                                             pt[1].y = yy +
(long)(ScaleFactor * (1 - y1));
                                             pt[2].x = xx +
(long)(ScaleFactor * x2);
                                             pt[2].y = yy +
(long)(ScaleFactor * (1 - y2));
                                             DisplayPoints (hdc, pt, 3,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                             // Right half
                                             pt[0].x = xx +
(long)ScaleFactor;   // Upper right corner.
                                             pt[0].y = yy + 0;
                                             pt[1].x = xx +
(long)ScaleFactor;   // Lower right corner.
                                             pt[1].y = yy +
(long)ScaleFactor;
                                             pt[2].x = xx + 0;    // Lower
left corner.
                                             pt[2].y = yy +
(long)ScaleFactor;
                                             pt[3].x = xx +
(long)(ScaleFactor * x1);
                                             pt[3].y = yy +
(long)(ScaleFactor * (1 - y1));
                                             pt[4].x = xx +
(long)(ScaleFactor * x2);
                                             pt[4].y = yy +
(long)(ScaleFactor * (1 - y2));
```

XLI CORPORATION - CONFIDENTIAL
PAINT.C                                                                                           PAGE 9

```
                                                                          DisplayPoints (hdc, pt, 5,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                          }
                                                                      else { // line goes through right side
of cell.
                                                                          pt[0].x = xx + 0;    // Upper
left corner.
                                                                          pt[0].y = yy + 0;
                                                                          pt[1].x = xx + 0;    // Lower
left corner.
                                                                          pt[1].y = yy +
(long)ScaleFactor;
                                                                          pt[2].x = xx +
(long)ScaleFactor;    // Lower right corner.
                                                                          pt[2].y = yy +
(long)ScaleFactor;
                                                                          pt[3].x = xx +
(long)(ScaleFactor * x1);
                                                                          pt[3].y = yy +
(long)(ScaleFactor * (1 - y1));
                                                                          pt[4].x = xx +
(long)(ScaleFactor * x2);
                                                                          pt[4].y = yy +
(long)(ScaleFactor * (1 - y2));
                                                                          DisplayPoints (hdc, pt, 5,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                                      // Right half
                                                                          pt[0].x = xx +
(long)ScaleFactor;    // Upper right corner.
                                                                          pt[0].y = yy + 0;
                                                                          pt[1].x = xx +
(long)(ScaleFactor * x1);
                                                                          pt[1].y = yy +
(long)(ScaleFactor * (1 - y1));
                                                                          pt[2].x = xx +
(long)(ScaleFactor * x2);
                                                                          pt[2].y = yy +
(long)(ScaleFactor * (1 - y2));
                                                                          DisplayPoints (hdc, pt, 3,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                          }
                                                                      else {    // x1 == 0 and x2 == 1       e.g. case
135,137,139         -alc-
                                                                          pt[2].x = xx + (long)(ScaleFactor * x2);
                                                                          pt[2].y = yy + (long)(ScaleFactor * (1 -
y2));
                                                                          pt[3].x = xx + (long)(ScaleFactor * x1);
                                                                          pt[3].y = yy + (long)(ScaleFactor * (1 -
y1));
                                                                      // Do upper polygon.  -alc-
                                                                      if (XOR (wC & 0x100, wC & 0x200)) {
                // There are two versions of this case...
                                                                          pt[1].x = xx + 0;
                // Upper left corner.
                                                                          pt[1].y = yy + 0;
                // note: points reversed
                                                                          pt[0].x = xx + (long)ScaleFactor;
                // Upper right corner.
                                                                          pt[0].y = yy + 0;
                                                                          DisplayPoints (hdc, pt, 4,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                          }
                                                                      else {
                                                                          pt[0].x = xx + 0;
                // Upper left corner.
                                                                          pt[0].y = yy + 0;
                                                                          pt[1].x = xx + (long)ScaleFactor;
                // Upper right corner.
                                                                          pt[1].y = yy + 0;
                                                                          DisplayPoints (hdc, pt, 4,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                                          }
                                                                      // Do lower polygon.  -alc-
                                                                      if (XOR (wC & 0x100, wC & 0x200)) {
                // There are two versions of this case...
                                                                          pt[1].x = xx + 0;
                // Lower left corner.
                                                                          pt[1].y = yy + (long)ScaleFactor;
                // note: points reversed
                                                                          pt[0].x = xx + (long)ScaleFactor;
                // Lower right corner.
                                                                          pt[0].y = yy + (long)ScaleFactor;
```

XLI CORPORATION - CONFIDENTIAL
PAINT.C  PAGE 10

```c
                                                                    DisplayPoints (hdc, pt, 4,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                                  }
                                                                  else {
                                                                    pt[0].x = xx + 0;
                // Lower left corner.
                                                                    pt[0].y = yy + (long)ScaleFactor;
                                                                    pt[1].x = xx + (long)ScaleFactor;
                // Lower right corner.
                                                                    pt[1].y = yy + (long)ScaleFactor;
                                                                    DisplayPoints (hdc, pt, 4,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                  }
                                                                }
                                                          else {  // Use three points.
                                                                  HPEN hP, hPold;
                                                                  HBRUSH hB, hBold;
                                                                  POINT Bez[3];

Normalize2Points (&x1, &y1, &x2, &y2, NULL, NULL);
                                                                  if (wC & 0x100) {   // If horizontal symmetry bit
is set...
                                                                        x1 = 1 - x1;
                                                                        x2 = 1 - x2;
                                                                        x3 = 1 - x3;
                                                                  }
                                                                  if (wC & 0x200) {   // If vertical symmetry bit is
set...
                                                                        y1 = 1 - y1;
                                                                        y2 = 1 - y2;
                                                                        y3 = 1 - y3;
                                                                  }
                                                                  // Order the 2 points so that the point 2 has a
higher Y than point 1.
                                                                  if (y2 < y1) {
                                                                        // switch points
                                                                        float t;
                                                                        t = x1;
                                                                        x1 = x2;
                                                                        x2 = t;
                                                                        t = y1;
                                                                        y1 = y2;
                                                                        y2 = t;
                                                                  }

// Do left half polygon.
                                                                  pt[0].x = xx + 0;    // Upper left corner.
                                                                  pt[0].y = yy + 0;
                                                                  pt[1].x = xx + 0;    // Lower left corner.
                                                                  pt[1].y = yy + (long)ScaleFactor;
                                                                  pt[2].x = xx + (long)(ScaleFactor * x1);
                                                                  pt[2].y = yy + (long)(ScaleFactor * (1 - y1));
                                                                  pt[3].x = xx + (long)(ScaleFactor * x3);
                                                                  pt[3].y = yy + (long)(ScaleFactor * (1 - y3));
                                                                  pt[4].x = xx + (long)(ScaleFactor * x2);
                                                                  pt[4].y = yy + (long)(ScaleFactor * (1 - y2));
//                                                                DisplayPoints (hdc, pt, 5, RGB(BitsInfo-
>bmiColors[bSrc[3]].rgbRed, BitsInfo->bmiColors[bSrc[3]].rgbGreen, BitsInfo->bmiColors[bSrc[3]].rgbBlue));

hP = CreatePen (PS_NULL, 0, RGB(0,0,0));
                                                                  hPold = SelectObject (hdc, hP);
                                                                  hB = CreateSolidBrush (RGB(BitsInfo-
>bmiColors[bSrc[3]].rgbRed, BitsInfo->bmiColors[bSrc[3]].rgbGreen, BitsInfo->bmiColors[bSrc[3]].rgbBlue));
                                                                  hBold = SelectObject (hdc, hB);
                                                                  MoveToEx (hdc, pt[0].x, pt[0].y, NULL);
                                                                  BeginPath (hdc);
                                                                  LineTo (hdc, pt[1].x, pt[1].y);
                                                                  LineTo (hdc, pt[2].x, pt[2].y);
//                                                                LineTo (hdc, pt[3].x, pt[3].y);
//                                                                LineTo (hdc, pt[4].x, pt[4].y);
                                                                  Bez[0].x = pt[3].x;
                                                                  Bez[0].y = pt[3].y;
                                                                  Bez[1].x = pt[3].x;
                                                                  Bez[1].y = pt[3].y;
                                                                  Bez[2].x = pt[4].x;
                                                                  Bez[2].y = pt[4].y;
                                                                  PolyBezierTo (hdc, &Bez[0], 3);

EndPath (hdc);
                                                                  StrokeAndFillPath (hdc);
                                                                  SelectObject (hdc, hBold);
                                                                  DeleteObject (hB);
                                                                  SelectObject (hdc, hPold);
                                                                  DeleteObject (hP);
```

XLI CORPORATION - CONFIDENTIAL
PAINT.C                                                                                                   PAGE 11
--------------------------------------------------------------------------------------------------------------------

```
                                                        // Right half
                                                        pt[0].x = xx + (long)ScaleFactor;          // Upper
right corner.
                                                        pt[0].y = yy + 0;
                                                        pt[1].x = xx + (long)ScaleFactor;          // Lower
right corner.
                                                        pt[1].y = yy + (long)ScaleFactor;
                                                        pt[2].x = xx + (long)(ScaleFactor * x1);
                                                        pt[2].y = yy + (long)(ScaleFactor * (1 - y1));
                                                        pt[3].x = xx + (long)(ScaleFactor * x3);
                                                        pt[3].y = yy + (long)(ScaleFactor * (1 - y3));
                                                        pt[4].x = xx + (long)(ScaleFactor * x2);
                                                        pt[4].y = yy + (long)(ScaleFactor * (1 - y2));
//                                                      DisplayPoints (hdc, pt, 5, RGB(BitsInfo-
>bmiColors[bSrc[4]].rgbRed, BitsInfo->bmiColors[bSrc[4]].rgbGreen, BitsInfo->bmiColors[bSrc[4]].rgbBlue));

hP = CreatePen (PS_NULL, 0, RGB(0,0,0));
                                                        hPold = SelectObject (hdc, hP);
                                                        hB = CreateSolidBrush (RGB(BitsInfo-
>bmiColors[bSrc[4]].rgbRed, BitsInfo->bmiColors[bSrc[4]].rgbGreen, BitsInfo->bmiColors[bSrc[4]].rgbBlue));
                                                        hBold = SelectObject (hdc, hB);
                                                        MoveToEx (hdc, pt[0].x, pt[0].y, NULL);
                                                        BeginPath (hdc);
                                                        LineTo (hdc, pt[1].x, pt[1].y);
                                                        LineTo (hdc, pt[2].x, pt[2].y);
                                                        Bez[0].x = pt[3].x;
                                                        Bez[0].y = pt[3].y;
                                                        Bez[1].x = pt[3].x;
                                                        Bez[1].y = pt[3].y;
                                                        Bez[2].x = pt[4].x;
                                                        Bez[2].y = pt[4].y;
                                                        PolyBezierTo (hdc, &Bez[0], 3);

EndPath (hdc);
                                                        StrokeAndFillPath (hdc);
                                                        SelectObject (hdc, hBold);
                                                        DeleteObject (hB);
                                                        SelectObject (hdc, hPold);
                                                        DeleteObject (hP);
                                                        }
                                                }
                                        else if (CaseType[wC & 0xff] == 2) {
                                                goto NoHit2;
                                                } else if (CaseType[wC & 0xff] == 12) {   // Near horizontal
                        POINT pt[6];
                                                float x1, x2, x3, y1, y2, y3;
                        int xx, yy;
                        xx = (int)(col * ScaleFactor);           // Calculate left edge of cell
                        yy = (int)(row * ScaleFactor);           // Calculate top edge of cell x1 = Point[wC & 0xff][0];
                                        y1 = Point[wC & 0xff][1];
                                        x2 = Point[wC & 0xff][2];
                                        y2 = Point[wC & 0xff][3];
                                                x3 = Point[wC & 0xff][4];
                                                y3 = Point[wC & 0xff][5];
                                        if ((x1 == 0) && (y1 == 0) && (x2 == 0) && (y2 == 0))    // If no-hit
                                                        goto NoHit2;

// Convert units and origin. Now the cell is 1 wide and high and the origin
                                        //     is the lower left corner.
                                        x1 = (x1 + 1) / 2;
                                        y1 = (y1 + 1) / 2;
                                        x2 = (x2 + 1) / 2;
                                        y2 = (y2 + 1) / 2;
                                        x3 = (x3 + 1) / 2;
                                        y3 = (y3 + 1) / 2;

if (x3 >= 100) { // If third point not specified, we need it
anyway...
                                                        Normalize2Points (&x1, &y1, &x2, &y2, &x3, &y3);

if (wC & 0x100) {   // If horizontal symmetry bit
is set...
                                                        x1 = 1 - x1;
                                                        x2 = 1 - x2;
                                                        x3 = 1 - x3;
                                                        }
                                                if (wC & 0x200) {   // If vertical symmetry bit is
set...
                                                        y1 = 1 - y1;
                                                        y2 = 1 - y2;
                                                        y3 = 1 - y3;
                                                        }
```

XLI CORPORATION - CONFIDENTIAL
PAINT.C PAGE 12

---

```
                                                            // Order the 2 points so that the point 2 has a
higher x than point 1.
                                                            if (x2 < x1) {
                                                                // switch points
                                                                float t;
                                                                t = x1;
                                                                x1 = x2;
                                                                x2 = t;
                                                                t = y1;
                                                                y1 = y2;
                                                                y2 = t;
                                                            } if ((x1 == 0) || (y1 == 0)) {
                                                                // Do upper left polygon.
                                                                pt[0].x = xx + 0;      // Upper left
corner.
                                                                pt[0].y = yy + 0;
                                                                pt[1].x = xx + 0;
                                                                pt[1].y = yy + (long)(ScaleFactor * 1);
                                                                pt[2].x = xx + (long)(ScaleFactor * x1);
                                                                pt[2].y = yy + (long)(ScaleFactor * (1 -
y1));
                                                                pt[3].x = xx + (long)(ScaleFactor * x3);
                                                                pt[3].y = yy + (long)(ScaleFactor * (1 -
y3));
                                                                pt[4].x = xx + (long)(ScaleFactor *
0.5F);      // Top middle point
                                                                pt[4].y = yy + (long)(ScaleFactor * 0);
                                                                if (wC & 0x200)      // If vertical
symmetry bit is set...
                                                                    DisplayPoints (hdc, pt, 5,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                                else
                                                                    DisplayPoints (hdc, pt, 5,
RGB(BitsInfo->bmiColors[bSrc[0]].rgbRed, BitsInfo->bmiColors[bSrc[0]].rgbGreen, BitsInfo->bmiColors[bSrc[0]].rgbBlue));
                                                            }
                                                            else {
                                                                pt[0].x = xx + (long)(ScaleFactor * x1);
                                                                pt[0].y = yy + (long)(ScaleFactor * (1 -
y1));
                                                                pt[1].x = xx + (long)(ScaleFactor * x3);
                                                                pt[1].y = yy + (long)(ScaleFactor * (1 -
y3));
                                                                pt[2].x = xx + (long)(ScaleFactor *
0.5F);      // Top middle point
                                                                pt[2].y = yy + (long)(ScaleFactor * 0);
                                                                if (wC & 0x200)      // If vertical
symmetry bit is set...
                                                                    DisplayPoints (hdc, pt, 3,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                                else
                                                                    DisplayPoints (hdc, pt, 3,
RGB(BitsInfo->bmiColors[bSrc[0]].rgbRed, BitsInfo->bmiColors[bSrc[0]].rgbGreen, BitsInfo->bmiColors[bSrc[0]].rgbBlue));
                                                            } if ((x1 == 0) || (y1 == 1)) {
                                                                // Do lower left polygon.
                                                                pt[0].x = xx + 0;      // Upper left
corner.
                                                                pt[0].y = yy + 0;
                                                                pt[1].x = xx + 0;
                                                                pt[1].y = yy + (long)(ScaleFactor * 1);
                                                                pt[2].x = xx + (long)(ScaleFactor *
0.5F);      // Bottom middle point
                                                                pt[2].y = yy + (long)(ScaleFactor * 1);
                                                                pt[3].x = xx + (long)(ScaleFactor * x3);
                                                                pt[3].y = yy + (long)(ScaleFactor * (1 -
y3));
                                                                pt[4].x = xx + (long)(ScaleFactor * x1);
                                                                pt[4].y = yy + (long)(ScaleFactor * (1 -
y1));
                                                                if (wC & 0x200)      // If vertical
symmetry bit is set...
                                                                    DisplayPoints (hdc, pt, 5,
RGB(BitsInfo->bmiColors[bSrc[6]].rgbRed, BitsInfo->bmiColors[bSrc[6]].rgbGreen, BitsInfo->bmiColors[bSrc[6]].rgbBlue));
                                                                else
                                                                    DisplayPoints (hdc, pt, 5,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                            }
                                                            else {
                                                                pt[0].x = xx + (long)(ScaleFactor *
0.5F);      // Bottom middle point
                                                                pt[0].y = yy + (long)(ScaleFactor * 1);
                                                                pt[1].x = xx + (long)(ScaleFactor * x3);
                                                                pt[1].y = yy + (long)(ScaleFactor * (1 -
y3));
```

XLI CORPORATION - CONFIDENTIAL
PAINT.C  PAGE 13

```
                                                                pt[2].x = xx + (long)(ScaleFactor * x1);
                                                                pt[2].y = yy + (long)(ScaleFactor * (1 -
y1));
                                                                if (wC & 0x200)     // If vertical
symmetry bit is set...
                                                                        DisplayPoints (hdc, pt, 3,
RGB(BitsInfo->bmiColors[bSrc[6]].rgbRed, BitsInfo->bmiColors[bSrc[6]].rgbGreen, BitsInfo->bmiColors[bSrc[6]].rgbBlue));
                                                                else
                                                                        DisplayPoints (hdc, pt, 3,
RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                                }
                                                        if ((x2 == 1) || (y2 == 0)) {
                                                                // Upper right
                                                                pt[0].x = xx + (long)ScaleFactor;
                        // Upper right corner.
                                                                pt[0].y = yy + 0;
                                                                pt[1].x = xx + (long)ScaleFactor;
                        // Lower right corner.
                                                                pt[1].y = yy + (long)ScaleFactor;
                                                                pt[2].x = xx + (long)(ScaleFactor * x2);
                                                                pt[2].y = yy + (long)(ScaleFactor * (1 -
y2));
                                                                pt[3].x = xx + (long)(ScaleFactor * x3);
                                                                pt[3].y = yy + (long)(ScaleFactor * (1 -
y3));
                                                                pt[4].x = xx + (long)(ScaleFactor *
0.5F);     // Top middle point
                                                                pt[4].y = yy + (long)(ScaleFactor * 0);
                                                                if (wC & 0x200)     // If vertical
symmetry bit is set...
                                                                        DisplayPoints (hdc, pt, 5,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                else
                                                                        DisplayPoints (hdc, pt, 5,
RGB(BitsInfo->bmiColors[bSrc[1]].rgbRed, BitsInfo->bmiColors[bSrc[1]].rgbGreen, BitsInfo->bmiColors[bSrc[1]].rgbBlue));
                                                        }
                                                        else {
                                                                pt[0].x = xx + (long)(ScaleFactor * x2);
                                                                pt[0].y = yy + (long)(ScaleFactor * (1 -
y2));
                                                                pt[1].x = xx + (long)(ScaleFactor * x3);
                                                                pt[1].y = yy + (long)(ScaleFactor * (1 -
y3));
                                                                pt[2].x = xx + (long)(ScaleFactor *
0.5F);     // Top middle point
                                                                pt[2].y = yy + (long)(ScaleFactor * 0);
                                                                if (wC & 0x200)     // If vertical
symmetry bit is set...
                                                                        DisplayPoints (hdc, pt, 3,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                else
                                                                        DisplayPoints (hdc, pt, 3,
RGB(BitsInfo->bmiColors[bSrc[1]].rgbRed, BitsInfo->bmiColors[bSrc[1]].rgbGreen, BitsInfo->bmiColors[bSrc[1]].rgbBlue));
                                                                }
                                                        if ((x2 == 1) || (y2 == 1)) {
                                                                // Lower right
                                                                pt[0].x = xx + (long)ScaleFactor;
                        // Upper right corner.
                                                                pt[0].y = yy + 0;
                                                                pt[1].x = xx + (long)ScaleFactor;
                        // Lower right corner.
                                                                pt[1].y = yy + (long)ScaleFactor;
                                                                pt[2].x = xx + (long)(ScaleFactor *
0.5F);     // Bottom middle point.
                                                                pt[2].y = yy + (long)(ScaleFactor * 1);
                                                                pt[3].x = xx + (long)(ScaleFactor * x3);
                                                                pt[3].y = yy + (long)(ScaleFactor * (1 -
y3));
                                                                pt[4].x = xx + (long)(ScaleFactor * x2);
                                                                pt[4].y = yy + (long)(ScaleFactor * (1 -
y2));
                                                                if (wC & 0x200)     // If vertical
symmetry bit is set...
                                                                        DisplayPoints (hdc, pt, 5,
RGB(BitsInfo->bmiColors[bSrc[7]].rgbRed, BitsInfo->bmiColors[bSrc[7]].rgbGreen, BitsInfo->bmiColors[bSrc[7]].rgbBlue));
                                                                else
                                                                        DisplayPoints (hdc, pt, 5,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                }
                                                        else {
                                                                pt[0].x = xx + (long)(ScaleFactor *
0.5F);     // Bottom middle point.
                                                                pt[0].y = yy + (long)(ScaleFactor * 1);
                                                                pt[1].x = xx + (long)(ScaleFactor * x3);
```

XLI CORPORATION - CONFIDENTIAL
PAINT.C                                                                                          PAGE 14

```
                                                                pt[1].y = yy + (long)(ScaleFactor * (1 -
y3));
                                                                pt[2].x = xx + (long)(ScaleFactor * x2);
                                                                pt[2].y = yy + (long)(ScaleFactor * (1 -
y2));
                                                                if (wC & 0x200)     // If vertical
symmetry bit is set...
                                                                        DisplayPoints (hdc, pt, 3,
RGB(BitsInfo->bmiColors[bSrc[7]].rgbRed, BitsInfo->bmiColors[bSrc[7]].rgbGreen, BitsInfo->bmiColors[bSrc[7]].rgbBlue));
                                                                else
                                                                        DisplayPoints (hdc, pt, 3,
RGB(BitsInfo->bmiColors[bSrc[4]].rgbRed, BitsInfo->bmiColors[bSrc[4]].rgbGreen, BitsInfo->bmiColors[bSrc[4]].rgbBlue));
                                                                }
                                                        }
                                                else {  // Use three points.
                                                        HPEN hP, hPold;
                                                        HBRUSH hB, hBold;
                                                        POINT Bez[3];

Normalize2Points (&x1, &y1, &x2, &y2, NULL, NULL);
                                                        if (wC & 0x100) {   // If horizontal symmetry bit
is set...
                                                                x1 = 1 - x1;
                                                                x2 = 1 - x2;
                                                                x3 = 1 - x3;
                                                                }
                                                        if (wC & 0x200) {   // If vertical symmetry bit is
set...
                                                                y1 = 1 - y1;
                                                                y2 = 1 - y2;
                                                                y3 = 1 - y3;
                                                                }
                                                        // Order the 2 points so that the point 2 has a
higher Y than point 1.
                                                        if (y2 < y1) {
                                                                // switch points
                                                                float t;
                                                                t = x1;
                                                                x1 = x2;
                                                                x2 = t;
                                                                t = y1;
                                                                y1 = y2;
                                                                y2 = t;
                                                                }

// Do left half polygon.
                                                        pt[0].x = xx + 0;   // Upper left corner.
                                                        pt[0].y = yy + 0;
                                                        pt[1].x = xx + 0;   // Lower left corner.
                                                        pt[1].y = yy + (long)ScaleFactor;
                                                        pt[2].x = xx + (long)(ScaleFactor * x1);
                                                        pt[2].y = yy + (long)(ScaleFactor * (1 - y1));
                                                        pt[3].x = xx + (long)(ScaleFactor * x3);
                                                        pt[3].y = yy + (long)(ScaleFactor * (1 - y3));
                                                        pt[4].x = xx + (long)(ScaleFactor * x2);
                                                        pt[4].y = yy + (long)(ScaleFactor * (1 - y2));

hP = CreatePen (PS_NULL, 0, RGB(0,0,0));
                                                        hPold = SelectObject (hdc, hP);
                                                        hB = CreateSolidBrush (RGB(BitsInfo-
>bmiColors[bSrc[3]].rgbRed, BitsInfo->bmiColors[bSrc[3]].rgbGreen, BitsInfo->bmiColors[bSrc[3]].rgbBlue));
                                                        hBold = SelectObject (hdc, hB);
                                                        MoveToEx (hdc, pt[0].x, pt[0].y, NULL);
                                                        BeginPath (hdc);
                                                        LineTo (hdc, pt[1].x, pt[1].y);
                                                        LineTo (hdc, pt[2].x, pt[2].y);
                                                        Bez[0].x = pt[3].x;
                                                        Bez[0].y = pt[3].y;
                                                        Bez[1].x = pt[3].x;
                                                        Bez[1].y = pt[3].y;
                                                        Bez[2].x = pt[4].x;
                                                        Bez[2].y = pt[4].y;
                                                        PolyBezierTo (hdc, &Bez[0], 3);

EndPath (hdc);
                                                        StrokeAndFillPath (hdc);
                                                        SelectObject (hdc, hBold);
                                                        DeleteObject (hB);
                                                        SelectObject (hdc, hPold);
                                                        DeleteObject (hP);

// Right half
                                                        pt[0].x = xx + (long)ScaleFactor;      // Upper
right corner.
                                                        pt[0].y = yy + 0;
```

XLI CORPORATION - CONFIDENTIAL
PAINT.C                                                                                                          PAGE 15
------------------------------------------------------------------------------------------------------------------------

```
                                                        pt[1].x = xx + (long)ScaleFactor;         // Lower
right corner.
                                                        pt[1].y = yy + (long)ScaleFactor;
                                                        pt[2].x = xx + (long)(ScaleFactor * x1);
                                                        pt[2].y = yy + (long)(ScaleFactor * (1 - y1));
                                                        pt[3].x = xx + (long)(ScaleFactor * x3);
                                                        pt[3].y = yy + (long)(ScaleFactor * (1 - y3));
                                                        pt[4].x = xx + (long)(ScaleFactor * x2);
                                                        pt[4].y = yy + (long)(ScaleFactor * (1 - y2));

hP = CreatePen (PS_NULL, 0, RGB(0,0,0));
                                                        hPold = SelectObject (hdc, hP);
                                                        hB = CreateSolidBrush (RGB(BitsInfo-
>bmiColors[bSrc[4]].rgbRed, BitsInfo->bmiColors[bSrc[4]].rgbGreen, BitsInfo->bmiColors[bSrc[4]].rgbBlue));
                                                        hBold = SelectObject (hdc, hB);
                                                        MoveToEx (hdc, pt[0].x, pt[0].y, NULL);
                                                        BeginPath (hdc);
                                                        LineTo (hdc, pt[1].x, pt[1].y);
                                                        LineTo (hdc, pt[2].x, pt[2].y);
                                                        Bez[0].x = pt[3].x;
                                                        Bez[0].y = pt[3].y;
                                                        Bez[1].x = pt[3].x;
                                                        Bez[1].y = pt[3].y;
                                                        Bez[2].x = pt[4].x;
                                                        Bez[2].y = pt[4].y;
                                                        PolyBezierTo (hdc, &Bez[0], 3);

EndPath (hdc);
                                                        StrokeAndFillPath (hdc);
                                                        SelectObject (hdc, hBold);
                                                        DeleteObject (hB);
                                                        SelectObject (hdc, hPold);
                                                        DeleteObject (hP);
                                                        }
                                        }
                                        else if (CaseType[wC & 0xff] == 13) {    // Split Cell
                        POINT pt[6];
                                        float x1, x2, x3, y1, y2, y3;
                        int xx, yy;
                        xx = (int)(col * ScaleFactor);      // Calculate left edge of cell
                        yy = (int)(row * ScaleFactor);      // Calculate top edge of cell x1 = Point[wC & 0xff][0];
                                        y1 = Point[wC & 0xff][1];
                                        x2 = Point[wC & 0xff][2];
                                        y2 = Point[wC & 0xff][3];
                                        if ((x1 == 0) && (y1 == 0) && (x2 == 0) && (y2 == 0))    // If no-hit
                                                goto NoHit2;

// Convert units and origin. Now the cell is 1 wide and high and the origin
                                        // is the lower left corner.
                                        x1 = (x1 + 1) / 2;
                                        y1 = (y1 + 1) / 2;
                                        x2 = (x2 + 1) / 2;
                                        y2 = (y2 + 1) / 2;

x3 = 0.5F;
                                                        y3 = 0.5F;

Normalize2Points (&x1, &y1, &x2, &y2, NULL, NULL);

if (wC & 0x100) {    // If horizontal symmetry bit is set...
                                                                x1 = 1 - x1;
                                                                x2 = 1 - x2;
                                                                }
                                                        if (wC & 0x200) {    // If vertical symmetry bit is set...
                                                                y1 = 1 - y1;
                                                                y2 = 1 - y2;
                                                                }
                                                        // Order the 2 points so that the point 2 has a higher x
than point 1.
                                                        if (x2 < x1) {
                                                                // switch points
                                                                float t;
                                                                t = x1;
                                                                x1 = x2;
                                                                x2 = t;
                                                                t = y1;
                                                                y1 = y2;
                                                                y2 = t;
                                                                }

// Do upper left polygon.
                                                        pt[0].x = xx + 0;    // Upper left corner.
                                                        pt[0].y = yy + 0;
                                                        pt[1].x = xx + 0;    // Lower left corner
                                                        pt[1].y = yy + (long)(ScaleFactor * 1);
```

XLI CORPORATION - CONFIDENTIAL
PAINT.C  PAGE 16
---

```
                                        pt[2].x = xx + (long)(ScaleFactor * x1);
                                        pt[2].y = yy + (long)(ScaleFactor * (1 - y1));
                                        pt[3].x = xx + (long)(ScaleFactor * x3);
                                        pt[3].y = yy + (long)(ScaleFactor * (1 - y3));
                                        pt[4].x = xx + (long)(ScaleFactor * 0.5F);    // Top
middle point
                                        pt[4].y = yy + (long)(ScaleFactor * 0);
                                        if (XOR (wC & 0x200, wC & 0x100))   // XOR symmetry
bits...
                                        // alc   DisplayPoints (hdc, pt, 5, RGB(BitsInfo-
>bmiColors[bSrc[0]].rgbRed, BitsInfo->bmiColors[bSrc[0]].rgbGreen, BitsInfo->bmiColors[bSrc[0]].rgbBlue));
                                                DisplayPoints (hdc, pt, 5, RGB(BitsInfo-
>bmiColors[bSrc[4]].rgbRed, BitsInfo->bmiColors[bSrc[4]].rgbGreen, BitsInfo->bmiColors[bSrc[4]].rgbBlue));
                                        else
                                                DisplayPoints (hdc, pt, 5, RGB(BitsInfo-
>bmiColors[bSrc[3]].rgbRed, BitsInfo->bmiColors[bSrc[3]].rgbGreen, BitsInfo->bmiColors[bSrc[3]].rgbBlue));

// Do lower left polygon.
                                        pt[0].x = xx + 0;   // Upper left corner.
                                        pt[0].y = yy + 0;
                                        pt[1].x = xx + 0;
                                        pt[1].y = yy + (long)(ScaleFactor * 1);
                                        pt[2].x = xx + (long)(ScaleFactor * 0.5F);    // Bottom
middle point
                                        pt[2].y = yy + (long)(ScaleFactor * 1);
                                        pt[3].x = xx + (long)(ScaleFactor * x3);
                                        pt[3].y = yy + (long)(ScaleFactor * (1 - y3));
                                        pt[4].x = xx + (long)(ScaleFactor * x1);
                                        pt[4].y = yy + (long)(ScaleFactor * (1 - y1));
                                        if (XOR (wC & 0x200, wC & 0x100))   // XOR symmetry
bits...
                                                DisplayPoints (hdc, pt, 5, RGB(BitsInfo-
>bmiColors[bSrc[3]].rgbRed, BitsInfo->bmiColors[bSrc[3]].rgbGreen, BitsInfo->bmiColors[bSrc[3]].rgbBlue));
                                        else
                                        // alc   DisplayPoints (hdc, pt, 5, RGB(BitsInfo-
>bmiColors[bSrc[6]].rgbRed, BitsInfo->bmiColors[bSrc[6]].rgbGreen, BitsInfo->bmiColors[bSrc[6]].rgbBlue));
                                                DisplayPoints (hdc, pt, 5, RGB(BitsInfo-
>bmiColors[bSrc[4]].rgbRed, BitsInfo->bmiColors[bSrc[4]].rgbGreen, BitsInfo->bmiColors[bSrc[4]].rgbBlue));

// Upper right
                                        pt[0].x = xx + (long)ScaleFactor;             // Upper right
corner.
                                        pt[0].y = yy + 0;
                                        pt[1].x = xx + (long)ScaleFactor;             // Lower right
corner.
                                        pt[1].y = yy + (long)ScaleFactor;
                                        pt[2].x = xx + (long)(ScaleFactor * x2);
                                        pt[2].y = yy + (long)(ScaleFactor * (1 - y2));
                                        pt[3].x = xx + (long)(ScaleFactor * x3);
                                        pt[3].y = yy + (long)(ScaleFactor * (1 - y3));
                                        pt[4].x = xx + (long)(ScaleFactor * 0.5F);    // Top
middle point
                                        pt[4].y = yy + (long)(ScaleFactor * 0);
                                        if (XOR (wC & 0x200, wC & 0x100))   // XOR symmetry
bits...
                                                DisplayPoints (hdc, pt, 5, RGB(BitsInfo-
>bmiColors[bSrc[4]].rgbRed, BitsInfo->bmiColors[bSrc[4]].rgbGreen, BitsInfo->bmiColors[bSrc[4]].rgbBlue));
                                        else
                                        // alc   DisplayPoints (hdc, pt, 5, RGB(BitsInfo-
>bmiColors[bSrc[1]].rgbRed, BitsInfo->bmiColors[bSrc[1]].rgbGreen, BitsInfo->bmiColors[bSrc[1]].rgbBlue));
                                                DisplayPoints (hdc, pt, 5, RGB(BitsInfo-
>bmiColors[bSrc[3]].rgbRed, BitsInfo->bmiColors[bSrc[3]].rgbGreen, BitsInfo->bmiColors[bSrc[3]].rgbBlue));

// Lower right
                                        pt[0].x = xx + (long)ScaleFactor;             // Upper right
corner.
                                        pt[0].y = yy + 0;
                                        pt[1].x = xx + (long)ScaleFactor;             // Lower right
corner.
                                        pt[1].y = yy + (long)ScaleFactor;
                                        pt[2].x = xx + (long)(ScaleFactor * 0.5F);    // Bottom
middle point.
                                        pt[2].y = yy + (long)(ScaleFactor * 1);
                                        pt[3].x = xx + (long)(ScaleFactor * x3);
                                        pt[3].y = yy + (long)(ScaleFactor * (1 - y3));
                                        pt[4].x = xx + (long)(ScaleFactor * x2);
                                        pt[4].y = yy + (long)(ScaleFactor * (1 - y2));
                                        if (XOR (wC & 0x200, wC & 0x100))   // XOR symmetry
bits...
                                        // alc   DisplayPoints (hdc, pt, 5, RGB(BitsInfo-
>bmiColors[bSrc[7]].rgbRed, BitsInfo->bmiColors[bSrc[7]].rgbGreen, BitsInfo->bmiColors[bSrc[7]].rgbBlue));
                                                DisplayPoints (hdc, pt, 5, RGB(BitsInfo-
>bmiColors[bSrc[3]].rgbRed, BitsInfo->bmiColors[bSrc[3]].rgbGreen, BitsInfo->bmiColors[bSrc[3]].rgbBlue));
                                        else
                                                DisplayPoints (hdc, pt, 5, RGB(BitsInfo-
>bmiColors[bSrc[4]].rgbRed, BitsInfo->bmiColors[bSrc[4]].rgbGreen, BitsInfo->bmiColors[bSrc[4]].rgbBlue));
                                        }
```

XLI CORPORATION - CONFIDENTIAL
PAINT.C                                                                PAGE 17

```
                                    // 5=Shifted cases (There are 4 versions of this: 5, 15, 25, 35
depending on where the little triangle is.)
                                    //       5 = upper left triangle
                                    //      15 = lower left
                                    //      25 = upper right
                                    //      35 = lower right
                                    else if (((CaseType[wC & 0xff] & 0xf) == 5) {     // Shifted cases of
any style.
                POINT pt[6];
                                            float x1, x2, x3, y1, y2, y3;
                int xx, yy;
                xx = (int)(col * ScaleFactor);      // Calculate left edge of cell
                yy = (int)(row * ScaleFactor);      // Calculate top edge of cell x1 = Point[wC & 0xff][0];
                                    y1 = Point[wC & 0xff][1];
                                    x2 = Point[wC & 0xff][2];
                                    y2 = Point[wC & 0xff][3];
                                    if ((x1 == 0) && (y1 == 0) && (x2 == 0) && (y2 == 0))      // If no-hit
                                            goto NoHit2;

// Convert units and origin. Now the cell is 1 wide and high and the origin
                            //  is the lower left corner.
                                    x1 = (x1 + 1) / 2;
                                    y1 = (y1 + 1) / 2;
                                    x2 = (x2 + 1) / 2;
                                    y2 = (y2 + 1) / 2;
                                            x3 = 0.5F;
                                            y3 = 0.5F;

Normalize2Points (&x1, &y1, &x2, &y2, NULL, NULL);

// Order the 2 points so that the point 2 has a higher x
than point 1.
                                    if (x2 < x1) {
                                            // switch points
                                            float t;
                                            t = x1;
                                            x1 = x2;
                                            x2 = t;
                                            t = y1;
                                            y1 = y2;
                                            y2 = t;
                                            }
                                    // For ease of reading, we change the orientation of the Y
values to positive = down.
                                    y1 = 1 - y1;
                                    y2 = 1 - y2;

// One half of the cell is always a rectangle of the color
on that side.
                                    // Based on the horizontal symmetry and style of shifted
case we know which side to fill.
                                    if (XOR (((CaseType[wC & 0xff] >> 4) == 0) || ((CaseType[wC
& 0xff] >> 4) == 1), (wC & 0x100))) {
                                            // Put rectangle on right.
                                            pt[0].x = xx + (long)(ScaleFactor * 1);  // Upper
right corner.
                                            pt[0].y = yy + 0;
                                            pt[1].x = xx + (long)(ScaleFactor * 1);  // Lower
right corner
                                            pt[1].y = yy + (long)(ScaleFactor * 1);
                                            pt[2].x = xx + (long)(ScaleFactor * 0.5F);
                    // Bottom middle
                                            pt[2].y = yy + (long)(ScaleFactor * 1);
                                            pt[3].x = xx + (long)(ScaleFactor * 0.5F);
                    // Top middle
                                            pt[3].y = yy + 0;
                                            DisplayPoints (hdc, pt, 4, RGB(BitsInfo-
>bmiColors[bSrc[4]].rgbRed, BitsInfo->bmiColors[bSrc[4]].rgbGreen, BitsInfo->bmiColors[bSrc[4]].rgbBlue));

// We know that the triangle and polygon go on the
left side of the cell, and we also know
                                            // which colors to use. The next issue is upper
or lower triangle.
                                            if (XOR (CaseType[wC & 0xff] & 0x10, wC & 0x200))
{           // XOR the bit which tells us upper versus lower, with the vertical symmetry.
                                                    // do lower left triangle
                                                    pt[0].x = xx + (long)(ScaleFactor * 0);
                    // Bottom left
                                                    pt[0].y = yy + (long)(ScaleFactor * 1);
                                                    pt[1].x = xx + (long)(ScaleFactor * 0);
                                                    pt[2].y = yy + (long)(ScaleFactor * 1);

// Sure this is complicated, but it
saves code.
```

XLI CORPORATION - CONFIDENTIAL
PAINT.C                                                                                                           PAGE 18

```
                                                                   switch (CaseType[wC & 0xff] >> 4) {
                                                                   default:
                                                                   case 0:  // Hsym = 0, Vsym = 1
          (must be since this is normally an upper left triangle and we are doing a lower left triangle.  The Vsym bit must be set!)
                                                                       pt[1].y = yy + (long)(ScaleFactor * (1 - y1));
                                                                       pt[2].x = xx + (long)(ScaleFactor * x2);
                                                                       break;
                                                                   case 1:  // Hsym = 0, Vsym = 0 (this case normally does triangle in lower left.
                                                                       pt[1].y = yy + (long)(ScaleFactor * y1);
                                                                       pt[2].x = xx + (long)(ScaleFactor * x2);
                                                                       break;
                                                                   case 2:  // Hsym = 1, Vsym = 1
                                                                       pt[1].y = yy + (long)(ScaleFactor * (1 - y2));
                                                                       pt[2].x = xx + (long)(ScaleFactor * (1 - x1));
                                                                       break;
                                                                   case 3:  // Hsym = 1, Vsym = 0
                                                                       pt[1].y = yy + (long)(ScaleFactor * y2);
                                                                       pt[2].x = xx + (long)(ScaleFactor * (1 - x1));
                                                                       break;
                                                                   }
                                                                   DisplayPoints (hdc, pt, 3, RGB(BitsInfo->bmiColors[bSrc[2]].rgbRed, BitsInfo->bmiColors[bSrc[2]].rgbGreen, BitsInfo->bmiColors[bSrc[2]].rgbBlue));

pt[0].x = xx + 0;                    // Upper left corner.
                                                                   pt[0].y = yy + 0;
                                                                   pt[3].x = xx + (long)(ScaleFactor * 0.5F);   // Bottom middle
                                                                   pt[3].y = yy + (long)(ScaleFactor * 1);
                                                                   pt[4].x = xx + (long)(ScaleFactor * 0.5F);   // Top middle
                                                                   pt[4].y = yy + 0;
                                                                   DisplayPoints (hdc, pt, 5, RGB(BitsInfo->bmiColors[bSrc[3]].rgbRed, BitsInfo->bmiColors[bSrc[3]].rgbGreen, BitsInfo->bmiColors[bSrc[3]].rgbBlue));
                                                               }
                                                               else {
                                                                   // do upper left triangle
                                                                   pt[0].x = xx + (long)(ScaleFactor * 0);
                                                                   // Top left
                                                                   pt[0].y = yy + (long)(ScaleFactor * 0);
                                                                   pt[1].x = xx + (long)(ScaleFactor * 0);
                                                                   pt[2].y = yy + (long)(ScaleFactor * 0);

// Sure this is complicated, but it saves code.
                                                                   switch (CaseType[wC & 0xff] >> 4) {
                                                                   default:
                                                                   case 0:  // Hsym = 0, Vsym = 0
          (must be since this is normally an upper left triangle and we are doing a lower left triangle.  The Vsym bit must be set?)
                                                                       pt[1].y = yy + (long)(ScaleFactor * y1);
                                                                       pt[2].x = xx + (long)(ScaleFactor * x2);
                                                                       break;
                                                                   case 1:  // Hsym = 0, Vsym = 1 (this case normally does triangle in lower left.
                                                                       pt[1].y = yy + (long)(ScaleFactor * (1 - y1));
                                                                       pt[2].x = xx + (long)(ScaleFactor * x2);
                                                                       break;
                                                                   case 2:  // Hsym = 1, Vsym = 0
                                                                       pt[1].y = yy + (long)(ScaleFactor * y2);
                                                                       pt[2].x = xx + (long)(ScaleFactor * (1 - x1));
                                                                       break;
                                                                   case 3:  // Hsym = 1, Vsym = 1
                                                                       pt[1].y = yy + (long)(ScaleFactor * (1 - y2));
                                                                       pt[2].x = xx + (long)(ScaleFactor * (1 - x1));
```

XLI CORPORATION - CONFIDENTIAL
PAINT.C                                                                                              PAGE 19

```
                                                                                        break;
                                                                                    }
                                                                DisplayPoints (hdc, pt, 3, RGB(BitsInfo-
>bmiColors[bSrc[2]].rgbRed, BitsInfo->bmiColors[bSrc[2]].rgbGreen, BitsInfo->bmiColors[bSrc[2]].rgbBlue));

pt[0].x = xx + 0;        // Bottom left corner.
                                                                    pt[0].y = yy + (long)(ScaleFactor * 1);
                                                                    pt[3].x = xx + (long)(ScaleFactor * 0.5F);   // Top middle
                                                                    pt[3].y = yy + 0;
                                                                    pt[4].x = xx + (long)(ScaleFactor * 0.5F);   // Bottom middle
                                                                    pt[4].y = yy + (long)(ScaleFactor * 1);
                                                                DisplayPoints (hdc, pt, 5, RGB(BitsInfo-
>bmiColors[bSrc[3]].rgbRed, BitsInfo->bmiColors[bSrc[3]].rgbGreen, BitsInfo->bmiColors[bSrc[3]].rgbBlue));
                                                                    }
                                                                }
                                                        else {
                                                            // If either left side case and NOT the horizontal symmetry then put rectangle on left.
                                                                pt[0].x = xx + 0;         // Upper left corner.
                                                                pt[0].y = yy + 0;
                                                                pt[1].x = xx + 0;         // Lower left corner
                                                                pt[1].y = yy + (long)(ScaleFactor * 1);
                                                                pt[2].x = xx + (long)(ScaleFactor * 0.5F);
                            // Bottom middle
                                                                pt[2].y = yy + (long)(ScaleFactor * 1);
                                                                pt[3].x = xx + (long)(ScaleFactor * 0.5F);
                            // Top middle
                                                                pt[3].y = yy + 0;
                                                            DisplayPoints (hdc, pt, 4, RGB(BitsInfo-
>bmiColors[bSrc[3]].rgbRed, BitsInfo->bmiColors[bSrc[3]].rgbGreen, BitsInfo->bmiColors[bSrc[3]].rgbBlue));

// We know that the triangle and polygon go on the left side of the cell, and we also know
                                                            // which colors to use.  The next issue is upper or lower triangle.
                                                            if (XOR (CaseType[wC & 0xff] & 0x10, wC & 0x200))
        {                       // XOR the bit which tells us upper versus lower, with the vertical symmetry.
                                                                // do lower right triangle
                                                                pt[0].x = xx + (long)(ScaleFactor * 1);
                            // Bottom right
                                                                pt[0].y = yy + (long)(ScaleFactor * 1);
                                                                pt[1].x = xx + (long)(ScaleFactor * 1);
                                                                pt[2].y = yy + (long)(ScaleFactor * 1);

// Sure this is complicated, but it saves code.
                                                                switch (CaseType[wC & 0xff] >> 4) {
                                                                    default:
                                                                    case 0:   // Hsym = 1, Vsym = 1
                (must be since this is normally an upper left triangle and we are doing a lower left triangle.  The Vsym bit must be set!)
                                                                        pt[1].y = yy + (long)(ScaleFactor * (1 - y1));
                                                                        pt[2].x = xx + (long)(ScaleFactor * (1 - x2));
                                                                        break;
                                                                    case 1:   // Hsym = 1, Vsym = 0 (this case normally does triangle in lower left.
                                                                        pt[1].y = yy + (long)(ScaleFactor * y1);
                                                                        pt[2].x = xx + (long)(ScaleFactor * (1 - x2));
                                                                        break;
                                                                    case 2:   // Hsym = 0, Vsym = 1
                                                                        pt[1].y = yy + (long)(ScaleFactor * (1 - y2));
                                                                        pt[2].x = xx + (long)(ScaleFactor * x1);
                                                                        break;
                                                                    case 3:   // Hsym = 0, Vsym = 0
                                                                        pt[1].y = yy + (long)(ScaleFactor * y2);
                                                                        pt[2].x = xx + (long)(ScaleFactor * x1);
                                                                        break;
                                                                }
                                                            DisplayPoints (hdc, pt, 3, RGB(BitsInfo-
>bmiColors[bSrc[5]].rgbRed, BitsInfo->bmiColors[bSrc[5]].rgbGreen, BitsInfo->bmiColors[bSrc[5]].rgbBlue));

pt[0].x = xx + (long)(ScaleFactor * 1);
                                // Upper right corner.
```

XLI CORPORATION - CONFIDENTIAL
PAINT.C                                                                                           PAGE 20

---

```c
                              0.5F);    // Bottom middle 0.5F);    // Top middle // Top right saves code.

(must be since this is normally an upper left triangle and we are doing a lower left triangle.  The Vsym bit
must be set!)

(long)(ScaleFactor * y1);

(long)(ScaleFactor * (1 - x2));

1 (this case normally does triangle in lower left.

(long)(ScaleFactor * (1 - y1));

(long)(ScaleFactor * (1 - x2));

0

(long)(ScaleFactor * y2);

(long)(ScaleFactor * x1);

1

(long)(ScaleFactor * (1 - y2));

(long)(ScaleFactor * x1);

->bmiColors[bSrc[5]].rgbRed, BitsInfo->bmiColors[bSrc[5]].rgbGreen, BitsInfo->bmiColors[bSrc[5]].rgbBlue));

// Bottom right corner.

0.5F);    // Top middle 0.5F);    // Bottom middle

->bmiColors[bSrc[4]].rgbRed, BitsInfo->bmiColors[bSrc[4]].rgbGreen, BitsInfo->bmiColors[bSrc[4]].rgbBlue));

else {    // No hit!!!
NoHit2:

BitsInfo->bmiColors[bSrc[3]].rgbGreen, BitsInfo->bmiColors[bSrc[3]].rgbBlue));

(int)(((float)col + 0.5F) * ScaleFactor) + 1, (int)((row + 1) * ScaleFactor) + 1);

pt[0].y = yy + 0;
                                                        pt[3].x = xx + (long)(ScaleFactor *
                                                        pt[3].y = yy + (long)(ScaleFactor * 1);
                                                        pt[4].x = xx + (long)(ScaleFactor *
                                                        pt[4].y = yy + 0;
                                                        DisplayPoints (hdc, pt, 5, RGB(BitsInfo-
                                                        }
                                                else {
                                                        // do upper right triangle
                                                        pt[0].x = xx + (long)(ScaleFactor * 1);
                                                        pt[0].y = yy + (long)(ScaleFactor * 0);
                                                        pt[1].x = xx + (long)(ScaleFactor * 1);
                                                        pt[2].y = yy + (long)(ScaleFactor * 0);

// Sure this is complicated, but it switch (CaseType[wC & 0xff] >> 4) {
                                                                default:
                                                                case 0: // Hsym = 1, Vsym = 0 pt[1].y = yy + pt[2].x = xx + break;
                                                                case 1: // Hsym = 1, Vsym = pt[1].y = yy + pt[2].x = xx + break;
                                                                case 2: // Hsym = 0, Vsym = pt[1].y = yy + pt[2].x = xx + break;
                                                                case 3: // Hsym = 0, Vsym = pt[1].y = yy + pt[2].x = xx + break;
                                                                }
                                                        DisplayPoints (hdc, pt, 3, RGB(BitsInfopt[0].x = xx + (long)(ScaleFactor * 1);
                                                        pt[0].y = yy + (long)(ScaleFactor * 1);
                                                        pt[3].x = xx + (long)(ScaleFactor *
                                                        pt[3].y = yy + 0;
                                                        pt[4].x = xx + (long)(ScaleFactor *
                                                        pt[4].y = yy + (long)(ScaleFactor * 1);
                                                        DisplayPoints (hdc, pt, 5, RGB(BitsInfo-
                                                        }
                                                }
                                        }
                                else /* if (CaseType[wC & 0xff] == 13) */ {
                                        goto NoHit2;
                                        }
                                } hP = CreatePen (PS_NULL, 0, RGB(0,0,0));
                                hPold = SelectObject (hdc, hP);
                                // Do left helf
                                hB = CreateSolidBrush (RGB(BitsInfo->bmiColors[bSrc[3]].rgbRed, hBold = SelectObject (hdc, hB);
                                Rectangle (hdc, (int)(col * ScaleFactor), (int)(row * ScaleFactor), SelectObject (hdc, hBold);
                                DeleteObject (hB);
```

XLI CORPORATION - CONFIDENTIAL
PAINT.C                                                                                                              PAGE 21

---

```c
                                            // Right half
                                            hB = CreateSolidBrush (RGB(BitsInfo->bmiColors[bSrc[4]].rgbRed,
BitsInfo->bmiColors[bSrc[4]].rgbGreen, BitsInfo->bmiColors[bSrc[4]].rgbBlue));
                                            hBold = SelectObject (hdc, hB);
                                            Rectangle (hdc, (int)(((float)col + 0.5F) * ScaleFactor), (int)(row *
ScaleFactor), (int)((col + 1) * ScaleFactor) + 1, (int)((row + 1) * ScaleFactor) + 1);
                                            SelectObject (hdc, hBold);
                                            DeleteObject (hB);
                                            SelectObject (hdc, hPold);
                                            DeleteObject (hP);
                                            }

// If the HighLite value is set, then see if this is that case.
                                    if (HighLite) {
                                            if (HighLite == (wC & 0xff)) {
                                                    int Mold; // Old background mode
                                                    LOGBRUSH lb;
                                                    lb.lbStyle = BS_HATCHED;
                                                    lb.lbColor = RGB(0,0,0);
                                                    lb.lbHatch = HS_DIAGCROSS;
                                                    hP = CreatePen (PS_NULL, 0, RGB(0,0,0));
                                                    hPold = SelectObject (hdc, hP);
                                                    // Do left helf
                                                    hB = CreateBrushIndirect (&lb);
                                                    hBold = SelectObject (hdc, hB);
                                                    Mold = SetBkMode (hdc, TRANSPARENT);
                                                    Ellipse (hdc, (int)(col * ScaleFactor), (int)(row *
ScaleFactor), (int)((col + 1) * ScaleFactor), (int)((row + 1) * ScaleFactor));
                                                    SetBkMode (hdc, Mold);
                                                    SelectObject (hdc, hBold);
                                                    DeleteObject (hB);
                                                    SelectObject (hdc, hPold);
                                                    DeleteObject (hP);
                                                    }
                                            }
                                    }
                            }

GlobalUnlock (hCases);
            }
endif
            GlobalUnlock (bi);
            GlobalFree (bi);

// If the grid is enabled and we are zoomed in enough to use it...
    if ((ScaleFactor >= 8) && (Grid)) {
        hpen = CreatePen (PS_SOLID, 1, RGB(255, 255, 255));  // Make a solid black pen.
        hpenOld = SelectObject (hdc, hpen);   // Select the pen.
                SetROP2 (hdc, R2_NOT);

// Draw horizontal grid lines
        for (i = 1; (i * ScaleFactor * yRatio) < rc.bottom; i++) {
            MoveToEx (hdc, 0, (int)(i * ScaleFactor * yRatio), NULL);
            LineTo (hdc, rc.right, (int)(i * ScaleFactor * yRatio));
            }
        // Draw vertical grid lines
        for (i = 1; (i * ScaleFactor * xRatio) < rc.right; i++) {
            MoveToEx (hdc, (int)(i * ScaleFactor * xRatio), 0, NULL);
            LineTo (hdc, (int)(i * ScaleFactor * xRatio), rc.bottom);
            }

SelectObject (hdc, hpenOld); // Restore the pen to the previous one.
        DeleteObject (hpen);   // Delete the pen.
        } if ((ScaleFactor >= 8) && (Grid == 2)) {
                long dwIndex;       // selects the values that go with the cell we are drawing.
        hpen = CreatePen (PS_SOLID, (ScaleFactor > 32) ? (int)(ScaleFactor / 16) : 3, RGB(0x80, 0x80, 0x80));  // Make a
solid black pen.
        hpenOld = SelectObject (hdc, hpen);   // Select the pen.
                SetROP2 (hdc, R2_COPYPEN);

// Draw edges between horizontally adjacent pixels. (vertical lines)
                for (row = 0; (row < rc.bottom / ScaleFactor) && (row + Y < Height); row++) {
                        for (col = 0; (col < rc.right / ScaleFactor) && (col + X + 1 < Width); col++) {
                                dwIndex = X + col + ((Y + row) * Width);
                                if (*(pTmp + dwIndex) != *(pTmp + dwIndex + 1)) {
                                    MoveToEx (hdc, (int)((col + 0.5F) * ScaleFactor), (int)(row * ScaleFactor), NULL);
                                    LineTo (hdc, (int)((col + 0.5F) * ScaleFactor), (int)((row + 1) * ScaleFactor));
                                    }
                                }
                        }

// Draw edges between vertically adjacent pixels. (horizontal lines)
                for (row = 0; (row < rc.bottom / ScaleFactor) && (row + Y + 1 < Height); row++) {
```

XLI CORPORATION - CONFIDENTIAL
PAINT.C  PAGE 22

---

```
            for (col = 0; (col < rc.right / ScaleFactor) && (col + X < Width); col++) {
                    dwIndex = X + col + ((Y + row) * Width);
                    if (*(pTmp + dwIndex) != *(pTmp + dwIndex + Width)) {
                MoveToEx (hdc, (int)((col - 0.5F) * ScaleFactor), (int)((row + 1) * ScaleFactor), NULL);
                LineTo (hdc, (int)((col + 0.5F) * ScaleFactor), (int)((row + 1) * ScaleFactor));
                    }
                }
            }
    SelectObject (hdc, hpenOld); // Restore the pen to the previous one.
    DeleteObject (hpen);  // Delete the pen.
    }

GlobalUnlock (hBitmap);
    EndPaint (hWnd, &ps);
}
```

XLI CORPORATION - CONFIDENTIAL
PRINT.C PAGE 1

```c
#include <windows.h>
#include <string.h>
#include <drivinit.h>          // contains printing constants
#include <commdlg.h>
#include "color.h"

// global structure for printing attributes
typedef struct {
    HANDLE  hCurrDevMode, hCurrDevNames;
    HFONT   hPrinterFont;
    LOGFONT lfCurrFont;
    char    szPrinter [64] ;
    LPSTR   szDevice, szDriver, szOutput ;
    BOOL    bAbort;
    HWND    hDlgAbort;
} PRINTINFOSTRUCT;

PRINTINFOSTRUCT pis;

void PrintGDI (HWND, HDC, HGLOBAL, WORD, WORD);

BOOL PrintIt (HWND hWnd, HGLOBAL hData, WORD Width, WORD Height)
{
    HDC hPrnDC;
    DOCINFO di;
    FARPROC lpAbortProc, lpAbortDlg;

if (!ShowPrintSetup (hWnd))
        return FALSE;

// get a printer dc
    if ((hPrnDC = GetPrinterDC ()) == NULL) {
        MessageBox (hWnd, "Cannot create printer DC!", "ERROR",
                MB_APPLMODAL | MB_ICONSTOP | MB_OK);
        return FALSE;
        }

// set user abort flag
    pis.bAbort = FALSE;

// Initialize the abort procedure.
    lpAbortProc = MakeProcInstance ((FARPROC)PrintAbortProc, hInst);
    lpAbortDlg  = MakeProcInstance ((FARPROC)PrintAbortDlg,  hInst);

// disable main application window
    EnableWindow (hWnd, FALSE);

// display abort dialog
    pis.hDlgAbort = CreateDialog (hInst, "CancelDLG", hWnd, (FARPROC)lpAbortDlg);

// set abort procedure
    if (SetAbortProc (hPrnDC, lpAbortProc) < 0) {
        MessageBox (NULL, "The SetAbortProc function failed.", "ERROR",
                MB_APPLMODAL|MB_ICONSTOP|MB_OK);

DeleteDC (hPrnDC);
        return FALSE;
        }

// need for StartDoc
    di.cbSize      = sizeof(DOCINFO);
    di.lpszDocName = (LPSTR)"HD Fax Printer";
    di.lpszOutput  = NULL;

// issue STARTDOC
    if (StartDoc (hPrnDC, &di) < 0) {
        MessageBox (NULL, "STARTDOC escape problem", "ERROR",
                MB_APPLMODAL|MB_ICONSTOP|MB_OK);
        goto DocError;
        }

// Call print routine...
    PrintGDI (hWnd, hPrnDC, hData, Width, Height);

// only do if user has not aborted
    if (!pis.bAbort) {
        if (EndDoc (hPrnDC) < 0) {  // end the document
            MessageBox (NULL, "EndDoc function problem", "ERROR",
                    MB_APPLMODAL|MB_ICONSTOP|MB_OK);
        }
    }

DocError:
    // enable main application window
    EnableWindow (hWnd, TRUE);
```

XLI CORPORATION - CONFIDENTIAL
PRINT.C                                                                                                       PAGE 2

---

```c
    // get rid of abort dialog
    DestroyWindow (pis.hDlgAbort);

// clean up
    FreeProcInstance (lpAbortProc);
    FreeProcInstance (lpAbortDlg);

DeleteDC (hPrnDC);
    return TRUE;
} void PrintGDI (HWND hWnd, HDC hPrnDC, HGLOBAL hData, WORD Width, WORD Height)
{
    int nxLogPix, nyLogPix;
    POINT Margin;
    char szBuffer[64];
    BOOL Error = TRUE;
    PBYTE pData;

pData = (PBYTE)GlobalLock (hData);
    if (pData == 0) {
        MessageBox (NULL, "Lock of bitmap failed", NULL, MB_OK);
        return;
    } if (Escape (hPrnDC, GETPRINTINGOFFSET, 0, NULL, (LPVOID)&Margin) < 0) {
        Margin.x = Margin.y = 0;
    }

// get logical pixels per inch
    nxLogPix = GetDeviceCaps (hPrnDC, LOGPIXELSX);
    nyLogPix = GetDeviceCaps (hPrnDC, LOGPIXELSY);
    wsprintf (szBuffer, "Printer is %d by %d", nxLogPix, nyLogPix);   // Tell the user what we are doing.
    SetDlgItemText (pis.hDlgAbort, 300, (LPSTR)szBuffer);

// Make sure the data is at least 1/4 inch off the topleft corner. Or whatever is in the ini file.
    if (Margin.x < MulDiv (nxLogPix, GetProfileInt ("xli-fax", "xoffset", 25), 100))
        Margin.x = MulDiv (nxLogPix, GetProfileInt ("xli-fax", "xoffset", 25), 100);
    if (Margin.y < MulDiv (nyLogPix, GetProfileInt ("xli-fax", "yoffset", 25), 100))
        Margin.y = MulDiv (nyLogPix, GetProfileInt ("xli-fax", "yoffset", 25), 100);

StartPage (hPrnDC);   // !!!!

{
        HDC hdcMemory;
        HBITMAP hbmpOld;
        BITMAP bm;
        HBITMAP hbm;
        int LinesPerBlt, CurrentLine;

bm.bmType = 0;
        bm.bmWidth = Width;
        bm.bmHeight = Height;
        bm.bmWidthBytes = ((Width + 31) / 32) * 4;
        bm.bmPlanes = 1;
        bm.bmBitsPixel = 1;
        bm.bmBits = pData;

CurrentLine = 0;
        LinesPerBlt = (int)(32768L / bm.bmWidthBytes);
        LinesPerBlt = 1;
        while (CurrentLine < Height) {
            if (LinesPerBlt < (Height - CurrentLine))
                bm.bmHeight = LinesPerBlt;
            else
                bm.bmHeight = Height - CurrentLine;
            bm.bmBits = pData + ((DWORD)CurrentLine * (DWORD)bm.bmWidthBytes);
            hbm = CreateBitmapIndirect (&bm);
            if (hbm != NULL) {
                hdcMemory = CreateCompatibleDC (hPrnDC);
                if (hdcMemory != NULL) {
                    hbmpOld = SelectObject (hdcMemory, hbm);
                    if (hbmpOld != NULL) {
                        BitBlt (hPrnDC, Margin.x, Margin.y + CurrentLine, Width, bm.bmHeight, hdcMemory, 0, 0, SRCINVERT);
                        SelectObject (hdcMemory, hbmpOld);
                    }
                    DeleteDC (hdcMemory);
                }
                DeleteObject (hbm);
            }
            CurrentLine += LinesPerBlt;
        }
    }
```

XLI CORPORATION - CONFIDENTIAL
PRINT.C PAGE 3

```
//goto PrintError;  // To stop switching to new bitmap.
    EndPage (hPrnDC);
    Error = FALSE;

//PrintError:
    if (Error) {  // This is only set if we came here from a goto.
        EndPage (hPrnDC);
        }
    GlobalUnlock (hData);
}

// *************************************************************
// ShowPrintSetup
// Purpose:
//    Function responsible for displaying Print Setup common
//    dialog box.  Stores a handle to the current DEVMODE and a
//    handle to the current DEVNAMES in a global PRINTINFOSTRUCT.
//
// Parameters:
//      HWND hWnd
//
// Return: (BOOL)
// *************************************************************
BOOL ShowPrintSetup (HWND hWnd)
{
    PRINTDLG pdPrint;

pdPrint.lStructSize  = sizeof(PRINTDLG);
    pdPrint.hwndOwner    = hWnd;
    pdPrint.hDevMode     = (HANDLE)pis.hCurrDevMode;
    pdPrint.hDevNames    = (HANDLE)pis.hCurrDevNames;
    pdPrint.Flags        = PD_PRINTSETUP;
    pdPrint.hInstance    = (HANDLE)hInst;

if (PrintDlg(&pdPrint)) {
        // set global handles
        pis.hCurrDevMode   = pdPrint.hDevMode;
        pis.hCurrDevNames  = pdPrint.hDevNames;
        return TRUE;
        }
    else {
        // set global handles
        pis.hCurrDevMode   = pdPrint.hDevMode;
        pis.hCurrDevNames  = pdPrint.hDevNames;
        return FALSE;
        }
}

// *************************************************************
// GetPrinterDC
// Purpose:
//    Function that retrieves a printer dc.  Retrieves a dc with
//    respect to the data in the current DEVMODE and DEVNAMES.
//
// Parameters:
//      void
//
// Return: (HDC)
// *************************************************************
LPDEVMODE lpdmDevMode = NULL;
HDC GetPrinterDC (void)
{
    LPDEVNAMES lpdnDevNames = NULL;
    LPSTR lpstrDevNames = NULL;

// lock handle to DEVMODE struct and send info to CreateDC
    // This causes a DC to be created that will have the same
    // DEVMODE attributes as what the user picked in the Print
    // Setup dialog.
    if (pis.hCurrDevMode != NULL)
        lpdmDevMode = (LPDEVMODE)GlobalLock(pis.hCurrDevMode);

// lock handle to DEVNAMES struct and send info to CreateDC
    // This causes a DC to be created and linked to the device
    // (printer) that the user selected in the Print Setup
    // dialog.  If hCurrDevNames is NULL then we create a DC
    // linked to the default printer.
    if (pis.hCurrDevNames != NULL) {
        lpdnDevNames = (LPDEVNAMES)GlobalLock(pis.hCurrDevNames);
        pis.szDevice = (LPSTR)lpdnDevNames + lpdnDevNames->wDeviceOffset;
        pis.szDriver = (LPSTR)lpdnDevNames + lpdnDevNames->wDriverOffset;
        pis.szOutput = (LPSTR)lpdnDevNames + lpdnDevNames->wOutputOffset;

return CreateDC (pis.szDriver, pis.szDevice, pis.szOutput, (CONST DEVMODE *)lpdmDevMode);
        }
```

XLI CORPORATION - CONFIDENTIAL
PRINT.C PAGE 4

```
    else {  // create a DC that is linked to the default printer
        GetProfileString ("windows", "device", "", pis.szPrinter, 64) ;

if ((pis.szDevice = (LPSTR)strtok (pis.szPrinter, ",")) &&
            (pis.szDriver = (LPSTR)strtok (NULL,          ", ")) &&
            (pis.szOutput = (LPSTR)strtok (NULL,          ", ")))
            return CreateDC (pis.szDriver, pis.szDevice, pis.szOutput, (CONST DEVMODE *)lpdmDevMode);
    }
    return NULL;
}

// ***********************************************************
// PrintAbortProc
// Purpose:
//     Function is used to give application some "multi-tasking"
//     through the use of a PeekMessage().  Also, it gives the
//     application some error control during printing.
//
// Parameters:
//     HDC hDC
//     short code
//
// Return: (BOOL FAR PASCAL)
// ***********************************************************
BOOL FAR PASCAL PrintAbortProc (HDC hDC, short code)
{
    MSG msg;

while (!pis.bAbort && PeekMessage((LPMSG)&msg, 0, 0, 0, PM_REMOVE)) {
        if (!IsDialogMessage(pis.hDlgAbort, &msg)) {
            TranslateMessage(&msg);
            DispatchMessage(&msg);
        }
    }
    return (!pis.bAbort);
} // * PrintAbortProc // *********************************************************
// PrintAbortDlg
// Purpose:
//     Dialog procedure for print abort dialog.
//
// Parameters:
//     HWND hWnd
//     unsigned msg
//     WORD wParam
//     LONG lParam
//
// Return: (int FAR PASCAL)
// ***********************************************************
int FAR PASCAL PrintAbortDlg (HWND hWnd, unsigned msg, WORD wParam, LONG lParam)
{
//  char szMsgBuffer[64];

switch (msg) {
        case WM_INITDIALOG:
            SetFocus(hWnd);
            EnableMenuItem(GetSystemMenu(hWnd, FALSE), SC_CLOSE, MF_GRAYED);

// set printing info to abort dialog
//          SetDlgItemText(hWnd, 100, "Now printing Page 1 of");

//          wsprintf((LPSTR)szMsgBuffer, "'%.25s' on the", (LPSTR)"PRNCDLG");
//          SetDlgItemText(hWnd, 101, (LPSTR)szMsgBuffer);

return TRUE;

case WM_COMMAND:
            pis.bAbort = TRUE;
            return TRUE;
    } return FALSE;
} // PrintAbortDlg()
```

XL1 CORPORATION - CONFIDENTIAL
RESOURCE.H                                                                                              PAGE 1
------------------------------------------------------------------------------------------------------------

```
//{{NO_DEPENDENCIES}}
// Microsoft Visual C++ generated include file.
// Used by color.rc
//
#define GRID_EDGES                      40001
#define IDM_HIGHLITE                    40003
#define IDM_WRITE_TIFF                  40004

// Next default values for new objects
//
#ifdef APSTUDIO_INVOKED
#ifndef APSTUDIO_READONLY_SYMBOLS
#define _APS_NEXT_RESOURCE_VALUE        101
#define _APS_NEXT_COMMAND_VALUE         40005
#define _APS_NEXT_CONTROL_VALUE         1000
#define _APS_NEXT_SYMED_VALUE           101
#endif
#endif
```

XLI CORPORATION - CONFIDENTIAL
VECTOR.C                                                                                                          PAGE 1
------------------------------------------------------------------------------------------------------------------------

```c
// This code deals with the table loading for the algorithm.

#include <windows.h>
#include <string.h>
#include "color.h"
#define POINTDEFINE 1
#include "vector.h"

// This takes two source points for each case and fills in the point table with
// output device point values for polygons for each of the 8 versions of a case.
// The 8 versions are based on horizontal symetry, vertical symetry and color.
// 8 versions of 256 cases means 2048 entries. This gets used during the output
// routine since then all we have to do is look-up into this table to get the
// points and point count for a polygon to be drawn into the device context.
// The Scale parameter tells us how to scale the points for this output device.

// A NOTE about the result point sets which describe polygons: the
// source points are based on a coordinate system with the origin at the center
// of the cell and the edges at unit 1, but the output uses the upper left as
// the origin and the cell is unit Scale is size and down is positive X!

// This version is modified for the color enhancement version. The 1-bit version
// did not have to deal with outputting colors on both sides of the line and this
// one does. So the results of this function must still be processed based on
// the type case hit. Also the number of output values has been reduced and increased
// since the color of the value is meaningless, but we had to add the polygon for
// both the left and right sides.
void PNT (int, int, int, float, float, float, float, float, float, float, float, float, float, float, float);
LPPOINTTABLE pt2;
float Scale2;

void LoadVectors (LPPOINTTABLE pt, float Scale)
{
    int i;
    float x1, x2, y1, y2;
    float M, B;

pt2 = pt;
    Scale2 = Scale;

for (i = 0; i < 256; i++) {
        x1 = Point[i][0];
        y1 = Point[i][1];
        x2 = Point[i][2];
        y2 = Point[i][3];
        if ((x1 == 0) && (y1 == 0) && (x2 == 0) && (y2 == 0)) {   // If no-hit
            pt[i].Count = 0;
            pt[i + 0x100].Count = 0;
            pt[i + 0x200].Count = 0;
            pt[i + 0x300].Count = 0;
            pt[i + 0x400].Count = 0;
            pt[i + 0x500].Count = 0;
            pt[i + 0x600].Count = 0;
            pt[i + 0x700].Count = 0;
            }
        else {
            // Convert units and origin.
            x1 = (x1 + 1) / 2;
            y1 = (y1 + 1) / 2;
            x2 = (x2 + 1) / 2;
            y2 = (y2 + 1) / 2;

// Calculate slope.
            if ((x1 - x2) == 0) {
                // Vertical line.
                PNT(i, 0, 4, 0.0F, 0.0F, x1, 0.0F, x1, 1.0F, 0.0F, 1.0F, 0.0F, 0.0F, 0.0F, 0.0F);   // Normal version
                PNT(i, 4, 4, 1.0F, 0.0F, x1, 0.0F, x1, 1.0F, 1.0F, 1.0F, 0.0F, 0.0F, 0.0F, 0.0F);   // Normal version
                }
            else {   // Finite slope!
                M = (y1 - y2) / (x1 - x2);
                B = y1 - (M * x1);           // Calculate intercept.
                if (B == 0) {   // If line goes through 0,0
                    if (M == 1) {   // 45 degree line.
                                PNT(i, 0, 3, 1.0F, 0.0F, 0.0F, 1.0F, 0.0F, 0.0F, 0.0F, 0.0F, 0.0F, 0.0F, 0.0F, 0.0F);
                    // Normal version
                                PNT(i, 4, 3, 1.0F, 0.0F, 0.0F, 1.0F, 1.0F, 1.0F, 0.0F, 0.0F, 0.0F, 0.0F, 0.0F, 0.0F);
                    // Normal version
                        } else if (M > 1) { // Greater than 45 degrees.
                        // Edge starts at lower left corner and goes through top of cell.
                                PNT(i, 0, 3, 0.0F, 1.0F, 1 / M, 0.0F, 0.0F, 0.0F, 0.0F, 0.0F, 0.0F, 0.0F, 0.0F, 0.0F);
                    // Normal version
                                PNT(i, 4, 4, 0.0F, 1.0F, 1 / M, 0.0F, 1.0F, 0.0F, 1.0F, 1.0F, 0.0F, 0.0F, 0.0F, 0.0F);
                    // Normal version
```

XLI CORPORATION - CONFIDENTIAL
VECTOR.C　　　　　　　　　　　　　　　　　　　　　　　　　　　　　　　　　　　　　PAGE 2

```
            }
        else {   // Less than 45 degrees.
            // Edge starts at lower left corner and goes through right edge of cell.
                    PNT(i, 0, 4, 0.0F, 0.0F, 0.0F, 1.0F, 1.0F, 1 - M, 1.0F, 0.0F, 0.0F, 0.0F, 0.0F, 0.0F);
// Normal version
                    PNT(i, 4, 3, 0.0F, 1.0F, 1.0F, 1 - M, 1.0F, 1.0F, 1.0F, 0.0F, 0.0F, 0.0F, 0.0F, 0.0F);
// Normal version
            }
        }
        else if (B == 1) {   // If line goes through 0,1 (top-left corner)
            if (M == -1) {   // 45 degree line. Goes through bottom-left corner
                    PNT(i, 0, 3, 0.0F, 0.0F, 0.0F, 1.0F, 1.0F, 1.0F, 0.0F, 0.0F, 0.0F, 0.0F, 0.0F, 0.0F);
// Normal version
                    PNT(i, 4, 3, 1.0F, 1.0F, 0.0F, 1.0F, 1.0F, 1.0F, 0.0F, 0.0F, 0.0F, 0.0F, 0.0F, 0.0F);
// Normal version
            }
            else if (M < -1) {   // Greater than -45 degrees. Goes through bottom.
                    PNT(i, 0, 3, 0.0F, 0.0F, 0.0F, 1.0F, -1 / M, 1.0F, 1.0F, 0.0F, 0.0F, 0.0F, 0.0F, 0.0F);
// Normal version
                    PNT(i, 4, 4, 0.0F, 0.0F, -1 / M, 1.0F, 1.0F, 1.0F, 1.0F, 0.0F, 0.0F, 0.0F, 0.0F, 0.0F);
// Normal version
            }
            else {   // Less than 45 degrees. Goes through right edge.
                    PNT(i, 0, 4, 0.0F, 0.0F, 0.0F, 1.0F, 1.0F, 1.0F, 1.0F, -1 * M, 0.0F, 0.0F, 0.0F, 0.0F);
// Normal version
                    PNT(i, 4, 3, 0.0F, 0.0F, 1.0F, -1 * M, 1.0F, 0.0F, 0.0F, 0.0F, 0.0F, 0.0F, 0.0F, 0.0F);
// Normal version
            }
        }
// Needs work.
        else if ((B > 0) && (B < 1)) {       // If line goes through left edge of cell...
            // Set X to 1 and determine Y.
            if ((M + B) == 0) {   // If bottom/right corner...
                    PNT(i, 0, 3, 0.0F, 1 - B, 0.0F, 1.0F, 1.0F, 1.0F, 0.0F, 0.0F, 0.0F, 0.0F, 0.0F, 0.0F);
// Normal version
                    PNT(i, 4, 4, 0.0F, 1 - B, 0.0F, 0.0F, 1.0F, 0.0F, 0.0F, 1.0F, 0.0F, 0.0F, 0.0F, 0.0F);
// Normal version
            }
            else if ((M + B) == 1) {   // If top/right corner...
                    PNT(i, 0, 3, 0.0F, 0.0F, 0.0F, 1 - B, 1.0F, 0.0F, 0.0F, 0.0F, 0.0F, 0.0F, 0.0F, 0.0F);
// Normal version
                    PNT(i, 4, 4, 0.0F, 1.0F, 0.0F, 1 - B, 1.0F, 0.0F, 1.0F, 1.0F, 0.0F, 0.0F, 0.0F, 0.0F);
// Normal version
            }
            else if (((M + B) > 0) && ((M + B) < 1)) {       // If intersection with right edge...
                    PNT(i, 0, 4, 0.0F, 0.0F, 0.0F, 1 - B, 1.0F, 1 - (M + B), 1.0F, 0.0F, 0.0F, 0.0F, 0.0F,
0.0F);   // Normal version
                    PNT(i, 4, 4, 0.0F, 1.0F, 0.0F, 1 - B, 1.0F, 1 - (M + B), 1.0F, 1.0F, 0.0F, 0.0F, 0.0F,
0.0F);   // Normal version
            }
            else if ((M + B) < 0) {   // If intersection with bottom edge...
                    PNT(i, 0, 3, 0.0F, 1 - B, 0.0F, 1.0F, (-1 * B) / M, 1.0F, 0.0F, 0.0F, 0.0F, 0.0F, 0.0F,
0.0F);   // Normal version
                    PNT(i, 4, 5, 0.0F, 1 - B, (-1 * B) / M, 1.0F, 1.0F, 1.0F, 1.0F, 0.0F, 0.0F, 0.0F, 0.0F,
0.0F);   // Normal version
            }
            else if ((M + B) > 1) {   // If intersection with top edge...
                    PNT(i, 0, 3, 0.0F, 0.0F, 0.0F, 1 - B, (1 - B) / M, 0.0F, 0.0F, 0.0F, 0.0F, 0.0F, 0.0F,
0.0F);   // Normal version
                    PNT(i, 4, 5, 0.0F, 1 - B, (1 - B) / M, 0.0F, 1.0F, 0.0F, 1.0F, 1.0F, 0.0F, 1.0F, 0.0F,
0.0F);   // Normal version
            }
            else {   // Error
                pt[i].Count = 0;
                pt[i + 0x100].Count = 0;
                pt[i + 0x200].Count = 0;
                pt[i + 0x300].Count = 0;
                pt[i + 0x400].Count = 0;
                pt[i + 0x500].Count = 0;
                pt[i + 0x600].Count = 0;
                pt[i + 0x700].Count = 0;
            }
        }
        else if (B < 0) {   // If line goes through bottom edge of cell...
            // Set X to 1 and determine Y.
            if ((M + B) == 1) {   // If top/right corner...
                    PNT(i, 0, 4, 0.0F, 0.0F, 0.0F, 1.0F, (-1 * B) / M, 1.0F, 1.0F, 0.0F, 0.0F, 0.0F, 0.0F,
0.0F);   // Normal version
                    PNT(i, 4, 3, (-1 * B) / M, 1.0F, 1.0F, 0.0F, 1.0F, 1.0F, 0.0F, 0.0F, 0.0F, 0.0F, 0.0F,
0.0F);   // Normal version
            }
            else if (((M + B) > 0) && ((M + B) < 1)) {       // If intersection with right edge...
```

XLI CORPORATION - CONFIDENTIAL
VECTOR.C                                                                                                     PAGE 3

```
                              PNT(i, 0, 5, 0.0F, 0.0F, 0.0F, 1.0F, (-1 * B) / M, 1.0F, 1.0F, 1 - (M + B), 1.0F, 0.0F,
0.0F, 0.0F);      // Normal version
                              PNT(i, 4, 3, (-1 * B) / M, 1.0F, 1.0F, 1 - (M + B), 1.0F, 1.0F, 0.0F, 0.0F, 0.0F, 0.0F,
0.0F, 0.0F);      // Normal version
                         }
                         else if ((M + B) >= 1) { // If intersection with top edge...
                              PNT(i, 0, 4, 0.0F, 0.0F, 0.0F, 1.0F, (-1 * B) / M, 1.0F, (1 - B) / M, 0.0F, 0.0F, 0.0F,
0.0F, 0.0F);      // Normal version
                              PNT(i, 4, 4, 1.0F, 0.0F, 1.0F, 1.0F, (-1 * B) / M, 1.0F, (1 - B) / M, 0.0F, 0.0F, 0.0F,
0.0F, 0.0F);      // Normal version
                         }
                         else {    // Error
                              pt[i].Count = 0;
                              pt[i + 0x100].Count = 0;
                              pt[i + 0x200].Count = 0;
                              pt[i + 0x300].Count = 0;
                              pt[i + 0x400].Count = 0;
                              pt[i + 0x500].Count = 0;
                              pt[i + 0x600].Count = 0;
                              pt[i + 0x700].Count = 0;
                         }
                    }
                    else if (B > 1) { // If line goes through top edge of cell...
                         // Set X to 1 and determine Y.
                         if ((M + B) == 0) {  // If bottom/left corner...
                              PNT(i, 0, 4, (1 - B) / M, 0.0F, 0.0F, 0.0F, 0.0F, 1.0F, 1.0F, 1.0F, 0.0F, 0.0F, 0.0F,
0.0F);      // Normal version
                              PNT(i, 4, 3, (1 - B) / M, 0.0F, 1.0F, 0.0F, 1.0F, 1.0F, 0.0F, 0.0F, 0.0F, 0.0F, 0.0F,
0.0F);      // Normal version
                         }
                         else if (((M + B) > 0) && ((M + B) < 1)) { // If intersection with right edge...
                              PNT(i, 0, 5, 0.0F, 0.0F, 0.0F, 1.0F, 1.0F, 1.0F, 1.0F, 1 - (M + B), (1 - B) / M, 0.0F,
0.0F, 0.0F);      // Normal version
                              PNT(i, 4, 3, 1.0F, 1 - (M + B), (1 - B) / M, 0.0F, 1.0F, 0.0F, 0.0F, 0.0F, 0.0F, 0.0F,
0.0F, 0.0F);      // Normal version
                         }
                         else if ((M + B) < 0) { // If intersection with bottom edge...
                              PNT(i, 0, 4, 0.0F, 0.0F, 0.0F, 1.0F, (-1 * B) / M, 1.0F, (1 - B) / M, 0.0F, 0.0F, 0.0F,
0.0F, 0.0F);      // Normal version
                              PNT(i, 4, 4, 1.0F, 0.0F, 1.0F, 1.0F, (-1 * B) / M, 1.0F, (1 - B) / M, 0.0F, 0.0F, 0.0F,
0.0F, 0.0F);      // Normal version
                         }
                         else {    // Error
                              pt[i].Count = 0;
                              pt[i + 0x100].Count = 0;
                              pt[i + 0x200].Count = 0;
                              pt[i + 0x300].Count = 0;
                              pt[i + 0x400].Count = 0;
                              pt[i + 0x500].Count = 0;
                              pt[i + 0x600].Count = 0;
                              pt[i + 0x700].Count = 0;
                         }
                    }
                    else {    // Error - set to no-hit
                         pt[i].Count = 0;
                         pt[i + 0x100].Count = 0;
                         pt[i + 0x200].Count = 0;
                         pt[i + 0x300].Count = 0;
                         pt[i + 0x400].Count = 0;
                         pt[i + 0x500].Count = 0;
                         pt[i + 0x600].Count = 0;
                         pt[i + 0x700].Count = 0;
                    }
               }
          }
     }
}

// This automatically adds the vertical and horizontal symetry.
#define SC(x) (int)(Scale2 * (x))     // Force scaling without typing it every time.
// PNT will load all the values in a specific structure with minimal typing.
void PNT (int i, int m, int n, float x0, float y0, float x1, float y1, float x2, float y2, float x3, float y3, float x4,
float y4, float x5, float y5)
{
     pt2[i + (m << 8)].Count = n;
     pt2[i + (m << 8)].p[0].x = SC(x0);
     pt2[i + (m << 8)].p[0].y = SC(y0);
     pt2[i + (m << 8)].p[1].x = SC(x1);
     pt2[i + (m << 8)].p[1].y = SC(y1);
     pt2[i + (m << 8)].p[2].x = SC(x2);
     pt2[i + (m << 8)].p[2].y = SC(y2);
     pt2[i + (m << 8)].p[3].x = SC(x3);
     pt2[i + (m << 8)].p[3].y = SC(y3);
     pt2[i + (m << 8)].p[4].x = SC(x4);
```

XLI CORPORATION - CONFIDENTIAL
VECTOR.C                                                                                    PAGE 4

```
    pt2[i + (m << 8)].p[4].y = SC(y4);
    pt2[i + (m << 8)].p[5].x = SC(x5);
    pt2[i + (m << 8)].p[5].y = SC(y5);

pt2[i + ((m + 1) << 8)].Count = n;
    pt2[i + ((m + 1) << 8)].p[0].x = SC(1 - (x0));
    pt2[i + ((m + 1) << 8)].p[0].y = SC(y0);
    pt2[i + ((m + 1) << 8)].p[1].x = SC(1 - (x1));
    pt2[i + ((m + 1) << 8)].p[1].y = SC(y1);
    pt2[i + ((m + 1) << 8)].p[2].x = SC(1 - (x2));
    pt2[i + ((m + 1) << 8)].p[2].y = SC(y2);
    pt2[i + ((m + 1) << 8)].p[3].x = SC(1 - (x3));
    pt2[i + ((m + 1) << 8)].p[3].y = SC(y3);
    pt2[i + ((m + 1) << 8)].p[4].x = SC(1 - (x4));
    pt2[i + ((m + 1) << 8)].p[4].y = SC(y4);
    pt2[i + ((m + 1) << 8)].p[5].x = SC(1 - (x5));
    pt2[i + ((m + 1) << 8)].p[5].y = SC(y5);

pt2[i + ((m + 2) << 8)].Count = n;
    pt2[i + ((m + 2) << 8)].p[0].x = SC(x0);
    pt2[i + ((m + 2) << 8)].p[0].y = SC(1 - (y0));
    pt2[i + ((m + 2) << 8)].p[1].x = SC(x1);
    pt2[i + ((m + 2) << 8)].p[1].y = SC(1 - (y1));
    pt2[i + ((m + 2) << 8)].p[2].x = SC(x2);
    pt2[i + ((m + 2) << 8)].p[2].y = SC(1 - (y2));
    pt2[i + ((m + 2) << 8)].p[3].x = SC(x3);
    pt2[i + ((m + 2) << 8)].p[3].y = SC(1 - (y3));
    pt2[i + ((m + 2) << 8)].p[4].x = SC(x4);
    pt2[i + ((m + 2) << 8)].p[4].y = SC(1 - (y4));
    pt2[i + ((m + 2) << 8)].p[5].x = SC(x5);
        pt2[i + ((m + 2) << 8)].p[5].y = SC(1 - (y5));

pt2[i + ((m + 3) << 8)].Count = n;
    pt2[i + ((m + 3) << 8)].p[0].x = SC(1 - (x0));
    pt2[i + ((m + 3) << 8)].p[0].y = SC(1 - (y0));
    pt2[i + ((m + 3) << 8)].p[1].x = SC(1 - (x1));
    pt2[i + ((m + 3) << 8)].p[1].y = SC(1 - (y1));
    pt2[i + ((m + 3) << 8)].p[2].x = SC(1 - (x2));
    pt2[i + ((m + 3) << 8)].p[2].y = SC(1 - (y2));
    pt2[i + ((m + 3) << 8)].p[3].x = SC(1 - (x3));
    pt2[i + ((m + 3) << 8)].p[3].y = SC(1 - (y3));
    pt2[i + ((m + 3) << 8)].p[4].x = SC(1 - (x4));
    pt2[i + ((m + 3) << 8)].p[4].y = SC(1 - (y4));
    pt2[i + ((m + 3) << 8)].p[5].x = SC(1 - (x5));
        pt2[i + ((m + 3) << 8)].p[5].y = SC(1 - (y5));
}
```

XLI CORPORATION - CONFIDENTIAL
VECTOR.H                                                                                                              PAGE 1
------------------------------------------------------------------------------------------------------------------------

```c
#if 0
typedef struct {
BYTE m;    // a value which is either x or y based on the cell boundaries that the line intersects.
BYTE n;    // ditto
BYTE t;    // Type of case:
        //      0 - edge intersects bottom and top of cell.
        //      1 - edge intersects left and top of cell.
        //      2 - edge intersects left and right of cell.
        //      3 - edge intersects left and bottom of cell.
        //      4 - edge intersects bottom and right of cell.

//      5 - edge intersects bottom/left corner and top of cell.
        //      6 - edge intersects bottom/left corner and right of cell.
        //      7 - edge intersects top/left corner and bottom of cell.
        //      8 - edge intersects top/left corner and right of cell.
        //      9 - edge intersects left and bottom/right corner of cell.
        //     10 - edge intersects top and bottom/right corner of cell.
        //     11 - edge intersects left and top/right corner of cell.
        //     12 - edge intersects bottom and top/right corner of cell.

//     13 - edge intersects bottom/left and top/right corner of cell.
        //     14 - edge intersects bottom/right and top/left corner of cell.
char c;    // Count of points used to define the edge. 0, 1, 2 or 3.
        //     -1 for no-hit case.
        //      0 for cases which intersect two corners.
        //      1 for cases which intersect a corner and have no mid-point.
} CPOINT;

extern CPOINT CasePt[256];   // For each case.
endif typedef struct {
POINT p[6];
int Count;
} POINTTABLE, FAR *LPPOINTTABLE;

// CHECK FOR ALL COMMAS: ERRORS WILL RIPPLE !!!!

// Numerous small changes made in values 11/12/95 ALC.  More shifted cases.

void LoadVectors (LPPOINTTABLE, float);
extern float Point[256][6];

ifdef POINTDEFINE float Point[256][6] = {         // Consists of (x1,y1) and (x2,y2)
/*  0= */   0.0F,0.0F,        0.0F,0.0F,       1000.0F,0.0F,
/*  1= */  -1.0F,1.0F,        0.0F,-1.0F,      0.0F,0.0F,        // *curve recommended
/*  2= */  -1.0F,1.0F,       -1.0F,-1.0F,     -0.5F,0.0F,        // *curve recommended      modified 11/20
/*  3= */  -1.0F,1.0F,        0.0F,-1.0F,      0.0F,0.80F,       // off edge, 45A shifted case
///*  3= */ -8.0F,11.0F,      2.0F,-1.0F,      1.0F,1.0F,        // off edge, 45A shifted case
/*  4= */  -0.34F,1.0F,       0.0F,-1.0F,      1000.0F,0.0F,
/*  5= */  -0.34F,1.0F,      -0.34F,-1.0F,     1000.0F,0.0F,
/*  6= */  -1.0F,1.0F,        0.0F,-1.0F,      1000.0F,0.0F,
/*  7= */  -1.0F,3.0F,        1.0F,-3.0F,      1000.0F,0.0F,
/*  8= */  -0.20F,1.0F,       0.0F,-1.0F,      1000.0F,0.0F,
/*  9= */  -0.20F,1.0F,      -0.20F,-1.0F,     1000.0F,0.0F,
/* 10= */  -1.0F,1.0F,        0.0F,-2.0F,      1000.0F,0.0F,
/* 11= */  -1.0F,3.0F,        0.0F,-1.0F,      1000.0F,0.0F,
/* 12= */  -1.0F,5.0F,        1.0F,-5.0F,      1000.0F,0.0F,
/* 13= */  -0.14F,1.0F,       0.0F,-1.0F,      1000.0F,0.0F,     // blue features off edge
/* 14= */  -0.14F,1.0F,      -0.14F,-1.0F,     1000.0F,0.0F,     // blue features off edge
/* 15= */  -1.0F,1.0F,        0.0F,-3.0F,      1000.0F,0.0F,
/* 16= */  -0.75F,1.0F,      -0.2F,-1.0F,      1000.0F,0.0F,     // adjusted to join #21, #12 exactly
/* 17= */  -1.0F,5.0F,        0.0F,-1.0F,      1000.0F,0.0F,
/* 18= */  -1.0F,7.0F,        1.0F,-7.0F,      1000.0F,0.0F,     // blue features off edge
/* 19= */  -4.0F,7.0F,        2.0F,-1.0F,      1000.0F,0.0F,     // 45A shifted
/* 20= */   0.0F,0.0F,        0.0F,0.0F,       1000.0F,0.0F,
/* 21= */  -1.0F,1.0F,        0.0F,-7.0F,      1000.0F,0.0F,     // off edge
/* 22= */  -1.0F,3.0F,        0.0F,-5.0F,      1000.0F,0.0F,     // off edge
/* 23= */  -1.0F,5.0F,        0.0F,-3.0F,      1000.0F,0.0F,     // off edge
/* 24= */  -1.0F,7.0F,        0.0F,-1.0F,      1000.0F,0.0F,     // off edge, blue features off edge
/* 25= */   0.0F,0.0F,        0.0F,0.0F,       1000.0F,0.0F,
/* 26= */   0.0F,0.0F,        0.0F,0.0F,       1000.0F,0.0F,
/* 27= */   0.0F,0.0F,        0.0F,0.0F,       1000.0F,0.0F,
/* 28= */   0.0F,0.0F,        0.0F,0.0F,       1000.0F,0.0F,
/* 29= */   0.0F,1.0F,        2.0F,-1.0F,      1000.0F,0.0F,     // 45A shifted (97)    fixed 11/10/95
/* 30= */  -1.0F,0.5F,        1.0F,0.5F,       1000.0F,0.0F,
/* 31= */  -2.0F,0.0F,        0.0F,1.0F,       1000.0F,0.0F,
/* 32= */  -1.0F,0.75F,       1.0F,0.75F,      1000.0F,0.0F,
/* 33= */  -2.0F,0.0F,        1.0F,1.0F,       1000.0F,0.0F,
/* 34= */  -4.0F,0.0F,        0.0F,1.0F,       1000.0F,0.0F,
/* 35= */  -1.0F,0.83F,       1.0F,0.83F,      1000.0F,0.0F,
/* 36= */  -2.0F,0.0F,        2.0F,1.0F,       1000.0F,0.0F,
/* 37= */  -4.0F,0.0F,        1.0F,1.0F,       1000.0F,0.0F,
```

XLI CORPORATION - CONFIDENTIAL
VECTOR.H                                                                                             PAGE 2

```
/*  38= */  -6.0F,0.0F,     0.0F,1.0F,      1000.0F,0.0F,
/*  39= */  -1.0F,0.87F,    1.0F,0.87F,     1000.0F,0.0F,
/*  40= */  -2.0F,0.0F,     3.0F,1.0F,      1000.0F,0.0F,
/*  41= */  -4.0F,0.0F,     2.0F,1.0F,      1000.0F,0.0F,
/*  42= */  -6.0F,0.0F,     1.0F,1.0F,      1000.0F,0.0F,
/*  43= */  -8.0F,0.0F,     0.0F,1.0F,      1000.0F,0.0F,    // blue features off edge   corrected
/*  44= */   0.0F,0.0F,     0.0F,0.0F,      1000.0F,0.0F,
/*  45= */  -2.0F,0.0F,     7.0F,1.0F,      1000.0F,0.0F,    // off edge
/*  46= */  -4.0F,0.0F,     5.0F,1.0F,      1000.0F,0.0F,    // off edge
/*  47= */  -6.0F,0.0F,     3.0F,1.0F,      1000.0F,0.0F,    // off edge
/*  48= */  -8.0F,0.0F,     1.0F,1.0F,      1000.0F,0.0F,    // off edge, blue features off edge
/*  49= */   0.0F,0.0F,     0.0F,0.0F,      1000.0F,0.0F,
/*  50= */   0.0F,0.0F,     0.0F,0.0F,      1000.0F,0.0F,
/*  51= */   0.0F,0.0F,     0.0F,0.0F,      1000.0F,0.0F,
/*  52= */   0.0F,0.0F,     0.0F,0.0F,      1000.0F,0.0F,
/*  53= */   0.0F,0.0F,     0.0F,0.0F,      1000.0F,0.0F,
/*  54= */   0.0F,0.0F,     0.0F,0.0F,      1000.0F,0.0F,
/*  55= */  +1.0F,0.20F,    1.50F,-1.0F,    1000.0F,0.0F,    // off edge (extrapolate) 45A shifted case
/*  56= */  -1.0F,-1.0F,    1.0F,1.0F,      1000.0F,0.0F,
/*  57= */   0.0F,-1.0F,    1.0F,0.50F,     1000.0F,0.0F,    // 5/26/96: new S column 0 case
/*  58= */  -1.0F,-1.0F,    1.0F,0.50F,     1000.0F,0.0F,
/*  59= */  -1.0F,-0.50F,   1.0F,0.50F,     1000.0F,0.0F,
/*  60= */   0.0F,-1.0F,    1.0F,0.33F,     1000.0F,0.0F,    // 5/26/96: new S column 0 case
/*  61= */  -1.0F,-1.0F,    1.0F,0.33F,     1000.0F,0.0F,
/*  62= */  -1.0F,-0.50F,   1.0F,0.33F,     1000.0F,0.0F,
/*  63= */  -1.0F,-0.33F,   1.0F,0.33F,     1000.0F,0.0F,
/*  64= */   0.0F,-1.0F,    1.0F,0.25F,     1000.0F,0.0F,    // 5/26/96: new S column 0 case
/*  65= */  -1.0F,-1.0F,    1.0F,0.25F,     1000.0F,0.0F,
/*  66= */  -1.0F,-0.50F,   1.0F,0.25F,     1000.0F,0.0F,
/*  67= */  -1.0F,-0.33F,   1.0F,0.25F,     1000.0F,0.0F,
/*  68= */  -1.0F,-0.25F,   1.0F,0.25F,     1000.0F,0.0F,
/*  69= */   0.0F,-1.0F,    1.0F,0.11F,     1000.0F,0.0F,    // 5/26/96: new S column 0 case
/*  70= */  -1.0F,-1.0F,    1.0F,0.11F,     1000.0F,0.0F,    // off edge
/*  71= */  -1.0F,-0.50F,   1.0F,0.11F,     1000.0F,0.0F,    // off edge
/*  72= */  -1.0F,-0.33F,   1.0F,0.11F,     1000.0F,0.0F,    // off edge
/*  73= */  -1.0F,-0.25F,   1.0F,0.11F,     1000.0F,0.0F,    // off edge
/*  74= */  -9.0F,-1.0F,    9.0F,1.0F,      1000.0F,0.0F,      // off edge, off edge
/*  75= */  +1.0F,0.33F,    1.67F,-1.0F,    1000.0F,0.0F,    // (extrapolate)
/*  76= */   0.0F,0.0F,     0.0F,0.0F,      1000.0F,0.0F,
/*  77= */  +1.0F,0.20F,    1.67F,-1.0F,    1000.0F,0.0F,    // off edge (extrapolate)
/*  78= */  +1.0F,0.50F,    1.50F,-1.0F,    1000.0F,0.0F,    // (extrapolate)
/*  79= */  +1.0F,0.33F,    1.50F,-1.0F,    1000.0F,0.0F,    // (extrapolate)
/*  80= */  -4.0F,5.0F,     0.0F,-1.0F,     1000.0F,0.0F,
/*  81= */  -6.0F,7.0F,     0.0F,-1.0F,     1000.0F,0.0F,
/*  82= */  -2.0F,5.0F,     2.0F,-1.0F,     1000.0F,0.0F,    // RIGHT shift of case 80,84,88,92
/*  83= */  -14.0F,15.0F,   0.0F,-1.0F,     1000.0F,0.0F,    // off edge
/*  84= */  -1.0F,0.50F,    -0.33F,-1.0F,   1000.0F,0.0F,
/*  85= */  -1.0F,0.33F,    -0.33F,-1.0F,   1000.0F,0.0F,
/*  86= */  -4.0F,7.0F,     2.0F,-1.0F,     1000.0F,0.0F,    // RIGHT shift of case 81,85,89,93
/*  87= */  -1.0F,0.14F,    -0.33F,-1.0F,   1000.0F,0.0F,    // off edge
/*  88= */  -1.0F,0.50F,    -0.50F,-1.0F,   1000.0F,0.0F,
/*  89= */  -1.0F,0.33F,    -0.50F,-1.0F,   1000.0F,0.0F,
/*  90= */  -12.0F,15.0F,   2.0F,-1.0F,     1000.0F,0.0F,    // RIGHT shift of case 83,87,91,95
/*  91= */  -1.0F,0.14F,    -0.50F,-1.0F,   1000.0F,0.0F,    // off edge
/*  92= */  -1.0F,0.50F,    -0.75F,-1.0F,   1000.0F,0.0F,    // off edge   changed to fit c22. Was .60  11/10/95
/*  93= */  -1.0F,0.33F,    -0.75F,-1.0F,   1000.0F,0.0F,    // off edge   changed to fit c22. Was .60  11/10/95
/*  94= */   0.0F,0.0F,     0.0F,0.0F,      1000.0F,0.0F,
/*  95= */  -1.0F,0.14F,    -0.75F,-1.0F,   1000.0F,0.0F,    // off edge, off edge  changed to fit c22. Was .60  11/10/95
/*  96= */   0.0F,0.0F,     0.0F,0.0F,      1000.0F,0.0F,
/*  97= */  -2.0F,1.0F,     0.0F,-1.0F,     1000.0F,0.0F,
/*  98= */   0.0F,0.0F,     0.0F,0.0F,      1000.0F,0.0F,
///* 99= */  -1.0F,-1.0F,    1.0F,0.125F,    0.0F,0.125F,    // *curve recommended
/*  99= */  -1.0F,-1.0F,    1.0F,0.5F,      1000.0F,0.0F,    // *curve recommended
/* 100= */  -4.0F,3.0F,     2.0F,-1.0F,     1000.0F,0.0F,
/* 101= */  -6.0F,5.0F,     2.0F,-1.0F,     1000.0F,0.0F,
/* 102= */  -8.0F,7.0F,     2.0F,-1.0F,     1000.0F,0.0F,
/* 103= */  -16.0F,15.0F,   2.0F,-1.0F,     1000.0F,0.0F,    // off edge
/* 104= */  -4.0F,3.0F,     2.0F,-1.0F,     1000.0F,0.0F,
/* 105= */  -6.0F,5.0F,     2.0F,-1.0F,     1000.0F,0.0F,
/* 106= */  -8.0F,7.0F,     2.0F,-1.0F,     1000.0F,0.0F,
/* 107= */  -16.0F,15.0F,   2.0F,-1.0F,     1000.0F,0.0F,    // off edge
/* 108= */  -6.0F,3.0F,     0.0F,-1.0F,     1000.0F,0.0F,    // c100 shifted L
/* 109= */  -8.0F,5.0F,     0.0F,-1.0F,     1000.0F,0.0F,    // c101 shifted L  corrected
/* 110= */  -2.0F,-3.0F,    4.0F,5.0F,      1000.0F,0.0F,
/* 111= */  -4.0F,-3.0F,    6.0F,5.0F,      1000.0F,0.0F,
/* 112= */  -2.0F,-3.0F,    6.0F,7.0F,      1000.0F,0.0F,
/* 113= */  -4.0F,-3.0F,    8.0F,7.0F,      1000.0F,0.0F,
/* 114= */   0.0F,0.0F,     0.0F,0.0F,      1000.0F,0.0F,
/* 115= */   0.0F,0.0F,     0.0F,0.0F,      1000.0F,0.0F,
/* 116= */  -4.0F,-5.0F,    6.0F,7.0F,      1000.0F,0.0F,
/* 117= */  -6.0F,-5.0F,    8.0F,7.0F,      1000.0F,0.0F,
/* 118= */   0.0F,0.0F,     0.0F,0.0F,      1000.0F,0.0F,
/* 119= */   0.0F,0.0F,     0.0F,0.0F,      1000.0F,0.0F,
/* 120= */   0.0F,0.0F,     0.0F,0.0F,      1000.0F,0.0F,
/* 121= */   0.0F,0.0F,     0.0F,0.0F,      1000.0F,0.0F,
/* 122= */  -1.0F, 1.0F,    1.0F,1.0F,      1000.0F,0.0F,    // off edge, off edge
```

XLI CORPORATION - CONFIDENTIAL
VECTOR.H                                                                                                    PAGE 3

```
/* 123= */  -18.0F,15.0F,    0.0F,-1.0F,      1000.0F,0.0F,    // corrected                    c103 shifted L
/* 124= */  -10.0F,7.0F,     0.0F,-1.0F,      1000.0F,0.0F,    // off edge. corrected          c102 shifted L
/* 125= */  -0.67F,-1.0F,    1.0F,0.75F,      1000.0F,0.0F,
/* 126= */  -2.0F,-3.0F,     4.0F,5.0F,       1000.0F,0.0F,
/* 127= */   2.0F,-3.0F,     6.0F,7.0F,       1000.0F,0.0F,
/* 128= */  -1.0F,-0.60F,    0.80F,1.0F,      1000.0F,0.0F,
/* 129= */   0.80F,-1.0F,    1.0F,0.83F,      1000.0F,0.0F,
/* 130= */  -4.0F,-5.0F,     6.0F,7.0F,       1000.0F,0.0F,
/* 131= */  -4.0F,-3.0F,     8.0F,7.0F,       1000.0F,0.0F,
/* 132= */  -1.0F,-0.72F,    0.86F,1.0F,      1000.0F,0.0F,
/* 133= */  -0.86F,-1.0F,    1.0F,0.87F,      1000.0F,0.0F,
/* 134= */   2.0F,3.0F,     -2.0F,-3.0F,      1000.0F,0.0F,
/* 135= */   4.0F,3.0F,     -4.0F,-3.0F,      1000.0F,0.0F,
/* 136= */   4.0F,5.0F,     -4.0F,-5.0F,      1000.0F,0.0F,
/* 137= */   6.0F,5.0F,     -6.0F,-5.0F,      1000.0F,0.0F,
/* 138= */   6.0F,7.0F,     -6.0F,-7.0F,      1000.0F,0.0F,
/* 139= */   8.0F,7.0F,     -8.0F,-7.0F,      1000.0F,0.0F,
/* 140= */   0.0F,0.0F,      0.0F,0.0F,       1000.0F,0.0F,
/* 141= */   0.0F,0.0F,      0.0F,0.0F,       1000.0F,0.0F,
/* 142= */   0.0F,0.0F,      0.0F,0.0F,       1000.0F,0.0F,
/* 143= */   0.0F,0.0F,      0.0F,0.0F,       1000.0F,0.0F,
/* 144= */   0.0F,0.0F,      0.0F,0.0F,       1000.0F,0.0F,
/* 145= */   0.0F,0.0F,      0.0F,0.0F,       1000.0F,0.0F,
/* 146= */   0.0F,0.0F,      0.0F,0.0F,       1000.0F,0.0F,
/* 147= */   0.0F,0.0F,      0.0F,0.0F,       1000.0F,0.0F,
/* 148= */   0.0F,0.0F,      0.0F,0.0F,       1000.0F,0.0F,
/* 149= */   0.0F,0.0F,      0.0F,0.0F,       1000.0F,0.0F,
/* 150= */  -2.0F, 3.0F,     1.0F,1.0F,       1000.0F,0.0F,    // corrected   was 2,1
/* 151= */  -2.0F,-3.0F,     3.0F,3.0F,       1000.0F,0.0F,    // corrected        4,3
/* 152= */  -2.0F,-3.0F,     5.0F,5.0F,       1000.0F,0.0F,    // corrected. was 6,5,
/* 153= */  -2.0F,-3.0F,    12.0F,13.0F,      1000.0F,0.0F,    // corrected. was 8,7,
/* 154= */  -4.0F,-5.0F,     1.0F,1.0F,       1000.0F,0.0F,    // corrected
/* 155= */  -4.0F,-5.0F,     3.0F,3.0F,       1000.0F,0.0F,    // corrected. was 4,3,
/* 156= */  -4.0F,-5.0F,     5.0F,5.0F,       1000.0F,0.0F,    // corrected. was 6,5,
/* 157= */  -4.0F,-5.0F,    10.0F,11.0F,      1000.0F,0.0F,    // corrected. was 8,7,
/* 158= */  -6.0F,-7.0F,     1.0F,1.0F,       1000.0F,0.0F,    // corrected
/* 159= */  -6.0F,-7.0F,     3.0F,3.0F,       1000.0F,0.0F,    // corrected. was 4,3,
/* 160= */  -6.0F,-7.0F,     5.0F,5.0F,       1000.0F,0.0F,    // corrected. was 6,5,
/* 161= */  -6.0F, 7.0F,     8.0F,9.0F,       1000.0F,0.0F,    // corrected. was 8,7,
/* 162= */  -4.0F,-3.0F,     1.0F,1.0F,       1000.0F,0.0F,    // corrected
/* 163= */  -4.0F,-3.0F,     3.0F,3.0F,       1000.0F,0.0F,    // corrected. was 4,3,
/* 164= */  -4.0F,-3.0F,     5.0F,5.0F,       1000.0F,0.0F,    // corrected. was 6,5,
/* 165= */  -4.0F,-3.0F,    14.0F,13.0F,      1000.0F,0.0F,    // corrected. was 8,7,
/* 166= */  -6.0F,-5.0F,     1.0F,1.0F,       1000.0F,0.0F,    // corrected
/* 167= */  -6.0F,-5.0F,     3.0F,3.0F,       1000.0F,0.0F,    // corrected. was 4,3,
/* 168= */  -6.0F,-5.0F,     5.0F,5.0F,       1000.0F,0.0F,    // corrected. was 6,5,
/* 169= */  -6.0F,-5.0F,    12.0F,11.0F,      1000.0F,0.0F,    // corrected. was 8,7,
/* 170= */  -8.0F,-7.0F,     1.0F,1.0F,       1000.0F,0.0F,    // corrected
/* 171= */  -8.0F,-7.0F,     3.0F,3.0F,       1000.0F,0.0F,    // corrected. was 4,3,
/* 172= */  -8.0F,-7.0F,     5.0F,5.0F,       1000.0F,0.0F,    // corrected. was 6,5,
/* 173= */  -8.0F,-7.0F,    10.0F,9.0F,       1000.0F,0.0F,    // corrected. was 8,7,
/* 174= */   0.0F,0.0F,      0.0F,0.0F,       1000.0F,0.0F,
/* 175= */   0.0F,0.0F,      0.0F,0.0F,       1000.0F,0.0F,
/* 176= */  -4.0F,-3.0F,     1.0F,3.0F,       1000.0F,0.0F,    // LEFT shift of case  151
/* 177= */  -4.0F,-3.0F,     3.0F,5.0F,       1000.0F,0.0F,    // LEFT shift of case  152
/* 178= */  -4.0F,-3.0F,    10.0F,13.0F,      1000.0F,0.0F,    // LEFT shift of case  153
/* 179= */   0.0F,0.0F,      0.0F,0.0F,       1000.0F,0.0F,
/* 180= */  -6.0F,-5.0F,     1.0F,3.0F,       1000.0F,0.0F,    // LEFT shift of case  155
/* 181= */  -6.0F,-5.0F,     3.0F,5.0F,       1000.0F,0.0F,    // LEFT shift of case  156
/* 182= */  -6.0F,-5.0F,     8.0F,11.0F,      1000.0F,0.0F,    // LEFT shift of case  157
/* 183= */   0.0F,0.0F,      0.0F,0.0F,       1000.0F,0.0F,
/* 184= */  -8.0F,-7.0F,     1.0F,3.0F,       1000.0F,0.0F,    // LEFT shift of case  159
/* 185= */  -8.0F,-7.0F,     3.0F,5.0F,       1000.0F,0.0F,    // LEFT shift of case  160
/* 186= */   0.0F,0.0F,      0.0F,0.0F,       1000.0F,0.0F,
///* 186= */ -8.0F,-7.0F,    6.0F,9.0F,       1000.0F,0.0F,        // LEFT shift of case  161
/* 187= */  -2.0F,-3.0F,     3.0F,1.0F,       1000.0F,0.0F,    // RIGHT shift of case 162
/* 188= */  -2.0F,-3.0F,     5.0F,3.0F,       1000.0F,0.0F,    // RIGHT shift of case 163
/* 189= */  -2.0F,-3.0F,     7.0F,5.0F,       1000.0F,0.0F,    // RIGHT shift of case 164
/* 190= */  -2.0F,-3.0F,    16.0F,13.0F,      1000.0F,0.0F,    // RIGHT shift of case 165
/* 191= */  -4.0F,-5.0F,     3.0F,1.0F,       1000.0F,0.0F,    // RIGHT shift of case 166
/* 192= */  -4.0F,-5.0F,     5.0F,3.0F,       1000.0F,0.0F,    // RIGHT shift of case 167
/* 193= */  -4.0F,-5.0F,     7.0F,5.0F,       1000.0F,0.0F,    // RIGHT shift of case 168
/* 194= */  -4.0F,-5.0F,    14.0F,11.0F,      1000.0F,0.0F,    // RIGHT shift of case 169
/* 195= */  -6.0F,-7.0F,     3.0F,1.0F,       1000.0F,0.0F,    // RIGHT shift of case 170
/* 196= */  -6.0F,-7.0F,     5.0F,3.0F,       1000.0F,0.0F,    // RIGHT shift of case 171
/* 197= */  -6.0F,-7.0F,     7.0F,5.0F,       1000.0F,0.0F,    // RIGHT shift of case 172
/* 198= */  -6.0F,-7.0F,    12.0F,9.0F,       1000.0F,0.0F,    // RIGHT shift of case 173
/* 199= */   0.0F,0.0F,      0.0F,0.0F,       1000.0F,0.0F,
/* 200= */  -4.0F,-3.0F,     4.0F,7.0F,       1000.0F,0.0F,    // c112,127 L shifted
/* 201= */  -2.0F,-3.0F,     8.0F,5.0F,       1000.0F,0.0F,    // c111,128 R shifted
/* 202= */  -2.0F,-3.0F,    10.0F,7.0F,       1000.0F,0.0F,    // c113,131 R shifted
/* 203= */  -4.0F,-5.0F,    10.0F,7.0F,       1000.0F,0.0F,    // c117,132 R shifted
/* 204= */   4.0F,5.0F,     -8.0F,-5.0F,      1000.0F,0.0F,    // c129      L shifted 137
/* 205= */   6.0F,7.0F,    -10.0F,-7.0F,      1000.0F,0.0F,    // c133      L shifted 139
/* 206= */   2.0F,3.0F,     -6.0F,-3.0F,      1000.0F,0.0F,    // c125      L shifted 135
};
```

XLI CORPORATION - CONFIDENTIAL
VECTOR.H                                                                                            PAGE 4
---

```
#endif
```

XLI CORPORATION - CONFIDENTIAL
XLIHDFAX.H PAGE 1

```c
//#define OLD_CONVERT 1 define CASE_ALLOC  1       // Allocating one word per source bit plus margins (one line only)
define CASE_LOCK   2
#define TEMP_ALLOC  3       // Allocating space for 9 source lines plus margins
#define TEMP_LOCK   4
#define BITS_ALLOC  5  // Allocating 8k bytes times the vertical scale factor rounded up.
define BITS_LOCK   6 define WINDOW_HEIGHT 9 typedef struct {
DWORD SrcWidth;             // in pixels
DWORD SrcHeight;
PBYTE lpSrc;

DWORD DestWidth;
DWORD DestHeight;
PBYTE lpDest;

DWORD BandHeight;   // number of lines each band can hold.
DWORD RenderedLines;        // For DLL use, must be 0 for first band.
DWORD Color;        // 0 means that "0" is white and "1" is black.  Non 0 is opposite.
DWORD Error;        // 0 means no problem, otherwise check include file.
} XLI_HD_DLL_DATA, *LP_XLI_HD_DLL_DATA;

//void FillLineBits (int, float, PBYTE, int, PWORD, PWORD, int, int);
void AdamEnhance (PBYTE, PWORD, DWORD, DWORD);
void FillLRPixels (PDWORD, PWORD, DWORD, DWORD);
//void Render (PWORD, DWORD, DWORD, PBYTE, DWORD, DWORD);
void LoadBits (LPWORD, int, int);
void ConvertCase2LUT (int, PWORD);
void FillLine (DWORD, float, PBYTE, DWORD, PWORD, PWORD, DWORD, DWORD, DWORD, PBYTE, DWORD);
void ByteSwap (PDWORD, DWORD);
```

XLI CORPORATION - CONFIDENTIAL
XLITIFF.H                                                                                                              PAGE 1
--------------------------------------------------------------------------------

```
/* tiff.h
 *
 * made this version on 88-10-31
 * updated 90-05-22
 */

/* TIFF data types
 */
#define TIFFBYTE         1
#define TIFFASCII        2
#define TIFFSHORT        3
#define TIFFLONG         4
#define TIFFRATIONAL     5
#define TIFFSIGNED       6
#define TIFFFLOAT        32768/* manufactured type - not found in TIFF file */

/* TIFF tag constants
 */
#define TGNEWSUBFILETYPE              254
#define TGOLDSUBFILETYPE              255
#define TGIMAGEWIDTH                          256
#define TGIMAGELENGTH                         257
#define TGBITSPERSAMPLE                       258
define TGCOMPRESSION                         259 define TGPHOTOMETRICINTERPRETATION   262
define TGTHRESHHOLDING                       263
#define TGCELLWIDTH                           264
#define TGCELLLENGTH                          265
define TGFILLORDER                           266 define TGDOCUMENTNAME                        269
define TGIMAGEDESCRIPTION            270
#define TGMAKE                                                271
#define TGMODEL                                               272
#define TGSTRIPOFFSETS                        273
define TGORIENTATION                         274 define TGSAMPLESPERPIXEL             277
define TGROWSPERSTRIP                        278
#define TGSTRIPBYTECOUNTS             279
#define TGMINSAMPLEVALUE              280
#define TGMAXSAMPLEVALUE              281
#define TGXRESOLUTION                         282
#define TGYRESOLUTION                         283
#define TGPLANARCONFIGURATION         284
#define TGPAGENAME                            285
#define TGXPOSITION                           286
#define TGYPOSITION                           287
#define TGFREEOFFSETS                         288
#define TGFREEBYTECOUNTS              289
#define    TGGRAYUNIT                                 290
define    TGGRAYCURVE                                291 define TGRESOLUTIONUNIT              296        /* 87-12-11 */
define    TGPAGENUMBER                       297 define    TGCOLORRESPONSECURVES      301 define    TGSOFTWARE                                 305
define    TGDATETIME                                 306 define TGARTIST                                 315
define TGHOSTCOMPUTER                           316 define TGPREDICTOR                              317        /* 88-09-19 */
define    TGWHITEPOINT                          318
#define    TGPRIMARYCHROMATICITIES    319
define    TGCOLORMAP                                    320 define TGHIGHSHADOW                             321        /* 89-11-16 */
define TGTILEWIDTH              322
#define TGTILELENGTH             323
#define TGTILEOFFSETS            324
#define TGTILEBYTECOUNTS     325
#define TGKIDS                                330
```

I claim:

1. A computational method for converting a digitized source color image, containing at least three different colors contiguously disposed, into a second electronic color image of different effective spatial resolution, comprising:

forming a scanned sequence of examination windows into said digitized color image, said examination windows being at least three pixels high and at least three pixels wide;

defining a corresponding scanned sequence of elemental inferral areas smaller than, and substantially centered within, said examination windows;

computing, in response to the pixels within the examination windows, at least one inferred-edge piece within at least some of said elemental inferral areas by separately computing unoriented inferred-edge pieces and separately computing an orientation to be applied to said unoriented inferred-edge prices; and combining the said inferred-edge pieces within at least one said elemental inferral-area, with color data from the source color image, to produce one elemental unit of said second electronic color image.

2. The method of claim 1 where said second electronic color image comprises a standard array of binary coded pixels.

3. The method of claim 1 where said second electronic color image is formatted for displaying on a color printer.

4. The method of claim 1 where said second electronic color image is formatted for display on a color display device.

5. The method of claim 4 where said color display device comprises a cathode ray tube.

6. The method of claim 4 where said color display device is a multiresolution display operated in a higher resolution mode than the resolution of the said digitized color image.

7. The method of claim 1 where combining inferred-edge pieces includes storage means for storing one previous scan line of computed elemental-inferral.

8. The method of claim 1 where said different effective spatial resolution is a decreased resolution.

9. The method of claim 1 where said different effective spatial resolution is an increased resolution.

10. The method of claim 1 where said examination window is rectangular and has an even number of pixels in one dimension and an odd number of pixels in the other dimension.

11. The method of claim 1 where said examination window is rectangular and has an even number of pixels in both dimensions.

12. The method of claim 1 where said examination window has variable size.

13. The method of claim 1 where said examination window is elliptical.

14. The method of claim 1 where said elemental inferral area is equal in area and aspect ratio to the input pixels in said digitized color image.

15. The method of claim 1 where said elemental inferral area at least partially overlaps two adjacent input pixels in said digitized color image.

16. The method of claim 1 where said elemental inferral area at least partially overlaps four touching input pixels in said digitized color image.

17. The method of claim 1 where said step of computing said inferred-edge pieces computes either zero, one, or two said inferred-edge pieces within a given said elemental inferral area.

18. The method of claim 1 where the step of computing comprises selecting from among a predefined set of no more than 1000 predefined inferred-edge pieces.

19. The method of claim 18 where said selection is represented as a binary case number.

20. The method of claim 18 where said selection is represented as an active signal on one among a set of conductors, said set of conductors corresponding to said set of predefined inferred-edge pieces.

21. The method of claim 1 where four possible orientations constitute all possible combinations of vertical and horizontal mirror imaging of unoriented edge pieces.

22. The method of claim 1 where eight possible orientations constitute all possible combinations of vertical and horizontal mirror imaging and 90 degree rotation of the unoriented inferred-edge pieces.

23. The method of claim 1 further including computing an intermediary map of existing edges in said digitized color image and within said examination window.

24. The method of claim 23 where said intermediary map of existing edges designates an edge as present between two contiguous source pixels when said contiguous source pixels differ at all in color.

25. The method of claim 24 where said two contiguous source pixels includes pair of pixels diagonally disposed with respect to each other and touching only at a shared corner.

26. The method of claim 23 where said intermediary map of existing edges designates an edge as present between two contiguous source pixels when said contiguous source pixels differ in color by more than a given threshold.

27. The method of claim 26 where said difference in color between contiguous pixels is computed as approximately representative of their psychological color difference.

28. The method of claim 26 where said given threshold is dynamically optimized.

29. The method of claim 23 where at least one scan line of said intermediary map of existing edges is buffered in lieu of buffering at least one scan line of said digitized color image.

30. The method of claim 1 where computing inferred-edge pieces includes detecting near-45 degrees edges in said digitized color image.

31. The method of claim 1 where computing inferred-edge pieces includes detecting single-pixel-width features in said digitized color image.

32. The method of claim 31 where detection of single-pixel-width features includes preserving said feature-width in the inferred image.

33. The method of claim 1 where said computation of an inferred edge requires that the source pixels along at least one side of that edge all have substantially the same color.

34. The method of claim 1 including estimating which of two diagonally disposed features is continuous through a given node where said continuity is otherwise ambiguous.

35. The method of claim 1 where the computation further includes knowing that the detection criteria for a given unoriented inferred-edge piece are internally symmetric and means for suppressing the generation of any orientation which is rendered redundant by said symmetry.

36. The method of claim 1 where said computation of said inferred-edge pieces includes detecting of curved edges which are tangent to orientation axes.

37. The method of claim 1 where said computation of inferred-edge pieces computes inferred-edge pieces which approximately join end-to-end with the inferred-edge pieces in adjacent elemental inferral areas.

38. The method of claim 1 where said computation of said inferred-edge pieces includes detecting double-size jags characteristic of sharply curved edges tangent to a 45 degree line.

39. The method of claim 1 where said computation of said inferred-edge pieces favors the longer inferred edge in otherwise ambiguous situations.

40. The method of claim 1 where a said inferred-edge piece comprises at least one straight-line segment represented as a vector.

41. The method of claim 40 whereas said vector or bitmap representation of said inferred-edge pieces is computed by accessing a lookup table.

42. The method of claim 1 where a said inferred-edge pieces are represented as an uncolored, bivalued bitmap of greater resolution than the digitized source color image.

43. The method of claim 42 where said bitmap is generated in run-length encoded form.

44. The method of claim 42 where said vector or bit map representation of said inferral-edge pieces is computed by accessing a lookup table.

45. The method of claim 1 where said elemental unit of said second electronic color image is a pulse of modulated width and position.

46. The method of claim 45 where said pulse is also modulated in amplitude.

47. The method of claim 1 where said elemental unit of said second electronic color image is a standard red-green-blue binary-encoded pixel.

48. The method of claim 47 further including utilizing the predefined separate locations of the individual primary color subpixels in a fixed-pixel color display for increasing effective luminance resolution.

49. The method of claim 1 where said elemental unit of said second electronic color image is a standard cyan-magenta-yellow-black binary-encoded pixel.

50. The method of claim 1 where said color display device comprises a fixed-pixel flat-panel display.

51. A computational method for converting a digitized source color image, containing at least three different colors contiguously disposed, into a second electronic color image of different effective spatial resolution, comprising:

forming a scanned sequence of examination windows into said digitized color image, said examination windows being at least three pixels high and at least three pixels wide;

defining a corresponding scanned sequence of elemental inferral areas smaller than, and substantially centered within, said examination windows;

computing, in response to the pixels within the examination windows, at least one inferred-edge piece within at least some of said elemental inferral areas, said computing comprising selecting from among a predefined set of inferred-edge pieces, said selecting comprising detecting major subfeatures shared by a plurality of candidate inferred-edge pieces within the set of inferred-edge pieces; and combining the said inferred-edge pieces within at least one said elemental inferral-area, with color data from the source color image, to produce one elemental unit of said second electronic color image.

52. The method of claim 51 where exactly two said subfeature detections are combined to select the desired inferred-edge piece.

53. The method of claim 51 where said detection of a major subfeature serves to inhibit selection of a particular inferred-edge piece.

54. The method of claim 53 where said inhibitory subfeature is a local checkerboard pattern of pixels in said examination window.

55. The method of claim 53 where said subfeature is a single-pixel-sized typographic serif.

56. The method of claim 53 where said subfeature is a single pixel-sized typographic cross-stroke.

57. The method of claim 51 where selecting said inferred-edge piece includes prioritizing among multiple inferred-edge piece candidates of a given orientation which would be otherwise selected.

58. A computational method for converting a digitized source color image, containing at least three different colors contiguously disposed, into a second electronic color image of different effective spatial resolution, comprising:

forming a scanned sequence of examination windows into said digitized color image, said examination windows being at least three pixels high and at least three pixels wide;

defining a corresponding scanned sequence of elemental inferral areas smaller than, and substantially centered within, said examination windows;

computing, in response to the pixels within the examination windows, at least one inferred-edge piece within at least some of said elemental inferral areas; and combining the said inferred-edge pieces within at least one said elemental inferral-area, with color data from the source color image, to produce one elemental unit of said second electronic color image; and repeating the foregoing steps to form the second electonic image, where the resolution of the source color image is the same as the nominal resolution of an output device and the said elemental units of said second electronic color image are positioned on scan lines halfway between the scan lines of said computed elemental inferral-areas.

* * * * *